US012745775B2

(12) United States Patent
Mahajan et al.

(10) Patent No.: US 12,745,775 B2
(45) Date of Patent: Sep. 29, 2026

(54) AGROCHEMICAL COMPOSITION COMPRISING 3-SUBSTITUTED PHENYLAMIDINE COMPOUNDS AND USE THEREOF

(71) Applicant: PI INDUSTRIES LIMITED, Udaipur-Rajasthan (IN)

(72) Inventors: Vishal A. Mahajan, Pune (IN); Santosh Shridhar Autkar, Akola (IN); Siddaramaiah C R, Karnataka (IN); Hagalavadi M Venkatesha, Bengaluru (IN)

(73) Assignee: PI INDUSTRIES LIMITED, Udaipur-Rajasthan (IN)

( * ) Notice: Subject to any disclaimer, the term of this patent is extended or adjusted under 35 U.S.C. 154(b) by 545 days.

(21) Appl. No.: 18/038,736

(22) PCT Filed: Nov. 29, 2021

(86) PCT No.: PCT/IB2021/061054

§ 371 (c)(1),
(2) Date: May 25, 2023

(87) PCT Pub. No.: WO2022/113033

PCT Pub. Date: Jun. 2, 2022

(65) Prior Publication Data

US 2023/0413824 A1 Dec. 28, 2023

(30) Foreign Application Priority Data

Nov. 30, 2020 (IN) ............................ 202011052097

(51) Int. Cl.

| | |
|---|---|
| ***A01N 47/40*** | (2006.01) |
| ***A01N 37/50*** | (2006.01) |
| ***A01N 43/32*** | (2006.01) |
| ***A01N 43/40*** | (2006.01) |
| ***A01N 43/54*** | (2006.01) |
| ***A01N 43/56*** | (2006.01) |
| ***A01N 43/653*** | (2006.01) |
| ***A01N 47/04*** | (2006.01) |
| ***A01N 47/20*** | (2006.01) |
| ***A01N 55/02*** | (2006.01) |
| ***A01P 3/00*** | (2006.01) |

(52) U.S. Cl.

CPC ............ *A01N 47/40* (2013.01); *A01N 37/50* (2013.01); *A01N 43/32* (2013.01); *A01N 43/40* (2013.01); *A01N 43/54* (2013.01); *A01N 43/56* (2013.01); *A01N 43/653* (2013.01); *A01N 47/04* (2013.01); *A01N 47/20* (2013.01); *A01N 55/02* (2013.01); *A01P 3/00* (2021.08)

(58) Field of Classification Search

None

See application file for complete search history.

(56) References Cited

U.S. PATENT DOCUMENTS

2022/0089523 A1 * 3/2022 Naik .................... C07C 251/06

FOREIGN PATENT DOCUMENTS

WO WO 2017-076739 * 5/2017
WO 2020148617 A1 7/2020

OTHER PUBLICATIONS

PCT—ISR (PCT/IB2021/061054)—Nov. 30, 2020 (4 pgs).
PCT—WR OPN (PCT/IB2021/061054)—Nov. 30, 2020 (7 pgs).
FRAC Code List © 2022 Fungal control agents sorted by cross-resistance pattern and mode of action (including coding for FRAC Groups on product labels)—17 pages.

* cited by examiner

*Primary Examiner* — Valerie Rodriguez-Garcia
(74) *Attorney, Agent, or Firm* — Lippes Mathias LLP

(57) ABSTRACT

The present invention discloses a novel agrochemical composition comprising (1) at least one compound of formula (I)

Formula (I)

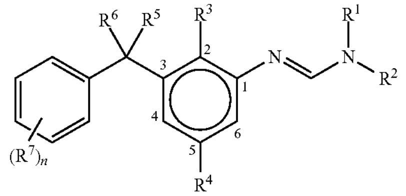

wherein, $R^1$, $R^2$, $R^3$, $R^4$, $R^5$, $R^6$, $R^7$ and n are as defined in the detailed description and (2) at least one further active ingredient. The present invention further discloses a method for controlling the phytopathogenic fungi of plants using the agrochemical composition according to invention.

10 Claims, No Drawings

AGROCHEMICAL COMPOSITION COMPRISING 3-SUBSTITUTED PHENYLAMIDINE COMPOUNDS AND USE THEREOF

This application is a National Stage Entry of International Application No. PCT/IB2021/061054, filed Nov. 29 2021, which claims priority to Indian Application No. 202011052097, filed Nov. 30, 2020.

FIELD OF THE INVENTION

The present invention relates to a novel agrochemical composition. More particularly, the present invention relates to a novel agrochemical composition which comprises a mixture of one or more phenylamidine compounds of formula (I) as a component (1) and one or more active compounds as component (2). Further, the present invention relates to a method for controlling phytopathogenic fungi of plants, to the use of a novel agrochemical composition according to the invention for the treatment of one or more seeds, to a method for protecting one or more seeds and to the corresponding treated seeds.

BACKGROUND OF THE INVENTION

The use of phenylamidine compounds as a fungicide was known from the following prior art documents: WO2000046184, WO2003093224, and WO2020148617 disclose arylamidine derivatives as fungicides.

WO2007031507, WO2005089547 and WO2003024219 disclose the fungicide mixtures comprising at least one arylamidine derivative and a further selected known fungicide.

The combinations of fungicides are often used to facilitate disease control and to retard resistance development. It is desirable to enhance the activity spectrum and the efficacy of disease control by using mixtures of active ingredients that provide a combination of curative, systemic and preventative control of plant pathogens. Also desirable are combinations that provide greater long lasting efficacy to allow for extended spray intervals. It is also very desirable to combine fungicidal agents that inhibit different biochemical pathways in the fungal pathogens to retard development of resistance to any particular plant disease control agent.

Fungicides that effectively control plant pathogens with a reduced quantity of chemical agent released in the environment are always desirable. Additionally, there is constant need to broaden the spectrum of activity, reduce toxicity and lower application rates. The present invention provides agrochemical compositions which in some aspects at least achieve the stated objectives.

Surprisingly, it has been found that the novel agrochemical compositions according to the invention not only bring about the additive enhancement of the spectrum of activity with respect to the phytopathogens to be controlled that was in principle to be expected, but also achieve a synergistic effect. The synergistic effect of the agrochemical compositions of the present invention helps to reduce the application rate of component (1) and component (2) by maintaining the level of efficacy even if the two individual compounds alone have become widely ineffective at such low application rates. Over and above, it allows a substantial broadening of the spectrum of phytopathogens that can be controlled, by, at the same time, increasing the safety in use.

In addition to the fungicidal and/or nematicidal and/or insecticidal synergistic activity, the agrochemical compositions according to the invention have further surprising properties which, in a wider sense, may also be called synergistic, such as, for example: broadening of the activity spectrum to other insects, nematodes and/or phytopathogens, for example to resistant strains of plant diseases; lower application rates of the active compounds; sufficient control of pests with the aid of the agrochemical composition according to the invention even at application rates where the individual compounds show virtually no activity; advantageous behavior during formulation or during use, for example during grinding, sieving, emulsifying, dissolving or dispensing; improved storage stability and light stability; advantageous residue formation; improved toxicological or eco-biological behavior; improved properties of the so called effects on plant physiology, for example better growth, increased harvest yields, a better developed root system, a larger leaf area, greener leaves, stronger shoots, less seed required, mobilization of the defense system of the plant, and good plant compatibility.

Thus, the use of the novel agrochemical compositions according to the invention contribute considerably, for example, to keeping young cereal stands healthy, which increases, for example, the winter survival of the cereal seed treated, and also safeguards quality and yield.

Moreover, the novel agrochemical compositions according to the invention may contribute to enhanced systemic action. Even if the individual compounds of the combination do not have sufficient systemic properties, the novel agrochemical composition according to the invention may still have this property. In a similar manner, the novel agrochemical composition according to the invention may result in higher long lasting efficacy of the fungicidal and/or insecticidal and/or nematicidal action.

SUMMARY OF THE INVENTION

Accordingly, the present invention provides a novel agrochemical composition comprising:

(1) at least one compound of formula (I)

Formula (I)

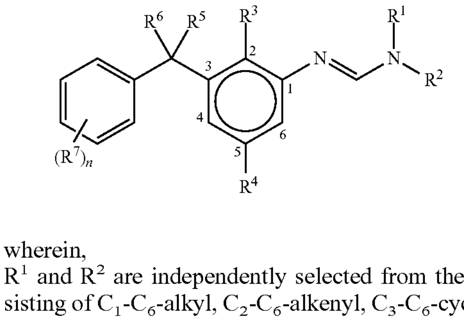

wherein, $R^1$ and $R^2$ are independently selected from the group consisting of $C_1$-$C_6$-alkyl, $C_2$-$C_6$-alkenyl, $C_3$-$C_6$-cycloalkyl-$C_1$-$C_3$-alkyl and $C_3$-$C_6$-cycloalkyl;

$R^3$ and $R^4$ are independently selected from the group consisting of halogen, cyano, $C_1$-$C_6$-alkyl, $C_1$-$C_6$-haloalkyl, $C_1$-$C_6$-alkoxy and $C_3$-$C_6$-cycloalkyl;

$R^5$ and $R^6$ are independently selected from the group consisting of hydrogen, halogen, cyano, $C_1$-$C_3$-alkyl, $C_1$-$C_3$-haloalkyl and $C_1$-$C_3$-alkoxy; or $R^5$ and $R^6$ together with the carbon atom to which they are attached may form a C═O, C═CR'R', C═NR' or cyclopropyl ring;

R' is selected from the group consisting of hydrogen, $C_1$-$C_3$-alkyl, $C_3$-$C_6$-cycloalkylalkyl and $C_1$-$C_3$-alkoxy;

$R^7$ is selected from the group consisting of hydrogen, halogen, cyano, $C_1$-$C_6$-alkyl, $C_1$-$C_6$-haloalkyl, $C_1$-$C_6$-alkoxy, $C_1$-$C_6$-haloalkoxy, $C_1$-$C_6$-alkylthio, $C_1$-$C_6$-alkylsulfinyl, $C_1$-$C_6$-alkylsulfonyl, $C_3$-$C_5$-cycloalkyl $C_3$-$C_6$-cycloalkyl-$C_1$-$C_3$-alkyl and phenyl;

each group of $R^1$, $R^2$, $R^3$, $R^4$, $R^5$, $R^6$ and $R^7$ may optionally be substituted by one or more groups selected from the group consisting of halogen, CN, $C_1$-$C_6$-alkyl, $C_1$-$C_6$-haloalkyl, $C_1$-$C_6$-alkoxy, $C_1$-$C_6$-alkylthio;

m represents integers 0, 1, 2, 3 or 4;

or salts, N-oxides, metal complexes or stereoisomers thereof;

and (2) at least one further active compound selected from the following groups:
- (A) inhibitors of the sterol synthesis,
- (B) inhibitors of the respiratory chain at complex I or II,
- (C) inhibitors of the respiratory chain at complex III,
- (D) inhibitors of the mitosis and cell division,
- (E) compounds capable of having a multisite action,
- (F) compounds capable of inducing a host defense,
- (G) inhibitors of the amino acid and/or protein biosynthesis,
- (H) inhibitors of the ATP production,
- (I) inhibitors of the cell wall synthesis,
- (J) inhibitors of the lipid and membrane synthesis,
- (K) inhibitors of the melanine biosynthesis,
- (L) inhibitors of the nucleic acid synthesis,
- (M) inhibitors of the signal transduction,
- (N) compounds capable of acting as uncoupler,
- (O) other fungicides,
- (P) inhibitors of histone deacetylase,
- (Q) compounds capable to act as a safener, and
- (R) biological fungicides.

In one embodiment, the present invention provides a method for controlling unwanted microorganisms, such as unwanted fungi and bacteria, comprising the step of applying at least one novel agrochemical composition according to the invention to the microorganisms and/or their habitat (to the plants, plant parts, seeds, fruits or to the soil in which the plants grow).

DETAILED DESCRIPTION OF THE INVENTION

Definitions

In the definitions of the symbols given in the above formulae, collective terms were used which are generally representative of the following substituents:

Hydrogen: Preferably, the definition of hydrogen encompasses also isotopes of hydrogen, preferably deuterium and tritium, more preferably deuterium.

Halogen: (also in combinations such as haloalkyl, haloalkoxy etc.) fluorine, chlorine, bromine and iodine, and preferably fluorine, chlorine, bromine and more preferably fluorine, chlorine;

Alkyl: (including in combinations such as alkylthio, alkoxy etc.) saturated, straight-chain or branched hydrocarbyl radicals having 1 to 6 carbon atoms, for example, $C_1$—C-alkyl, such as methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl and octyl. If the alkyl is at the end of a composite substituent, as, for example, in alkylcycloalkyl, the part of the composite substituent at the start, for example, the cycloalkyl, may be mono- or polysubstituted identically or differently and independently by alkyl.

Haloalkyl: (including in combinations such as haloalkylthio, haloalkoxy etc.) straight-chain or branched alkyl groups having 1 to 6 carbon atoms (as specified above), where some or all of the hydrogen atoms in these groups may be replaced by halogen atoms as specified above, for example, $C_1$-$C_3$-haloalkyl such as chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2-difluoroethyl, 2,2-dichloro-2-fluoroethyl, 2,2,2-trichloroethyl, pentafluoroethyl and 1,1,1-trifluoroprop-2-yl.

Halomethyl: a methyl group, where some or all of the hydrogen atoms in these group may be replaced by halogen atoms as specified above, for example, (but not limited to) chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, and preferably difluoromethyl or trifluoromethyl.

The term "cycloalkyl" means alkyl closed to form a ring. Non-limiting examples include but are not limited to cyclopropyl, cyclopentyl and cyclohexyl. This definition also applies to cycloalkyl as a part of a composite substituent, for example, cycloalkylalkyl etc., unless specifically defined elsewhere.

The term "alkoxy" used either alone or in compound words included $C_1$-$C_6$ alkoxy. Examples of alkoxy include methoxy, ethoxy, propoxy, 1-methylethoxy, butoxy, 1-methylpropoxy, 2-methylpropoxy, 1,1-dimethylethoxy, pentoxy, 1-methylbutoxy, 2-methylbutoxy, 3-methylbutoxy, 2,2-dimethylpropoxy, 1-ethylpropoxy, hexoxy, 1,1-dimethylpropoxy, 1,2-dimethylpropoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy and 1-ethyl-2-methylpropoxy and the different isomers.

Depending on the nature of the substituents, the compounds of formula (I) can be present as mixtures of different possible isomeric forms, in particular of stereoisomers, such as, for example, E and Z, threo and erythro, and also optical isomers, and, if appropriate, also of tautomers. If applicable, compounds of formula (I) comprise both the E and the Z isomers, and also the threo and erythro, and the optical isomers, any mixtures of these isomers, and the possible tautomeric forms.

Any of the compounds according to the invention can exist in one or more optical, geometric or chiral isomer forms depending on the number of asymmetric centres in the compound. The invention thus relates equally to all the optical isomers and to their racemic or scalemic mixtures (the term "scalemic" denotes a mixture of enantiomers in different proportions), and to the mixtures of all the possible stereoisomers, in all proportions. The diastereomers and/or the optical isomers can be separated according to the methods which are known per se by a person ordinary skilled in the art.

Any of the compounds according to the invention can also exist in one or more geometric isomer forms depending on the number of double bonds in the compound. The invention thus relates equally to all geometric isomers and to all possible mixtures, in all proportions. The geometric isomers can be separated according to general methods, which are known per se by a person ordinary skilled in the art.

Depending on the nature of the substituents, the compounds of formula (I) can also exist in one or more geometric isomer forms depending on the relative position (syn/anti or cis/trans) of the substituents of ring B. The invention thus relates equally to all syn/anti (or cis/trans) isomers and to all possible syn/anti (or cis/trans) mixtures, in all proportions. The syn/anti (or cis/trans) isomers can be separated according to general methods, which are known per se by the man ordinary skilled in the art.

The compound of formula (I) carry amidine groups which induce basic properties. Thus, these compounds can be reacted with acids to give salts.

Examples of inorganic acids are hydrohalic acids, such as hydrogen fluoride, hydrogen chloride, hydrogen bromide and hydrogen iodide, sulfuric acid, phosphoric acid and nitric acid, and acidic salts, such as $NaHSO_4$ and $KHSO_4$.

Suitable organic acids are, for example, formic acid, carbonic acid and alkanoic acids, such as acetic acid, trifluoroacetic acid, trichloroacetic acid and propionic acid, and also glycolic acid, thiocyanic acid, lactic acid, succinic acid, citric acid, benzoic acid, cinnamic acid, oxalic acid, alkylsulfonic acids (sulfonic acids having straight-chain or branched alkyl groups having 1 to 20 carbon atoms), arylsulfonic acids or—disulfonic acids (aromatic groups, such as phenyl and naphthyl, which carry one or two sulfonic acid groups), alkylphosphonic acids (phosphonic acids having straight-chain or branched alkyl groups having 1 to 20 carbon atoms), arylphosphonic acids or -diphosphonic acids (aromatic radicals, such as phenyl and naphthyl, which carry one or two phosphonic acid groups), where the alkyl and aryl groups may carry further substituents, for example, p-toluenesulfonic acid, salicylic acid, p-aminosalicylic acid, 2-phenoxybenzoic acid, 2-acetoxybenzoic acid, etc.

The radical definitions and explanations given above in general terms or stated within preferred ranges can, however, also be combined with one another as desired, i.e. including between the particular ranges and preferred ranges. They apply both to the end products and correspondingly to precursors and intermediates. In addition, individual definitions may not apply.

In an embodiment, the present invention provides a novel agrochemical composition comprising a mixture of component (1) and component (2), wherein component (1) is a at least one compound of formula (I)

Formula (I)

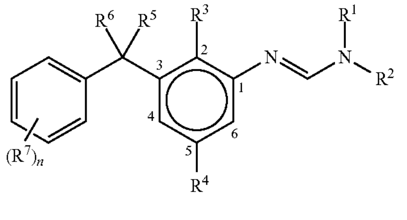

wherein, $R^1$ and $R^2$ are independently selected from the group consisting of $C_1$-$C_6$-alkyl, $C_2$-$C_6$-alkenyl, $C_3$-$C_6$-cycloalkyl-$C_1$-$C_3$-alkyl and $C_3$-$C_6$-cycloalkyl;

$R^3$ and $R^4$ are independently selected from the group consisting of halogen, cyano, $C_1$-$C_6$-alkyl, $C_1$-$C_6$-haloalkyl, $C_1$-$C_6$-alkoxy and $C_3$-$C_6$-cycloalkyl;

$R^5$ and $R^6$ are independently selected from the group consisting of hydrogen, halogen, cyano, $C_1$-$C_3$-alkyl and $C_1$-$C_3$-alkoxy; or $R^5$ and $R^6$ together with the carbon atom to which they are bound form a C═O, C═CR'R', C═NR' or cyclopropyl ring;

R' is selected from the group consisting of hydrogen, $C_1$-$C_3$-alkyl, $C_3$-$C_6$-cycloalkylalkyl and $C_1$-$C_3$-alkoxy;

$R^7$ is selected from the group consisting of hydrogen, halogen, cyano, $C_1$-$C_6$-alkyl, $C_1$-$C_6$-haloalkyl, $C_1$-$C_6$-alkoxy, $C_1$-$C_6$-haloalkoxy, $C_1$-$C_6$-alkylthio, $C_1$-$C_6$-alkylsulfinyl, $C_1$-$C_6$-alkylsulfonyl, $C_3$-$C_5$-cycloalkyl and $C_3$-$C_6$-cycloalkyl-$C_1$-$C_3$-alkyl;

n represents integers of 1, 2, 3 or 4;

or salts, N-oxides, metal complexes or stereoisomers thereof; and component (2) is a at least one further active compound selected from the following groups:

(A) inhibitors of the sterol synthesis,
(B) inhibitors of the respiratory chain at complex I or II,
(C) inhibitors of the respiratory chain at complex III,
(D) inhibitors of the mitosis and cell division,
(E) compounds capable of having a multisite action,
(F) compounds capable of inducing a host defense,
(G) inhibitors of the amino acid and/or protein biosynthesis,
(H) inhibitors of the ATP production,
(I) inhibitors of the cell wall synthesis,
(J) inhibitors of the lipid and membrane synthesis,
(K) inhibitors of the melanine biosynthesis,
(L) inhibitors of the nucleic acid synthesis,
(M) inhibitors of the signal transduction,
(N) compounds capable of acting as uncoupler,
(O) other fungicides,
(P) inhibitors of histone deacetylase,
(Q) compounds capable to act as a safener and
(R) biological fungicides.

In one embodiment, the component (2) is a at least one further active compound selected from the following groups:

(A) inhibitors of the sterol synthesis,
(B) inhibitors of the respiratory chain at complex I or II,
(C) inhibitors of the respiratory chain at complex III,
(D) inhibitors of the mitosis and cell division
(E) compounds capable of having a multisite action,
(I) inhibitors of the cell wall synthesis,
(L) inhibitors of the nucleic acid synthesis,
(M) inhibitors of the signal transduction,
(N) compounds capable of acting as uncoupler,
(O) other fungicides,
(P) inhibitors of histone deacetylase,
(Q) compounds capable to act as a safener, and
(R) biological fungicides.

In a preferred embodiment, the component (2) is a at least one further active compound selected from the following groups:

(A) inhibitors of the sterol biosynthesis
(B) inhibitors of the respiratory chain at complex I or II
(C) inhibitors of the respiratory chain at complex III (D) inhibitors of the mitosis and cell division
(E) compounds capable to have a multisite action
(L) inhibitors of the nucleic acid synthesis
(M) inhibitors of the signal transduction
(N) compounds capable to act as an uncoupler
(O) other fungicides and
(P) inhibitors of histone deacetylase.

Even more preferred, the component (2) is a at least one further active compound selected from the following groups:
(A) inhibitors of the sterol synthesis,
(B) inhibitors of the respiratory chain at complex I or II,
(C) inhibitors of the respiratory chain at complex III,
(E) compounds capable of having a multisite action,
(N) compounds capable of acting as uncoupler, and
(P) inhibitors of histone deacetylase.

In preferred embodiment, the compound of formula (I) is

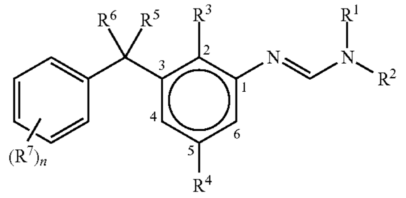

wherein,
$R^1$ is selected from the group consisting of methyl, ethyl, isopropyl and cyclopropyl;
$R^2$ is selected from the group consisting of ethyl, isopropyl, cyclopropyl and cyclopropylmethyl;
$R^3$ is selected from the group consisting of halogen, cyano, methyl, ethyl, isopropyl, halomethyl and cyclopropyl;
$R^4$ is selected from the group consisting of halogen, cyano, methyl, ethyl, isopropyl, halomethyl, methoxy and cyclopropyl;
$R^5$ and $R^6$ are independently selected from the group consisting of hydrogen, halogen, cyano, methyl, halo methyl and methoxy;
$R^5$ and $R^6$ together with the carbon atom to which they are bound form a cyclopropyl;
$R^7$ is selected from the group consisting of hydrogen, halogen, cyano, methyl, ethyl, isopropyl, halomethyl, methoxy, ethoxy, isopropoxy, halomethoxy, haloethoxy and cyclopropyl;
n represent integers 0, 1, 2, 3 or 4;
and salts, N-oxides, metal complexes or stereoisomers thereof.

In more preferred embodiment, the compound of formula (I) or salts, N-oxides, metal complexes or stereoisomers thereof as a component (1) is selected from:
(I-1) N'-(5-chloro-2-methyl-3-(3-methylbenzyl)phenyl)-N-ethyl-N-methylformimidamide;
(I-2) N'-(2,5-dimethyl-3-(4-methylbenzyl)phenyl)-N-ethyl-N-methylformimidamide;
(I-3) N'-(2,5-dimethyl-3-(2-methylbenzyl)phenyl)-N-ethyl-N-methylformimidamide;
(I-4) N-ethyl-N'-(3-(3-fluorobenzyl)-2,5-dimethylphenyl)-N-methylformimidamide;
(I-5) N-ethyl-N'-(5-fluoro-2-methyl-3-(3-methylbenzyl)phenyl)-N-methylformimidamide;
(I-6) N'-(5-chloro-2-methyl-3-(4-methylbenzyl)phenyl)-N-ethyl-N-methylformimidamide;
(I-7) N'-(3-(2-chlorobenzyl)-5-fluoro-2-methylphenyl)-N-ethyl-N-methylformimidamide;

(I-8) N'-(5-chloro-3-(4-cyanobenzyl)-2-methylphenyl)-N-ethyl-N-methylformimidamide;
(I-9) N'-(5-chloro-3-(4-methoxybenzyl)-2-methylphenyl)-N-ethyl-N-methylformimidamide;
(I-10) N'-(2-chloro-3-(4-methoxybenzyl)-5-methylphenyl)-N-ethyl-N-methylformimidamide;
(I-11) N'-(3-(2-bromobenzyl)-5-fluoro-2-methylphenyl)-N-ethyl-N-methylformimidamide;
(I-12) N-ethyl-N'-(3-(3-fluoro-2-methylbenzyl)-2,5-dimethylphenyl)-N-methylformimidamide;
(I-13) N-ethyl-N'-(3-(3-methoxybenzyl)-2,5-dimethylphenyl)-N-methylformimidamide;
(I-14) N'-(3-(4-(difluoromethoxy)benzyl)-2,5-dimethylphenyl)-N-ethyl-N-methylformimidamide;
(I-15) N'-(3-(2-(difluoromethoxy)benzyl)-2,5-dimethylphenyl)-N-ethyl-N-methylformimidamide or
(I-16) N-ethyl-N'-(3-(3-fluoro-5-methylbenzyl)-5-methoxy-2-methylphenyl)-N-methylformimidamide.

Preferred novel agrochemical compositions according to the invention comprise at least one further active compound (2) selected from:

(A) Inhibitors of the sterol biosynthesis, for example, (A001) cyproconazole, (A002) difenoconazole, (A003) epoxiconazole, (A004) fenhexamid, (A005) fenpropidin, (A006) fenpropimorph, (A007) fenpyrazamine, (A008) fluquinconazole, (A009) flutriafol, (A010) imazalil, (A011) imazalil sulfate, (A012) ipconazole, (A013) metconazole, (A014) myclobutanil, (A015) paclobutrazol, (A016) prochloraz, (A017) propiconazole, (A018) prothioconazole, (A019) pyrisoxazole, (A020) spiroxamine, (A021) tebuconazole, (A022) tetraconazole, (A023) triadimenol, (A024) tridemorph, (A025) triticonazole, (A026) (1R,2S,5S)-5-(4-chlorobenzyl)-2-(chloromethyl)-2-methyl-1-(1H-1,2,4-triazol-1-ylmethyl)cyclopentanol, (A027) (1S,2R,5R)-5-(4-chlorobenzyl)-2-(chloromethyl)-2-methyl-1-(1H-1,2,4-triazol-1-ylmethyl)cyclopentanol, (A028) (2R)-2-(1-chlorocyclopropyl)-4-[(1R)-2,2-dichlorocyclopropyl]-1-(1H-1,2,4-triazol-1-yl)butan-2-ol, (A029) (2R)-2-(1-chlorocyclopropyl)-4-[(1S)-2,2-dichlorocyclopropyl]-1-(1H-1,2,4-triazol-1-yl)butan-2-ol, (A030) (2R)-2-[4-(4-chlorophenoxy)-2-(trifluoromethyl)phenyl]-1-(1H-1,2,4-triazol-1-yl)propan-2-ol, (A031) (2S)-2-(1-chlorocyclopropyl)-4-[(1R)-2,2-dichlorocyclopropyl]-1-(1H-1,2,4-triazol-1-yl)butan-2-ol, (A032) (2S)-2-(1-chlorocyclopropyl)-4-[(1S)-2,2-dichlorocyclopropyl]-1-(1H-1,2,4-triazol-1-yl)butan-2-ol, (A033) (2S)-2-[4-(4-chlorophenoxy)-2-(trifluoromethyl)phenyl]-1-(1H-1,2,4-triazol-1-yl)propan-2-ol, (A034) (R)-[3-(4-chloro-2-fluorophenyl)-5-(2,4-difluorophenyl)-1,2-oxazol-4-yl](pyridin-3-yl)methanol, (A035) (S)-[3-(4-chloro-2-fluorophenyl)-5-(2,4-difluorophenyl)-1,2-oxazol-4-yl](pyridin-3-yl)methanol, (A036) [3-(4-chloro-2-fluorophenyl)-5-(2,4-difluorophenyl)-1,2-oxazol-4-yl](pyridin-3-yl)methanol, (A037) 1-({(2R,4S)-2-[2-chloro-4-(4-chlorophenoxy)phenyl]-4-methyl-1,3-dioxolan-2-yl}methyl)-1H-1,2,4-triazole, (A038) 1-({(2S,4S)-2-[2-chloro-4-(4-chlorophenoxy)phenyl]-4-methyl-1,3-dioxolan-2-yl}methyl)-1H-1,2,4-triazole, (A039) 1-{[3-(2-chlorophenyl)-2-(2,4-difluorophenyl)oxiran-2-yl]methyl}-1H-1,2,4-triazol-5-yl thiocyanate, (A040) 1-{[rel(2R,3R)-3-(2-chlorophenyl)-2-(2,4-difluorophenyl)oxiran-2-yl]methyl}-1H-1,2,4-triazol-5-yl thiocyanate, (A041) 1-{[rel(2R,3S)-3-(2-chlorophenyl)-2-(2,4-difluorophenyl)oxiran-2-yl]methyl}-1H-1,2,4-triazol-5-yl thiocyanate, (A042) 2-[(2R,4R,5R)-1-(2,4-dichlorophenyl)-5-hydroxy-2,6,6-trimethylheptan-4-yl]-2,4-dihydro-3H-1,2,4-triazole-3-thione, (A043) 2-[(2R,4R,5S)-1-(2,4-dichlorophenyl)-5-hydroxy-2,6,6-trimethylheptan-4-yl]-2,4-dihydro-3H-1,2,4-triazole-3-thione, (A044) 2-[(2R,4S,5R)-1-(2,4-dichlorophenyl)-5-hydroxy-2,6,6-trimethylheptan-4-yl]-2,4-dihydro-3H-1,2,4-triazole-3-thione, (A045) 2-[(2R,4S,5S)-1-(2,4-dichlorophenyl)-5-hydroxy-2,6,6-trimethylheptan-4-yl]-2,4-dihydro-3H-1,2,4-triazole-3-thione, (A046) 2-[(2S,4R,5R)-1-(2,4-dichlorophenyl)-5-hydroxy-2,6,6-trimethylheptan-4-yl]-2,4-dihydro-3H-1,2,4-triazole-3-thione, (A047) 2-[(2S,4R,5S)-1-(2,4-dichlorophenyl)-5-hydroxy-2,6,6-trimethylheptan-4-yl]-2,4-dihydro-3H-1,2,4-triazole-3-thione, (A048) 2-[(2S,4S,5R)-1-(2,4-dichlorophenyl)-5-hydroxy-2,6,6-trimethylheptan-4-yl]-2,4-dihydro-3H-1,2,4-triazole-3-thione, (A049) 2-[(2S,4S,5S)-1-(2,4-dichlorophenyl)-5-hydroxy-2,6,6-trimethylheptan-4-yl]-2,4-dihydro-3H-1,2,4-triazole-3-thione, (A050) 2-[1-(2,4-dichlorophenyl)-5-hydroxy-2,6,6-trimethylheptan-4-yl]-2,4-dihydro-3H-1,2,4-triazole-3-thione, (A051) 2-[2-chloro-4-(2,4-dichlorophenoxy)phenyl]-1-(1H-1,2,4-triazol-1-yl)propan-2-ol, (A052) 2-[2-chloro-4-(4-chlorophenoxy)phenyl]-1-(1H-1,2,4-triazol-1-yl)butan-2-ol, (A053) 2-[4-(4-chlorophenoxy)-2-(trifluoromethyl)phenyl]-1-(1H-1,2,4-triazol-1-yl)butan-2-ol, (A054) 2-[4-(4-chlorophenoxy)-2-(trifluoromethyl)phenyl]-1-(1H-1,2,4-triazol-1-yl)pentan-2-ol, (A055) 2-[4-(4-chlorophenoxy)-2-(trifluoromethyl)phenyl]-1-(1H-1,2,4-triazol-1-yl)propan-2-ol, (A056) 2-{[3-(2-chlorophenyl)-2-(2,4-difluorophenyl)oxiran-2-yl]methyl}-2,4-dihydro-3H-1,2,4-triazole-3-thione, (A057) 2-{[rel(2R,3R)-3-(2-chlorophenyl)-2-(2,4-difluorophenyl)oxiran-2-yl]methyl}-2,4-dihydro-3H-1,2,4-triazole-3-thione, (A058) 2-{[rel(2R,3S)-3-(2-chlorophenyl)-2-(2,4-difluorophenyl)oxiran-2-yl]methyl}-2,4-dihydro-3H-1,2,4-triazole-3-thione, (A059) 5-(4-chlorobenzyl)-2-(chloromethyl)-2-methyl-1-(1H-1,2,4-triazol-1-ylmethyl)cyclopentanol, (A060) 5-(allylsulfanyl)-1-{[3-(2-chlorophenyl)-2-(2,4-difluorophenyl)oxiran-2-yl]methyl}-1H-1,2,4-triazole, (A061) 5-(allylsulfanyl)-1-{[rel(2R,3R)-3-2-chlorophenyl)-2-(2,4-difluorophenyl)oxiran-2-yl]methyl}-1H-1,2,4-triazole, (A062) 5-(allylsulfanyl)-1-{[rel(2R,3S)-3-(2-chlorophenyl)-2-(2,4-difluorophenyl)oxiran-2-yl]methyl}-1H-1,2,4-triazole, (A063) bromuconazole, (A064) diniconazole, (A065) diniconazole-M, (A066) etaconazole, (A067) fenbuconazole, (A068) hexaconazole, (A069) imibenconazole, (A070) penconazole, (A071) simeconazole, (A072) triadimefon, (A073) uniconazole, (A074) pyributicarb, (A075) dodemorph, (A076) aldimorph, (A077) trimorphamide, (A078) piperalin, (A079) naftifine, (A080) terbinafine, (A081) mefentrifluconazole, (A082) Ipfentrifluconazole, (A083) 1-(2,4-difluorophenyl)-2-(1H-1,2,4-triazol-1-yl)-1-[1-(2,6-difluoro-4-chlorophenoxy)cyclopropyl]ethanol, (A084) 1-[2-(1-chlorocyclopropyl)-3-(2-fluorophenyl)-2-hydroxypropyl]-1H-imidazole-5-carbonitrile, (A085) difenoconazole, (A086) buthiobate, (A087) pyrifenox, (A088) fenarimol, (A089) nuarimol, (A090) triarimol, (A091) triforine, (A092) clotrimazole, (A093) econazole, (A094) isoconazole, (A095) miconazole, (A096) oxpoconazole, (A097) pefurazoate, (A098) triflumizole, (A099) azaconazole, (A100) bitertanol, (A081) mefentrifluconazole, (A082) ipfentrifluconazole, (A083) 1-(2,4-difluorophenyl)-2-(1H-1,2,4-triazol-1-yl)-1-[1-(2,6-difluoro-4-chlorophenoxy)cyclopropyl]ethanol, (A084) 1-[2-(1-chlorocyclopropyl)-3-(2-fluorophenyl)-2-hydroxypropyl]-1H-imidazole-5-carbonitrile, (A085) terbinafine, (A086) buthiobate, (A087) pyrifenox, (A088) fenarimol, (A089) nuarimol, (A090) triarimol, (A091) triforine, (A092) clotrimazole, (A093) econazole, (A094) isoconazole, (A095) miconazole, (A096) oxpoconazole, (A097) pefurazoate, (A098) triflumizole, (A099) azaconazole, (A100) bitertanol;

(B) Inhibitors of the respiratory chain at complex I or II, for example, (B001) benzovindiflupyr, (B002) bixafen, (B003) boscalid, (B004) carboxin, (B005) fluopyram, (B006) flutolanil, (B007) fluxapyroxad, (B008) furametpyr, (B009) isofetamid, (B010) isopyrazam (anti-epimeric enantiomer 1R,4S,9S), (B011) isopyrazam (anti-epimeric enantiomer 1S,4R,9R), (B012) isopyrazam (anti-epimeric racemate 1RS,4SR,9SR), (B013) isopyrazam (mixture of syn-epimeric racemate 1RS,4SR,9RS and anti-epimeric racemate 1RS,4SR,9SR), (B014) isopyrazam (syn-epimeric enantiomer 1R,4S,9R), (B015) isopyrazam (syn-epimeric enantiomer 1S,4R,9S), (B016) isopyrazam (syn-epimeric racemate 1RS,4SR,9RS), (B017) penflufen, (B018) penthiopyrad, (B019) pydiflumetofen, (B020) pyraziflumid, (B021) sedaxane, (B022) 1,3-dimethyl-N-(1,1,3-trimethyl-2,3-dihydro-1H-inden-4-yl)-1H-pyrazole-4-carboxamide, (B023) 1,3-dimethyl-N-[(3R)-1,1,3-trimethyl-2,3-dihydro-1H-inden-4-yl]-1H-pyrazole-4-carboxamide, (B024) 1,3-dimethyl-N-[(3S)-1,1,3-trimethyl-2,3-dihydro-1H-inden-4-yl]-1H-pyrazole-4-carboxamide, (B025) 1-methyl-3-(trifluoromethyl)-N-[2'-(trifluoromethyl)biphenyl-2-yl]-1H-pyrazole-4-carboxamide, (B026) 2-fluoro-6-(trifluoromethyl)-N-(1,1,3-trimethyl-2,3-dihydro-1H-inden-4-yl)benzamide, (B027) 3-(difluoromethyl)-1-methyl-N-(1,1,3-trimethyl-2,3-dihydro-1H-inden-4-yl)-1H-pyrazole-4-carboxamide, (B028) 3-(difluoromethyl)-1-methyl-N-[(3R)-1,1,3-trimethyl-2,3-dihydro-1H-inden-4-yl]-1H-pyrazole-4-carboxamide (inpyrfluxam), (B029) 3-(difluoromethyl)-1-methyl-N-[(3S)-1,1,3-trimethyl-2,3-dihydro-1H-inden-4-yl]-1H-pyrazole-4-carboxamide, (B030) 3-(difluoromethyl)-N-(7-fluoro-1,1,3-trimethyl-2,3-dihydro-1H-inden-4-yl)-1-methyl-1H-pyrazole-4-carboxamide (Fluindapyr), (B031) 3-(difluoromethyl)-N-[(3R)-7-fluoro-1,1,3-trimethyl-2,3-dihydro-1H-inden-4-yl]-1-methyl-1H-pyrazole-4-carboxamide, (B032) 3-(difluoromethyl)-N-[(3S)-7-fluoro-1,1,3-trimethyl-2,3-dihydro-1H-inden-4-yl]-1-methyl-1H-pyrazole-4-carboxamide, (B033) 5,8-difluoro-N-[2-(2-fluoro-4-{[4-(trifluoromethyl)pyridin-2-yl]oxy}phenyl)ethyl]quinazolin-4-amine, (B034) N-(2-cyclopentyl-5-fluorobenzyl)-N-cyclopropyl-3-(difluoromethyl)-5-fluoro-1-methyl-1-H-pyrazole-4-carboxamide, (B035) N-(2-tert-butyl-5-methylbenzyl)-N-cyclopropyl-3-(difluoromethyl)-5-fluoro-1-methyl-1H-pyrazole-4-carboxamide, (B036) N-(2-tert-butylbenzyl)-N-cyclopropyl-3-(difluoromethyl)-5-fluoro-1-methyl-1H-pyrazole-4-carboxamide, (B037) N-(5-chloro-2-ethylbenzyl)-N-cyclopropyl-3-(difluoromethyl)-5-fluoro-1-methyl-1H-pyrazole-4-carboxamide, (B038) N-(5-chloro-2-isopropylbenzyl)-N-cyclopropyl-3-(difluoromethyl)-5-fluoro-1-methyl-1H-pyrazole-4-carboxamide (isoflucpyram), (B039) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (B040) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide, (B041) N-[1-(2,4-dichlorophenyl)-1-methoxypropan-2-yl]-3-(difluoromethyl)-1-methyl-1H-pyrazole-4-carboxamide, (B042) N-[2-chloro-6-(trifluoromethyl)benzyl]-N-cyclopropyl-3-(difluoromethyl)-5-fluoro-1-methyl-1H-pyrazole-4-carboxamide, (B043) N-[3-chloro-2-fluoro-6-(trifluoromethyl)benzyl]-N-cyclopropyl-3-(difluoromethyl)-5-fluoro-1-methyl-1H-pyrazole-4-carboxamide, (B044) N-[5-chloro-2-(trifluoromethyl)benzyl]-N-cyclopropyl-3-(difluoromethyl)-5-fluoro-1-methyl-1H-pyrazole-4-carboxamide, (B045) N-cyclopropyl-3-(difluoromethyl)-5-fluoro-1-methyl-N-[5-methyl-2-(trifluoromethyl)benzyl]-1H-pyrazole-4-carboxamide, (B046) N-cyclopropyl-3-(difluoromethyl)-5-fluoro-N-(2-fluoro-6-isopropylbenzyl)-1-methyl-1H-pyrazole-4-carboxamide, (B047) N-cyclopropyl-3-(difluoromethyl)-5-fluoro-N-(2-isopropyl-5-methylbenzyl)-1-methyl-1H-pyrazole-4-carboxamide, (B048) N-cyclopropyl-3-(difluoromethyl)-5-fluoro-N-(2-isopropylbenzyl)-1-methyl-1H-pyrazole-4-carbothioamide, (B049) N-cyclopropyl-3-(difluoromethyl)-5-fluoro-N-(2-isopropylbenzyl)-1-methyl-1H-pyrazole-4-carboxamide, (B050) N-cyclopropyl-3-(difluoromethyl)-5-fluoro-N-(5-fluoro-2-isopropylbenzyl)-1-methyl-1H-pyrazole-4-carboxamide, (B051) N-cyclopropyl-3-(difluoromethyl)-N-(2-ethyl-4,5-dimethylbenzyl)-5-fluoro-1-methyl-1H-pyrazole-4-carboxamide, (B052) N-cyclopropyl-3-(difluoromethyl)-N-(2-ethyl-5-fluorobenzyl)-5-fluoro-1-methyl-1H-pyrazole-4-carboxamide, (B053) N-cyclopropyl-3-(difluoromethyl)-N-(2-ethyl-5-methylbenzyl)-5-fluoro-1-methyl-1H-pyrazole-4-carboxamide, (B054) N-cyclopropyl-N-(2-cyclopropyl-5-fluorobenzyl)-3-(difluoromethyl)-5-fluoro-1-methyl-1H-pyrazole-4-carboxamide, (B055) N-cyclopropyl-N-(2-cyclopropyl-5-methylbenzyl)-3-(difluoromethyl)-5-fluoro-1-methyl-1H-pyrazole-4-carboxamide, (B056) N-cyclopropyl-N-(2-cyclopropylbenzyl)-3-(difluoromethyl)-5-fluoro-1-methyl-1H-pyrazole-4-carboxamide, (B057) 2-(difluoromethyl)-N-(1,1-dimethyl-3-propyl-2,3-dihydro-1H-inden-4-yl)nicotinamide, (B058) pyrapropoyne, (B059) inpyrfluxam, (B060) mepronil, (B061) isoflucypram, (B062) oxycarboxin, (B063) α-(methoxyimino)-N-methyl-2-[[[1-[3-(trifluoromethyl)phenyl]ethoxy]imino]methyl]benzeneacetamide, (B064) diflumetorim, (B065) thifluzamide, (B066) fenfuram, (B068) benodanil, (B069) cyclobutrifluram, (B070) flubeneteram, (B071) pyrapropoyne;

(C) Inhibitors of the respiratory chain at complex III, for example, (C001) ametoctradin, (C002) amisulbrom, (C003) azoxystrobin, (C004) coumethoxystrobin, (C005) coumoxystrobin, (C006) cyazofamid, (C007) dimoxystrobin, (C008) enoxastrobin, (C009) famoxadone, (C010) fenamidone, (C011) flufenoxystrobin, (C012) fluoxastrobin, (C013) kresoxim-methyl, (C014) metominostrobin, (C015) orysastrobin, (C016) picoxystrobin, (C017) pyraclostrobin, (C018) pyrametostrobin, (C019) pyraoxystrobin, (C020) trifloxystrobin, (C021) (2E)-2-{2-[({[(1E)-1-(3-{[(E)-1-fluoro-2-phenylvinyl]oxy} phenyl)ethylidene]amino} oxy)methyl]phenyl}-2-(methoxyimino)-N-methylacetamide, (C022) (2E,3Z)-5-{[1-(4-chlorophenyl)-1H-pyrazol-3-yl]oxy}-2-(methoxyimino)-N,3-dimethylpent-3-enamide, (C023) (2R)-2-{2-[(2,5-dimethylphenoxy)methyl]phenyl}-2-methoxy-N-methylacetamide, (C024) (2S)-2-{2-[(2,5-dimethylphenoxy)methyl]phenyl}-2-methoxy-N-methylacetamide, (C025) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl-2-methylpropanoate (Fenpicoxamid), (C026) 2-{2-[(2,5-dimethylphenoxy)methyl]phenyl}-2-methoxy-N-methylacetamide (Mandestrobin), (C027) N-(3-ethyl-3,5,5-trimethylcyclohexyl)-3-formamido-2-hydroxybenzamide, (C028) (2E,3Z)-5-{[1-(4-chloro-2-fluorophenyl)-1H-pyrazol-3-yl]oxy}-2-(methoxyimino)-N,3-dimethylpent-3-enamide, (C029) methyl {5-[3-(2,4-dimethylphenyl)-1H-pyrazol-1-yl]-2-methylbenzyl}carbamate, (C030) 1-(2-{[1-(4-chlorophenyl)pyrazol-3-yl]oxymethyl}-3-methylphenyl)-1,4-dihydro-4-methyl-5H-tetrazol-5-one (metyltetraprole), (C031) florylpicoxamid, (C032) pyribencarb, (C033) α-(methoxyimino)-N-methyl-2-[[[1-[3-(trifluoromethyl)phenyl]ethoxy]imino]methyl]benzeneacetamide, (C034) metarylpicoxamid;

(D) Inhibitors of the mitosis and cell division, for example, (D001) carbendazim, (D002) diethofencarb, (D003) ethaboxam, (D004) fluopicolide, (D005) pencycuron, (D006) thiabendazole, (D007) thiophanate-methyl, (D008) zoxamide, (D009) 3-chloro-4-(2,6-difluorophenyl)-6-methyl-5-phenylpyridazine, (D010) 3-chloro-5-(4-chlorophenyl)-4-(2,6-difluorophenyl)-6-methylpylidazine, (D011) 3-chloro-5-(6-chloropyridin-3-yl)-6-methyl-4-(2,4,6-trifluorophenyl)pyridazine, (D012) 4-(2-bromo-4-fluorophenyl)-N-(2,6-difluorophenyl)-1,3-dimethyl-1H-pyrazol-5-amine, (D013) 4-(2-bromo-4-fluorophenyl)-N-(2-bromo-6-fluorophenyl)-1,3-dimethyl-1H-pyrazol-5-amine, (D014) 4-(2-bromo-4-fluorophenyl)-N-(2-bromophenyl)-1,3-dimethyl-1H-pyrazol-5-amine, (D015) 4-(2-bromo-4-fluorophenyl)-N-(2-chloro-6-fluorophenyl)-1,3-dimethyl-1H-pyrazol-5-amine, (D016) 4-(2-bromo-4-fluorophenyl)-N-(2-chlorophenyl)-1,3-dimethyl-1H-pyrazol-5-amine, (D017) 4-(2-bromo-4-fluorophenyl)-N-(2-fluorophenyl)-1,3-dimethyl-1H-pyrazol-5-amine, (D018) 4-(2-chloro-4-fluorophenyl)-N-(2,6-difluorophenyl)-1,3-dimethyl-1H-pyrazol-5-amine, (D019) 4-(2-chloro-4-fluorophenyl)-N-(2-chloro-6-fluorophenyl)-1,3-dimethyl-1H-pyrazol-5-amine, (D020) 4-(2-chloro-4-fluorophenyl)-N-(2-chlorophenyl)-1,3-dimethyl-1H-pyrazol-5-amine, (D021) 4-(2-chloro-4-fluorophenyl)-N-(2-fluorophenyl)-1,3-dimethyl-1H-pyrazol-5-amine, (D022) 4-(4-chlorophenyl)-5-(2,6-difluorophenyl)-3,6-dimethylpyridazine, (D023) N-(2-bromo-6-fluorophenyl)-4-(2-chloro-4-fluorophenyl)-1,3-dimethyl-1H-pyrazol-5-amine, (D024) N-(2-bromophenyl)-4-(2-chloro-4-fluorophenyl)-1,3-dimethyl-1H-pyrazol-5-amine, (D025) N-(4-chloro-2,6-difluorophenyl)-4-(2-chloro-4-fluorophenyl)-1,3-dimethyl-1H-pyrazol-5-amine, (D026) benomyl;

(E) Compounds capable to have a multisite action, for example, (E001) bordeaux mixture, (E002) captafol, (E003) captan, (E004) chlorothalonil, (E005) copper hydroxide, (E006) copper naphthenate, (E007) copper oxide, (E008) copper oxychloride, (E009) copper(2+) sulfate, (E010) dithianon, (E011) dodine, (E012) folpet, (E013) mancozeb, (E014) maneb, (E015) metiram, (E016) metiram zinc, (E017) oxine-copper, (E018) propineb, (E019) sulfur and sulfur preparations including calcium polysulfide, (E020) thiram, (E021) zineb, (E022) ziram, (E023) 6-ethyl-5,7-dioxo-6,7-dihydro-5H-pynolo[3',4':5,6][1,4]dithiino[2,3-c][1,2]thiazole-3-carbonitrile, (E024) ferbam, (E025) dichlofluanid, (E026) tolylfluanid, (E027) guazatine, (E028) iminoctadine, (E029) anilazine, (E030) quinomethionate;

(F) Compounds capable to induce a host defence, for example, (F001) acibenzolar-S-methyl, (F002) isotianil, (F003) probenazole, (F004) tiadinil;

(G) Inhibitors of the amino acid and/or protein biosynthesis, for example, (G001) cyprodinil, (G002) kasugamycin, (G003) kasugamycin hydrochloride hydrate, (G004) oxytetracycline, (G005) pyrimethanil, (G006) 3-(5-fluoro-3,3,4,4-tetramethyl-3,4-dihydroisoquinolin-1-yl)quinoline, (G007) fuberidazole, (G008) thiophanate, (G009) blasticidin-S, (G010) streptomycin, (G011) mepanipyrim;

(H) Inhibitors of the ATP production, for example, (H001) silthiofam, (H002) fentin acetate, (H003) fentin chloride, (H004) fentin hydroxide;

(I) Inhibitors of the cell wall synthesis, for example, (I001) benthiavalicarb, (I002) dimethomorph, (I003) flumorph, (I004) iprovalicarb, (I005) mandipropamid, (I006) pyrimorph, (I007) valifenalate, (I008) (2E)-3-(4-tert-butylphenyl)-3-(2-chloropyridin-4-yl)-1-(morpholin-4-yl)prop-2-en-1-one, (I009) (2Z)-3-(4-tert-butylphenyl)-3-(2-chloropyridin-4-yl)-1-(morpholin-4-yl)prop-2-en-1-one, (I010) benthiavalicarb-isopropyl, (I011) polyoxins, (I012) N-[2-[4-[[3-(4-chlorophenyl)-2-propyn-1-yl]oxy]-3-, (I013) methoxyphenyl]ethyl]-3-methyl-2-[(methylsulfonyl)-amino]butanamide, (I014) N-[2-[4-[[3-(4-chlorophenyl)-2-propyn-1-yl]oxy]-3-methoxyphenyl]-ethyl]-3-methyl-2-[(ethylsulfonyl)amino]butanamide;

(J) Inhibitors of the lipid and membrane synthesis, for example, (J001) propamocarb, (J002) propamocarb hydrochloride, (J003) tolclofos-methyl, (J004) difenphos, (J005) iodocarb, (J006) prothiocarb, (J007) edifenphos, (J008) iprobenfos, (J009) pyrazophos, (J010) isoprothiolane, (J011) etridiazole, (J012) biphenyl, (J013) chloroneb, (J014) dicloran, (J015) quintozene, (J016) tecnazene;

(K) Inhibitors of the melanin biosynthesis, for example, (K001) tricyclazole, (K002) 2,2,2-trifluoroethyl {3-methyl-1-[(4-methylbenzoyl)amino]butan-2-yl}carbamate, (K003) carpropamid, (K004) diclocymet, (K005) fenoxanil, (K006) fthalide, (K007) pyroquilon;

(L) Inhibitors of the nucleic acid synthesis, for example, (L001) benalaxyl, (L002) benalaxyl-M (kiralaxyl), (L003) metalaxyl, (L004) metalaxyl-M (mefenoxam), (L005) ethirimol, (L006) furalaxyl, (L007) ofurace, (L008) oxolinic acid, (L009) hymexazole, (L010) octhilinone, (L011) bupirimate, (L012) dimethirimol;

(M) Inhibitors of the signal transduction, for example, (M001) fludioxonil, (M002) iprodione, (M003) procymidone, (M004) proquinazid, (M005) quinoxyfen, (M006) vinclozolin, (M007) chlozolinate, (M008) fenpiclonil, (M009) proquinazid, (M010) 2-butoxy-6-iodo-3-propyl-4H-1-benzopyran-4-one;

(N) Compounds capable to act as an uncoupler, for example, (N001) fluazinam, (N002) meptyldinocap, (N003) binapacryl, (N004) dinocap;

(O) Other fungicides, for example, (O001) abscisic acid, (O002) benthiazole, (O003) bethoxazin, (O004) capsimycin, (O005) carvone, (O006) chinomethionat, (O007) cufraneb, (O008) cyflufenamid, (O009)

cymoxanil, (O010) cyprosulfamide, (O011) flutianil, (O012) fosetyl-aluminium, (O013) fosetyl-calcium, (O014) fosetyl-sodium, (O015) methyl isothiocyanate, (O016) metrafenone, (O017) mildiomycin, (O018) natamycin, (O019) nickel dimethyldithiocarbamate, (O020) nitrothal-isopropyl, (O021) oxamocarb, (O022) oxathiapiprolin, (O023) oxyfenthiin, (O024) pentachlorophenol and salts, (O025) phosphorous acid and its salts, (O026) propamocarb-fosetylate, (O027) pyriofenone (chlazafenone), (O028) tebufloquin, (O029) tecloftalam, (O030) tolnifanide, (O031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (O032) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-H-pyrazol-1-yl]ethanone, (O033) 2-(6-benzylpyridin-2-yl)quinazoline, (O034) 2,6-dimethyl-1H,5H-[1,4]dithiino[2,3-c:5,6-c']dipyrrole-1,3,5,7(2H,6H)-tetrone, (O035) 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, (O036) 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, (O037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, (O038) 2-[6-(3-fluoro-4-methoxyphenyl)-5-methylpyridin-2-yl]quinazoline, (O039) 2-{(5R)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (O040) 2-{(5S)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (O041) 2-{2-[(7,8-difluoro-2-methylquinolin-3-yl)oxy]-6-fluorophenyl}propan-2-ol, (O042) 2-{2-fluoro-6-[(8-fluoro-2-methylquinolin-3-yl)oxy]phenyl}propan-2-ol, (O043) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate (fluoxapiprolin), (O044) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}phenyl methanesulfonate, (O045) 2-phenylphenol and salts, (O046) 3-(4,4,5-trifluoro-3,3-dimethyl-3,4-dihydroisoquinolin-1-yl)quinoline, (O047) 3-(4,4-difluoro-3,3-dimethyl-3,4-dihydroisoquinolin-1-yl)quinoline (Quinofumelin), (O048) 4-amino-5-fluoropyrimidin-2-ol (tautomeric form: 4-amino-5-fluoropyrimidin-2(1H)-one), (O049) 4-oxo-4-[(2-phenylethyl)amino]butanoic acid, (O050) 5-amino-1,3,4-thiadiazole-2-thiol, (O051) 5-chloro-N'-phenyl-N'-(prop-2-yn-1-yl)thiophene-2-sulfonohydrazide, (O052) 5-fluoro-2-[(4-fluorobenzyl)oxy]pyrimidin-4-amine, (O053) 5-fluoro-2-[(4-methylbenzyl)oxy]pyrimidin-4-amine, (O054) 9-fluoro-2,2-dimethyl-5-(quinolin-3-yl)-2,3-dihydro-1,4-benzoxazepine, (O055) but-3-yn-1-yl{6-[({[(Z)-(1-methyl-1H-tetrazol-5-yl)(phenyl)methylene]aminoI oxy)methyl]pyridin-2-yl}carbamate, (O056) ethyl (2Z)-3-amino-2-cyano-3-phenylacrylate, (O057) phenazine-1-carboxylic acid, (O058) propyl 3,4,5-trihydroxybenzoate, (O059) quinolin-8-ol, (O060) quinolin-8-ol sulfate (2:1), (O061) tert-butyl {6-[({[(1-methyl-1H-tetrazol-5-yl)(phenyl)methylene] amino}oxy)methyl]pyridin-2-yl}carbamate, (O062) 5-fluoro-4-imino-3-methyl-1-[(4-methylphenyl)sulfonyl]-3,4-dihydropyrimidin-2(1H)-one, (O063) pyridachlometyl, (O064) ipflufenoquin, (O065) aminopyrifen, (O066) N-[[(cyclopropyl-methoxy)amino][6-(difluoromethoxy)-2,3-difluorophenyl]-methylene] benzeneacetamide, (O067) methasulfocarb, (O068) nabam, (O069) oxine copper, (O070) ditalimfos, (O071) drazoxolon, (O072) tolyfluanide, (O073) diclobutrazol, (O074) cyprofuram, (O075) phophorous acid and salts, (O076) ferimzone, (O077) pyrrolnitrin, (O078) triazoxide, (O079) flusulfamide, (O080) diclomezine, (O081) mineral oils, (O082) organic oils, (O083) inorganic oils, (O084) potassium bicarbonate, (O085) ferric methanearsonate, (O086) 4-fluorophenyl-N-[1-[[[1-(4-cyanophenyl)ethyl]sulfonyl]methyl] propyl]carbamate, (O087) 5-chloro-6-(2,4,6-trifluorophenyl)-7-(4-methylpiperidin-1-yl)[1,2,4]triazolo[1,5-a]pyrimidine, (O088) N-[4-[4-chloro-3-(trifluoromethyl)phenoxy]-2,5-dimethylphenyl]-N-ethyl-N-methylmethanimidamide;

(P) Inhibitors of histone deacetylase, for example, (P001) N-(1-ethylcyclopropyl)-4-[5-(trifluoromethyl)-1,2,4-oxadiazol-3-yl]benzamide; (P002) N-(2-isopropylcyclopropyl)-4-[5-(trifluoromethyl)-1,2,4-oxadiazol-3-yl]benzamide; (P003) N-(2-methylcyclopropyl)-4-[5-(trifluoromethyl)-1,2,4-oxadiazol-3-yl]benzamide; (P004) N-(1-methylcyclopropyl)-4-[5-(trifluoromethyl)-1,2,4-oxadiazol-3-yl]benzamide; (P005) N-(2-ethylcyclopropyl)-4-[5-(trifluoromethyl)-1,2,4-oxadiazol-3-yl]benzamide; (P006) N-(2,4-difluorophenyl)-4-[5-(trifluoromethyl)-1,2,4-oxadiazol-3-yl] benzamide; (P007) 5-(trifluoromethyl)-3-[4-[[3-(trifluoromethyl)-1,2,4triazol-1-yl]methyl]phenyl]-1,2,4-oxadiazole; (P008) 2-[[4-[5-(trifluoromethyl)-1,2,4-oxadiazol-3-yl]phenyl]methyl]-1,2,4-triazole-3-carbonitrile; (P009) ethyl 1-[[4-[5-(trifluoromethyl)-1,2,4-oxadiazol-3-yl]phenyl]methyl]pyrazole-4-carboxylate; (P010) N-cyclopropyl-1-[[4-[5-(trifluoromethyl)-1,2,4-oxadiazol-3-yl]phenyl]methyl] pyrazole-4-carboxamide; (P011) N,N-dimethyl-1-[[4-[5-(trifluoromethyl)-1,2,4-oxadiazol-3-yl]phenyl] methyl]pyrazole-4-carboxamide; (P012) N-methyl-1-[[4-[5-(trifluoromethyl)-1,2,4-oxadiazol-3-yl]phenyl] methyl]pyrazole-4-carboxamide; (P013) N,N,-dimethyl-H[4-[5-(trifluoromethyl)-1,2,4-oxadiazol-3-yl]phenyl]methyl]-1,2,4-triazol-3-amine; (P014) 3-[4-[(5-ethylsulfanyl-1,2,4-triazol-1-yl)methyl]phenyl]-5-(trifluoromethyl)-1,2,4-oxadiazole; (P015) 3-[4-(triazolo[4,5-b]pyridin-1-ylmethyl)phenyl]-5-(trifluoromethyl)-1,2,4-oxadiazole; (P016) 3-[4-(triazolo[4,5-b]pyridin-2-ylmethyl)phenyl]-5-(trifluoromethyl)-1,2,4-oxadiazole; (P017) 3-[4-(triazolo[4,5-b]pyridin-3-ylmethyl)phenyl]-5-(trifluoromethyl)-1,2,4-oxadiazole; (P018) methyl 1-[[4-[5-(trifluoromethyl)-1,2,4-oxadiazol-3-yl]phenyl]methyl]pyrazole-4-carboxylate; (P019) ethyl 1-[[3-fluoro-4-[5-(trifluoromethyl)-1,2,4-oxadiazol-3-yl] phenyl]methyl]pyrazole-4-carboxylate; (P020) N,N-diethyl-1-[[4-[5-(trifluoromethyl)-1,2,4-oxadiazol-3-yl]phenyl]methyl]pyrazole-4-carboxamide; (P021) N-methoxy-N-methyl-1-[[4-[5-(trifluoromethyl)-1,2,4-oxadiazol-3-yl]phenyl]methyl]pyrazole-4-carboxamide; (P022) propyl 1-[[4-[5-(trifluoromethyl)-1,2,4-oxadiazol-3-yl]phenyl]methyl]pyrazole-4-carboxylate; (P023) N-methoxy-1-[[4-[5-(trifluoromethyl)-1,2,4-oxadiazol-3-yl]phenyl]methyl]pyrazole-4-carboxamide; (P024) N-ethyl-1-[[4-[5-(trifluoromethyl)-1,2,4-oxadiazol-3-yl]phenyl]methyl]pyrazole-4-carboxamide; (P025) 1-[[4-[5-(trifluoromethyl)-1,2,4-oxadiazol-3-yl]phenyl]methyl]pyrazole-4-carboxamide; (P026) N-methoxy-1-[1-[[4-[5-(trifluoromethyl)-1,2,4-oxadiazol-3-yl]phenyl]methyl] pyrazol-4-yl]methanimine; (P027) ethyl 1-[1-[4-[5-(trifluoromethyl)-1,2,4-oxadiazol-3-yl]phenyl]ethyl] pyrazole-4-carboxylate; (P028) 1-[[4-[5-(trifluoromethyl)-1,2,4-oxadiazol-3-yl]phenyl]methyl] pyrrolidin-2-one; (P029) 1-[[4-[5-(trifluoromethyl)-1,2,4-oxadiazol-3-yl]phenyl]methyl]piperidin-2-one; (P030) 4-[[4-[5-(trifluoromethyl)-1,2,4-oxadiazol-3-yl]phenyl]methyl]morpholin-3-one; (P031) 4,4-dimethyl-2-[[4-[5-(trifluoromethyl)-1,2,4-oxadiazol-3-yl] phenyl]methyl]isoxazolidin-3-one; (P032) 2-[[4-[5-(trifluoromethyl)-1,2,4-oxadiazol-3-yl]phenyl]methyl] isoxazolidin-3-one; (P033) 5,5-dimethyl-2-[[4-[5-(trifluoromethyl)-1,2,4-oxadiazol-3-yl]phenyl]methyl] isoxazolidin-3-one; (P034) 3,3-dimethyl-1 [4-[5-(trifluoromethyl)-1,2,4-oxadiazol-3-yl]phenyl]methyl] piperidin-2-one; (P035) 1-[[2-fluoro-4-[5-(trifluoromethyl)-1,2,4-oxadiazol-3-yl]phenyl]methyl] pyrrolidin-2-one; (P036) 1-[[2-fluoro-4-[5-(trifluoromethyl)-1,2,4-oxadiazol-3-yl]phenyl]methyl] piperidin-2-one; (P037) 2-[[4-[5-(trifluoromethyl)-1,2,4-oxadiazol-3-yl]phenyl]methyl]oxazinan-3-one; (P038) 1-[[3-fluoro-4-[5-(trifluoromethyl)-1,2,4-oxadiazol-3-yl]phenyl]methyl]piperidin-2-one; (P039) 3-[[4-[5-(trifluoromethyl)-1,2,4-oxadiazol-3-yl]phenyl]methyl]oxazolidin-2-one; (P040) 1-methyl-3-[[4-[5-(trifluoromethyl)-1,2,4-oxadiazol-3-yl]phenyl] methyl]imidazolidin-2-one; (P041) 1-[[3-fluoro-4-[5-(trifluoromethyl)-1,2,4-oxadiazol-3-yl]phenyl] methyl]-3,3-dimethyl-piperidin-2-one; (P042) 1-[[3-fluoro-4-[5-(trifluoromethyl)-1,2,4-oxadiazol-3-yl] phenyl]methyl]pyrrolidin-2-one; (P043) 2-[[3-fluoro-4-[5-(trifluoromethyl)-1,2,4-oxadiazol-3-yl]phenyl] methyl]-4,4-dimethyl-isoxazolidin-3-one; (P044) 2-[[2,3-difluoro-4-[5-(trifluoromethyl)-1,2,4-oxadiazol-3-yl]phenyl]methyl]isoxazolidin-3-one; (P045) 2-[[3-fluoro-4-[5-(trifluoromethyl)-1,2,4-oxadiazol-3-yl]phenyl]methyl]isoxazolidin-3-one; (P046) 1-[[3-fluoro-4-[5-(trifluoromethyl)-1,2,4-oxadiazol-3-yl] phenyl]methyl]azepan-2-one; (P047) N-[[4-[5-(trifluoromethyl)-1,2,4-oxadiazol-3-yl]phenyl]methyl] propanamide; (P048) 2,2-dimethyl-N-[[4-[5-(trifluoromethyl)-1,2,4-oxadiazol-3-yl]phenyl]methyl] but-3-ynamide; (P049) N-[[4-[5-(trifluoromethyl)-1,2,4-oxadiazol-3-yl]phenyl]methyl]butanamide; (P050) 3-methyl-N-[[4-[5-(trifluoromethyl)-1,2,4-oxadiazol-3-yl]phenyl]methyl]butanamide; (P051) 2-methyl-N-[[4-[5-(trifluoromethyl)-1,2,4-oxadiazol-3-yl]phenyl] methyl]prop-2-enamide; (P052) 2-methyl-N-[[4-[5-(trifluoromethyl)-1,2,4-oxadiazol-3-yl]phenyl]methyl] butanamide; (P053) 2-methoxy-N-[[4-[5-(trifluoromethyl)-1,2,4-oxadiazol-3-yl]phenyl]methyl]; (P054) 3,3,3-trifluoro-N-[[3-fluoro-4-[5-(trifluoromethyl)-1,2,4-oxadiazol-3-yl]phenyl]methyl]propanamide; (P055) 3,3,3-trifluoro-N-[[2-fluoro-4-[5-(trifluoromethyl)-1,2,4-oxadiazol-3-yl]phenyl]methyl] propanamide; (P056) N-[[2,3-difluoro-4-[5-(trifluoromethyl)-1,2,4-oxadiazol-3-yl]phenyl]methyl] butanamide; (P057) N-[[2,3-difluoro-4-[5-(trifluoromethyl)-1,2,4-oxadiazol-3-yl]phenyl] methyl]-3,3,3-trifluoro-propanamide; (P058)

2-(difluoromethoxy)-N-[[4-[5-(trifluoromethyl)-1,2,4-oxadiazol-3-yl]phenyl]methyl]acetamide; (P059) 2-methoxy-2-methyl-N-[[4-[5-(trifluoromethyl)-1,2,4-oxadiazol-3-yl]phenyl]methyl]propanamide; (P060) 1-methyl-3-[[4-[5-(trifluoromethyl)-1,2,4-oxadiazol-3-yl]phenyl]methyl]urea; (P061) 1-ethyl-1-methyl-3-[[4-[5-(trifluoromethyl)-1,2,4-oxadiazol-3-yl]phenyl] methyl]urea; (P062) 1-ethoxy-3-[[4-[5-(trifluoromethyl)-1,2,4-oxadiazol-3-yl]phenyl]methyl] urea; (P063) 1-methoxy-1-methyl-3-[[4-[5-(trifluoromethyl)-1,2,4-oxadiazol-3-yl]phenyl]methyl]; (P064) 1,1-diethyl-3-[[4-[5-(trifluoromethyl)-1,2,4-oxadiazol-3-yl]phenyl]methyl]urea; (P065) N-methoxy-N-[[4-[5-(trifluoromethyl)-1,2,4-oxadiazol-3-yl]phenyl]methyl]cyclopropanecarboxamide; (P066) N-methoxy-N-[[4-[5-(trifluoromethyl)-1,2,4-oxadiazol-3-yl]phenyl]methyl]pent-4-ynamide; (P067) N-methoxy-2-methyl-N-[[4-[5-(trifluoromethyl)-1,2,4-oxadiazol-3-yl]phenyl]methyl]prop-2-enamide; (P068) N,2-dimethoxy-N-[[4-[5-(trifluoromethyl)-1,2,4-oxadiazol-3-yl]phenyl]methyl]propanamide; (P069) N-cyclopropyl-3,3,3-trifluoro-N-[[4-[5-(trifluoromethyl)-1, 2,4-oxadiazol-3-yl]phenyl]methyl]propanamide; (P070) 2,2-difluoro-N-(2-methoxyethyl)-N-[[4-[5-(trifluoromethyl)-1,2,4-oxadiazol-3-yl]phenyl]methyl]cyclo propanecarboxamide; (P071) N-ethyl-2-methyl-N-[[4-[5-(trifluoromethyl)-1,2,4-oxadiazol-3-yl]phenyl] methyl]propanamide; (P072) N-[[3-fluoro-4-[5-(trifluoromethyl)-1,2,4-oxadiazol-3-yl]phenyl] methyl]-N-methoxy-propanamide; (P073) 2-methoxy-N-(2,2,2-trifluoroethyl)-N-[[4-[5-(trifluoromethyl)-1, 2,4-oxadiazol-3-yl]phenyl]methyl] acetamide; (P074) N-[[2,3-difluoro-4-[5-(trifluoromethyl)-1,2,4-oxadiazol-3-yl]phenyl]methyl]-N-methoxy-cyclopropane carboxamide; (P075) 2-(difluoromethoxy)-N-methyl-N-[[4-[5-(trifluoromethyl)-1,2,4-oxadiazol-3-yl]phenyl]methyl]acetamide; (P076) N-ethoxy-2-methoxy-N-[[4-[5-(trifluoromethyl)-1,2,4-oxadiazol-3-yl]phenyl] methyl]propanamide; (P077) N-isopropyl-N-[[4-[5-(trifluoromethyl)-1,2,4-oxadiazol-3-yl]phenyl]methyl] tetrahydrofuran-2-carboxamide; (P078) 1-methoxy-3-methyl-1-[[4-[5-(trifluoromethyl)-1,2,4-oxadiazol-3-yl]phenyl]methyl]urea; (P079) 3-cyclopropyl-1-methoxy-1-[[4-[5-(trifluoromethyl)-1,2,4-oxadiazol-3-yl]phenyl]methyl]urea; (P080) 3-ethoxy-1-methoxy-1-[[4-[5-(trifluoromethyl)-1,2,4-oxadiazol-3-yl]phenyl] methyl]urea; (P081) 3-allyl-1-methoxy-1-[[4-[5-(trifluoromethyl)-1,2,4-oxadiazol-3-yl]phenyl]methyl] urea; (P082) 1-cyclopropyl-3-methoxy-3-methyl-1-[[4-[5-(trifluoromethyl)-1,2,4-oxadiazol-3-yl]phenyl] methyl]urea; (P083) 3-isopropyl-1-methoxy-1-[[4-[5-(trifluoromethyl)-1,2,4-oxadiazol-3-yl]phenyl]methyl] urea; (P084) 1-methoxy-3-prop-2-ynyl-1-[[4-[5-(trifluoromethyl)-1,2,4-oxadiazol-3-yl]phenyl]methyl] urea; (P085) 1-[[3-fluoro-4-[5-(trifluoromethyl)-1,2,4-oxadiazol-3-yl]phenyl]methyl]-1-methoxy-3-methyl-urea; (P086) 3-(cyclopropylmethyl)-1-methyl-1-[[4-[5-(trifluoromethyl)-1,2,4-oxadiazol-3-yl]phenyl]methyl] urea; (P087) 1-ethyl-3-(2,2,2-trifluoroethyl)-1-[[4-[5-(trifluoromethyl)-1,2,4-oxadiazol-3-yl]phenyl]methyl] urea; (P088) 1,3-dimethoxy-1-[[4-[5-(trifluoromethyl)-1,2,4-oxadiazol-3-yl]phenyl]methyl]urea; (P089) 3-ethyl-1-methoxy-1-[[4-[5-(trifluoromethyl)-1,2,4-oxadiazol-3-yl]phenyl]methyl]urea; (P090) N-methyl-4-[5-(trifluoromethyl)-1,2,4-oxadiazol-3-yl]benzamide; (P091) N—[(E)-methoxyiminomethyl]-4-[5-(trifluoromethyl)-1,2,4-oxadiazol-3-yl]benzamide; (P092) N—[(Z)-methoxyiminomethyl]-4-[5-(trifluoromethyl)-1,2,4-oxadiazol-3-yl]benzamide; (P093) N-[4-[5-(trifluoromethyl)-1,2,4-oxadiazol-3-yl]phenyl]cyclopropanecarboxamide; (P094) N-(2-fluorophenyl)-4-[5-(trifluoromethyl)-1,2,4-oxadiazol-3-yl]benzamide; (P095) 2,2-difluoro-N-methyl-2-[4-[5-(trifluoromethyl)-1,2,4-oxadiazol-3-yl]phenyl] acetamide; (P096) N-allyl-N-[[4-[5-(trifluoromethyl)-1,2,4-oxadiazol-3-yl]phenyl]methyl]acetamide; (P097) N—[(E)-N-methoxy-C-methyl-carbonimidoyl]-4-[5-(trifluoromethyl)-1,2,4-oxadiazol-3-yl]benzamide; (P098) N—[(Z)—N-methoxy-C-methyl-carbonimidoyl]-4-[5-(trifluoromethyl)-1,2,4-oxadiazol-3-yl]benzamide; (P099) N1-methyl-N2-(4-(5-(trifluoromethyl)-1,2,4-oxadiazol-3-yl)benzyl)oxalamide, (P100) N-allyl-N-[[4-[5-(trifluoromethyl)-1,2,4-oxadiazol-3-yl]phenyl]methyl]propanamide; (P101) 4,4-dimethyl-1-[[4-[5-(trifluoromethyl)-1,2,4-oxadiazol-3-yl]phenyl]methyl]pyrrolidin-2-one; (P102) N-methyl-4-[5-(trifluoromethyl)-1,2,4-oxadiazol-3-yl] benzenecarbothioamide; (P103) 5-methyl-1-[[4-[5-(trifluoromethyl)-1,2,4-oxadiazol-3-yl]phenyl]methyl] pyrrolidin-2-one; (P104) N-methyl-4-[5-(trifluoromethyl)-1,2,4-oxadiazol-3-yl] benzenecarboxamide.

(Q) Compounds capable to act as a safener, for example, (Q001) 1-(2,4-dichlorophenyl)-5-(ethoxycarbonyl)-5-methyl-2-pyrazoline-3-carboxylic acid, (Q002) ethyl 1-(2,4-dichlorophenyl)-5-(ethoxycarbonyl)-5-methyl-2-pyrazoline-3-carboxylate ("mefenpyr (-diethyl)"), (Q003) benoxacor, (Q004) cloquintocet-mexyl, (Q005) cumyluron, (Q006) cyometrinil, (Q007) daimuron, (Q008) dichlormid, (Q009) dicyclonon, (Q010) dietholate, (Q011) dimepiperate, (Q012) fenchlorazole-ethyl, (Q013) fenclorim, (Q014) flurazole, (Q015) fluxofenim, (Q016) furilazole, (Q017) isoxadifen-ethyl, (Q018) mefenpyr-diethyl, (Q019) mephenate, (Q020) methoxyphenone, (Q021) naphthalic anhydride, (Q022) oxabetrinil, (Q023) AD-67, (Q024) cyprosulfamide, (Q025) furilazole and the corresponding R isomer, (Q026) isoxadifenethyl, (Q027) N-(aminocarbonyl)-2-methylbenzenesulfonamide, (Q028) N-(aminocarbonyl)-2-fluorobenzenesulfonamide, (Q029) 1-bromo-4-[(chloromethyl)sulfonyl]benzene, (Q030) 2-(dichloromethyl)-2-methyl-1,3-dioxolane (MG 191), (Q031) 4-(dichloroacetyl)-1-oxa-4-azospiro-[4.5]decane (MON 4660), (Q032) 2,2-dichloro-1-(2,2,5-trimethyl-3-oxazolidinyl)-ethanone, (Q033) 2-methoxy-N-[[4-[[(methylamino)carbonyl] amino]phenyl]sulfonyl]-benzamide, (Q034) 2-methoxy-N-[[4-[[(methylamino)carbonyl]amino]-phenyl]sulfonyl]-benzamide;

(R) Biological fungicides, for example, (R001) *Bacillus subtilis* syn., (R002) *Bacillus subtilis* strain QST713, (R003) *Bacillus subtilis* strain BU1814, (R004) *Bacillus subtilis* var. *amyloliquefaciens* strain FZB24, (R005) *Bacillus amyloliquefaciens* strain MBI600, (R006) *Bacillus amyloliquefaciens* strain D747, (R007) *Bacillus amyloliquefaciens* strain D727, (R008) *Bacillus amyloliquefaciens* strain ENV503, (R009) Tricoderma *atroviride* strain SC1, (R010) *Bacillus mycoides* isolate, (R011) *Pseudomonas chlororaphis* strain AFS009, (R012) *Streptomyces lydicus* strain WYEC108, (R013) *Aureobasidium pullulans* strain DSM 14940+*Pullulans* strain DSM 14941, (R014) extract from Melameuca *alternifolia*, (R015) *Swinglea glutinosa* extract, (R016) calcium salt of phosphorus acid/calcium phosphite, (R017) *Streptomyces hygroscopicus* (validamycin), (R018) *Bacillus* altudinis, (R019) *Bacillus amyloliquefaciens*, (R020) *Bacillus amyloliquefaciens* ssp. *plantarum* MBI 600 (II-27), (R021) *Bacillus amyloliquefaciens* ssp. *plantarum* D747, (R022) *Bacillus megaterium*, (R023) *Bacillus mojavensis* (II-28), (R024) *Bacillus mycoides*, (R025) *Bacillus pumilus* INR-7 (II-29), (R026) *Bacillus pumilus* GHA 180, (R027) *Bacillus simplex* (II-30), (R028) *Bacillus solisalsi* (II-31), (R029) *Burkholderia* sp., (R030) *Clavibacter michiganensis* (bacteriophages) (II-32), (R031) *Gliocladium roseum* (II-33), (R032) *Microsphaeropsis ochracea*, (R033) *Muscodor albus*, (R034) *Paenibacillus alvei*, (R035) *Paenibacillus polymyxa* (II-34), (R036) *Pantoea agglomerans* (II-35), (R037) *Pantoea vagans*, (R038) *Penicillium bilaiae*, (R039) *Pseudomonas* sp., (R040) *Pseudomonas* chlororaphis, (R041) *Pseudomonas fluorescens*, (R042) *Sphaerodes mycoparasitica* (II-36), (R043) *Streptomyces violaceusniger* (II-38), (R044) *Trichoderma* fertile JM41R (II-39), (R045) *Typhula phacorrhiza* (II-40), (R046) *Verticillium* dahlia (II-42), (R047) zucchini yellow mosaic virus (avirulent strain).

All named mixing partners of the classes (A) to (R) can, if their functional groups enable this, optionally form salts with suitable bases or acids.

Where a compound (1) or a compound (2) can be present in tautomeric form, such a compound is understood hereinabove and hereinbelow also to include, where applicable, corresponding tautomeric forms, even when these are not specifically mentioned in each case.

The active ingredients specified herein by their common name are known and described, for example, in the pesticide manual (16th Ed. British Crop Protection Council) or can be searched in the internet (e.g. www.alanwood.net/pesticides).

A particularly preferred composition of compound (I) according to the invention comprises at least one further active compound (2) selected from:

(A) Inhibitors of the sterol biosynthesis, for example, (A001) cyproconazole, (A002) difenoconazole, (A003) epoxiconazole, (A004) fenhexamid, (A005) fenpropidin, (A006) fenpropimorph, (A007) fenpyrazamine, (A008) fluquinconazole, (A009) flutriafol, (A010) imazalil, (A011) imazalil sulfate, (A012) ipconazole, (A013) metconazole, (A014) myclobutanil, (A015) paclobutrazol, (A016) prochloraz, (A017) propiconazole, (A018) prothioconazole, (A019) pyrisoxazole, (A020) spiroxamine, (A021) tebuconazole, (A022) tetraconazole, (A023) triadimenol, (A024) tridemorph, (A025) triticonazole, (A026) (1R,2S,5S)-5-(4-chlorobenzyl)-2-(chloromethyl)-2-methyl-1-(1H-1,2,4-triazol-1-ylmethyl)cyclopentanol, (A027) (1S,2R,5R)-5-(4-chlorobenzyl)-2-(chloromethyl)-2-methyl-1-(1H-1,2,4-triazol-1-ylmethyl)cyclopentanol, (A028) (2R)-2-(1-chlorocyclopropyl)-4-[(1R)-2,2-dichlorocyclopropyl]-1-(1H-1,2,4-triazol-1-yl)butan-2-ol, (A029) (2R)-2-(1-chlorocyclopropyl)-4-[(1S)-2,2-dichlorocyclopropyl]-1-(1H-1,2,4-triazol-1-yl)butan-2-ol, (A030) (2R)-2-[4-(4-chlorophenoxy)-2-(trifluoromethyl)phenyl]-1-(1H-1,2,4-triazol-1-yl)propan-2-ol, (A031) (2S)-2-(1-chlorocyclopropyl)-4-[(1R)-2,2-dichlorocyclopropyl]-1-(1H-1,2,4-triazol-1-yl)butan-2-ol, (A032)

(2S)-2-(1-chlorocyclopropyl)-4-[(1S)-2,2-dichlorocyclopropyl]-1-(1H-1,2,4-triazol-1-yl)butan-2-ol, (A033) (2S)-2-[4-(4-chlorophenoxy)-2-(trifluoromethyl)phenyl]-1-(1H-1,2,4-triazol-1-yl)propan-2-ol, (A034) (R)-[3-(4-chloro-2-fluorophenyl)-5-(2,4-difluorophenyl)-1,2-oxazol-4-yl](pyridin-3-yl)methanol, (A035) (S)-[3-(4-chloro-2-fluorophenyl)-5-(2,4-difluorophenyl)-1,2-oxazol-4-yl](pyridin-3-yl) methanol, (A036) [3-(4-chloro-2-fluorophenyl)-5-(2,4-difluorophenyl)-1,2-oxazol-4-yl](pyridin-3-yl) methanol, (A037) 1-({(2R,4S)-2-[2-chloro-4-(4-chlorophenoxy)phenyl]-4-methyl-1,3-dioxolan-2-yl}methyl)-1H-1,2,4-triazole, (A038) 1-({(2S,4S)-2-[2-chloro-4-(4-chlorophenoxy)phenyl]-4-methyl-1,3-dioxolan-2-yl}methyl)-1H-1,2,4-triazole, (A039) 1-{[3-(2-chlorophenyl)-2-(2,4-difluorophenyl)oxiran-2-yl]methyl}-1H-1,2,4-triazol-5-yl thiocyanate, (A040) 1-{[rel(2R,3R)-3-(2-chlorophenyl)-2-(2,4-difluorophenyl)oxiran-2-yl]methyl}-1H-1,2,4-triazol-5-yl thiocyanate, (A041) 1-{[rel(2R,3S)-3-(2-chlorophenyl)-2-(2,4-difluorophenyl)oxiran-2-yl] methyl}-1H-1,2,4-triazol-5-yl thiocyanate, (A042) 2-[(2R,4R,5R)-1-(2,4-dichlorophenyl)-5-hydroxy-2,6,6-trimethylheptan-4-yl]-2,4-dihydro-3H-1,2,4-triazole-3-thione, (A043) 2-[(2R,4R,5S)-1-(2,4-dichlorophenyl)-5-hydroxy-2,6,6-trimethylheptan-4-yl]-2,4-dihydro-3H-1,2,4-triazole-3-thione, (A044) 2-[(2R,4S,5R)-1-(2,4-dichlorophenyl)-5-hydroxy-2,6,6-trimethylheptan-4-yl]-2,4-dihydro-3H-1,2,4-triazole-3-thione, (A045) 2-[(2R,4S,5S)-1-(2,4-dichlorophenyl)-5-hydroxy-2,6,6-trimethylheptan-4-yl]-2,4-dihydro-3H-1,2,4-triazole-3-thione, (A046) 2-[(2S,4R,5R)-1-(2,4-dichlorophenyl)-5-hydroxy-2,6,6-trimethylheptan-4-yl]-2,4-dihydro-3H-1,2,4-triazole-3-thione, (A047) 2-[(2S,4R,5S)-1-(2,4-dichlorophenyl)-5-hydroxy-2,6,6-trimethylheptan-4-yl]-2,4-dihydro-3H-1,2,4-triazole-3-thione, (A048) 2-[(2S,4S,5R)-1-(2,4-dichlorophenyl)-5-hydroxy-2,6,6-trimethylheptan-4-yl]-2,4-dihydro-3H-1,2,4-triazole-3-thione, (A049) 2-[(2S,4S,5S)-1-(2,4-dichlorophenyl)-5-hydroxy-2,6,6-trimethylheptan-4-yl]-2,4-dihydro-3H-1,2,4-triazole-3-thione, (A050) 2-[1-(2,4-dichlorophenyl)-5-hydroxy-2,6,6-trimethylheptan-4-yl]-2,4-dihydro-3H-1,2,4-triazole-3-thione, (A051) 2-[2-chloro-4-(2,4-dichlorophenoxy)phenyl]-1-(1H-1,2,4-triazol-1-yl)propan-2-ol, (A052) 2-[2-chloro-4-(4-chlorophenoxy)phenyl]-1-(1H-1,2,4-triazol-1-yl) butan-2-ol, (A053) 2-[4-(4-chlorophenoxy)-2-(trifluoromethyl)phenyl]-1-(1H-1,2,4-triazol-1-yl) butan-2-ol, (A054) 2-[4-(4-chlorophenoxy)-2-(trifluoromethyl)phenyl]-1-(1H-1,2,4-triazol-1-yl) pentan-2-ol, (A055) 2-[4-(4-chlorophenoxy)-2-(trifluoromethyl)phenyl]-1-(1H-1,2,4-triazol-1-yl) propan-2-ol, (A056) 2-{[3-(2-chlorophenyl)-2-(2,4-difluorophenyl)oxiran-2-yl]methyl}-2,4-dihydro-3H-1,2,4-triazole-3-thione, (A057) 2-{[rel(2R,3R)-3-(2-chlorophenyl)-2-(2,4-difluorophenyl)oxiran-2-yl]methyl}-2,4-dihydro-3H-1,2,4-triazole-3-thione, (A058) 2-{[rel(2R,3S)-3-(2-chlorophenyl)-2-(2,4-difluorophenyl)oxiran-2-yl]methyl}-2,4-dihydro-3H-1,2,4-triazole-3-thione, (A059) 5-(4-chlorobenzyl)-2-(chloromethyl)-2-methyl-1-(1H-1,2,4-triazol-1-ylmethyl)cyclopentanol, (A060) 5-(allylsulfanyl)-1-{[3-(2-chlorophenyl)-2-(2,4-difluorophenyl) oxiran-2-yl]methyl}-1H-1,2,4-triazole, (A061) 5-(allylsulfanyl)-1-{[rel(2R,3R)-3-2-chlorophenyl)-2-(2,4-difluorophenyl)oxiran-2-yl]methyl}-1H-1,2,4-triazole, (A062) 5-(allylsulfanyl)-1-{[rel(2R,3S)-3-(2-chlorophenyl)-2-(2,4-difluorophenyl)oxiran-2-yl]methyl}-1H-1,2,4-triazole, (A063)

bromuconazole, (A064) diniconazole, (A065) diniconazole-M, (A066) etaconazole, (A067) fenbuconazole, (A068) hexaconazole, (A069) imibenconazole, (A070) penconazole, (A071) simeconazole, (A072) triadimefon, (A073) uniconazole, (A074) pyributicarb, (A075) dodemorph, (A076) aldimorph, (A077) trimorphamide, (A078) piperalin, (A079) naftifine, (A080) terbinafine, (A081) mefentrifluconazole, (A082) Ipfentrifluconazole, (A083) 1-(2,4-difluorophenyl)-2-(1H-1,2,4-triazol-1-yl)-1-[1-(2,6-difluoro-4-chlorophenoxy)cyclopropyl]ethanol, (A084) 1-[2-(1-chlorocyclopropyl)-3-(2-fluorophenyl)-2-hydroxypropyl]-1H-imidazole-5-carbonitrile, (A085) difenoconazole, (A086) buthiobate, (A087) pyrifenox, (A088) fenarimol, (A089) nuarimol, (A090) triarimol, (A091) triforine, (A092) clotrimazole, (A093) econazole, (A094) isoconazole, (A095) miconazole, (A096) oxpoconazole, (A097) pefurazoate, (A098) triflumizole, (A099) azaconazole, (A100) bitertanol, (A081) mefentrifluconazole, (A082) ipfentrifluconazole, (A083) 1-(2,4-difluorophenyl)-2-(1H-1,2,4-triazol-1-yl)-1-[1-(2,6-difluoro-4-chlorophenoxy)cyclopropyl]ethanol, (A084) 1-[2-(1-chlorocyclopropyl)-3-(2-fluorophenyl)-2-hydroxypropyl]-1H-imidazole-5-carbonitrile, (A085) terbinafine, (A086) buthiobate, (A087) pyrifenox, (A088) fenarimol, (A089) nuarimol, (A090) triarimol, (A091) triforine, (A092) clotrimazole, (A093) econazole, (A094) isoconazole, (A095) miconazole, (A096) oxpoconazole, (A097) pefurazoate, (A098) triflumizole, (A099) azaconazole, (A100) bitertanol;

(B) Inhibitors of the respiratory chain at complex I or II, for example, (B001) benzovindiflupyr, (B002) bixafen, (B003) boscalid, (B004) carboxin, (B005) fluopyram, (B006) flutolanil, (B007) fluxapyroxad, (B008) furametpyr, (B009) psofetamid, (B010) isopyrazam (anti-epimeric enantiomer 1R,4S,9S), (B011) isopyrazam (anti-epimeric enantiomer 1S,4R,9R), (B012) isopyrazam (anti-epimeric racemate 1RS,4SR,9SR), (B013) isopyrazam (mixture of syn-epimeric racemate 1RS,4SR,9RS and anti-epimeric racemate 1RS,4SR,9SR), (B014) isopyrazam (syn-epimeric enantiomer 1R,4S,9R), (B015) isopyrazam (syn-epimeric enantiomer 1S,4R,9S), (B016) isopyrazam (syn-epimeric racemate 1RS,4SR,9RS), (B017) penflufen, (B018) penthiopyrad, (B019) pydiflumetofen, (B020) pyraziflumid, (B021) sedaxane, (B022) 1,3-dimethyl-N-(1,1,3-trimethyl-2,3-dihydro-1H-inden-4-yl)-1H-pyrazole-4-carboxamide, (B023) 1,3-dimethyl-N-[(3R)-1,1,3-trimethyl-2,3-dihydro-1H-inden-4-yl]-1H-pyrazole-4-carboxamide, (B024) 1,3-dimethyl-N-[(3S)-1,1,3-trimethyl-2,3-dihydro-1H-inden-4-yl]-1H-pyrazole-4-carboxamide, (B025) 1-methyl-3-(trifluoromethyl)-N-[2'-(trifluoromethyl)biphenyl-2-yl]-1H-pyrazole-4-carboxamide, (B026) 2-fluoro-6-(trifluoromethyl)-N-(1,1,3-trimethyl-2,3-dihydro-1H-inden-4-yl) benzamide, (B027) 3-(difluoromethyl)-1-methyl-N-(1,1,3-trimethyl-2,3-dihydro-1H-inden-4-yl)-1H-pyrazole-4-carboxamide, (B028) 3-(difluoromethyl)-1-methyl-N-[(3R)-1,1,3-trimethyl-2,3-dihydro-1H-inden-4-yl]-1H-pyrazole-4-carboxamide (inpyrfluxam), (B029) 3-(difluoromethyl)-1-methyl-N-[(3S)-1,1,3-trimethyl-2,3-dihydro-1H-inden-4-yl]-1H-pyrazole-4-carboxamide, (B030) 3-(difluoromethyl)-N-(7-fluoro-1,1,3-trimethyl-2,3-dihydro-1H-inden-4-yl)-1-methyl-1H-pyrazole-4-carboxamide (Fluindapyr), (B031) 3-(difluoromethyl)-N-[(3R)-7-fluoro-1,1,3-trimethyl-2,3-dihydro-1H-inden-4-yl]-1-methyl-1H-pyrazole-4-carboxamide, (B032) 3-(difluoromethyl)-N-[(3S)-7-fluoro-1,1,3-trimethyl-2,3-dihydro-1H-inden-4-yl]-1-methyl-1H-pyrazole-4-carboxamide, (B033) 5,8-difluoro-N-[2-(2-fluoro-4-{[4-(trifluoromethyl)pyridin-2-yl]oxy}phenyl)ethyl] quinazolin-4-amine, (B034) N-(2-cyclopentyl-5-fluorobenzyl)-N-cyclopropyl-3-(difluoromethyl)-5-fluoro-1-methyl-1-H-pyrazole-4-carboxamide, (B035) N-(2-tert-butyl-5-methylbenzyl)-N-cyclopropyl-3-(difluoromethyl)-5-fluoro-1-methyl-1H-pyrazole-4-carboxamide, (B036) N-(2-tert-butylbenzyl)-N-cyclopropyl-3-(difluoromethyl)-5-fluoro-1-methyl-1H-pyrazole-4-carboxamide, (B037) N-(5-chloro-2-ethylbenzyl)-N-cyclopropyl-3-(difluoromethyl)-5-fluoro-1-methyl-1H-pyrazole-4-carboxamide, (B038) N-(5-chloro-2-isopropylbenzyl)-N-cyclopropyl-3-(difluoromethyl)-5-fluoro-1-methyl-1H-pyrazole-4-carboxamide, (B039) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (B040) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide, (B041) N-[1-(2,4-dichlorophenyl)-1-methoxypropan-2-yl]-3-(difluoromethyl)-1-methyl-1H-pyrazole-4-carboxamide, (B042) N-[2-chloro-6-(trifluoromethyl)benzyl]-N-cyclopropyl-3-(difluoromethyl)-5-fluoro-1-methyl-1H-pyrazole-4-carboxamide, (B043) N-[3-chloro-2-fluoro-6-(trifluoromethyl)benzyl]-N-cyclopropyl-3-(difluoromethyl)-5-fluoro-1-methyl-1H-pyrazole-4-carboxamide, (B044) N-[5-chloro-2-(trifluoromethyl)benzyl]-N-cyclopropyl-3-(difluoromethyl)-5-fluoro-1-methyl-1H-pyrazole-4-carboxamide, (B045) N-cyclopropyl-3-(difluoromethyl)-5-fluoro-1-methyl-N-[5-methyl-2-(trifluoromethyl)benzyl]-1H-pyrazole-4-carboxamide, (B046) N-cyclopropyl-3-(difluoromethyl)-5-fluoro-N-(2-fluoro-6-isopropylbenzyl)-1-methyl-1H-pyrazole-4-carboxamide, (B047) N-cyclopropyl-3-(difluoromethyl)-5-fluoro-N-(2-isopropyl-5-methylbenzyl)-1-methyl-1H-pyrazole-4-carboxamide, (B048) N-cyclopropyl-3-(difluoromethyl)-5-fluoro-N-(2-isopropylbenzyl)-1-methyl-1H-pyrazole-4-carbothioamide, (B049) N-cyclopropyl-3-(difluoromethyl)-5-fluoro-N-(2-isopropylbenzyl)-1-methyl-1H-pyrazole-4-carboxamide, (B050) N-cyclopropyl-3-(difluoromethyl)-5-fluoro-N-(5-fluoro-2-isopropylbenzyl)-1-methyl-1H-pyrazole-4-carboxamide, (B051) N-cyclopropyl-3-(difluoromethyl)-N-(2-ethyl-4,5-dimethylbenzyl)-5-fluoro-1-methyl-1H-pyrazole-4-carboxamide, (B052) N-cyclopropyl-3-(difluoromethyl)-N-(2-ethyl-5-fluorobenzyl)-5-fluoro-1-methyl-1H-pyrazole-4-carboxamide, (B053) N-cyclopropyl-3-(difluoromethyl)-N-(2-ethyl-5-methylbenzyl)-5-fluoro-1-methyl-1H-pyrazole-4-carboxamide, (B054) N-cyclopropyl-N-(2-cyclopropyl-5-fluorobenzyl)-3-(difluoromethyl)-5-fluoro-1-methyl-1H-pyrazole-4-carboxamide, (B055) N-cyclopropyl-N-(2-cyclopropyl-5-methylbenzyl)-3-(difluoromethyl)-5-fluoro-1-methyl-1H-pyrazole-4-carboxamide, (B056) N-cyclopropyl-N-(2-cyclopropylbenzyl)-3-(difluoromethyl)-5-fluoro-1-methyl-1H-pyrazole-4-carboxamide, (B057) 2-(difluoromethyl)-N-(1,1-dimethyl-3-propyl-2,3-dihydro-1H-inden-4-yl) nicotinamide, (B058) pyrapropoyne, (B059) inpyrfluxam, (B060) mepronil, (B061) isoflucypram, (B062) oxycarboxin, (B063) α-(methoxyimino)-N-methyl-2-[[[1-[3-(trifluoromethyl)phenyl]ethoxy] imino]methyl]benzeneacetamide, (B064) diflumetorim, (B065) thifluzamide, (B066) fenfuram, (B068) benodanil, (B069) cyclobutrifluram, (B070) flubeneteram, (B071) pyrapropoyne;

(C) Inhibitors of the respiratory chain at complex III, for example, (C001) ametoctradin, (C002) amisulbrom, (C003) azoxystrobin, (C004) coumethoxystrobin, (C005) coumoxystrobin, (C006) cyazofamid, (C007) dimoxystrobin, (C008) enoxastrobin, (C009) famoxadone, (C010) fenamidone, (C011) flufenoxystrobin, (C012) fluoxastrobin, (C013) kresoxim-methyl, (C014) metominostrobin, (C015) orysastrobin, (C016) picoxystrobin, (C017) pyraclostrobin, (C018) pyrametostrobin, (C019) pyraoxystrobin, (C020) trifloxystrobin, (C021) (2E)-2-{2-[({[(1E)-1-(3-{[(E)-1-fluoro-2-phenylvinyl]oxy} phenyl)ethylidene]amino}oxy)methyl] phenyl}-2-(methoxyimino)-N-methylacetamide, (C022) (2E,3Z)-5-{[1-(4-chlorophenyl)-1H-pyrazol-3-yl]oxy}-2-(methoxyimino)-N,3-dimethylpent-3-enamide, (C023) (2R)-2-{2-[(2,5-dimethylphenoxy)methyl] phenyl}-2-methoxy-N-methylacetamide, (C024) (2S)-2-{2-[(2,5-dimethylphenoxy)methyl]phenyl}-2-methoxy-N-methylacetamide, (C025) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl-2-methylpropanoate (Fenpicoxamid), (C026) 2-{2-[(2,5-dimethylphenoxy) methyl]phenyl}-2-methoxy-N-methylacetamide (Mandestrobin), (C027) N-(3-ethyl-3,5,5-trimethylcyclohexyl)-3-formamido-2-hydroxybenzamide, (C028) (2E,3Z)-5-{[1-(4-chloro-2-fluorophenyl)-1H-pyrazol-3-yl]oxy}-2-(methoxyimino)-N,3-dimethylpent-3-enamide, (C029) methyl {5-[3-(2,4-dimethylphenyl)-1H-pyrazol-1-yl]-2-methylbenzyl}carbamate, (C030) 1-(2-{[1-(4-chlorophenyl)pyrazol-3-yl]oxymethyl}-3-methylphenyl)-1,4-dihydro-4-methyl-5H-tetrazol-5-one (Metyltetraprole), (C031) florylpicoxamid, (C032) pyribencarb, (C033) α-(methoxyimino)-N-methyl-2-[[[1-[3-(trifluoromethyl)phenyl]ethoxy]imino]methyl] benzeneacetamide, (C034) metarylpicoxamid;

(E) Compounds capable to have a multisite action, for example, (E001) bordeaux mixture, (E002) captafol, (E003) captan, (E004) chlorothalonil, (E005) copper hydroxide, (E006) copper naphthenate, (E007) copper oxide, (E008) copper oxychloride, (E009) copper(2+) sulfate, (E010) dithianon, (E011) dodine, (E012) folpet, (E013) mancozeb, (E014) maneb, (E015) metiram, (E016) metiram zinc, (E017) oxine-copper, (E018) propineb, (E019) sulfur and sulfur preparations including calcium polysulfide, (E020) thiram, (E021) zineb, (E022) ziram, (E023) 6-ethyl-5,7-dioxo-6,7-dihydro-5H-pynolo[3',4':5,6][1,4]dithiino[2,3-c][1,2]thiazole-3-carbonitrile, (E024) ferbam, (E025) dichlofluanid, (E026) tolylfluanid, (E027) guazatine, (E028) iminoctadine, (E029) anilazine, (E030) quinomethionate;

(L) Inhibitors of the nucleic acid synthesis, for example, (L003) metalaxyl, (L004) metalaxyl-M (mefenoxam), (L005) ethirimol, (L006) furalaxyl, (L007) ofurace, (L008) oxolinic acid, (L009) hymexazole, (L010) octhilinone, (LO 11) bupirimate, (L012) dimethirimol;

(M) Inhibitors of the signal transduction, for example, (M001) fludioxonil, (M002) iprodione, (M004) proquinazid, (M005) quinoxyfen, (M007) chlozolinate, (M008) fenpiclonil, (M009) proquinazid, (M010) 2-butoxy-6-iodo-3-propyl-4H-1-benzopyran-4-one;

(N) Compounds capable to act as an uncoupler, for example, (N001) fluazinam, (N002) meptyldinocap, (N003) binapacryl, (N004) dinocap;

(O) Other fungicides, for example, (O001) abscisic acid, (O002) benthiazole, (O003) bethoxazin, (O004) capsimycin, (O005) carvone, (O006) chinomethionat, (O007) cufraneb, (O008) cyflufenamid, (O009) cymoxanil, (O010) cyprosulfamide, (O011) flutianil, (O012) fosetyl-aluminium, (O013) fosetyl-calcium, (O014) fosetyl-sodium, (O015) methyl isothiocyanate, (O016) metrafenone, (O017) mildiomycin, (O018) natamycin, (O019) nickel dimethyldithiocarbamate, (O020) nitrothal-isopropyl, (O021) oxamocarb, (O022) oxathiapiprolin, (O023) oxyfenthiin, (O024) pentachlorophenol and salts, (O025) phosphorous acid and its salts, (O026) propamocarb-fosetylate, (O027) pyriofenone (chlazafenone), (O028) tebufloquin, (O029) tecloftalam, (O030) tolnifanide, (O031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (O032) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (O033) 2-(6-benzylpyridin-2-yl)quinazoline, (O034) 2,6-dimethyl-1H,5H-[1,4]dithiino[2,3-c:5,6-c']dipyrrole-1,3,5,7(2H,6H)-tetrone, (O035) 2-[3,5-bis(difluoromethyl)-1H-pyrazol-1-yl]-1-[4-(4-{5-[2-(prop-2-yn-1-yloxy) phenyl]-4,5-dihydro-1,2-oxazol-3-yl}-1,3-thiazol-2-yl) piperidin-1-yl]ethanone, (O036) 2-[3,5-bis (difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, (O037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, (O038) 2-[6-(3-fluoro-4-methoxyphenyl)-5-methylpyridin-2-yl]quinazoline, (O039) 2-{(5R)-3-[2-(1-{[3,5-bis(difluoromethyl)-1H-pyrazol-1-yl] acetyl}piperidin-4-yl)-1,3-thiazol-4-yl]-4,5-dihydro-1,2-oxazol-5-yl}-3-chlorophenyl methanesulfonate, (O040) 2-{(5S)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (O041) 2-{2-[(7,8-difluoro-2-methylquinolin-3-yl)oxy]-6-fluorophenyl}propan-2-ol, (O042) 2-{2-fluoro-6-[(8-fluoro-2-methylquinolin-3-yl)oxy]phenyl}propan-2-ol, (O043) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate (fluoxapiprolin), (O045) 2-phenylphenol and salts, (O046) 3-(4,4,5-trifluoro-3,3-dimethyl-3,4-dihydroisoquinolin-1-yl) quinoline, (O047) 3-(4,4-difluoro-3,3-dimethyl-3,4-dihydroisoquinolin-1-yl)quinoline (Quinofumelin), (O048) 4-amino-5-fluoropyrimidin-2-ol (tautomeric form: 4-amino-5-fluoropyrimidin-2(1H)-one), (O049) 4-oxo-4-[(2-phenylethyl)amino]butanoic acid, (O050) 5-amino-1,3,4-thiadiazole-2-thiol, (O051) 5-chloro-N'-phenyl-N'-(prop-2-yn-1-yl)thiophene-2-sulfonohydrazide, (O052) 5-fluoro-2-[(4-fluorobenzyl)oxy]pyrimidin-4-amine, (O053) 5-fluoro-2-[(4-methylbenzyl)oxy]pyrimidin-4-amine, (O054) 9-fluoro-2,2-dimethyl-5-(quinolin-3-yl)-2,3-dihydro-1,4-benzoxazepine, (O055) but-3-yn-1-yl{6-[({[(Z)-(1-methyl-1H-tetrazol-5-yl)(phenyl)methylene]aminoI oxy)methyl]pyridin-2-yl}carbamate, (O056) ethyl (2Z)-3-amino-2-cyano-3-phenylacrylate, (O057) phenazine-1-carboxylic acid, (O058) propyl 3,4,5-trihydroxybenzoate, (O059) quinolin-8-ol, (O060) quinolin-8-ol sulfate (2:1), (O061) tert-butyl {6-[(1[(1-methyl-1H-tetrazol-5-yl)(phenyl)methylene] amino}oxy)methyl]pyridin-2-yl}carbamate, (O062) 5-fluoro-4-imino-3-methyl-1-[(4-methylphenyl)sulfonyl]-3,4-dihydropyrimidin-2(1H)-one, (O063) pyridachlometyl, (O064) ipflufenoquin, (O065) aminopyrifen, (O066) N-[[(cyclopropyl-methoxy)amino][6-(difluoromethoxy)-2,3-difluorophenyl]-methylene] benzeneacetamide; (O067) methasulfocarb, (O068) nabam, (O069) oxine copper, (O070) ditalimfos, (O071) drazoxolon, (O072) tolyfluanide, (O073) diclobutrazol, (O074) cyprofuram, (O075) phophorous acid and salts, (O076) ferimzone, (O077) pyrrolnitrin, (O078) triazoxide, (O079) flusulfamide, (O080) diclomezine, (O081) mineral oils, (O082) organic oils, (O083) inorganic oils, (O084) potassium bicarbonate, (O085) ferric methanearsonate, (O086) 4-fluorophenyl-N-[1-[[[1-(4-cyanophenyl)ethyl]sulfonyl]methyl] propyl]carbamate, (O087) 5-chloro-6-(2,4,6-trifluorophenyl)-7-(4-methylpiperidin-1-yl)[1,2,4]triazolo[1,5-a]pyrimidine, (O088) N-[4-[4-chloro-3-(trifluoromethyl)phenoxy]-2,5-dimethylphenyl]-N-ethyl-N-methylmethanimidamide (P) Inhibitors of histone deacetylase, for example, (P001) N-(1-ethylcyclopropyl)-4-[5-(trifluoromethyl)-1,2,4-oxadiazol-3-yl]benzamide; (P002) N-(2-isopropylcyclopropyl)-4-[5-(trifluoromethyl)-1,2,4-oxadiazol-3-yl]benzamide; (P003) N-(2-methylcyclopropyl)-4-[5-(trifluoromethyl)-1,2,4-oxadiazol-3-yl]benzamide; (P004) N-(1-methylcyclopropyl)-4-[5-(trifluoromethyl)-1,2,4-oxadiazol-3-yl]benzamide; (P005) N-(2-ethylcyclopropyl)-4-[5-(trifluoromethyl)-1,2,4-oxadiazol-3-yl]benzamide; (P006) N-(2,4-difluorophenyl)-4-[5-(trifluoromethyl)-1,2,4-oxadiazol-3-yl] benzamide; (P007) 5-(trifluoromethyl)-3-[4-[[3-(trifluoromethyl)-1,2,4triazol-1-yl]methyl]phenyl]-1,2,4-oxadiazole; (P008) 2-[[4-[5-(trifluoromethyl)-1,2,4-oxadiazol-3-yl]phenyl]methyl]-1,2,4-triazole-3-carbonitrile; (P009) ethyl 1-[[4-[5-(trifluoromethyl)-1,2,4-oxadiazol-3-yl]phenyl]methyl]pyrazole-4-carboxylate; (P010) N-cyclopropyl-1-[[4-[5-(trifluoromethyl)-1,2,4-oxadiazol-3-yl]phenyl]methyl] pyrazole-4-carboxamide; (P011) N,N-dimethyl-1-[[4-[5-(trifluoromethyl)-1,2,4-oxadiazol-3-yl]phenyl] methyl]pyrazole-4-carboxamide; (P012) N-methyl-1-[[4-[5-(trifluoromethyl)-1,2,4-oxadiazol-3-yl]phenyl] methyl]pyrazole-4-carboxamide; (P013) N,N,-dimethyl-H[4-[5-(trifluoromethyl)-1,2,4-oxadiazol-3-yl]phenyl]methyl]-1,2,4-triazol-3-amine; (P014) 3-[4-[(5-ethylsulfanyl-1,2,4-triazol-1-yl)methyl]phenyl]-5-(trifluoromethyl)-1,2,4-oxadiazole; (P015) 3-[4-(triazolo[4,5-b]pyridin-1-ylmethyl)phenyl]-5-(trifluoromethyl)-1,2,4-oxadiazole; (P016) 3-[4-(triazolo[4,5-b]pyridin-2-ylmethyl)phenyl]-5-(trifluoromethyl)-1,2,4-oxadiazole; (P017) 3-[4-(triazolo[4,5-b]pyridin-3-ylmethyl)phenyl]-5-(trifluoromethyl)-1,2,4-oxadiazole; (P018) methyl 1-[[4-[5-(trifluoromethyl)-1,2,4-oxadiazol-3-yl]phenyl]methyl]pyrazole-4-carboxylate; (P019) ethyl 1-[[3-fluoro-4-[5-(trifluoromethyl)-1,2,4-oxadiazol-3-yl] phenyl]methyl]pyrazole-4-carboxylate; (P020) N,N-diethyl-1-[[4-[5-(trifluoromethyl)-1,2,4-oxadiazol-3-yl]phenyl]methyl]pyrazole-4-carboxamide; (P021) N-methoxy-N-methyl-1-[[4-[5-(trifluoromethyl)-1,2,4-oxadiazol-3-yl]phenyl]methyl]pyrazole-4-carboxamide; (P022) propyl 1-[[4-[5-(trifluoromethyl)-1,2,4-oxadiazol-3-yl]phenyl]methyl]pyrazole-4-carboxylate; (P023) N-methoxy-1-[[4-[5-(trifluoromethyl)-1,2,4-oxadiazol-3-yl]phenyl]methyl]pyrazole-4-carboxamide; (P024) N-ethyl-1-[[4-[5-(trifluoromethyl)-1,2,4-oxadiazol-3-yl]phenyl]methyl]pyrazole-4-carboxamide; (P025) 1-[[4-[5-(trifluoromethyl)-1,2,4-oxadiazol-3-yl]phenyl]methyl]pyrazole-4-carboxamide; (P026) N-methoxy-1-[1-[[4-[5-(trifluoromethyl)-1,2,4-oxadiazol-3-yl]phenyl]methyl] pyrazol-4-yl]methanimine; (P027) ethyl 1-[1-[4-[5-(trifluoromethyl)-1,2,4-oxadiazol-3-yl]phenyl]ethyl] pyrazole-4-carboxylate; (P028) 1-[[4-[5-(trifluoromethyl)-1,2,4-oxadiazol-3-yl]phenyl]methyl] pyrrolidin-2-one; (P029) 1-[[4-[5-(trifluoromethyl)-1,2,4-oxadiazol-3-yl]phenyl]methyl]piperidin-2-one; (P030) 4-[[4-[5-(trifluoromethyl)-1,2,4-oxadiazol-3-yl]phenyl]methyl]morpholin-3-one; (P031) 4,4-dimethyl-2-[[4-[5-(trifluoromethyl)-1,2,4-oxadiazol-3-yl] phenyl]methyl]isoxazolidin-3-one; (P032) 2-[[4-[5-(trifluoromethyl)-1,2,4-oxadiazol-3-yl]phenyl]methyl] isoxazolidin-3-one; (P033) 5,5-dimethyl-2-[[4-[5-(trifluoromethyl)-1,2,4-oxadiazol-3-yl]phenyl]methyl] isoxazolidin-3-one; (P034) 3,3-dimethyl-1-[[4-[5-(trifluoromethyl)-1,2,4-oxadiazol-3-yl]phenyl]methyl] piperidin-2-one; (P035) 1-[[2-fluoro-4-[5-(trifluoromethyl)-1,2,4-oxadiazol-3-yl]phenyl]methyl] pyrrolidin-2-one; (P036) 1-[[2-fluoro-4-[5-(trifluoromethyl)-1,2,4-oxadiazol-3-yl]phenyl]methyl] piperidin-2-one; (P037) 2-[[4-[5-(trifluoromethyl)-1,2,4-oxadiazol-3-yl]phenyl]methyl]oxazinan-3-one; (P038) 1-[[3-fluoro-4-[5-(trifluoromethyl)-1,2,4-oxadiazol-3-yl]phenyl]methyl]piperidin-2-one; (P039) 3-[[4-[5-(trifluoromethyl)-1,2,4-oxadiazol-3-yl]phenyl]methyl]oxazolidin-2-one; (P040) 1-methyl-3-[[4-[5-(trifluoromethyl)-1,2,4-oxadiazol-3-yl]phenyl] methyl]imidazolidin-2-one; (P041) 1-[[3-fluoro-4-[5-(trifluoromethyl)-1,2,4-oxadiazol-3-yl]phenyl] methyl]-3,3-dimethyl-piperidin-2-one; (P042) 1-[[3-fluoro-4-[5-(trifluoromethyl)-1,2,4-oxadiazol-3-yl] phenyl]methyl]pyrrolidin-2-one; (P043) 2-[[3-fluoro-4-[5-(trifluoromethyl)-1,2,4-oxadiazol-3-yl]phenyl] methyl]-4,4-dimethyl-isoxazolidin-3-one; (P044) 2-[[2,3-difluoro-4-[5-(trifluoromethyl)-1,2,4-oxadiazol-3-yl]phenyl]methyl]isoxazolidin-3-one; (P045) 2-[[3-fluoro-4-[5-(trifluoromethyl)-1,2,4-oxadiazol-3-yl]phenyl]methyl]isoxazolidin-3-one; (P046) 1-[[3-fluoro-4-[5-(trifluoromethyl)-1,2,4-oxadiazol-3-yl] phenyl]methyl]azepan-2-one; (P047) N-[[4-[5-(trifluoromethyl)-1,2,4-oxadiazol-3-yl]phenyl]methyl] propanamide; (P048) 2,2-dimethyl-N-[[4-[5-(trifluoromethyl)-1,2,4-oxadiazol-3-yl]phenyl]methyl] but-3-ynamide; (P049) N-[[4-[5-(trifluoromethyl)-1,2,4-oxadiazol-3-yl]phenyl]methyl]butanamide; (P050) 3-methyl-N-[[4-[5-(trifluoromethyl)-1,2,4-oxadiazol-3-yl]phenyl]methyl]butanamide; (P051) 2-methyl-N-[[4-[5-(trifluoromethyl)-1,2,4-oxadiazol-3-yl]phenyl] methyl]prop-2-enamide; (P052) 2-methyl-N-[[4-[5-(trifluoromethyl)-1,2,4-oxadiazol-3-yl]phenyl]methyl]

butanamide; (P053) 2-methoxy-N-[[4-[5-(trifluoromethyl)-1,2,4-oxadiazol-3-yl]phenyl]methyl]; (P054) 3,3,3-trifluoro-N-[[3-fluoro-4-[5-(trifluoromethyl)-1,2,4-oxadiazol-3-yl]phenyl]methyl]propanamide; (P055) 3,3,3-trifluoro-N-[[2-fluoro-4-[5-(trifluoromethyl)-1,2,4-oxadiazol-3-yl]phenyl]methyl] propanamide; (P056) N-[[2,3-difluoro-4-[5-(trifluoromethyl)-1,2,4-oxadiazol-3-yl]phenyl]methyl] butanamide; (P057) N-[[2,3-difluoro-4-[5-(trifluoromethyl)-1,2,4-oxadiazol-3-yl]phenyl] methyl]-3,3,3-trifluoro-propanamide; (P058) 2-(difluoromethoxy)-N-[[4-[5-(trifluoromethyl)-1,2,4-oxadiazol-3-yl]phenyl]methyl]acetamide; (P059) 2-methoxy-2-methyl-N-[[4-[5-(trifluoromethyl)-1,2,4-oxadiazol-3-yl]phenyl]methyl]propanamide; (P060) 1-methyl-3-[[4-[5-(trifluoromethyl)-1,2,4-oxadiazol-3-yl]phenyl]methyl]urea; (P061) 1-ethyl-1-methyl-3-[[4-[5-(trifluoromethyl)-1,2,4-oxadiazol-3-yl]phenyl] methyl]urea; (P062) 1-ethoxy-3-[[4-[5-(trifluoromethyl)-1,2,4-oxadiazol-3-yl]phenyl]methyl] urea; (P063) 1-methoxy-1-methyl-3-[[4-[5-(trifluoromethyl)-1,2,4-oxadiazol-3-yl]phenyl]methyl] urea; (P064) 1,1-diethyl-3-[[4-[5-(trifluoromethyl)-1,2,4-oxadiazol-3-yl]phenyl]methyl]urea; (P065) N-methoxy-N-[[4-[5-(trifluoromethyl)-1,2,4-oxadiazol-3-yl]phenyl]methyl]cyclopropanecarboxamide; (P066) N-methoxy-N-[[4-[5-(trifluoromethyl)-1,2,4-oxadiazol-3-yl]phenyl]methyl]pent-4-ynamide; (P067) N-methoxy-2-methyl-N-[[4-[5-(trifluoromethyl)-1,2,4-oxadiazol-3-yl]phenyl]methyl]prop-2-enamide; (P068) N,2-dimethoxy-N-[[4-[5-(trifluoromethyl)-1,2,4-oxadiazol-3-yl]phenyl]methyl]propanamide; (P069) N-cyclopropyl-3,3,3-trifluoro-N-[[4-[5-(trifluoromethyl)-1,2,4-oxadiazol-3-yl]phenyl]methyl]propanamide; (P070) 2,2-difluoro-N-(2-methoxyethyl)-N-[[4-[5-(trifluoromethyl)-1,2,4-oxadiazol-3-yl]phenyl]methyl]cyclo propanecarboxamide; (P071) N-ethyl-2-methyl-N-[[4-[5-(trifluoromethyl)-1,2,4-oxadiazol-3-yl]phenyl] methyl]propanamide; (P072) N-[[3-fluoro-4-[5-(trifluoromethyl)-1,2,4-oxadiazol-3-yl]phenyl] methyl]-N-methoxy-propanamide; (P073) 2-methoxy-N-(2,2,2-trifluoroethyl)-N-[[4-[5-(trifluoromethyl)-1,2,4-oxadiazol-3-yl]phenyl]methyl] acetamide; (P074) N-[[2,3-difluoro-4-[5-(trifluoromethyl)-1,2,4-oxadiazol-3-yl]phenyl]methyl]-N-methoxy-cyclopropane carboxamide; (P075) 2-(difluoromethoxy)-N-methyl-N-[[4-[5-(trifluoromethyl)-1,2,4-oxadiazol-3-yl]phenyl]methyl]acetamide; (P076) N-ethoxy-2-methoxy-N-[[4-[5-(trifluoromethyl)-1,2,4-oxadiazol-3-yl]phenyl] methyl]propanamide; (P077) N-isopropyl-N-[[4-[5-(trifluoromethyl)-1,2,4-oxadiazol-3-yl]phenyl]methyl] tetrahydrofuran-2-carboxamide; (P078) 1-methoxy-3-methyl-1-[[4-[5-(trifluoromethyl)-1,2,4-oxadiazol-3-yl]phenyl]methyl]urea; (P079) 3-cyclopropyl-1-methoxy-1-[[4-[5-(trifluoromethyl)-1,2,4-oxadiazol-3-yl]phenyl]methyl]urea; (P080) 3-ethoxy-1-methoxy-1-[[4-[5-(trifluoromethyl)-1,2,4-oxadiazol-3-yl]phenyl] methyl]urea; (P081) 3-allyl-1-methoxy-1-[[4-[5-(trifluoromethyl)-1,2,4-oxadiazol-3-yl]phenyl]methyl] urea; (P082) 1-cyclopropyl-3-methoxy-3-methyl-1-[[4-[5-(trifluoromethyl)-1,2,4-oxadiazol-3-yl]phenyl] methyl]urea; (P083) 3-isopropyl-1-methoxy-1-[[4-[5-(trifluoromethyl)-1,2,4-oxadiazol-3-yl]phenyl]methyl] urea; (P084) 1-methoxy-3-prop-2-ynyl-1-[[4-[5-(trifluoromethyl)-1,2,4-oxadiazol-3-yl]phenyl]methyl] urea; (P085) 1-[[3-fluoro-4-[5-(trifluoromethyl)-1,2,4-oxadiazol-3-yl]phenyl]methyl]-1-methoxy-3-methyl-urea; (P086) 3-(cyclopropylmethyl)-1-methyl-1-[[4-[5-(trifluoromethyl)-1,2,4-oxadiazol-3-yl]phenyl]methyl] urea; (P087) 1-ethyl-3-(2,2,2-trifluoroethyl)-1-[[4-[5-(trifluoromethyl)-1,2,4-oxadiazol-3-yl]phenyl]methyl] urea; (P088) 1,3-dimethoxy-1-[[4-[5-(trifluoromethyl)-1,2,4-oxadiazol-3-yl]phenyl]methyl]urea; (P089) 3-ethyl-1-methoxy-1-[[4-[5-(trifluoromethyl)-1,2,4-oxadiazol-3-yl]phenyl]methyl]urea; (P090) N-methyl-4-[5-(trifluoromethyl)-1,2,4-oxadiazol-3-yl]benzamide; (P091) N—[(E)-methoxyiminomethyl]-4-[5-(trifluoromethyl)-1,2,4-oxadiazol-3-yl]benzamide; (P092) N—[(Z)-methoxyiminomethyl]-4-[5-(trifluoromethyl)-1,2,4-oxadiazol-3-yl]benzamide; (P093) N-[4-[5-(trifluoromethyl)-1,2,4-oxadiazol-3-yl]phenyl]cyclopropanecarboxamide; (P094) N-(2-fluorophenyl)-4-[5-(trifluoromethyl)-1,2,4-oxadiazol-3-yl]benzamide; (P095) 2,2-difluoro-N-methyl-2-[4-[5-(trifluoromethyl)-1,2,4-oxadiazol-3-yl]phenyl] acetamide; (P096) N-allyl-N-[[4-[5-(trifluoromethyl)-1,2,4-oxadiazol-3-yl]phenyl]methyl]acetamide; (P097) N—[(E)-N-methoxy-C-methyl-carbonimidoyl]-4-[5-(trifluoromethyl)-1,2,4-oxadiazol-3-yl]benzamide; (P098) N—[(Z)—N-methoxy-C-methyl-carbonimidoyl]-4-[5-(trifluoromethyl)-1,2,4-oxadiazol-3-yl]benzamide; (P099) N1-methyl-N2-(4-(5-(trifluoromethyl)-1,2,4-oxadiazol-3-yl)benzyl)oxalamide (P100) N-allyl-N-[[4-[5-(trifluoromethyl)-1,2,4-oxadiazol-3-yl] phenyl]methyl]propanamide; (P101) 4,4-dimethyl-1-[[4-[5-(trifluoromethyl)-1,2,4-oxadiazol-3-yl]phenyl] methyl]pyrrolidin-2-one; (P102) N-methyl-4-[5-(trifluoromethyl)-1,2,4-oxadiazol-3-yl] benzenecarbothioamide; (P104) N-methyl-4-[5-(trifluoromethyl)-1,2,4-oxadiazol-3-yl] benzenecarboxamide.

(Q) Compounds capable to act as a safener, for example, (Q001) 1-(2,4-dichlorophenyl)-5-(ethoxycarbonyl)-5-methyl-2-pyrazoline-3-carboxylic acid, (Q002) ethyl 1-(2,4-dichlorophenyl)-5-(ethoxycarbonyl)-5-methyl-2-pyrazoline-3-carboxylate ("mefenpyr (-diethyl)"), (Q003) benoxacor, (Q004) cloquintocet-mexyl, (Q005) cumyluron, (Q006) cyometrinil, (Q007) daimuron, (Q008) dichlormid, (Q009) dicyclonon, (Q010) dietholate, (Q011) dimepiperate, (Q012) fenchlorazole-ethyl, (Q013) fenclorim, (Q014) flurazole, (Q015) fluxofenim, (Q016) furilazole, (Q017) isoxadifen-ethyl, (Q018) mefenpyr-diethyl, (Q019) mephenate, (Q020) methoxyphenone, (Q021) naphthalic anhydride, (Q022) oxabetrinil, (Q023) AD-67, (Q024) cyprosulfamide, (Q025) furilazole and the corresponding R isomer, (Q026) isoxadifenethyl, (Q027) N-(aminocarbonyl)-2-methylbenzenesulfonamide, (Q028) N-(aminocarbonyl)-2-fluorobenzenesulfonamide, (Q029) 1-bromo-4-[(chloromethyl)sulfonyl]benzene, (Q030) 2-(dichloromethyl)-2-methyl-1,3-dioxolane (MG 191), (Q031) 4-(dichloroacetyl)-1-oxa-4-azospiro-[4.5]decane (MON 4660), (Q032) 2,2-dichloro-1-(2,2,5-trimethyl-3-oxazolidinyl)-ethanone, (Q033) 2-methoxy-N-[[4-[[(methylamino)carbonyl] amino]phenyl]sulfonyl]-benzamide, (Q034) 2-methoxy-N-[[4-[[(methylamino)carbonyl]amino]-phenyl]sulfonyl]-benzamide.

Further particularly more preferred compositions of compound (I), according to the invention, comprise (2) at least one further active compound selected from:

(A) Inhibitors of the sterol biosynthesis, for example, (A001) cyproconazole, (A002) difenoconazole, (A003) epoxiconazole, (A006) fenpropimorph, (A009) flutriafol, (A012) ipconazole, (A013) metconazole, (A017) propiconazole, (A018) prothioconazole, (A021) tebuconazole, (A022) tetraconazol, (A081) mefentrifluconazole, (A082) ipfentrifluconazole, (B) Inhibitors of the respiratory chain at complex I or II, for example, (B001) benzovindiflupyr, (B002) bixafen, (B003) boscalid, (B005) fluopyram, (B007) fluxapyroxad, (B009) isofetamid, (B010) isopyrazam (B017) penflufen, (B018) penthiopyrad, (B019) pydiflumetofen, (B021) sedaxane, (B028) inpyrfluxam, (B030) 3-(difluoromethyl)-N-(7-fluoro-1,1,3-trimethyl-2,3-dihydro-1H-inden-4-yl)-1-methyl-1H-pyrazole-4-carboxamide (Fluindapyr), (C) Inhibitors of the respiratory chain at complex III, for example, (C003) azoxystrobin, (C007) dimoxystrobin, (C012) fluoxastrobin, (C013) kresoxim-methyl, (C014) metominostrobin, (C016) picoxystrobin, (C017) pyraclostrobin, (C020) trifloxystrobin, (C025) (3S,6S,7R,8R)-8-benzyl-3-[({3-[(isobutyryloxy)methoxy]-4-methoxypyridin-2-yl}carbonyl)amino]-6-methyl-4,9-dioxo-11,5-dioxonan-7-yl-2-methylpropanoate (Fenpicoxamid), (C031) florylpicoxamid, (D) Inhibitors of the mitosis and cell division, for example, (D001) carbendazim, (D007) thiophanate-methyl (D012) 4-(2-bromo-4-fluorophenyl)-N-(2,6-difluorophenyl)-1,3-dimethyl-1H-pyrazol-5-amine, (D015) 4-(2-bromo-4-fluorophenyl)-N-(2-chloro-6-fluorophenyl)-1,3-dimethyl-1H-pyrazol-5-amine, (D025) N-(4-chloro-2,6-difluorophenyl)-4-(2-chloro-4-fluorophenyl)-1,3-dimethyl-1H-pyrazol-5-amine, (E) Compounds capable to have a multisite action, for example, (E003) captan, (E004) chlorothalonil, (E010) dithianon, (E012) folpet, (E013) mancozeb, (E015) metiram, (E018) propineb, (E020) thiram, (L) Inhibitors of the nucleic acid synthesis, for example, (L003) metalaxyl, (L004) metalaxyl-M (mefenoxam), (M) Inhibitors of the signal transduction, for example, (M001) fludioxonil, (M002) iprodione, (M004) proquinazid, (M005) quinoxyfen, (N) Compounds capable to act as an uncoupler, for example, (N001) fluazinam, (N002) meptyldinocap, (O) Other fungicides, for example, (O008) cyflufenamid, (0.010) cyprosulfamide, (O011) flutianil, (O012) fosetyl-aluminium, (0.016), metrafenone, (O022) oxathiapiprolin, (O027) pyriofenone (chlazafenone), (O043) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate (fluoxapiprolin), (O047) 3-(4,4-difluoro-3,3-dimethyl-3,4-dihydroisoquinolin-1-yl)quinoline (Quinofumelin), (O048) 4-amino-5-fluoropyrimidin-2-ol (tautomeric form: 4-amino-5-fluoropyrimidin-2 (1H)-one), (O052) 5-fluoro-2-[(4-fluorobenzyl)oxy] pyrimidin-4-amine, (O053) 5-fluoro-2-[(4-methylbenzyl)oxy]pyrimidin-4-amine, (O 062) 5-fluoro-4-imino-3-methyl-1-[(4-methylphenyl)sulfonyl]-3,4-dihydropyrimidin-2(1H)-one, (O063) pyridachlometyl, (O064) ipflufenoquin, (O065) aminopyrifen, (P) Inhibitors of histone deacetylase, for example, (P006) N-(2,4-difluorophenyl)-4-[5-(trifluoromethyl)-1,2,4-oxadiazol-3-yl]benzamide, (P094) N-(2-fluorophenyl)-4-[5-(trifluoromethyl)-1,2,4-oxadiazol-3-yl]benzamide and (P104) N-methyl-4-[5-(trifluoromethyl)-1,2,4-oxadiazol-3-yl]benzenecarboxamide.

Further particularly most preferred compositions of compound (I) according to the invention comprise component (2) at least one further active compound selected from:

(A) Inhibitors of the sterol biosynthesis, for example, (A001) cyproconazole, (A002) difenoconazole, (A004) tetraconazol (A006) fenpropimorph, (A009) flutriafol, (A013) metconazole, (A017) propiconazole, (A018) prothioconazole, (A021) tebuconazole, (A022) epoxiconazole, (A081) mefentrifluconazole, (B) Inhibitors of the respiratory chain at complex I or II, for example, (B001) benzovindiflupyr, (B002) bixafen, (B005) fluopyram, (B007) fluxapyroxad, (B019) pydiflumetofen, (B028) inpyrfluxam, (B30) fluindapyr, (B038) isoflucpyram, (C) Inhibitors of the respiratory chain at complex III, for example, (C003) azoxystrobin, (C012) fluoxastrobin (C014) metominostrobin, (C017) pyraclostrobin, (C016) picoxystrobin, (C020) trifloxystrobin, (C025) (3S,6S,7R,8R)-8-benzyl-3-[({3-[(isobutyryloxy) methoxy]-4-methoxypyridin-2-yl}carbonyl)amino]-6-methyl-4,9-dioxo-1,5-dioxonan-7-yl-2-methylpropanoate (Fenpicoxamid), (C030) 1-(2-{[1-(4-chlorophenyl)pyrazol-3-yl]oxymethyl}-3-methylphenyl)-1,4-dihydro-4-methyl-5H-tetrazol-5-one (Metyltetraprole), (D) Inhibitors of the mitosis and cell division, for example, (D001) carbendazim, (D007) thiophanate-methyl, (E) Compounds capable to have a multisite action, for example, (E004) chlorothalonil, (E010) dithianon, (E013) mancozeb, (E020) thiram, (L) Inhibitors of the nucleic acid synthesis, for example, (L003) metalaxyl, (M) Inhibitors of the signal transduction, for example, (M001) fludioxonil, (N) Compounds capable to act as an uncoupler, for example, (N001) fluazinam, (O) Other fungicides, for example, (O022) oxathiapiprolin, (O043) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate (fluoxapiprolin), (O046) 3-(4,4,5-trifluoro-3,3-dimethyl-3,4-dihydroisoquinolin-1-yl)quinoline, (O047) 3-(4,4-difluoro-3,3-dimethyl-3,4-dihydroisoquinolin-1-yl)quinoline (Quinofumelin), (O065) ipflufenoquin, (P) Inhibitors of histone deacetylase, for example, (P006) N-(2,4-difluorophenyl)-4-[5-(trifluoromethyl)-1,2,4-oxadiazol-3-yl]benzamide, (P094) N-(2-fluorophenyl)-4-[5-(trifluoromethyl)-1,2,4-oxadiazol-3-yl]benzamide and (P103) 5-methyl-1-[[4-[5-(trifluoromethyl)-1,2,4-oxadiazol-3-yl]phenyl]methyl]pyrrolidin-2-one.

In one embodiment particularly more preferred compositions of compound (I) according to the invention comprise (2) at least one active compound selected from the group consisting of: azoxystrobin, benzovindiflupyr, bixafen, boscalid, difenconazole, dithianon, fluazinam, fluindapyr, fluopyram, fluxapyroxad, folpet, inpyrfluxam, mancozeb, mefentrifluconazole, metiram, metominostrobin, picoxystrobin, propineb, prothioconazole, pyraclostrobin, tebuconazole and trifloxystrobin.

The following combinations exemplify specific embodiments of the agrochemical composition according to the present invention.

Following combinations, listed in Table-1, wherein component (1) (compound of formula (I) and another component (2), are selected from the groups (A) to (R) as defined herein (component 2, for example, (A001) or cyproconazole, in combination [(I)+(A001)]).

TABLE 1

(I) + (A001), (I) + (A002), (I) + (A003), (I) + (A004), (I) + (A005), (I) + (A006), (I) + (A007), (I) + (A008),
(I) + (A009), (I) + (A010), (I) + (A011), (I) + (A012), (I) + (A013), (I) + (A014), (I) + (A015), (I) + (A016),
(I) + (A017), (I) + (A018), (I) + (A019), (I) + (A020), (I) + (A021), (I) + (A022), (I) + (A023), (I) + (A024),
(I) + (A025), (I) + (A026), (I) + (A027), (I) + (A028), (I) + (A029), (I) + (A030), (I) + (A031), (I) + (A032),
(I) + (A033), (I) + (A034), (I) + (A035), (I) + (A036), (I) + (A037), (I) + (A038), (I) + (A039), (I) + (A040),
(I) + (A041), (I) + (A042), (I) + (A043), (I) + (A044), (I) + (A045), (I) + (A046), (I) + (A047), (I) + (A048),
(I) + (A049), (I) + (A050), (I) + (A051), (I) + (A052), (I) + (A053), (I) + (A054), (I) + (A055), (I) + (A056),
(I) + (A057), (I) + (A058), (I) + (A059), (I) + (A060), (I) + (A061), (I) + (A062), (I) + (A063), (I) + (A064),
(I) + (A065), (I) + (A066), (I) + (A067), (I) + (A068), (I) + (A069), (I) + (A070), (I) + (A071), (I) + (A072),
(I) + (A073), (I) + (A074), (I) + (A075), (I) + (A076), (I) + (A077), (I) + (A078), (I) + (A079), (I) + (A080),
(I) + (A081), (I) + (A082), (I) + (A083), (I) + (A084), (I) + (A085), (I) + (A086), (I) + (A087), (I) + (A088),
(I) + (A089), (I) + (A090), (I) + (A091), (I) + (A092), (I) + (A093), (I) + (A094), (I) + (A095), (I) + (A096),
(I) + (A097), (I) + (A098), (I) + (A099), (I) + (A100), (I) + (B001), (I) + (B002), (I) + (B003), (I) + (B004),
(I) + (B005), (I) + (B006), (I) + (B007), (I) + (B008), (I) + (B009), (I) + (B010), (I) + (B011), (I) + (B012),
(I) + (B013), (I) + (B014), (I) + (B015), (I) + (B016), (I) + (B017), (I) + (B018), (I) + (B019), (I) + (B020),
(I) + (B021), (I) + (B022), (I) + (B023), (I) + (B024), (I) + (B025), (I) + (B026), (I) + (B027), (I) + (B028),
(I) + (B029), (I) + (B030), (I) + (B031), (I) + (B032), (I) + (B033), (I) + (B034), (I) + (B035), (I) + (B036),
(I) + (B037), (I) + (B038), (I) + (B039), (I) + (B040), (I) + (B041), (I) + (B042), (I) + (B043), (I) + (B044),
(I) + (B045), (I) + (B046), (I) + (B047), (I) + (B048), (I) + (B049), (I) + (B050), (I) + (B051), (I) + (B052),
(I) + (B053), (I) + (B054), (I) + (B055), (I) + (B056), (I) + (B057), (I) + (B058), (I) + (B059), (I) + (B060),
(I) + (B061), (I) + (B062), (I) + (B063), (I) + (B064), (I) + (B065), (I) + (B066), (I) + (B068), (I) + (B069),
(I) + (B070), (I) + (B071), (I) + (C001), (I) + (C002), (I) + (C003), (I) + (C004), (I) + (C005), (I) + (C006),
(I) + (C007), (I) + (C008), (I) + (C009), (I) + (C010), (I) + (C011), (I) + (C012), (I) + (C013), (I) + (C014),
(I) + (C015), (I) + (C016), (I) + (C017), (I) + (C018), (I) + (C019), (I) + (C020), (I) + (C021), (I) + (C022),
(I) + (C023), (I) + (C024), (I) + (C025), (I) + (C026), (I) + (C027), (I) + (C028), (I) + (C029), (I) + (C030),
(I) + (C031), (I) + (C032), (I) + (C033), (I) + (C034), (I) + (D001), (I) + (D002), (I) + (D003), (I) + (D004),
(I) + (D005), (I) + (D006), (I) + (D007), (I) + (D008), (I) + (D009), (I) + (D010), (I) + (D011), (I) + (D012),
(I) + (D013), (I) + (D014), (I) + (D015), (I) + (D016), (I) + (D017), (I) + (D018), (I) + (D019), (I) + (D020),
(I) + (D021), (I) + (D022), (I) + (D023), (I) + (D024), (I) + (D025), (I) + (D026), (I) + (E001), (I) + (E002),
(I) + (E003), (I) + (E004), (I) + (E005), (I) + (E006), (I) + (E007), (I) + (E008), (I) + (E009), (I) + (E010),
(I) + (E011), (I) + (E012), (I) + (E013), (I) + (E014), (I) + (E015), (I) + (E016), (I) + (E017), (I) + (E018),
(I) + (E019), (I) + (E020), (I) + (E021), (I) + (E022), (I) + (E023), (I) + (E024), (I) + (E025), (I) + (E026),
(I) + (E027), (I) + (E028), (I) + (E029), (I) + (E030), (I) + (F001), (I) + (F002), (I) + (F003), (I) + (F004),
(I) + (G001), (I) + (G002), (I) + (G003), (I) + (G004), (I) + (G005), (I) + (G006), (I) + (G007), (I) + (G008),
(I) + (G009), (I) + (G0010), (I) + (G0011), (I) + (H001), (I) + (H002), (I) + (H003), (I) + (H004), (I) + (I001),
(I) + (I002), (I) + (I003), (I) + (I004), (I) + (I005), (I) + (I006), (I) + (I007), (I) + (I008), (I) + (I009), (I) + (I010),
(I) + (I011), (I) + (I012), (I) + (I013), (I) + (I014), (I) + (J001), (I) + (J002), (I) + (J003), (I) + (J004), (I) + (J005),
(I) + (J006), (I) + (J007), (I) + (J008), (I) + (J009), (I) + (J0010), (I) + (J011), (I) + (J012), (I) + (J013), (I) + (J014),
(I) + (J015), (I) + (J015), (I) + (J016), (I) + (K001), (I) + (K002), (I) + (K003), (I) + (K004), (I) + (K005),
(I) + (K006), (I) + (K007), (I) + (L001), (I) + (L002), (I) + (L003), (I) + (L004), (I) + (L005), (I) + (L006),
(I) + (L007), (I) + (L008), (I) + (L009), (I) + (L010), (I) + (L011), (I) + (L012), (I) + (M001), (I) + (M002),
(I) + (M003), (I) + (M004), (I) + (M005), (I) + (M006), (I) + (M007), (I) + (M008), (I) + (M009), (I) + (M010),
(I) + (N001), (I) + (N002), (I) + (N003), (I) + (N004), (I) + (O001), (I) + (O002), (I) + (O003), (I) + (O004),
(I) + (O005), (I) + (O006), (I) + (O007), (I) + (O008), (I) + (O009), (I) + (O010), (I) + (O011), (I) + (O012),
(I) + (O013), (I) + (O014), (I) + (O015), (I) + (O016), (I) + (O017), (I) + (O018), (I) + (O019), (I) + (O020),
(I) + (O021), (I) + (O022), (I) + (O023), (I) + (O024), (I) + (O025), (I) + (O026), (I) + (O027), (I) + (O028),
(I) + (O029), (I) + (O030), (I) + (O031), (I) + (O032), (I) + (O033), (I) + (O034), (I) + (O035), (I) + (O036),
(I) + (O037), (I) + (O038), (I) + (O039), (I) + (O040), (I) + (O041), (I) + (O042), (I) + (O043), (I) + (O044),
(I) + (O045), (I) + (O046), (I) + (O047), (I) + (O048), (I) + (O049), (I) + (O050), (I) + (O051), (I) + (O052),
(I) + (O053), (I) + (O054), (I) + (O055), (I) + (O056), (I) + (O057), (I) + (O058), (I) + (O059), (I) + (O060),
(I) + (O061), (I) + (O062), (I) + (O063), (I) + (O064), (I) + (O065), (I) + (O066), (I) + (O067), (I) + (O068),
(I) + (O069), (I) + (O070), (I) + (O071), (I) + (O072), (I) + (O073), (I) + (O074), (I) + (O075), (I) + (O076),
(I) + (O077), (I) + (O078), (I) + (O079), (I) + (O080), (I) + (O081), (I) + (O082), (I) + (O083), (I) + (O084),
(I) + (O086), (I) + (O087), (I) + (O088), (I) + (O089), (I) + (P001), (I) + (P002), (I) + (P003), (I) + (P004),
(I) + (P005), (I) + (P006), (I) + (P007), (I) + (P008), (I) + (P009), (I) + (P010), (I) + (P011), (I) + (P012),
(I) + (P013), (I) + (P014), (I) + (P015), (I) + (P016), (I) + (P017), (I) + (P018), (I) + (P019), (I) + (P020),
(I) + (P021), (I) + (P022), (I) + (P023), (I) + (P024), (I) + (P025), (I) + (P026), (I) + (P027), (I) + (P028),
(I) + (P029), (I) + (P030), (I) + (P031), (I) + (P032), (I) + (P033), (I) + (P034), (I) + (P035), (I) + (P036),
(I) + (P037), (I) + (P038), (I) + (P039), (I) + (P040), (I) + (P041), (I) + (P042), (I) + (P043), (I) + (P044),
(I) + (P045), (I) + (P046), (I) + (P047), (I) + (P048), (I) + (P049), (I) + (P050), (I) + (P051), (I) + (P052),
(I) + (P053), (I) + (P054), (I) + (P055), (I) + (P056), (I) + (P057), (I) + (P058), (I) + (P059), (I) + (P060),
(I) + (P061), (I) + (P062), (I) + (P063), (I) + (P064), (I) + (P065), (I) + (P066), (I) + (P067), (I) + (P068),
(I) + (P069), (I) + (P070), (I) + (P071), (I) + (P072), (I) + (P073), (I) + (P074), (I) + (P075), (I) + (P076),
(I) + (P077), (I) + (P078), (I) + (P079), (I) + (P080), (I) + (P081), (I) + (P082), (I) + (P083), (I) + (P084),
(I) + (P085), (I) + (P086), (I) + (P087), (I) + (P088), (I) + (P089), (I) + (P090), (I) + (P091), (I) + (P092),
(I) + (P093), (I) + (P094), (I) + (P095), (I) + (P096), (I) + (P097), (I) + (P098), (I) + (P099), (I) + (P100),
(I) + (P101), (I) + (P102), (I) + (P103), (I) + (P104), (I) + (Q001), (I) + (Q002), (I) + (Q003), (I) + (Q004),
(I) + (Q005), (I) + (Q006), (I) + (Q007), (I) + (Q008), (I) + (Q009), (I) + (Q010), (I) + (Q011), (I) + (Q012),
(I) + (Q013), (I) + (Q014), (I) + (Q015), (I) + (Q016), (I) + (Q017), (I) + (Q018), (I) + (Q019), (I) + (Q020),
(I) + (Q021), (I) + (Q022), (I) + (Q023), (I) + (Q024), (I) + (Q025), (I) + (Q026), (I) + (Q027), (I) + (Q028),
(I) + (Q029), (I) + (Q030), (I) + (Q031), (I) + (Q032), (I) + (Q033), (I) + (Q034), (I) + (R001), (I) + (R002),
(I) + (R003), (I) + (R004), (I) + (R005), (I) + (R006), (I) + (R007), (I) + (R008), (I) + (R009), (I) + (R010),
(I) + (R011), (I) + (R012), (I) + (R013), (I) + (R014), (I) + (R015), (I) + (R016), (I) + (R017), (I) + (R018),
(I) + (R019), (I) + (R020), (I) + (R021), (I) + (R022), (I) + (R023), (I) + (R024), (I) + (R025), (I) + (R026),
(I) + (R027), (I) + (R028), (I) + (R029), (I) + (R030), (I) + (R031), (I) + (R032), (I) + (R033), (I) + (R034),

TABLE 1-continued

| |
|---|
| (I) + (R035), (I) + (R036), (I) + (R037), (I) + (R038), (I) + (R039), (I) + (R040), (I) + (R041), (I) + (R042), (I) + (R043), (I) + (R044), (I) + (R045), (I) + (R046), (I) + (R047). |

In one embodiment the weight ratio of component (1) to component (2) is between 500:1 and 1:500 in combinations [(I)+(A001] to [(I)+(R047)] of Table: 1.

In one embodiment the weight ratio of component (1) to component (2) is between 100:1 and 1:100 in combinations [(I)+(A001] to [(I)+(R047)] of Table: 1.

In one embodiment the weight ratio of component (1) to component (2) is between 50:1 and 1:50 in combinations [(I)+(A001] to [(I)+(R047)] of Table: 1.

In one embodiment the weight ratio of component (1) to component (2) is between 20:1 and 1:20 in combinations [(I)+(A001] to [(I)+(Q047)] of Table: 1.

In one embodiment the weight ratio of component (1) to component (2) is between 5:1 and 1:5 in combinations [(I)+(A001] to [(I)+(R047)] of Table: 1.

In one embodiment the weight ratio of component (1) to component (2) is between 3:1 and 1:3 in combinations [(I)+(A001] to [(I)+(R047)] of Table: 1.

In one embodiment the weight ratio of component (1) to component (2) is between 2:1 and 1:2 in combinations [(I)+(A001] to [(I)+(R047)] of Table: 1.

In one embodiment the weight ratio of component (1) to component (2) is 1:1 in combinations [(I)+(A001] to [(I)+(R047)] of Table: 1.

Particularly, following combinations, listed in Table-2, wherein component (1) as compound (I-1) and component (2) are selected from the groups (A) to (R) as defined herein.

TABLE 2

| |
|---|
| (I-1) + (A001), (I-1) + (A002), (I-1) + (A003), (I-1) + (A004), (I-1) + (A005), (I-1) + (A006), (I-1) + (A007), (I-1) + (A008), (I-1) + (A009), (I-1) + (A010), (I-1) + (A011), (I-1) + (A012), (I-1) + (A013), (I-1) + (A014), (I-1) + (A015), (I-1) + (A016), (I-1) + (A017), (I-1) + (A018), (I-1) + (A019), (I-1) + (A020), (I-1) + (A021), (I-1) + (A022), (I-1) + (A023), (I-1) + (A024), (I-1) + (A025), (I-1) + (A026), (I-1) + (A027), (I-1) + (A028), (I-1) + (A029), (I-1) + (A030), (I-1) + (A031), (I-1) + (A032), (I-1) + (A033), (I-1) + (A034), (I-1) + (A035), (I-1) + (A036), (I-1) + (A037), (I-1) + (A038), (I-1) + (A039), (I-1) + (A040), (I-1) + (A041), (I-1) + (A042), (I-1) + (A043), (I-1) + (A044), (I-1) + (A045), (I-1) + (A046), (I-1) + (A047), (I-1) + (A048), (I-1) + (A049), (I-1) + (A050), (I-1) + (A051), (I-1) + (A052), (I-1) + (A053), (I-1) + (A054), (I-1) + (A055), (I-1) + (A056), (I-1) + (A057), (I-1) + (A058), (I-1) + (A059), (I-1) + (A060), (I-1) + (A061), (I-1) + (A062), (I-1) + (A063), (I-1) + (A064), (I-1) + (A065), (I-1) + (A066), (I-1) + (A067), (I-1) + (A068), (I-1) + (A069), (I-1) + (A070), (I-1) + (A071), (I-1) + (A072), (I-1) + (A073), (I-1) + (A074), (I-1) + (A075), (I-1) + (A076), (I-1) + (A077), (I-1) + (A078), (I-1) + (A079), (I-1) + (A080), (I-1) + (A081), (I-1) + (A082), (I-1) + (A083), (I-1) + (A084), (I-1) + (A085), (I-1) + (A086), (I-1) + (A087), (I-1) + (A088), (I-1) + (A089), (I-1) + (A090), (I-1) + (A091), (I-1) + (A092), (I-1) + (A093), (I-1) + (A094), (I-1) + (A095), (I-1) + (A096), (I-1) + (A097), (I-1) + (A098), (I-1) + (A099), (I-1) + (A100), (I-1) + (B001), (I-1) + (B002), (I-1) + (B003), (I-1) + (B004), (I-1) + (B005), (I-1) + (B006), (I-1) + (B007), (I-1) + (B008), (I-1) + (B009), (I-1) + (B010), (I-1) + (B011), (I-1) + (B012), (I-1) + (B013), (I-1) + (B014), (I-1) + (B015), (I-1) + (B016), (I-1) + (B017), (I-1) + (B018), (I-1) + (B019), (I-1) + (B020), (I-1) + (B021), (I-1) + (B022), (I-1) + (B023), (I-1) + (B024), (I-1) + (B025), (I-1) + (B026), (I-1) + (B027), (I-1) + (B028), (I-1) + (B029), (I-1) + (B030), (I-1) + (B031), (I-1) + (B032), (I-1) + (B033), (I-1) + (B034), (I-1) + (B035), (I-1) + (B036), (I-1) + (B037), (I-1) + (B038), (I-1) + (B039), (I-1) + (B040), (I-1) + (B041), (I-1) + (B042), (I-1) + (B043), (I-1) + (B044), (I-1) + (B045), (I-1) + (B046), (I-1) + (B047), (I-1) + (B048), (I-1) + (B049), (I-1) + (B050), (I-1) + (B051), (I-1) + (B052), (I-1) + (B053), (I-1) + (B054), (I-1) + (B055), (I-1) + (B056), (I-1) + (B057), (I-1) + (B058), (I-1) + (B059), (I-1) + (B060), (I-1) + (B061), (I-1) + (B062), (I-1) + (B063), (I-1) + (B064), (I-1) + (B065), (I-1) + (B066), (I-1) + (B068), (I-1) + (B069), (I) + (B070), (I) + (B071), (I-1) + (C001), (I-1) + (C002), (I-1) + (C003), (I-1) + (C004), (I-1) + (C005), (I-1) + (C006), (I-1) + (C007), (I-1) + (C008), (I-1) + (C009), (I-1) + (C010), (I-1) + (C011), (I-1) + (C012), (I-1) + (C013), (I-1) + (C014), (I-1) + (C015), (I-1) + (C016), (I-1) + (C017), (I-1) + (C018), (I-1) + (C019), (I-1) + (C020), (I-1) + (C021), (I-1) + (C022), (I-1) + (C023), (I-1) + (C024), (I-1) + (C025), (I-1) + (C026), (I-1) + (C027), (I-1) + (C028), (I-1) + (C029), (I-1) + (C030), (I-1) + (C031), (I-1) + (C032), (I-1) + (C033), (I) + (C034), (I-1) + (D001), (I-1) + (D002), (I-1) + (D003), (I-1) + (D004), (I-1) + (D005), (I-1) + (D006), (I-1) + (D007), (I-1) + (D008), (I-1) + (D009), (I-1) + (D010), (I-1) + (D011), (I-1) + (D012), (I-1) + (D013), (I-1) + (D014), (I-1) + (D015), (I-1) + (D016), (I-1) + (D017), (I-1) + (D018), (I-1) + (D019), (I-1) + (D020), (I-1) + (D021), (I-1) + (D022), (I-1) + (D023), (I-1) + (D024), (I-1) + (D025), (I-1) + (D026), (I-1) + (E001), (I-1) + (E002), (I-1) + (E003), (I-1) + (E004), (I-1) + (E005), (I-1) + (E006), (I-1) + (E007), (I-1) + (E008), (I-1) + (E009), (I-1) + (E010), (I-1) + (E011), (I-1) + (E012), (I-1) + (E013), (I-1) + (E014), (I-1) + (E015), (I-1) + (E016), (I-1) + (E017), (I-1) + (E018), (I-1) + (E019), (I-1) + (E020), (I-1) + (E021), (I-1) + (E022), (I-1) + (E023), (I-1) + (E024), (I-1) + (E025), (I-1) + (E026), (I-1) + (E027), (I-1) + (E028), (I-1) + (E029), (I-1) + (E030), (I-1) + (F001), (I-1) + (F002), (I-1) + (F003), (I-1) + (F004), (I-1) + (G001), (I-1) + (G002), (I-1) + (G003), (I-1) + (G004), (I-1) + (G005), (I-1) + (G006), (I-1) + (G007), (I-1) + (G008), (I-1) + (G009), (I-1) + (G0010), (I-1) + (G0011), (I-1) + (H001), (I-1) + (H002), (I-1) + (H003), (I-1) + (H004), (I-1) + (I001), (I-1) + (I002), (I-1) + (I003), (I-1) + (I004), (I-1) + (I005), (I-1) + (I006), (I-1) + (I007), (I-1) + (I008), (I-1) + (I009), (I-1) + (I010), (I-1) + (I011), (I-1) + (I012), (I-1) + (I013), (I-1) + (I014), (I-1) + (J001), (I-1) + (J002), (I-1) + (J003), (I-1) + (J004), (I-1) + (J005), (I-1) + (J006), (I-1) + (J007), (I-1) + (J008), (I-1) + (J009), (I-1) + (J0010), (I-1) + (J011), (I-1) + (J012), (I-1) + (J013), (I-1) + (J014), (I-1) + (J015), (I-1) + (J015), (I-1) + (J016), (I-1) + (K001), (I-1) + (K002), (I-1) + (K003), (I-1) + (K004), (I-1) + (K005), (I-1) + (K006), (I-1) + (K007), (I-1) + (L001), (I-1) + (L002), (I-1) + (L003), (I-1) + (L004), (I-1) + (L005), (I-1) + (L006), (I-1) + (L007), (I-1) + (L008), (I-1) + (L009), (I-1) + (L010), (I-1) + (L011), (I-1) + (L012), (I-1) + (M001), (I-1) + (M002), (I-1) + (M003), (I-1) + (M004), (I-1) + (M005), (I-1) + (M006), (I-1) + (M007), (I-1) + (M008), (I-1) + (M009), (I-1) + (M010), (I-1) + (N001), (I-1) + (N002), (I-1) + (N003), (I-1) + (N004), (I-1) + (O001), (I-1) + (O002), (I-1) + (O003), (I-1) + (O004), (I-1) + (O005), (I-1) + (O006), (I-1) + (O007), (I-1) + (O008), (I-1) + (O009), (I-1) + (O010), (I-1) + (O011), (I-1) + (O012), (I-1) + (O013), (I-1) + (O014), (I-1) + (O015), (I-1) + (O016), (I-1) + (O017), (I-1) + (O018), (I-1) + (O019), (I-1) + (O020), (I-1) + (O021), (I-1) + (O022), (I-1) + (O023), (I-1) + (O024), (I-1) + (O025), (I-1) + (O026), (I-1) + (O027), (I-1) + (O028), (I-1) + (O029), (I-1) + (O030), (I-1) + (O031), (I-1) + (O032), (I-1) + (O033), (I-1) + (O034), (I-1) + (O035), (I-1) + (O036), (I- |

TABLE 2-continued

| |
|---|
| 1) + (O037), (I-1) + (O038), (I-1) + (O039), (I-1) + (O040), (I-1) + (O041), (I-1) + (O042), (I-1) + (O043), (I-1) + (O044), (I-1) + (O045), (I-1) + (O046), (I-1) + (O047), (I-1) + (O048), (I-1) + (O049), (I-1) + (O050), (I-1) + (O051), (I-1) + (O052), (I-1) + (O053), (I-1) + (O054), (I-1) + (O055), (I-1) + (O056), (I-1) + (O057), (I-1) + (O058), (I-1) + (O059), (I-1) + (O060), (I-1) + (O061), (I-1) + (O062), (I-1) + (O063), (I-1) + (O064), (I-1) + (O065), (I-1) + (O066), (I-1) + (O067), (I-1) + (O068), (I-1) + (O069), (I-1) + (O070), (I-1) + (O071), (I-1) + (O072), (I-1) + (O073), (I-1) + (O074), (I-1) + (O075), (I-1) + (O076), (I-1) + (O077), (I-1) + (O078), (I-1) + (O079), (I-1) + (O080), (I-1) + (O081), (I-1) + (O082), (I-1) + (O083), (I-1) + (O084), (I-1) + (O085), (I-1) + (O086), (I-1) + (O087), (I-1) + (O088), (I-1) + (P001), (I-1) + (P002), (I-1) + (P003), (I-1) + (P004), (I-1) + (P005), (I-1) + (P006), (I-1) + (P007), (I-1) + (P008), (I-1) + (P009), (I-1) + (P010), (I-1) + (P011), (I-1) + (P012), (I-1) + (P013), (I-1) + (P014), (I-1) + (P015), (I-1) + (P016), (I-1) + (P017), (I-1) + (P018), (I-1) + (P019), (I-1) + (P020), (I-1) + (P021), (I-1) + (P022), (I-1) + (P023), (I-1) + (P024), (I-1) + (P025), (I-1) + (P026), (I-1) + (P027), (I-1) + (P028), (I-1) + (P029), (I-1) + (P030), (I-1) + (P031), (I-1) + (P032), (I-1) + (P033), (I-1) + (P034), (I-1) + (P035), (I-1) + (P036), (I-1) + (P037), (I-1) + (P038), (I-1) + (P039), (I-1) + (P040), (I-1) + (P041), (I-1) + (P042), (I-1) + (P043), (I-1) + (P044), (I-1) + (P045), (I-1) + (P046), (I-1) + (P047), (I-1) + (P048), (I-1) + (P049), (I-1) + (P050), (I-1) + (P051), (I-1) + (P052), (I-1) + (P053), (I-1) + (P054), (I-1) + (P055), (I-1) + (P056), (I-1) + (P057), (I-1) + (P058), (I-1) + (P059), (I-1) + (P060), (I-1) + (P061), (I-1) + (P062), (I-1) + (P063), (I-1) + (P064), (I-1) + (P065), (I-1) + (P066), (I-1) + (P067), (I-1) + (P068), (I-1) + (P069), (I-1) + (P070), (I-1) + (P071), (I-1) + (P072), (I-1) + (P073), (I-1) + (P074), (I-1) + (P075), (I-1) + (P076), (I-1) + (P077), (I-1) + (P078), (I-1) + (P079), (I-1) + (P080), (I-1) + (P081), (I-1) + (P082), (I-1) + (P083), (I-1) + (P084), (I-1) + (P085), (I-1) + (P086), (I-1) + (P087), (I-1) + (P088), (I-1) + (P089), (I-1) + (P090), (I-1) + (P091), (I-1) + (P092), (I-1) + (P093), (I-1) + (P094), (I-1) + (P095), (I-1) + (P096), (I-1) + (P097), (I-1) + (P098), (I-1) + (P099), (I-1) + (P100), (I-1) + (P101), (I-1) + (P102), (I-1) + (P103), (I-1) + (P104), (I-1) + (Q001), (I-1) + (Q002), (I-1) + (Q003), (I-1) + (Q004), (I-1) + (Q005), (I-1) + (Q006), (I-1) + (Q007), (I-1) + (Q008), (I-1) + (Q009), (I-1) + (Q010), (I-1) + (Q011), (I-1) + (Q012), (I-1) + (Q013), (I-1) + (Q014), (I-1) + (Q015), (I-1) + (Q016), (I-1) + (Q017), (I-1) + (Q018), (I-1) + (Q019), (I-1) + (Q020), (I-1) + (Q021), (I-1) + (Q022), (I-1) + (Q023), (I-1) + (Q024), (I-1) + (Q025), (I-1) + (Q026), (I-1) + (Q027), (I-1) + (Q028), (I-1) + (Q029), (I-1) + (Q030), (I-1) + (Q031), (I-1) + (Q032), (I-1) + (Q033), (I-1) + (Q034), (I-1) + (R001), (I-1) + (R002), (I-1) + (R003), (I-1) + (R004), (I-1) + (R005), (I-1) + (R006), (I-1) + (R007), (I-1) + (R008), (I-1) + (R009), (I-1) + (R010), (I-1) + (R011), (I-1) + (R012), (I-1) + (R013), (I-1) + (R014), (I-1) + (R015), (I-1) + (R016), (I-1) + (R017), (I-1) + (R018), (I-1) + (R019), (I-1) + (R020), (I-1) + (R021), (I-1) + (R022), (I-1) + (R023), (I-1) + (R024), (I-1) + (R025), (I-1) + (R026), (I-1) + (R027), (I-1) + (R028), (I-1) + (R029), (I-1) + (R030), (I-1) + (R031), (I-1) + (R032), (I-1) + (R033), (I-1) + (R034), (I-1) + (R035), (I-1) + (R036), (I-1) + (R037), (I-1) + (R038), (I-1) + (R039), (I-1) + (R040), (I-1) + (R041), (I-1) + (R042), (I-1) + (R043), (I-1) + (R044), (I-1) + (R045), (I-1) + (R046), (I-1) + (R047). |

Table 3:

Combination [(I-2)+(A001] to [(I-2)+(R047)] are defined as combination [(I-1)+(A001] to [(I-1)+(R047)] of Table 2, wherein compound (I-1) in each mixture is replaced with compound (I-2).

Table 4:

Combination [(I-3)+(A001] to [(I-3)+(R047)] are defined as combination [(I-1)+(A001] to [(I-1)+(R047)] of Table 2, wherein compound (I-1) in each mixture is replaced with compound (I-3).

Table 5:

Combination [(I-4)+(A001] to [(I-4)+(R047)] are defined as combination [(I-1)+(A001] to [(I-1)+(R047)] of Table 2, wherein compound (I-1) in each mixture is replaced with compound (I-4).

Table 6:

Combination [(I-5)+(A001] to [(I-5)+(R047)] are defined as combination [(I-1)+(A001] to [(I-1)+(R047)] of Table 2, wherein compound (I-1) in each mixture is replaced with compound (I-5).

Table 7:

Combination [(I-6)+(A001] to [(I-6)+(R047)] are defined as combination [(I-1)+(A001] to [(I-1)+(R047)] of Table 2, wherein compound (I-1) in each mixture is replaced with compound (I-6).

Table 8:

Combination [(I-7)+(A001] to [(I-7)+(R047)] are defined as combination [(I-1)+(A001] to [(I-1)+(R047)] of Table 2, wherein compound (I-1) in each mixture is replaced with compound (I-7).

Table 9:

Combination [(I-8)+(A001] to [(I-7)+(R047)] are defined as combination [(I-1)+(A001] to [(I-1)+(R047)] of Table 2, wherein compound (I-1) in each mixture is replaced with compound (I-8).

Table 10:

Combination [(I-9)+(A001] to [(I-9)+(R047)] are defined as combination [(I-1)+(A001] to [(I-1)+(R047)] of Table 2, wherein compound (I-1) in each mixture is replaced with compound (I-9).

Table 11:

Combination [(I-10)+(A001] to [(I-10)+(R047)] are defined as combination [(I-1)+(A001] to [(I-1)+(R047)] of Table 2, wherein compound (I-1) in each mixture is replaced with compound (I-10).

Table 12:

Combination [(I-11)+(A001] to [(I-11)+(R047)] are defined as combination [(I-1)+(A001] to [(I-1)+(R047)] of Table 2, wherein compound (I-1) in each mixture is replaced with compound (I-11).

Table 13:

Combination [(I-12)+(A001] to [(I-12)+(R047)] are defined as combination [(I-1)+(A001] to [(I-1)+(R047)] of Table 2, wherein compound (I-1) in each mixture is replaced with compound (I-12).

Table 14:

Combination [(I-13)+(A001] to [(I-13)+(R047)] are defined as combination [(I-1)+(A001] to [(I-1)+(R047)] of Table 2, wherein compound (I-1) in each mixture is replaced with compound (I-13).

Table 15:

Combination [(I-14)+(A001] to [(I-14)+(R047)] are defined as combination [(I-1)+(A001] to [(I-1)+(R047)] of Table 2, wherein compound (I-1) in each mixture is replaced with compound (I-14).

Table 16:

Combination [(I-15)+(A001] to [(I-15)+(R047)] are defined as combination [(I-1)+(A001] to [(I-1)+(R047)] of Table 2, wherein compound (I-1) in each mixture is replaced with compound (I-15).

Table 17:

Combination [(I-16)+(A001] to [(I-16)+(R047)] are defined as combination [(I-1)+(A001] to [(I-1)+(R047)] of Table 2, wherein compound (I-1) in each mixture is replaced with compound (I-16).

In one embodiment, the present invention provides use of the fungicidal composition for controlling or preventing agricultural crops and/or horticultural crops against diseases caused by phytopathogenic fungi.

In one embodiment, the present invention provides use of the fungicidal composition for controlling or preventing agricultural crops and/or horticultural crops against diseases caused by phytopathogenic fungi, wherein said phytopathogenic fungi are *Alternaria* spp., *Botrytis* spp., *Colletotrichum* spp., *Erysiphe* spp., *Fusarium* spp., *Hemileia* spp., *Phakopsoraceae* spp., *Pyricularia* spp., *Rhizoctonia* spp., *Septoria* spp, *Puccinia* spp., and *Uromyces* spp.

In a preferred embodiment, the compositions disclosed in Table-1 to Table-16 and in particular when the weight ratios of component (1) to component (2) are as disclosed for these mixtures as herein mentioned before, are used against crop phytopathogenic fungi like *Alternaria* species, for example, *Alternaria solani; Botrytis* species, for example, *Botrytis cinerea; Erysiphe* spp. (e.g. *Erysiphe cichoracearum*); *Pyricularia* species, for example, *Pyricularia oryzae; Septoria* species, for example, *Septoria nodorum, Puccinia* spp. (rusts) on various plants, in particular *P. triticina* (brown or leaf rust), *P. striiformis* (stripe or yellow rust), *P. hordei* (dwarf rust), *P. graminis* (stem or black rust) or *P. recondita* (brown or leaf rust), on cereals selected from wheat, barley or rye, *P. coronata* (crown rust of grasses including oats) on cereals, such as e. g. wheat, barley or rye, and *Puccinia sorghi* (common rust) on maize, *Puccinia polysora* (southern rust) on maize, and *P. helianthi* (sunflower rust); *Puccinia melanocephala* ('Brown rust' in sugarcane); *Hemileia vastatrix* and *Hemileia coffeicola* (leaf rust and grey rust of coffee) *Hemileia vastatrix* (Coffee rust); *Uromyces* spp. on various crops; and *Phakopsoraceae* spp. on various plants, in particular *Phakopsora pachyrhizi* and *P. meibomiae* (soybean rust) on soybeans.

The novel agrochemical compositions according to the invention have a potent microbicidal activity. They can be used for controlling unwanted microorganisms, such as unwanted fungi and bacteria. They can be particularly useful in crop protection (by controlling microorganisms that cause plants diseases). More specifically, the agrochemical composition according to the invention can be used to protect seeds, germinating plants, emerged seedlings, plants, plant parts, fruits and the soil in which the plants grow from unwanted microorganisms.

The term "Control" or "Controlling" as used herein encompasses curative and protective treatment of unwanted microorganisms. The unwanted microorganisms may be pathogenic bacteria or pathogenic fungi, more specifically phytopathogenic bacteria or phytopathogenic fungi. As detailed herein below, these phytopathogenic microorganisms are the causal agents of a broad spectrum of plants diseases.

More specifically, novel agrochemical composition according to the invention can be used as fungicides. In particular, they can be useful in crop protection, for example, for the control of unwanted fungi, such as Plasmodiophoromycetes, Oomycetes, Chytridiomycetes, Zygomycetes, Ascomycetes, Basidiomycetes and Deuteromycetes.

The term "locus thereof" includes soil, surroundings of plant or plant parts and equipment or tools used before, during or after sowing/planting a plant or a plant part.

Application of the compounds of the present disclosure or the compound of the present disclosure in a composition optionally comprising other compatible compounds to a plant or a plant material or locus thereof include application by a technique known to a person skilled in the art which includes but is not limited to spraying, coating, dipping, fumigating, impregnating, injecting and dusting.

The novel agrochemical compositions, according to the invention, can also be used as bactericide. In particular, they can be used in crop protection, for example, for the control of unwanted bacteria, such as Pseudomonadaceae, Rhizobiaceae, Enterobacteriaceae, Corynebacteriaceae and Streptomycetaceae.

In one embodiment, the present invention provides a method for controlling or preventing infestation of useful plants by phytopathogenic fungi in agricultural crops and/or horticultural crops, wherein the fungicidal composition is applied to the plants, to parts thereof or to a locus thereof.

In another embodiment, the present invention provides a method for combating phytopathogenic fungi, comprising treating plants, soil, seeds or materials to be protected with the fungicidal composition as described herein.

The present invention also relates to a method for controlling unwanted microorganisms, such as unwanted fungi and bacteria, comprising the step of applying at least one novel agrochemical composition according to the invention to the microorganisms and/or their habitat (to the plants, plant parts, seeds, fruits or to the soil in which the plants grow).

Typically, when the novel agrochemical composition according to the invention are used in curative or protective methods for controlling phytopathogenic fungi, an effective and non-phytotoxic amount thereof is applied to the plants, plant parts, fruits, seeds or to the soil in which the plants grow.

Effective and non-phytotoxic amount means an amount that is sufficient to control or destroy the fungi present or liable to appear on the cropland and that does not entail any appreciable symptom of phytotoxicity for said crops. Such an amount can vary within a wide range depending on the fungus to be controlled, the type of crop, the climatic conditions and the respective composition of the invention used. This amount can be determined by systematic field trials that are within the capabilities of a person skilled in the art.

The novel agrochemical composition according to the invention can be applied to any plants or plant parts.

In one embodiment, the present invention provides a fungicidal composition for treating seed, seed of transgenic plants and transgenic plants.

Plants mean all plants and plant populations, such as desired and undesired wild plants or crop plants (including naturally occurring crop plants). Crop plants may be plants which can be obtained by conventional breeding and optimization methods or by biotechnological and genetic engineering methods or combinations of these methods, including the genetically modified plants (GMO or transgenic plants) and the plant cultivars which are protectable and non-protectable by plant breeders' rights.

Genetically modified plants (GMO or transgenic plants) are plants of which a heterologous gene has been stably integrated into the genome. The expression "heterologous gene" essentially means a gene which is provided or assembled outside the plant and then introduced in the nuclear, chloroplastic or mitochondrial genome. This gene gives the transformed plant new or improved agronomic or other properties by expressing a protein or polypeptide of interest or by down regulating or silencing other gene(s) which are present in the plant (using for example, antisense technology, cosuppression technology, RNA interference—RNAi—technology or microRNA—miRNA—technology). A heterologous gene that is located in the genome is also called a transgene. A transgene that is defined by its particular location in the plant genome is called a transformation or transgenic event.

Plant cultivars are understood to mean plants which have new properties ("traits") and have been obtained by conventional breeding, by mutagenesis or by recombinant DNA techniques. They can be cultivars, varieties, bio- or genotypes.

Plant parts are understood to mean all parts and organs of plants above and below the ground, such as shoots, leaves, needles, stalks, stems, flowers, fruit bodies, fruits, seeds, roots, tubers and rhizomes. The plant parts also include harvested material and vegetative and generative propagation material, for example, cuttings, tubers, rhizomes, slips and seeds.

Plants which can be treated in accordance with the methods of the invention include the following: cotton, flax, grapevine, fruit, vegetables, such as Rosaceae sp. (for example, pome fruits such as apples and pears, but also stone fruits such as apricots, cherries, almonds and peaches, and soft fruits such as strawberries), Ribesioidae sp., Juglandaceae sp., Betulaceae sp., Anacardiaceae sp., *fagaceae* sp., lvloraceae sp., *oleaceae* sp., Actinidaceae sp., Lauraceae sp., Afusaceae sp. (for example, banana trees and plantations), Rubiaceae sp. (for example, coffee), Theaceae sp., Sterculiceae sp., Rutaceae sp. (for example, lemons, oranges and grapefruit); Solanaceae sp. (for example, tomatoes), Liliaceae sp., Asteraceae sp. (for example, lettuce), *umbelliferae* sp., Cruciferae sp., Chenopodiaceae sp., Cucurbitaceae sp. (for example cucumber), Alliaceae sp. (for example, leek, onion), Papilionaceae sp. (for example, peas); major crop plants, such as Gramineae sp. (for example, maize, turf, cereals such as wheat, rye, rice, barley, oats, millet and tiiticale), Asteraceae sp. (for example, sunflower), Brassicaceae sp. (for example, white cabbage, red cabbage, broccoli, cauliflower, Brussels sprouts, pak choi, kohlrabi, radishes, and oilseed rape, mustard, horseradish and cress), Fabacae sp. (for example, bean, peanuts), Papilionaceae sp. (for example, soya bean), Solanaceae sp. (for example, potatoes), Chenopodiaceae sp. (for example, sugar beet, fodder beet, swiss chard, beetroot); useful plants and ornamental plants for gardens and wooded areas; and genetically modified varieties of each of these plants.

Non-limiting examples of pathogens of fungal diseases which can be treated in accordance with the invention include:

- diseases caused by powdery mildew pathogens, for example, *Blumeria* species, for example, *Blumeria graminis; Podosphaera* species, for example, *Podosphaera leucotricha; Sphaerotheca* species, for example, *Sphaerotheca fuliginea; Uncinula* species, for example, *Uncinula necator; Erysiphe* species, for example, *Erysiphe* cichoracearu;
- diseases caused by rust disease pathogens, for example, *Gymnosporangium* species, for example, *Gymnosporangium sabinae; Hemileia* species, for example, *Hemileia vastatrix; Phakopsora* species, for example, *Phakopsora pachyrhizi* or *Phakopsora meibomiae; Puccinia* species, for example, *Puccinia recondita, Puccinia graminis* or *Puccinia striiformis* and *Puccinia melanocephala; Uromyces* species, for example, *Uromyces appendiculatus;*

In particular, *Cronartium ribicola* (White pine blister rust); *Gymnosporangium juniperi-virginianae* (Cedar-apple rust); *Hemileia vastatrix* (Coffee rust); *Phakopsora meibomiae* and *P. pachyrhizi* (Soybean rust); *Puccinia coronata* (Crown Rust of Oats and Ryegrass); *Puccinia graminis* (Stem rust of wheat and Kentucky bluegrass, or black rust of cereals); *Puccinia hemerocallidis* (Daylily rust); *Puccinia persistens* subsp. *triticina* (wheat rust or 'brown or red rust'); *Puccinia sorghi* (rust in corn); *Puccinia striiformis* ('Yellow rust' in cereals); *Puccinia melanocephala; Uromyces appendiculatus* (rust of beans); *Uromyces phaseoli* (Bean rust); *Puccinia melanocephala* ('Brown rust' in sugarcane); *Puccinia kuehnii* ('Orange rust' in sugarcane).

- diseases caused by pathogens from the group of the Oomycetes, for example, *Albugo* species, for example, *Albugo candida; Bremia* species, for example, *Bremia lactucae; Peronospora* species, for example, *Peronospora pisi* or *P. brassicae; Phytophthora* species, for example, *Phytophthora infestans; Plasmopara* species, for example, *Plasmopara viticola; Pseudoperonospora* species, for example, *Pseudoperonospora humuli* or *Pseudoperonospora cubensis; Pythium* species, for example, *Pythium ultimum;*
- leaf blotch diseases and leaf wilt diseases caused, for example, by *Alternaria* species, for example, *Alternaria solani; Cercospora* species, for example, *Cercospora beticola*; Cladiosporium species, for example, Cladiosporium *cucumerinum; Cochliobolus* species, for example, *Cochliobolus sativus* (conidial form: *Drechslera*, syn: *Helminthosporium*) or *Cochliobolus miyabeanus; Colletotrichum* species, for example, *Colletotrichum* lindemuthanium; *Cycloconium* species, for example, *Cycloconium* oleaginum; *Diaporthe* species, for example, *Diaporthe citri; Elsinoe* species, for example, *Elsinoe fawcettii; Gloeosporium* species, for example, *Gloeosporium laeticolor; Glomerella* species, for example, *Glomerella cingulata; Guignardia* species, for example, *Guignardia bidwelli; LeptoSphaeria* species, for example, *LeptoSphaeria maculans; Magnaporthe* species, for example, *Magnaporthe grisea; Microdochium* species, for example, *Microdochium nivale; Mycosphaerella* species, for example, *Mycosphaerella graminicola, Mycosphaerella arachidicola* or *Mycosphaerella fijiensis; PhaeoSphaeria* species, for example, *PhaeoSphaeria nodorum; Pyrenophora* species, for example *Pyrenophora teres* or *Pyrenophora tritici repentis; Ramularia* species, for example, *Ramularia collo-cygni* or *Ramularia areola; Rhynchosporium* species, for example, *Rhynchosporium secalis; Septoria* species, for example, *Septoria apii* or *Septoria lycopersici; Stagonospora* species, for example, *Stagonospora nodorum; Typhula* species, for example, *Typhula incarnata; Venturia* species, for example, *Venturia inaequalis;*
- root and stem diseases caused, for example, by *Corticium* species, for example, *Corticium graminearum; Fusarium* species, for example, *Fusarium oxysporum; Gaeumannomyces* species, for example, *Gaeumannomyces graminis; Plasmodiophora* species, for example, *Plasmodiophora brassicae; Rhizoctonia* species, for example, *Rhizoctonia solani; Sarocladium* species, for example, *Sarocladium oryzae; Sclerotium* species, for example, *Sclerotium oryzae; Tapesia* species, for example, *Tapesia acuformis; Thielaviopsis* species, for example, *Thielaviopsis basicola; Ganoderma* species, for example, *Ganoderma lucidum;* ear and panicle diseases (including corn cobs) caused, for example, by *Alternaria* species, for example, *Alternaria* spp.; *Aspergillus* species, for example, *Aspergillus flavus; Cladosporium* species, for example, *Cladosporium cladosporioides; Claviceps* species, for example, *Claviceps purpurea; Fusarium* species, for example, *Fusarium culmorum; Gibberella* species, for example, *Gibberella zeae; Monographella* species, for example, *Monographella nivalis*; Stagnospora species, for example, Stagnospora *nodorum;* diseases caused by smut fungi, for example, *Sphacelotheca* species, for example, *Sphacelotheca reiliana; Tilletia* species, for example, *Tilletia caries* or *Tilletia controversa; Urocystis* species, for example, *Urocystis occulta; Ustilago* species, for example, *Ustilago nuda;* fruit rot caused, for example, by *Aspergillus* species, for example, *Aspergillus flavus; Botrytis* species, for example, *Botrytis cinerea; Penicillium* species, for example, *Penicillium expansum* or *Penicillium purpurogenum; Rhizopus* species, for example, *Rhizopus stolonifer; Sclerotinia* species, for example, *Sclerotinia sclerotiorum*; Verticilium species, for example, Verticilium *alboatrum;* seed- and soil-borne rot and wilt diseases, and also diseases of seedlings, caused, for example, by *Alternaria* species, for example, *Alternaria brassicicola; Aphanomyces* species, for example, *Aphanomyces euteiches; Ascochyta* species, for example, *Ascochyta lentis; Aspergillus* species, for example, *Aspergillus flavus; Cladosporium* species, for example, *Cladosporium herbarum; Cochliobolus* species, for example, *Cochliobolus sativus* (conidial form: *Drechslera, Bipolaris* Syn: *Helminthosporium*); *Colletotrichum* species, for example, *Colletotrichum coccodes; Fusarium* species, for example, *Fusarium culmorum; Gibberella* species, for example, *Gibberella zeae; Macrophomina* species, for example, *Macrophomina phaseolina; Microdochium* species, for example, *Microdochium nivale; Monographella* species, for example, *Monographella nivalis; Penicillium* species, for example, *Penicillium expansum; Phoma* species, for example, *Phoma* lingam; *Phomopsis* species, for example, *Phomopsis sojae; Phytophthora* species, for example, *Phytophthora cactorum; Pyrenophora* species, for example, *Pyrenophora graminea; Pyricularia* species, for example, *Pyricularia oryzae; Pythium* species, for example, *Pythium ultimum; Rhizoctonia* species, for example, *Rhizoctonia solani; Rhizopus* species, for example, *Rhizopus oryzae; Sclerotium* species, for example, *Sclerotium rolfsii; Septoria* species, for example, *Septoria nodorum; Typhula* species, for example, *Typhula incarnata; Verticillium* species, for example, *Verticillium dahliae;* cancers, galls and witches' broom caused, for example, by *Nectria* species, for example, *Nectria galligena;* wilt diseases caused, for example, by *Monilinia* species, for example, *Monilinia laxa;* deformations of leaves, flowers and fruits caused, for example, by *Exobasidium* species, for example, *Exobasidium vexans; Taphrina* species, for example, *Taphrina deformans;* degenerative diseases in woody plants, caused, for example, by *Esca* species, for example, *Phaeomoniella chlamydospora, Phaeoacremonium aleophilum* or *Fomitiporia mediterranea; Ganoderma* species, for example, *Ganoderma boninense;* diseases of flowers and seeds caused, for example, by *Botrytis* species, for example *Botrytis cinerea*; diseases of plant tubers caused, for example, by *Rhizoctonia* species, for example, *Rhizoctonia solani; Helminthosporium* species, for example, *Helminthosporium solani;* diseases caused by bacterial pathogens, for example, *Xanthomonas* species, for example, *Xanthomonas campestris* pv. *oryzae; Pseudomonas* species, for example, *Pseudomonas syringae* pv. *lachrymans; Erwinia* species, for example, *Erwinia amylovora; Ralstonia* species, for example, *Ralstonia solanacearum;*

Fungal diseases on roots and the stem base caused, for example, by black root rot (*Calonectria crotalariae*), charcoal rot (*Macrophomina phaseolina*), *fusarium* blight or wilt, root rot, and pod and collar rot (*Fusarium oxysporum, Fusarium orthoceras, Fusarium semitectum, Fusarium equiseti*), *Mycoleptodiscus* root rot (*Mycoleptodiscus terrestris*), *neocosmospora* (*Neocosmospora vasinfecta*), pod and stem blight (*Diaporthe phaseolorum*), stem canker (*Diaporthe phaseolorum* var. *caulivora*), *phytophthora* rot (*Phytophthora megasperma*), brown stem rot (*Phialophora gregata*), *pythium* rot (*Pythium aphanidermatum, Pythium irregulare, Pythium debaryanum, Pythium myriotylum, Pythium ultimum*), *rhizoctonia* root rot, stem decay, and damping-off (*Rhizoctonia solani*), *sclerotinia* stem decay (*Sclerotinia sclerotiorum*), *sclerotinia* southern blight (*Sclerotinia rolfsii*), *thielaviopsis* root rot (*Thielaviopsis basicola*).

Plants which can be treated in accordance with the invention include the following: Rosaceae sp (for example, pome fruits such as apples, pears, apricots, cherries, almonds and peaches), Ribesioidae sp., Juglandaceae sp., Betulaceae sp., Anacardiaceae sp., *fagaceae* sp., Moraceae sp., *oleaceae* sp., Actinidaceae sp., Lauraceae sp., Musaceae sp. (for example, banana trees and plantations), Rubiaceae sp. (for example, coffee), Theaceae sp., Sterculiceae sp., Rutaceae sp. (for example lemons, oranges and grapefruit); Vitaceae sp. (for example, grapes); Solanaceae sp. (for example, tomatoes, peppers), Liliaceae sp., Asteraceae sp. (for example, lettuce), *umbelliferae* sp., Cruciferae sp., Chenopodiaceae sp., Cucurbitaceae sp. (for example cucumber), Alliaceae sp. (for example, leek, onion), Papilionaceae sp. (for example, peas); major crop plants, such as Poaceae/Gramineae sp. (for example, maize, turf, cereals such as wheat, rye, rice, barley, oats, millet and triticale), Asteraceae sp. (for example sunflower), Brassicaceae sp. (for example, white cabbage, red cabbage, broccoli, cauliflower, Brussels sprouts, pak choi, kohlrabi, radishes, and oilseed rape, mustard, horseradish and cress), Fabacae sp. (for example, bean, peanuts), Papilionaceae sp. (for example, soya bean), Solanaceae sp. (for example, potatoes), Chenopodiaceae sp. (for example, sugar beet, fodder beet, swiss chard, beetroot); *Malvaceae* (for example, cotton); useful plants and ornamental plants for gardens and wooded areas; and genetically modified varieties of each of these plants.

More preference is given to controlling the following diseases of soya beans: Fungal diseases on leaves, stems, pods and seeds caused, for example, by Altemaria leaf spot (Altemaria spec. *atrans tenuissima*), Anthracnose (*Colletotrichum* gloeosporoides *dematium* var. *truncatum*), brown spot (*Septoria glycines*), *cercospora* leaf spot and blight (*Cercospora kikuchii*), *Choanephora* leaf blight (*Choanephora infundibulifera trispora* (Syn.)), *dactuliophora* leaf spot (*Dactuliophora* glycines), downy mildew (*Peronospora manshurica*), *drechslera* blight (*Drechslera* glycini), frogeye leaf spot (*Cercospora* sojina), *leptosphaerulina* leaf spot (*Leptosphaerulina trifolii*), phyllostica leaf spot (*Phyllosticta* sojaecola), pod and stem blight (*Phomopsis sojae*), powdery mildew (*Microsphaera diffusa*), *pyrenochaeta* leaf spot (*Pyrenochaeta* glycines), *rhizoctonia* aerial, foliage, and web blight (*Rhizoctonia solani*), rust (*Phakopsora pachyrhizi, Phakopsora meibomiae*), scab (*Sphaceloma* glycines), *stemphylium* leaf blight (*Stemphylium botryosum*), target spot (*Corynespora cassiicola*).

The agrochemical compositions of the present invention can be used for curative or protective/preventive control of phytopathogenic fungi. The present invention therefore also relates to curative and protective methods for controlling phytopathogenic fungi by use of the novel agrochemical compositions, which are applied to the seed, the plant or plant parts, the fruit or the soil in which the plants grow.

The fact that the novel agrochemical compositions according to the invention are well tolerated by plants at the concentrations required for controlling plant diseases allows the treatment of above-ground parts of plants, of propagation stock and seeds, and of the soil.

According to the invention all plants and plant parts can be treated. By plants is meant all plants and plant populations such as desirable and undesirable wild plants, cultivars and plant varieties (whether or not protectable by plant variety or plant breeder's rights). Cultivars and plant varieties can be plants obtained by conventional propagation and breeding methods which can be assisted or supplemented by one or more biotechnological methods such as by use of double haploids, protoplast fusion, random and directed mutagenesis, molecular or genetic markers or by bioengineering and genetic engineering methods. By plant parts is meant all above ground and below ground parts and organs of plants such as shoot, leaf, blossom and root, whereby for example, leaves, needles, stems, branches, blossoms, fruiting bodies, fruits and seed as well as roots, conns and rhizomes are listed. Crops and vegetative and generative propagating material, for example, cuttings, conns, rhizomes, runners and seeds also belong to plant parts.

The novel agrochemical compositions according to the invention, when they are well tolerated by plants, have favorable homeotherm toxicity and are well tolerated by the environment, are suitable for protecting plants and plant organs, for enhancing harvest yields and for improving the quality of the harvested material. They can preferably be used as crop protection compositions. They are active against normally sensitive and resistant species and against all or some stages of development.

Plants which can be treated in accordance with the invention include the following main crop plants: maize, soya bean, alfalfa, cotton, sunflower, *Brassica* oil seeds such as *Brassica napus* (e.g. canola, rapeseed), *Brassica rapa, B. juncea* (e.g. (field) mustard) and *Brassica carinata*, Arecaceae sp. (e.g. oilpalm, coconut), rice, wheat, sugar beet, sugar cane, oats, rye, barley, millet and sorghum, triticale, flax, nuts, grapes and vine and vaiious fruit and vegetables from various botanic taxa, e.g. Rosaceae sp. (e.g. pome fruits such as apples and pears, but also stone fruits such as apricots, cherries, almonds, plums and peaches, and berry fruits such as strawberries, raspberries, red and black currant and gooseberry), Ribesioidae sp., Juglandaceae sp., Betulaceae sp., Anacardiaceae sp., *fagaceae* sp., Aforaceae sp., *oleaceae* sp. (e.g. olive tree), Actinidaceae sp., Lauraceae sp. (e.g. avocado, cinnamon, camphor), Afusaceae sp. (e.g. banana trees and plantations), Rubiaceae sp. (e.g. coffee), Theaceae sp. (e.g. tea), Sterculiceae sp., Rutaceae sp. (e.g. lemons, oranges, mandarins and grapefruit); Solanaceae sp. (e.g. tomatoes, potatoes, peppers, *capsicum*, aubergines, tobacco), Liliaceae sp., Compositae sp. (e.g. lettuce, artichokes and chicory—including root chicmy, endive or common chicory), *umbelliferae* sp. (e.g. carrots, parsley, celery and celeriac), Cucurbitaceae sp. (e.g. cucumbers—including gherkins, pumpkins, watermelons, calabashes and melons), Alliaceae sp. (e.g. leeks and onions), Cruciferae sp. (e.g. white cabbage, red cabbage, broccoli, cauliflower, Brussels sprouts, pak choi, kohlrabi, radishes, horseradish, cress and chinese cabbage), Leguminosae sp. (e.g. peanuts, peas, lentils and beans—e.g. common beans and broad beans), Chenopodiaceae sp. (e.g. Swiss chard, fodder beet, spinach, beetroot), Linaceae sp. (e.g. hemp), Cannabeacea sp. (e.g. *cannabis*), *malvaceae* sp. (e.g. okra, cocoa), Papaveraceae (e.g. poppy), Asparagaceae (e.g. asparagus); useful plants and ornamental plants in the garden and woods including turf, lawn, grass and *Stevia rebaudiana*; and in each case genetically modified types of these plants.

In particular, the novel agrochemical compositions according to the invention are suitable for controlling the following plant diseases:

*Albugo* spp. (white rust) on ornamentals, vegetables (e. g. *A candida*) and sunflowers (e. g. A *tragopogonis*); *Alternaria* spp. (*Alternaria* leaf spot) on vegetables, rape (*A brassicola* or *brassi* cae), sugar beets (*A tenuis*), fruits, rice, soybeans, potatoes (e. g. *A solani* or *A alternata*), tomatoes (e. g. *A solani* or *A alternata*) and wheat; *Aphanomyces* spp. on sugar beets and vegetables; *Ascochyta* spp. on cereals and vegetables, e. g. *A tritici* (anthracnose) on wheat and *A hordei* on barley; *Bipolaris* and *Drechslera* spp. (teleomorph: *Cochliobolus* spp.), e.g. Southern leaf blight (*D. maydis*) or Northern leaf blight (*B. zeicola*) on corn, e. g. spot blotch (*B. sorokiniana*) on cereals and e. g. *B. oryzae* on rice and turfs; *Blumeria* (formerly *Erysiphe*) *graminis* (powdery mildew) on cereals (e.g. on wheat or barley); *Botrytis cinerea* (teleomorph: *Botryotinia fuckeliana*: grey mold) on fruits and berries (e.g. strawberries), vegetables (e.g. lettuce, carrots, celery and cabbages), rape, flowers, vines, forestry plants and wheat; *Bremia lactucae* (downy mildew) on lettuce; *Ceratocystis* (syn. *Ophiostoma*) spp. (rot or wilt) on broad leaved trees and evergreens, e.g. *C. ulmi* (Dutch elm disease) on elms; *Cercospora* spp. (*Cercospora* leaf spots) on corn (e.g. Gray leaf spot: *C. zeaemaydis*), rice, sugar beets (e.g. *C. beticola*), sugar cane, vegetables, coffee, soybeans (e.g. *C. sojina* or *C. kikuchil*) and rice; *Cladosporium* spp. on tomatoes (e.g. *C. fulvum*: leaf mold) and cereals, e.g. *C. herbarum* (black ear) on wheat; *Claviceps purpurea* (ergot) on cereals; *Cochliobolus* (anamorph: Helmin thosporium of *Bipolaris*) spp. (leaf spots) on corn (*C. carbonum*), cereals (e.g. *C. sativus*, anamorph: *B. sorokiniana*) and rice (e.g. *C. miyabeanus*, anamorph: *H. oryzae*); *Colletotrichum* (teleomorph: *Glomerella*) spp. (anthracnose) on cotton (e. g. C. gossypit), corn (e.g. C. gramini cola: Anthracnose stalk rot), fruits, potatoes (e.g. *C. coccodes*: black dot), vegetables like beans (e.g. *C. lindemuthianum*) and soybeans (e.g. *C. truncatum* or *C. gloeosporioides*); *Corticium* spp., e.g. *C. sasakii* (sheath blight) on rice; *Corynespora cassiicola* (leaf spots) on soybeans and ornamentals; *Cycloconium* spp., e.g. C. oleaginum on olive trees; *Cylindrocarpon* spp. (e.g. fruit tree canker or young vine decline, teleomorph: *Nectria* or *Neonectria* spp.) on fruit trees, vines (e. g. *C. liriodendri*, teleomorph: *Neonectria liriodendri*: Black Foot Disease) and ornamentals; *Dematophora* (teleomorph: *Rosellinia*) *necatrix* (root and stem rot) on soybeans; *Diaporthe* spp., e.g. *D. phaseolorum* (damping off) on soybeans; *Drechslera* (syn. *Helminthosporium*, teleomorph: *Pyrenophora*) spp. on corn, cereals, such as barley (e.g. *D. teres*, net blotch) and wheat (e.g. *D. tritici-*

*repentis*: tan spot), rice and turf; *Esca* (dieback, apoplexy) on vines, caused by Formitiporia (syn. *Phellinus*) *punctata, F. mediterranea, Phaeomoniella chlamydospora* (earlier *Phaeoacremonium chlamydosporum*), *Phaeoacremonium aleophilum* and/or *BotryoSphaeria obtusa; Elsinoe* spp. on pome fruits (*E. pyn*), soft fruits (*E. veneta*: anthracnose) and vines (*E. ampelina*: anthracnose); *Entyloma oryzae* (leaf smut) on rice; *Epicoccum* spp. (black mold) on wheat; *Erysiphe* spp. (powdery mildew) on sugar beets (*E. betae*), vegetables (e. g. E. pist), such as cucurbits (e.g. *E. cichoracearum*), cabbages, rape (e.g. *E. cruciferarum*); *Eutypa lata* (*Eutypa* canker or dieback, anamorph: *Cytosporina lata*, syn. *Libertella blepharis*) on fruit trees, vines and ornamental woods; *Exserohilum* (syn. *Helminthosporium*) spp. on corn (e.g. *E. turcicum*); *Fusarium* (teleomorph: *Gibberella*) spp. (wilt, root or stem rot) on various plants, such as *F. graminearum* or *F. culmorum* (root rot, scab or head blight) on cereals (e.g. wheat or barley), *F. oxysporum* on tomatoes, *F. solani* (f. sp. glycines now syn. *F. virguliforme*) and *F. tucumaniae* and *F. brasiliense* each causing sudden death syndrome on soybeans, and *F. verticillioides* on corn; *Gaeumannomyces graminis* (take-all) on cereals (e.g. wheat or barley) and corn; Gib berella spp. on cereals (e. g. *G. zeae*) and rice (e.g. *G. fujikuroi*: Bakanae disease); *Glomerella cingulata* on vines, pome fruits and other plants and *G. gossypii* on cotton; Grainstaining complex on rice; *Guignardia bidwellii* (black rot) on vines; *Gymnosporangium* spp. on rosaceous plants and junipers, e. g. *G. sabinae* (rust) on pears; *Helminthosporium* spp. (syn. *Drechslera*, teleomorph: *Cochliobolus*) on corn, cereals and rice; *Hemileia* spp., e.g. *H. vastatrix* (coffee leaf rust) on coffee; lsariopsis *clavispora* (syn. *Cladosporium vitis*) on vines; *Macrophomina phaseolina* (syn. phaseoft) (root and stem rot) on soybeans and cotton; *Microdochium* (syn. *Fusarium*) *nivale* (pink snow mold) on cereals (e. g. wheat or barley); *Microsphaera diffusa* (powdery mildew) on soybeans; *Monilinia* spp., e.g. *M. laxa, M. fructicola* and *M. fructigena* (bloom and twig blight, brown rot) on stone fruits and other rosaceous plants; *Mycosphaerella* spp. on cereals, bananas, soft fruits and ground nuts, such as e. g. *M. graminicola* (anamorph: *Septoria tritici, Septoria* blotch) on wheat or *M. fijiensis* (black Sigatoka disease) on bananas; *Peronospora* spp. (downy mildew) on cabbage (e.g. *P. brassicae*), rape (e.g. *P. parasitica*), onions (e.g. P. destructor), tobacco (*P. tabacina*) and soybeans (e.g. *P. manshurica*); *Phakopsora pachyrhizi* and *P. meibomiae* (soybean rust) on soybeans; *Phialophora* spp. e.g. on vines (e.g. *P. tracheiphila* and *P. tetraspora*) and soybeans (e.g. *P. gregata*: stem rot); *Phoma* lingam (root and stem rot) on rape and cabbage and *P. betae* (root rot, leaf spot and damping-off) on sugar beets; *Phomopsis* spp. on sunflowers, vines (e. g. *P. viticola*: can and leaf spot) and soybeans (e.g. stem rot: *P. phaseoli*, teleomorph: *Diaporthe phaseolorum*); Phy soderma *maydis* (brown spots) on corn; *Phytophthora* spp. (wilt, root, leaf, fruit and stem root) on various plants, such as paprika and cucurbits (e.g. P. capsicl), soybeans (e. g. *P. megasperma*, syn. *P. sojae*), potatoes and tomatoes (e. g. *P. infestans*: late blight) and broad leaved trees (e.g. *P. ramorum*: sudden oak death); *Plasmodiophora brassicae* (club root) on cabbage, rape, radish and other plants; *Plasmopara* spp., e.g. *P. viticola* (grapevine downy mildew) on vines and *P. halstedii* on sunflowers; *Podosphaera* spp. (powdery mildew) on rosa ceous plants, hop, pome and soft fruits, e.g. *P. leucotricha* on apples; *Polymyxa* spp., e.g. on cereals, such as barley and wheat (*P. graminis*) and sugar beets (*P. betae*) and thereby trans mitted viral diseases; *Pseudocercosporella herpotrichoides* (eyespot, teleomorph: *Tapesia yallundae*) on cereals, e.g. wheat or barley; *Pseudoperonospora* (downy mildew) on various plants, e.g. *P. cubensis* on cucurbits or *P. humili* on hop; *Pseudopezicula tracheiphila* (red fire disease or, rotbrenner', anamorph: *Phialophora*) on vines; *Puccinia* spp. (rusts) on various plants, e.g. *P. triticina* (brown or leaf rust), *P. striiformis* (stripe or yellow rust), *P. hordei* (dwarf rust), *P. graminis* (stem or black rust) or *P. recondita* (brown or leaf rust) on cereals, such as e.g. wheat, barley or rye, *P. kuehnii* (orange rust) on sugar cane and *P. asparagi* on asparagus; *Pyrenophora* (anamorph: *Drechslera*) *tritici-repentis* (tan spot) on wheat or *P. teres* (net blotch) on barley; *Pyricularia* spp., e.g. *P. oryzae* (teleomorph: *Magnaporthe grisea*, rice blast) on rice and *P. grisea* on turf and cereals; *Pythium* spp. (damping-off) on turf, rice, corn, wheat, cotton, rape, sunflowers, soybeans, sugar beets, vegetables and various other plants (e. g. *P. ultimum* or *P. aphanidermatum*); *Ramularia* spp., e. g. *R. collo-cygni* (*Ramularia* leaf spots, Physiological leaf spots) on barley and *R. beticola* on sugar beets; *Rhizoctonia* spp. on cotton, rice, potatoes, turf, corn, rape, potatoes, sugar beets, vegetables and various other plants, e. g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on strawberries, carrots, cabbage, vines and tomatoes; *Rhynchosporium secalis* (scald) on barley, rye and triticale; Sa rocladium *oryzae* and *S. attenuatum* (sheath rot) on rice; *Sclerotinia* spp. (stem rot or white mold) on vegetables and field crops, such as rape, sunflowers (e. g. *S. sclerotiorum*) and soy beans (e.g. *S. rolfsii* or *S. sclerotiorum*); *Septoria* spp. on various plants, e. g. *S. glycines* (brown spot) on soybeans, *S. tritici* (*Septoria* blotch) on wheat and S. (syn. *Stagonospora*) no dorum (*Stagonospora* blotch) on cereals; *Uncinula* (syn. *Erysiphe*) *necator* (powdery mildew, anamorph: *Oidium* tucken) on vines; Setospaeria spp. (leaf blight) on corn (e.g. *S. turcicum*, syn. *Helminthosporium turcicum*) and turf; *Sphacelotheca* spp. (smut) on corn, (e.g. *S. reiliana*: head smut), sorghum und sugar cane; *Sphaerotheca fuliginea* (powdery mildew) on cucurbits; *Spongospora subterranea* (powdery scab) on potatoes and thereby transmitted viral diseases; *Stagonospora* spp. on cereals, e. g. *S. nodorum* (*Stagonospora* blotch, teleomorph: Lepto *Sphaeria* [syn. *PhaeoSphaeria*] *nodorum*) on wheat; *Synchytrium endobioticum* on potatoes (potato wart disease); *Taphrina* spp., e.g. *T. deformans* (leaf curl disease) on peaches and *T. pruni* (plum pocket) on plums; *Thielaviopsis* spp. (black root rot) on tobacco, pome fruits, vegetables, soybeans and cotton, e.g. *T. basicola* (syn. *Chalara elegans*); *Tilletia* spp. (common bunt or stinking smut) on cereals, such as e. g. *T. tritici* (syn. *T. caries*, wheat bunt) and *T. controversa* (dwarf bunt) on wheat; *Typhula* incamata (grey snow mold) on barley or wheat; *Urocystis* spp., e.g. *U. occulta* (stem smut) on rye; *Uromyces* spp. (rust) on vegetables, such as beans (e.g. *U. appendiculatus*, syn. U. phaseoft) and sugar beets (e.g. *U. betae*); *Ustilago* spp. (loose smut) on cereals (e. g. *U. nuda* and *U. avaenae*), corn (e. g. *U. maydis*: corn smut) and sugar cane; *Venturia* spp. (scab) on apples (e.g. *V. inaequalis*) and pears; and *Verticillium* spp. (wilt) on various plants, such as fruits and ornamentals, vines, soft fruits, vegetables and field crops, e.g. *V. dahliae* on strawberries, rape, potatoes and tomatoes.

The present invention is also directed to the use of the novel agrochemical composition according to the invention for the treatment of soybean diseases.

Most preference is given to the following soybean diseases:

*Cercospora kikuchii, Cercospora sojina; Colletotrichum* gloeosporoides *dematium* var. *truncatum; Corynespora* casiicola; *Diaporthe phaseolorum; Microsphaera diffusa; Peronospora manshurica; Phakopsora* species, for example, *Phakopsora pachyrhizi* and *Phakopsora meibomiae* (soybean rust); *Phytophthora megasperma; Phialophora gregata; Rhizoctonia solani; Sclerotinia sclerotiorum; Septoria* spp. e.g. *Septoria glycines, Thielaviopsis basicola.*

In addition, the novel agrochemical composition of the invention can reduce the mycotoxin content in the harvested material and the foods and feeds prepared therefrom. Mycotoxins include particularly, but not exclusively, the following: deoxynivalenol (DON), nivalenol, 15-Ac-DON, 3-Ac-DON, T2- and HT2-toxin, fumonisins, zearalenon, moniliformin, fusarin, diaceotoxyscirpenol (DAS), beauvericin, enniatin, fusaroproliferin, fusarenol, ochratoxins, patulin, ergot alkaloids and aflatoxins which can be produced, for example, by the following fungi: *Fusarium* spec., such as *F acuminatum, F. asiaticum, F. avenaceum, F croobvellense, F culmorum, F graminearum* (*Gibberella zeae*), *F equiseti, F fujikoroi, F musarum, F oxysporum, F proliferatum, F poae, F pseudograminearum, F. sambucinum, F. scirpi, F semitectum, F solani, F sporotrichoides, F langsethiae, F. subglutinans, F. tricinctum, F verticillioides* etc., and also by *Aspergillus* spec., such as *A. jlavus, A. parasiticus, A. nomius, A. ochraceus, A. clavatus, A. terreus, A. versicolor, Penicillium* spec., such as *P. verrucosum, P. viridicatum, P. citrinum, P. expansum, P. claviforme, P. roqueforti, Claviceps* spec., such as *C. purpurea, C. fusiformis, C. paspali, C. africana, Stachybotrys* spec. and others.

The novel agrochemical composition of the invention can also be used in the protection of materials, especially for the protection of industrial materials against attack and destruction by phytopathogenic fungi.

The novel agrochemical composition of the invention may prevent adverse effects, such as rotting, decay, discoloration, decoloration or formation of mould.

In the case of treatment of wood, the novel agrochemical composition of the invention may also be used against fungal diseases liable to grow on or inside timber.

The novel agrochemical composition of the invention can also be employed for protecting storage goods. Storage goods are understood to mean natural substances of vegetable or animal origin or processed products thereof which are of natural origin, and for which long-term protection is desired. Storage goods of vegetable origin, for example, plants or plant parts, such as stems, leaves, tubers, seeds, fruits, grains, can be protected freshly harvested or after processing by (pre) drying, moistening, comminuting, grinding, pressing or roasting. Storage goods also include timber-Storage goods of animal origin are, for example, hides, leather, furs and hairs. The agrochemical composition of the invention may prevent adverse effects, such as rotting, decay, discoloration, decoloration or formation of mould.

Microorganisms capable of degrading or altering industrial materials include, for example, bacteria, fungi, yeasts, algae and slime organisms. The agrochemical composition of the invention preferably acts against fungi, especially moulds, wood-discoloring and wood-destroying fungi (Ascomycetes, Basidiomycetes, Deuteromycetes and Zygomycetes).

The novel agrochemical composition of the invention may intervene in physiological processes of plants and can therefore also be used as plant growth regulators.

Growth regulating effects, comprise earlier germination, better emergence, more developed root system and/or improved root growth, increased ability of tillering, more productive tillers, earlier flowering, increased plant height and/or biomass, shorting of stems, improvements in shoot growth, number of kernels/ear, number of ears/m2, number of stolons and/or number of flowers, enhanced harvest index, bigger leaves, less dead basal leaves, improved phyllotaxy, earlier maturation/earlier fruit finish, homogenous ripping, increased duration of grain filling, better fruit finish, bigger fruit/vegetable size, sprouting resistance and reduced lodging.

Increased or improved yield is referring to total biomass per hectare, yield per hectare, kernel/fruit weight, seed size and/or hectolitre weight as well as to improved product quality, comprising: improved processability relating to size distribution (kernel, fruit, etc.), homogenous ripping, grain moisture, better milling, better vinification, better brewing, increased juice yield, harvestability, digestibility, sedimentation value, falling number, pod stability, storage stability, improved fiber length/strength/uniformity, increase of milk and/or meet quality of silage fed animals, adaption to cooking and frying; improved marketability relating to improved fruit/grain quality, size distribution (kernel, fruit, etc.), increased storage/shelf-life, firmness/softness, taste (aroma, texture, etc.), grade (size, shape, number of berries, etc.), number of berries/fruits per bunch, crispness, freshness, coverage with wax, frequency of physiological disorders, colour, etc.; increased desired ingredients such as e.g. protein content, fatty acids, oil content, oil quality, amino acid composition, sugar content, acid content (pH), sugar/acid ratio (Brix), polyphenols, starch content, nutritional quality, gluten content/index, energy content, taste, etc.; decreased undesired ingredients such as e.g. less mycotoxines, less aflatoxines, geosmin level, phenolic aromas, lacchase, polyphenol oxidases and peroxidases, nitrate content etc.

The novel agrochemical composition of the invention also exhibits a potent strengthening effect in plants. Accordingly, they can be used for mobilizing the defences of the plant against attack by undesirable microorganisms.

Plant-strengthening (resistance-inducing) substances in the present context are substances capable of stimulating the defence system of plants in such a way that the treated plants, when subsequently inoculated with undesirable microorganisms, develop a high degree of resistance to these microorganisms.

Further, in context with the present invention plant physiology effects comprise the following:

Abiotic stress tolerance, comprising tolerance to high or low temperatures, drought tolerance and recovery after drought stress, water use efficiency (correlating to reduced water consumption), flood tolerance, ozone stress and UV tolerance, tolerance towards chemicals like heavy metals, salts, pesticides etc.

Biotic stress tolerance comprising increased fungal resistance and increased resistance against nematodes, viruses and bacteria. In context with the present invention, biotic stress tolerance preferably comprises increased fungal resistance and increased resistance against nematodes.

Increased plant vigor, comprising plant health/plant quality and seed vigor, reduced stand failure, improved appearance, increased recovery after periods of stress, improved pigmentation (e.g. chlorophyll content, stay-green effects, etc.) and improved photosynthetic efficiency. The invention further comprises a method for treating seed. The invention further provides seed which has been treated by one of the methods described in the previous paragraph. The inventive seeds are employed in methods for the protection of seed from unwanted microorganisms. In these methods, seed treated with at least one inventive agrochemical composition is used.

The novel agrochemical composition of the present invention is also suitable for treating seed. A large part of the damage to crop plants caused by harmful organisms is triggered by the infection of the seed during storage or after sowing as well as during and after germination of the plant. This phase is particularly critical since the roots and shoots of the growing plant are particularly sensitive, and even minor damage may result in the death of the plant. There is therefore a great interest in protecting the seed and the germinating plant by using appropriate compositions.

The control of phytopathogenic fungi by treating the seed of plants has been known for a long time and is the subject of constant improvements. However, the treatment of seed entails a series of problems which cannot always be solved in a satisfactory manner. For instance, it is desirable to develop methods for protecting the seed and the germinating plant, which dispense with, or at least significantly reduce, the additional deployment of crop protection compositions after planting or after emergence of the plants. It is also desirable to optimize the amount of the active ingredient used to provide the best possible protection for the seed and the germinating plant from attack by phytopathogenic fungi, but without damaging the plant itself by the active ingredient employed. In particular, methods for the treatment of seed should also take account of the intrinsic fungicidal properties of transgenic plants in order to achieve optimal protection of the seed and the germinating plant with a minimum expenditure of crop protection compositions.

In one embodiment, the present invention provides a seed comprising the fungicidal composition.

The present invention therefore also relates to a method for protection of seed and germinating plants from attack by phytopathogenic fungi, by treating the seed with an inventive composition. The invention likewise relates to the use of the inventive compositions for treatment of seed to protect the seed and the germinating plant from phytopathogenic fungi. The invention further relates to seed which has been treated with an inventive composition for protection from phytopathogenic fungi.

The control of phytopathogenic fungi which damage plants post-emergence is affected primarily by treating the soil and the above-ground parts of plants with crop protection compositions. Owing to the concerns regarding a possible influence of the crop protection compositions on the environment and the health of humans and animals, there are efforts to reduce the amount of active ingredients deployed.

One of the advantages of the present invention is that, in particular, the systemic properties of the novel agrochemical composition not only protect the seed itself, but also the resulting plants after emergence, from phytopathogenic fungi. In this way, the immediate treatment of the crop at the time of sowing or shortly thereafter can be dispensed with.

It is likewise considered to be advantageous that the novel agrochemical composition can especially also be used with transgenic seed, in which case the plant growing from this seed is capable of expressing a protein which acts against pests. By virtue of the treatment of such seed with the novel agrochemical compositions, merely the expression of the protein, for example, an insecticidal protein, can control certain pests. Surprisingly, a further synergistic effect can be observed in this case, which additionally increases the effectiveness for protection against attack by pests.

The novel agrochemical compositions are suitable for protecting seeds of any plant variety which is used in agriculture, in greenhouses, in forests or in horticulture and viticulture. In particular, seeds of cereals (such as wheat, barley, rye, triticale, sorghum/millet and oats), maize, cotton, soyabean, rice, potato, sunflower, bean, coffee, beet (for example, sugar beet and fodder beet), peanut, oilseed rape, poppy, olive, coconut, cocoa, sugar cane, tobacco, vegetables (such as tomato, cucumbers, onions and lettuce), turf and ornamentals (see also below). The treatment of seeds of cereals (such as wheat, barley, rye, triticale and oats), maize, rice and soybean is of particular significance.

As also described herein, the treatment of transgenic seed with the novel agrochemical composition is of particular significance. This relates to the seed of plants containing at least one heterologous gene which enables the expression of a polypeptide or protein having insecticidal properties. The heterologous gene in transgenic seed can originate, for example, from microorganisms of the species *Bacillus, Rhizobium, Pseudomonas, Serratia, Trichoderma, Clavibacter, Glomus* or *Gliocladium*. This heterologous gene preferably originates from *Bacillus* sp., in which case the gene product is effective against the European maize borer and/or the western maize rootworm. The heterologous gene more preferably originates from *Bacillus thuringiensis.*

In the context of the present invention, the novel agrochemical composition is applied to the seed alone or in a suitable formulation. Preferably, the seed is treated in a state in which it is sufficiently stable for no damage to occur in the course of treatment. In general, the seed can be treated at any time between harvest and sowing. It is customary to use seed which has been separated from the plant and freed from cobs, shells, stalks, coats, hairs or the flesh of the fruits. For example, it is possible to use seed which has been harvested, cleaned and dried down to a moisture content of less than 15% by weight. Alternatively, it is also possible to use seed which, after drying, for example, has been treated with water and then dried again.

When treating the seed, care must generally be taken that the amount of the novel agrochemical composition applied to the seed and/or the amount of further additives is selected such that the germination of the seed is not impaired, or that the resulting plant is not damaged. This has to be borne in mind in particular in the case of active ingredients which can have phytotoxic effects at certain application rates.

The present invention further relates to a novel agrochemical composition, for controlling unwanted microorganisms. The agrochemical compositions may be applied to the microorganisms and/or in their habitat.

The agrochemical composition typically comprises at least one active compounds combination and at least one agriculturally suitable auxiliary, e.g. carrier(s) and/or surfactant(s).

In the context of the present invention, "control of harmful microorganisms" means a reduction in infestation by harmful microorganisms, compared with the untreated plant measured as fungicidal efficacy, preferably a reduction by 25-50%, compared with the untreated plant (100%), more preferably a reduction by 40-79%, compared with the untreated plant (100%); even more preferably, the infection by harmful microorganisms is entirely suppressed (by 70-100%). The control may be curative, i.e. for treatment of already infected plants, or protective, for protection of plants which have not yet been infected.

An "effective but non-phytotoxic amount" means an amount of the novel agrochemical composition which is sufficient to control the fungal disease of the plant in a satisfactory manner or to eradicate the fungal disease completely, and which, at the same time, does not cause any significant symptoms of phytotoxicity. In general, this application rate may vary within a relatively wide range. It depends on several factors, for example, on the fungus to be controlled, the plant, the climatic conditions and the ingredients of the inventive compositions.

A carrier is a solid or liquid, natural or synthetic, organic or inorganic substance that is generally inert. The carrier generally improves the application of the compounds, for instance, to plants, plants parts or seeds. Examples of suitable solid carriers include, but are not limited to, ammonium salts, natural rock flours, such as kaolins, clays, talc, chalk, quartz, attapulgite, montmorillonite and diatomaceous earth, and synthetic rock flours, such as finely divided silica, alumina and silicates. Examples of typically useful solid caniers forpreparing granules include, but are not limited to crushed and fractionated natural rocks such as calcite, marble, pumice, sepiolite and dolomite, synthetic granules of inorganic and organic flours and granules of organic material such as paper, sawdust, coconut shells, maize cobs and tobacco stalks. Examples of suitable liquid carriers include, but are not limited to, water, organic solvents and combinations thereof. Examples of suitable solvents include polar and nonpolar organic chemical liquids, for example, from the classes of aromatic and nonaromatic hydrocarbons (such as cyclohexane, paraffins, alkylbenzenes, xylene, toluene alkylnaphthalenes, chlorinated aromatics or chlorinated aliphatic hydrocarbons such as chlorobenzenes, chloroethylenes or methylene chloride), alcohols and polyols (which may optionally also be substituted, etherified and/or esterified, such as butanol or glycol), ketones (such as acetone, methyl ethyl ketone, methyl isobutyl ketone or cyclohexanone), esters (including fats and oils) and (poly)ethers, unsubstituted and substituted amines, amides (such as dimethylformamide), lactams (such as N-alkylpynolidones) and lactones, sulphones and sulphoxides (such as dimethyl sulphoxide). The carrier may also be a liquefied gaseous extender, i.e. liquid which is gaseous at standard temperature and under standard pressure, for example, aerosol propellants such as halohydrocarbons, butane, propane, nitrogen and carbon dioxide.

The surfactant can be an ionic (cationic or anionic) or non-ionic surfactant, such as ionic or non-ionic emulsifier(s), foam former(s), dispersant(s), wetting agent(s) and any mixtures thereof. Examples of suitable surfactants include, but are not limited to, salts of polyacrylic acid, salts of lignosulphonic acid, salts of phenolsulphonic acid or naphthalenesulphonic acid, polycondensates of ethylene and/or propylene oxide with fatty alcohols, fatty acids or fatty amines (polyoxyethylene fatty acid esters, polyoxyethylene fatty alcohol ethers, for example, alkylmyl polyglycol ethers), substituted phenols (preferably alkylphenols or arylphenols), salts of sulphosuccinic esters, taurine derivatives (preferably alkyl taurates), phosphoric esters of polyethoxylated alcohols or phenols, fatty esters of polyols and derivatives of compounds containing sulphates, sulphonates, phosphates (for example, alkylsulphonates, alkyl sulphates, arylsulphonates) and protein hydrolysates, lignosulphite waste liquors and methylcellulose. A surfactant is typically used when the compound of the formula (I) and/or the carrier is insoluble in water and the application is made with water. Then, the amount of surfactants typically ranges from 5 to 40% by weight of the composition.

Further examples of suitable auxiliaries include water repellents, siccatives, binders (adhesive, tackifier, fixing agent, such as carboxymethylcellulose, natural and synthetic polymers in the form of powders, granules or latices, such as gum arabic, polyvinyl alcohol and polyvinyl acetate, natural phospholipids such as cephalins and lecithins and synthetic phospholipids, polyvinylpyrrolidone, polyvinyl acetate, polyvinyl alcohol and tylose), thickeners, stabilizers (e.g. cold stabilizers, preservatives, antioxidants, light stabilizers, or other agents which improve chemical and/or physical stability), dyes or pigments (such as inorganic pigments, e.g. iron oxide, titanium oxide and Prussian Blue; organic dyes, e.g. alizarin, azo and metal phthalocyanine dyes), antifoams (e.g. silicone antifoams and magnesium stearate), preservatives (e.g. dichlorophene and benzyl alcohol hemiformal), secondary thickeners (cellulose derivatives, acrylic acid derivatives, xanthan, modified clays and finely divided silica), stickers, gibberellins and processing auxiliaries, mineral and vegetable oils, perfumes, waxes, nutrients (including trace nutrients, such as salts of iron, manganese, boron, copper, cobalt, molybdenum and zinc), protective colloids, thixotropic substances, penetrants, sequestering agents and complex formers.

The choice of the auxiliaries is related to the intended mode of application of the compound of formula (I) and/or on the physical properties. Furthermore, the auxiliaries may be chosen to impart particular properties (technical, physical and/or biological properties) to the compositions or use forms prepared therefrom. The choice of auxiliaries may allow customizing the compositions to specific needs.

The novel agrochemical composition of the present invention may be in any customary form, such as solutions (e.g. aqueous solutions), emulsions, wettable powders, water- and oil-based suspensions, powders, dusts, pastes, soluble powders, soluble granules, granules for broadcasting, suspoemulsion concentrates, natural or synthetic products impregnated with the agrochemical composition, fertilizers and also microencapsulations in polymeric substances. The agrochemical composition according to the invention may be present in a suspended, emulsified or dissolved form.

The novel agrochemical composition of the invention may be provided to the end user as ready-for-use formulation, i.e. the compositions can be directly applied to the plants or seeds by a suitable device, such as a spraying or dusting device. Alternatively, the compositions may be provided to the end user in the form of concentrates which have to be diluted, preferably with water, prior to use.

The novel agrochemical composition of the invention can be prepared in conventional manners, for example, by mixing the agrochemical composition according to the invention with one or more suitable auxiliaries, such as disclosed herein above.

The novel agrochemical composition according to the invention contains generally from 0.01 to 99% by weight, from 0.05 to 98% by weight, preferably from 0.1 to 95% by weight, more preferably from 0.5 to 90% by weight, most preferably from 10 to 70% by weight of the active compounds according to the invention.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of 1 to 2000 L/ha, especially from 10 to 1000 L/ha.

The novel agrochemical composition can be applied directly, i.e. without containing any other components and without having been diluted. In general, it is preferable to apply the composition to the seed in the form of a suitable formulation. Suitable formulations and methods for seed treatment are known to those skilled in the art and are described, for example, in the following documents: U.S. Pat. Nos. 4,272,417, 4,245,432, 4,808,430, 5,876,739, US20030176428, WO2002080675, WO2002028186.

The novel agrochemical composition usable in accordance with the invention can be converted to the formulations such as, a suspension concentrate (SC), a water dispersible granule (WDG)/(WG), a tablet (TB), a wettable powder (WP), a water dispersible tablet (WT), an ultra-low volume (ULV), a liquid (UL), an ultra-low volume (ULV), a suspension (SU), a water soluble powder (SP), a suspoemulsion (SE), a granule (GR), an emulsifiable granule (EG), an oil-in-water emulsion (EW), an emulsifiable granule (EG), an emulsion oil in water (EO), an emulsifiable powder (EP), an emulsion for seed treatment (ES), a solution for seed treatment (LS), a flowable concentrate for seed treatment (FS), an emulsifiable concentrate (EC), a microemulsion (ME), oil-in-water emulsions (EW), an oil miscible flowable concentrate (oil miscible suspension) (OF), an oil dispersible powder (OP), an oil dispersion (OD), a capsule suspension (CS), a dustable powder (DP), a soluble concentrate (SL), a water soluble granule (SG), an aerosol (AE), a mixed formulation of CS and SC (ZC), a mixed formulation of CS and SE (ZE) or a mixed formulation of CS and EW (ZW).

The novel agrochemical composition usable in accordance with the invention can be converted to the customary seed dressing formulations, such as solutions, emulsions, suspensions, powders, foams, slurries or other coating compositions for seed, and also ULV formulations. These formulations are prepared in a known manner, by mixing the active compounds with agriculturally acceptable additives, for example, customary extenders and also solvent(s) or diluent(s), dye(s), wetting agent(s), dispersant(s), emulsifier(s), antifoam(s), preservative(s), thickener(s), adhesive(s), gibberellins, solid carrier(s), liquid carrier(s), gaseous carrier(s), surfactant(s), binder(s), disintegrating agent(s), pH adjuster(s), anti-caking agent(s), penetrant(s), anti-freezing agent(s), defoaming agent(s), extender(s), filler(s), stabilizer(s) and/or coloring agent(s) or combination thereof and also water.

Useful dyes which may be present in the seed dressing formulations usable in accordance with the invention are all dyes which are customary for such purposes. It is possible to use either pigments, which are sparingly soluble in water, or dyes, which are soluble in water. Examples include the dyes known by the names Rhodamine B, C.I. Pigment Red 112 and C.I. Solvent Red 1. Useful wetting agents which may be present in the seed dressing formulations usable in accordance with the invention are all substances which promote wetting and which are conventionally used for the formulation of active agrochemical ingredients. Preference is given to using alkyl naphthalene sulphonates, such as diisopropyl or diisobutyl naphthalene sulphonates.

Useful dispersants and/or emulsifiers which may be present in the seed dressing formulations usable in accordance with the invention are all nonionic, anionic and cationic dispersants conventionally used for the formulation of active agrochemical ingredients. Usable with preference are nonionic or anionic dispersants or mixtures of nonionic or anionic dispersants. Suitable nonionic dispersants include especially ethylene oxide/propylene oxide block polymers, alkylphenol polyglycol ethers and tristryrylphenol polyglycol ether, and the phosphated or sulphated derivatives thereof Suitable anionic dispersants are especially lignosulphonates, polyacrylic acid salts and arylsulphonate/formaldehyde condensates.

Antifoams which may be present in the seed dressing formulations usable in accordance with the invention are all foam-inhibiting substances conventionally used for the formulation of active agrochemical ingredients. Silicone antifoams and magnesium stearate can be used with preference.

Preservatives which may be present in the seed dressing formulations usable in accordance with the invention are all substances usable for such purposes in agrochemical compositions. Examples include dichlorophene and benzyl alcohol hemiformal.

Thickeners which may be present in the seed dressing formulations usable in accordance with the invention are all substances usable for such purposes in agrochemical compositions. Preferred examples include cellulose derivatives, acrylic acid derivatives, xanthan, modified clays and finely divided silica.

Adhesives which may be present in the seed dressing formulations usable in accordance with the invention are all customary binders usable in seed dressing products. Preferred examples include polyvinylpyrrolidone, polyvinyl acetate, polyvinyl alcohol and tylose.

Liquid carrier(s) is selected from the group comprising of, but not limited to, water; alcohols such as ethanol, propanol, butanol, n-octanol, isopropanol ethylene glycol, diethylene glycol, propylene glycol, polyethylene glycol, benzyl alcohol, glycerin; polyol ethers such as ethylene glycol monopropyl ether, diethylene glycol monomethyl ether, dipropylene glycol dimethyl ether; ketones such as acetone, methyl ethyl ketone, methyl isobutyl ketone, cyclohexanone; ethers such as dipropyl ether, dioxane, tetrahydrofuran, aliphatic hydrocarbons such as normal paraffin, isoparaffin, kerosene, mineral oil; aromatic hydrocarbons such as xylene, toluene, naphthene, solvent naphtha, solvent C9, solvent C10, solvent C12, solvesso 100, solvesso 150, solvesso 200; chlorinated aliphatic or aromatics hydrocarbons such as chlorobenzene, chloroethylene, methylene chloride; esters such as ethyl acetate, diisopropyl phthalate, dimethyl adipate, methyl oleate, methyl tallowate; lactones such as gamma-butyrolactone, gamma-valerolactone, epsilon-caprolactone; amides such as dimethylformamide, N-methylpyrrolidone, N-octylpyrolidone, N,N-dimethyldecanamide; nitriles such as acetonitrile; organosulfur compound such as dimethyl sulfoxide; vegetable oils such as soybean oil, rapeseed oil, cotton seed oil. These liquid carriers may be used alone or in combination.

Gaseous carrier(s) is selected from the group comprising of, but not limited to, liquefied petroleum gas, air, nitrogen, carbon dioxide or dimethyl ether. These gaseous carriers may be used alone or in combination thereof.

Surfactant(s) are nonionic or anionic surfactants or a combination of these surfactants. It is preferred to use one or more than one kind of surfactant. Surfactant(s) is selected from the group comprising of, but not limited to, sugar esters such as sorbitan monolaurate, polyoxyethylene sorbitan monolaurate; C1-C30 alkylcarboxylate, C1-C20 hydroxyalkylcarboxylate, polymer containing carboxylate, arylcarboxylate, alkylx (e.g. aliphatic di- and tricarboxylates) having 2 to 32 carbon atoms, such as aconitic acid, adipic acid, aspartic acid, citric acid, fumaric acid, galactaric acid, glutamic acid, glutaric acid, oxoglutaric acid, maleic acid, malic acid, malonic acid, oxalate, sebacic acid, succinic acid, tartaric acid; alkyl polyglucoside such as decyl glucoside; polyoxyethylene alkyl ethers such as polyoxyethylene lauryl ether, or polyoxyethylene coconut fatty alcohol ether; polyoxyethylene alkynyl ether such as polyoxyethylene 2,4,7,9-tetramethyl-5-decyn-4,7-diol ether; polyoxyethylene aryl ethers such as polyoxyethylene nonylphenyl ether or polyoxyethylene tristyrylphenyl ether; polyoxyethylene vegetable oil ethers such as polyoxyethylene castor oil or polyoxyethylene hydrogenated castor oil; vegetable oil ethoxylate; C6-C20 linear and branched alcohol ethoxylates, C6-C20 alcohol propoxylates, C6-C20 propoxylated and ethoxylated alcohols; polyoxyethylene fatty acid esters such as polyoxyethylene monolaurate, polyoxyethylene distearate or polyoxyethylene resin acid ester; polyoxyethylene polyoxypropylene (EO-PO) block copolymers such as Pluronic®; polyoxyethylene polyoxypropylene alkyl ether such as polyoxyethylene polyoxypropylene lauryl ether; polyoxyethylene polyoxypropylene aryl ether such as polyoxyethylene polyoxypropylene styrylphenyl ether; a modified styrene acrylic polymer, polyoxyethylene alkyl amines such as polyoxyethylene stearyl amine; polyoxyethylene fatty acid amide such as lauric acid diethanolamid; fluorinated surfactant; alkyl sulfates such as sodium lauryl sulfate; sodium alkylbenzene sulfonate, calcium alkylbenzene sulphonate; polyoxyethylene alkyl ether sulfates such as sodium polyoxyethylene lauryl ether sulfate; polyoxyethylene aryl ether sulfates such as sodium polyoxyethylene nonylphenyl ether sulfate or ammonium polyoxyethylene tristyrylphenyl ether sulfate; aryl sulfonate such as calcium benzene sulfonate calcium dodecyl benzene sulfonate, sodium naphthalene sulfonate, sodium salt of naphthalene sulfonate condensate (MORWET® D-425) or sodium naphthalene sulfonate formaldehyde condensate; poly aryl phenyl ether sulphate ammonium salt; 'alpha'-olefin sulfonate; lauryl sulfosuccinate, laureth sulfosuccinate, laureth-5 sulfosuccinate, ricinoleamide MEA sulfosuccinate, undecylenearnide MEA sulfosuccinate, diisobutyl sulfosuccinate, dioctyl sulfosuccinate, dihexyl sulfosuccinate, dicyclohexyl sulfosuccinate, diisodecyl sulfosuccinate, diisotridecyl sulfosuccinate, di-2-ethylhexyl sulfosuccinate, di-2-methylamyl sulfosuccinate, dimethylamyl sulfosuccinate, dibutylhexyl sulfosuccinate, diisooctyl sulfosuccinate or their alkali metal salts, sodium lignosulfonate; polycarboxylic acid sodium salt; N-methyl fatty acid sarcosinate; polyoxyethylene alkyl ether phosphate; polyoxyethylene aryl ether phosphates such as polyoxyethylene phenyl ether phosphate; polyoxyethylene alkyl phenyl ether phosphate; graft copolymers such as polymethyl methacrylate-polyethylene glycol graft copolymer. These surfactants may be used alone or in combination thereof. On the other hand, surfactants may act as detergents, wetting agents, emulsifiers, foaming agents, dispersants, spreader, adjuvant for penetration enhancement, rain fastness, or soil leaching control etc.

Penetrant(s) is selected from the group comprising of, but not limited to, one or more of alcohol, glycol, glycol ether, ester, amine, alkanolamine, amine oxide, quaternary ammonium compound, triglyceride, fatty acid ester, fatty acid ether, N-methyl pyrrolidone, dimethylformamide, dimethyl acetamide, dimethyl sulfoxide, polyoxyethylenetrimethylolpropanemonooleate, polyoxyethylenetrimeth ylolpropanedioleate, polyoxyethylenetrimethylolpropanetrioleate, polyoxyethylenesorbitanmonooleate, polyoxyethylene sorbitol hexaoleate and methylated soybean oil. However, those skilled in the art will appreciate that it is possible to utilize different penetrants without departing from the scope of the present invention.

Solvent(s) is selected from the group comprising of, but not limited to, one or more of C2-C4-alkyl lactates, in particular from glycerin triacetate, ethyl lactate, n-propyl lactate and isopropyl lactate. In one embodiment solvent is selected from $C_6$-$C_{10}$-alkyl lactates, such as n-hexyl lactate, 1-ethylhexyl lactate, 1-methylhepytyl lactate, 1,3-dimethylhexyl lactate, 2-methylheptyl lactate, 2,4-dimethylhexyllactate, 2,2,4-trimethylpentyl lactate, n-octyl lactate, 2-ethylhexyl lactate, n-nonyl lactate, 1-methyloctyl lactate, 2-methyloctyl lactate, 1-methylnonyl lactate, 2-propylheptyl lactate and n-decyl lactate, 2,2,4-trimethylpentyl lactate, butyl lactate, isopropyl myristate, hexylene glycol, dioxane, d-limonene, a $C_1$-$C_{14}$ saturated straight-chain alcohol, isopropyl alcohol, 2-butanol, isobutyl alcohol, tertiary butyl alcohol, 2-butoxyethanol, 2-phenylethanol, diacetone alcohol, γ-butyrolactone, nitromethane, acetophenone, triacetin, pyridine, water, toluene, xylene, petroleum naphtha, crop oil, acetone, methyl ethyl ketone, cyclohexanone, acetic anhydride, acetonitrile, acetophenone, amyl acetate, 2-butanone, chlorobenzene, cyclohexane, cyclohexanol, alkyl acetates, diacetonalcohol, 1,2-dichloropropane, diethanolamine, p-diethylbenzene, abietate, diethylene glycol butyl ether, diethylene glycol ethyl ether, diethylene glycol methyl ether, N,N-dimethyl formamide, dimethyl sulfoxide, 1,4-dioxane, dipropylene glycol, dipropylene glycol methyl ether, dipropylene glycol dibenzoate, diproxitol, alkyl pyrrolidinone, ethyl acetate, 2-ethyl hexanol, ethylene carbonate, 1,1,1-trichloroethane, 2-heptanone, alpha pinene, d-limonene, ethylene glycol, ethylene glycol butyl ether, ethylene glycol methyl ether, gamma-butyrolactone, glycerol, glycerol diacetate, glycerol monoacetate, glycerol triacetate, hexadecane, hexylene glycol, isoamyl acetate, isobornyl acetate, isooctane, isophorone, isopropyl benzene, isopropyl myristate, lactic acid, laurylamine, mesityl oxide, methoxy-propanol, methyl isoamyl ketone, methyl isobutyl ketone, methyl laurate, methyl octanoate, methyl oleate, methylene chloride, m-xylene, n-hexane, n-octylamine, octadecanoic acid, octyl amine acetate, oleic acid, oleylamine, o-xylene, phenol, polyethylene glycol (PEG400), propionic acid, propylene glycol, propylene glycol monomethyl ether, p-xylene, toluene, triethyl phosphate, triethylene glycol, xylene sulfonic acid, paraffin, mineral oil, trichloroethylene, perchloroethylene, ethyl acetate, amyl acetate, butyl acetate, methanol, ethanol, isopropanol, and higher molecular weight alcohols such as amyl alcohol, tetrahydrofurfuryl alcohol, hexanol, octanol, etc. ethylene glycol, propylene glycol, glycerine, N-methyl-2-pyrrolidinone, and the like.

Oil(s) is selected from the group comprising of, but not limited to, a light paraffin oil, plant oil, mineral oil, petroleum oil, vegetable oil or animal oil or derivatives or mixtures thereof. However, those skilled in the art will appreciate that it is possible to utilize other water immiscible solvents without departing from the scope of the present invention.

Stabilizer(s) is selected from the group comprising of, but not limited to, drying agent such as zeolite, quick lime or magnesium oxide; antioxidant agent such as phenol type, amine type, sulfur type or phosphorus type; or ultraviolet absorber such as salicylic acid type or a benzophenone type; or methylated soybean oil; or peroxide compounds such as hydrogen peroxide and organic peroxides, alkyl nitrites such as ethyl nitrite and alkyl glyoxylates such as ethyl glyoxylate, zeolite, antioxidants such as phenol compounds, phosphoric acid compounds and the like; ultraviolet absorbers such as benzophenone compounds or derivatives thereof. However, those skilled in the art will appreciate that it is possible to utilize other conventionally known stabilizers without departing from the scope of the present invention. These stabilizers may be used alone or in combination thereof.

The gibberellins which may be present in the seed dressing formulations usable in accordance with the invention may preferably be gibberellins A1, A3 (=gibberellic acid), A4 and A7; particular preference is given to using gibberellic acid.

The seed dressing formulations usable in accordance with the invention can be used, either directly or after previously having been diluted with water, for the treatment of a wide range of different seed, including the seed of transgenic plants. In this case, additional synergistic effects may also occur in interaction with the substances formed by expression.

For treatment of seed with the seed dressing formulations usable in accordance with the invention, or the preparations prepared therefrom by adding water, all mixing units usable customarily for the seed dressing are useful. Specifically, the procedure in the seed dressing is to place the seed into a mixer, to add the particular desired amount of seed dressing formulations, either as such or after prior dilution with water, and to mix everything until the formulation is distributed homogeneously on the seed. If appropriate, this is followed by a drying process.

In the novel agrochemical composition according to the invention the components (1) and components (2) are advantageously present in a synergistically effective weight ratio of components (1):components (2) in a range of 1000:1 to 1:1000.

Further agrochemical composition according to the invention the components (1) and components (2) are advantageously present in a synergistically effective weight ratio of components (1):components (2) in a range of 100:1 to 1:100, preferably in a weight ratio of 50:1 to 1:50, more preferably in a weight ratio of 20:1 to 1:20, even more preferably in a weight ratio of 10:1 to 1:10.

Further ratios by weight of components (1):components (2) which are preferably used within the weight ratio of 10:1 to 1:10 are 5:1 to 1:5, 4:1 to 1:4, 3:1 to 1:3, 2:1 to 1:2 and 1:1.

In particular, the novel agrochemical composition is used for foliar application.

According to the invention, the expression “composition” stands for the various mixtures or combinations of components (1) and (2), for example, in a single “ready-mix” form, in a combined spray mixture composed from separate formulations of the single active compounds, such as a “tank-mix”, and in a combined use of the single active ingredients when applied in a sequential manner, i.e. one after the other with a reasonably short period, such as a few hours or days. Preferably the order of applying the components (1) and (2) is not essential for working the present invention.

According to the invention the term “agrochemical composition” means a combination or mixture of at least two active compounds with further agriculturally suitable additives, such as agriculturally suitable auxiliaries, e.g. solvents, carriers, surfactants, extenders or the like which are described above. The term “agrochemical composition” also comprises the terms “crop protection composition” and “formulation”.

When using the novel agrochemical composition as a fungicide, the application rates can be varied within a relatively wide range, depending on the kind of application. The application rate in the case of treatment of plant parts, for example, leaves: from 0.1 to 10000 g/ha, preferably from 10 to 1000 g/ha, more preferably from 10 to 800 g/ha, even more preferably from 50 to 300 g/ha (in the case of application by watering or dripping, it is even possible to reduce the application rate (from 10 to 50 g/ha), especially when inert substrates such as rockwool or perlite are used); in the case of seed treatment: from 2 to 200 g per 100 kg of seed, in the case of soil treatment: from 0.1 to 10000 g/ha, preferably from 1 to 5000 g/ha.

These application rates are merely by way of example and are not limiting for the purposes of the invention.

The user may apply the novel agrochemical composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 30 to 400 liters, of the ready-to-use spray liquor are applied per hectare of agricultural useful area.

According to one embodiment, individual components of the agrochemical composition according to the invention such as parts of a kit or parts of a binary or ternary mixture may be mixed by the user himself in a spray tank or any other kind of vessel used for applications (e. g. seed treater drums, seed pelleting machinery, knapsack sprayer) and further auxiliaries may be added, if appropriate.

Consequently, one embodiment of the invention is a kit for preparing a usable agrochemical composition, the kit comprising a) a composition comprising component (1) as defined herein and at least one auxiliary; and b) a composition comprising component (2) as defined herein and at least one auxiliary; and optionally c) a composition comprising at least one auxiliary and optionally a further active component (3) as defined herein.

The term (a) “component (3)” means:

(a) one or more compounds having acaricidal, algicidal, avicidal, bactericidal, fungicidal, herbicidal, insecticidal, molluscicidal, nematicidal, rodenticidal, or virucidal properties; or (b) one or more compounds that are antifeedants, bird repellents, chemosterilants, herbicide safeners, insect attractants, insect repellents, mammal repellents, mating disrupters, plant activators, plant growth regulators, or synergists;

The present invention furthermore relates to agrochemical compositions comprising a mixture of at least one compound of formula (I) (component 1) and at least one further active compound useful for plant protection, e. g. selected from the groups (A) to (R) (component 2) as described above, and if desired one suitable solvent or solid carrier. These mixtures are of particular interest because many of them at the same application rate show higher efficiencies against harmful fungi.

Furthermore, combating harmful fungi with a mixture of a compound of formula (I) and at least one fungicide from groups (A) to (R), as described above, is more efficient than combating those fungi with the individual compounds of formula (I) or individual fungicides from groups (A) to (R). By applying a compound of formula (I) together with at least one active compound from groups (A) to (R) a synergistic effect can be obtained, i.e. more than simple addition of the individual effects is obtained (synergistic mixtures).

This can be obtained by applying the compound of formula (I) and at least one further active compound simultaneously, either jointly (e. g. as tank-mix) or separately, or in succession, wherein the time interval between the individual applications is selected to ensure that the active compound applied first still occurs at the site of action in a sufficient amount at the time of application of the further active substance(s). The order of application is not essential for working of the present invention.

When sequentially applying a compound of formula (I) and at least one further active compound, the time between both applications may vary e. g. between 2 hours to 7 days. Also, a broader range is possible ranging from 0.25 hour to 30 days, preferably from 0.5 hour to 14 days, particularly from 1 hour to 7 days or from 1.5 hours to 5 days, even more preferred from 2 hours to 1 day.

In the binary mixtures and compositions according to the invention the weight ratio of the compound of formula (I) [component (1)] and the component (2) generally depends from the properties of the active components used, usually it is in the range of 1:1000 to 1000:1, often it is in the range of 1:100 to 100:1, regularly in the range of 1:50 to 50:1, preferably in the range of 1:20 to 20:1, more preferably in the range of 1:5 to 5:1 and in particular in the range of 1:2 to 2:1.

According to a further embodiment of the binary mixtures and compositions, the weight ratio of the compound of formula (I) [component (1)] and the component (2) usually is in the range of 500:1 to 1:1, often in the range of 100:1 to 1:1, regularly in the range of 50:1 to 1:1, preferably in the range of 20:1 to 1:1, more preferably in the range of 5:1 to 1:1 and in particular in the range of 2:1 to 1:1.

According to a further embodiment of the binary mixtures and compositions, the weight ratio of the compound of formula (I) [component (1)] and the component (2) usually is in the range of 1:1 to 1:500, often in the range of 1:1 to 1:100, regularly in the range of 1:1 to 1:50, preferably in the range of 1:1 to 1:20, more preferably in the range of 1:1 to 1:5 and in particular in the range of 1:1 to 1:2.

In the ternary mixtures, i.e. compositions according to the invention comprising the compound of formula (I) as a component (1) and a component (2) and a further active component (3), the weight ratio of component (1) and component (2) is in the range of 1:100 to 100:1, regularly in the range of 1:50 to 50:1, preferably in the range of 1:20 to 20:1, more preferably in the range of 1:5 to 5:1 and in particular in the range of 1:2 to 2:1, and the weight ratio of component (1) and component (3) is in the range of 1:100 to 100:1, regularly in the range of 1:50 to 50:1, preferably in the range of 1:20 to 20:1, more preferably in the range of 1:5 to 5:1 and in particular in the range of 1:2 to 2:1.

It is preferred that the ternary mixtures comprise as component (3) can be fungicidal compounds that are independently of each other selected from the groups (A), (B), (C), (D), (E), (F), (G), (H), (I), (J), (K) (L), (M), (N), (O) (P), (Q) and (R); and wherein the at least one active component (3) is not identical with the at least one active component (2).

Any further active components are, if desired, added in a ratio of 20:1 to 1:20 to the compound of formula (I) as a component (1).

In another embodiment, the mixture according to the invention is a mixture of one active compound of formula (I) as component (1) with three fungicidally active compounds (II) as a components (2). In another embodiment, the mixture according to the invention is a mixture of one active compound of formula (I) as component (1) with two fungicidally active compound (II) as a component (2), compound of formula (I) as component (1)+two active component (2) as selected from two fungicidally active compounds (II)/two insecticidally or nematicidally active compounds (III)+a further active component (3) as described herein (4-way mixture).

Consequently, one embodiment of the invention is a kit for preparing a usable agrochemical composition, the kit comprising a) a composition comprising component (1) as defined herein and at least one auxiliary; and b) a composition comprising component (2) as defined herein and at least one auxiliary; and optionally c) a composition comprising at least one auxiliary and optionally a further active component (3) as defined herein.

The present invention furthermore relates to agrochemical compositions comprising a mixture of at least one compound of formula (I) as component (1) and at least one further active compound (II) selected from the groups (A) to (R) as component (2) as described above, useful for plant protection, and if desired one suitable solvent or solid carrier. These mixtures are of particular interest because many of them at the same application rate show higher efficiencies against harmful fungi.

Furthermore, combating harmful fungi with a mixture of a compound of formula (I) as component (1) and at least one further active compound (II) selected from the groups (A) to (R) as component (2), as described above, is more efficient than combating those fungi with the individual compounds of formula (I) or individual fungicidally active compound (II) selected from the groups (A) to (R). By applying a compound of formula (I) together with at least one further active compound (II) selected from the groups (A) to (R) as component (2), a synergistic effect can be obtained, i.e. more than simple addition of the individual effects is obtained (synergistic mixtures).

These ratios are also suitable for seed treatment.

The method of treatment according to the invention also provides the use or application of component (1) and component (2) in a simultaneous, separate or sequential manner. If the single active ingredient is applied in a sequential manner, i.e. at different times, they are applied one after the other within a reasonable period, such as a few hours or days. Preferably the order of applying the component (1) and component (2) is not essential for working the present invention.

In the novel agrochemical composition according to the invention the component (1) and (2) are advantageously present in a synergistically effective weight ratio of (1):(2) in a range of 100:1 to 1:100, preferably in a weight ratio of 50:1 to 1:50, more preferably in a weight ratio of 20:1 to 1:20, even more preferably in a weight ratio of 10:1 to 1:10, 5:1 to 1:5 and 2:1 to 1:2.

Preferred formulations of agrochemical composition as disclosed in the present invention can have the following compositions (weight %):

a. Emulsifiable Concentrates:
   active ingredients: 1 to 95%, preferably 60 to 90%
   surface-active agent(s): 1 to 30%, preferably 5 to 20%
   liquid carrier(s): 1 to 80%, preferably 1 to 35%

The following examples further illustrate, but do not limit, the invention.

Emulsions of any required dilution, which can be used in plant protection, can be obtained from this concentrate by dilution with water.

| Emulsifiable concentrate | |
|---|---|
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

b. Dusts:

active ingredients: 0.1 to 10%, preferably 0.1 to 5%
solid carrier(s): 99.9 to 90%, preferably 99.9 to 99%

The following examples further illustrate, but do not limit, the invention.

Ready-for-use dusts are obtained by mixing the combination with the carrier and grinding the mixture in a suitable mill. Such powders can also be used for dry dressings for seed.

| Dusts | a) | b) | c) |
|---|---|---|---|
| active ingredients | 5% | 6% | 4% |
| talcum | 95% | — | — |
| Kaolin | — | 94% | — |
| mineral filler | — | — | 96% |

c. Suspension Concentrates:

active ingredients: 5 to 75%, preferably 10 to 50%
water: 94 to 24%, preferably 88 to 30%
surface-active agent: 1 to 40%, preferably 2 to 30%

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

| Suspension concentrate | |
|---|---|
| active ingredients | 40% |
| propylene glycol | 10% |
| nonylphenol polyethylene glycol ether (15 mol of ethylene oxide) | 6% |
| Sodium lignosulfonate | 10% |
| Carboxymethylcellulose | 1% |
| silicone oil (in the form of a 75% emulsion in water) | 1% |
| Water | 32% |

d. Wettable Powders:

active ingredients: 0.5 to 90%, preferably 1 to 80%
surface-active agent(s): 0.5 to 20%, preferably 1 to 15%
solid carrier(s): 5 to 95%, preferably 15 to 90%

The following examples further illustrate, but do not limit, the invention.

The combination is thoroughly mixed with the adjuvants and the mixture is thoroughly ground in a suitable mill, affording wettable powders that can be diluted with water to give suspensions of the desired concentration.

| Wettable Powders | a) | b) | c) |
|---|---|---|---|
| active ingredients | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

e. Granules:

active ingredients: 0.1 to 30%, preferably 0.1 to 15%
solid carrier(s): 99.5 to 70%, preferably 97 to 85%

The following examples further illustrate, but do not limit, the invention.

The combination is mixed and ground with the adjuvants and the mixture is moistened with water. The mixture is extruded and then dried in a stream of air.

| Extruded granules | |
|---|---|
| active ingredients | 15% |
| sodium lignosulfonate | 2% |
| Carboxymethylcellulose | 1% |
| Kaolin | 82% |

The finely ground combination is uniformly applied, in a mixer, to the kaolin moistened with polyethylene glycol. Non-dusty coated granules are obtained in this manner.

| Coated granules | |
|---|---|
| active ingredients | 8% |
| polyethylene glycol (mol. wt. 200) | 3% |
| Kaolin | 89% |

f. Seed Treatment Compositions

The following examples further illustrate, but do not limit, the invention.

The combination is thoroughly mixed with the adjuvants and the mixture is thoroughly ground in a suitable mill, affording powders that can be used directly for seed treatment.

| Powders for dry seed treatment | a) | b) | c) |
|---|---|---|---|
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | | 20 |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

| concentrate for seed treatment | |
|---|---|
| active ingredients | 40% |
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

g. Slow Release Capsule Suspension 28 parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

The composition comprising the compound of formula (I) [component (1)] and the component (2) may show a synergistic effect.

According to the present invention, whenever the efficacy of an active ingredient combination is greater than the sum of the efficacies of the individual components. The activity to be expected E for a given active ingredient combination obeys the so-called COLBY formula.

An efficacy of 0 means that the infection level of the treated plants corresponds to that of the untreated control plants; an efficacy of 100 means that the treated plants were not infected.

The expected efficacies of active compound combinations may be determined using Colby's formulas (COLBY, S. R. "Calculating synergistic and antagonistic responses of herbicide combination", Weeds, Vol. 15, pages 20-22; 1967).

Colby's Formulas:

The expected activity for a given combination of two active compounds (binary composition) can be calculated as follows:

$$E = X + Y - \frac{XY}{100}$$

In which E represents the expected percentage of inhibition of the disease for the combination of two fungicides at defined doses (for example, equal to x and y respectively), x is the percentage of inhibition observed for the disease by the compound (1) at a given dose (equal to x), y is the percentage of inhibition observed for the disease by the compound (2) at a defined dose (equal to y). When the percentage of inhibition observed for the combination is greater than E, there is a synergistic effect.

The expected activity for a given combination of three active compounds (ternary composition) can be calculated as follows:

$$E = X + Y + Z - \frac{XY + XZ + YZ}{100} + \frac{XYZ}{10000}$$

- X: efficacy, expressed in % of the untreated control, when using the active compound (1) at the concentration a,
- Y: efficacy, expressed in % of the untreated control, when using the active compound (2) at the concentration b
- Z: efficacy, expressed in % of the untreated control, when using the active compound (3) at the concentration c.
- E is the efficacy when the active compounds (1), (2) and (3) are applied at application rates of a, b and c.

Preparation of Compound of Formula (I)

A. Synthesis of C-Bridge Amidine Derivative

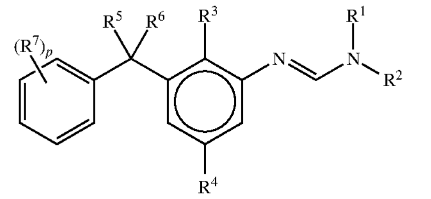

I

In one of the embodiments according to the invention, the arylamidine of the formula (Ia) wherein $R^1$ to $R^7$ are as defined in the invention can be obtained by using the process described in following schemes 1-8.

Scheme-1

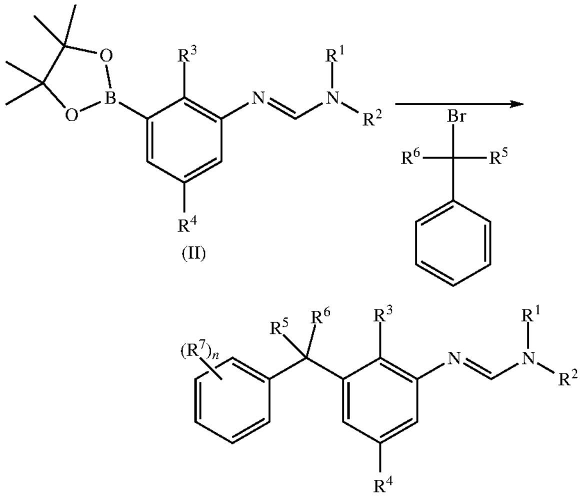

(II)

I

The C-bridged amidine of formula (Ia), can be obtained by palladium catalyzed cross coupling of the corresponding boronate ester derivatives of formula (II) with suitable aryl halides in the presence of a base such as potassium carbonate or sodium bicarbonate by following the analogous procedure as disclosed in prior art WO2018069841 as shown in Scheme-1.

Scheme-2

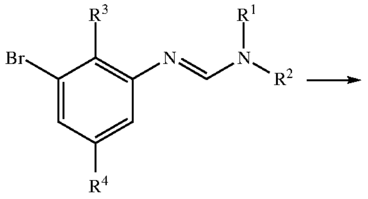

(III)

-continued

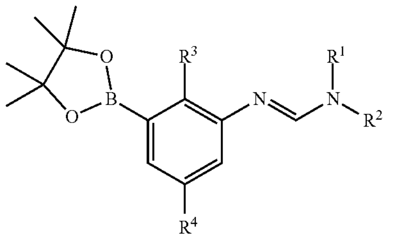

(II)

The boronate ester of amidine derivative of formula (II) is an important intermediate and can be obtained (Scheme-2) from corresponding halogen derivatives of amidine of formula (III) using bispinacolato diborane in the presence of a palladium catalyst, following the miyaura borylation method as disclosed in *J. Org. Chem.*, 1995, 60, 7508-7510.

The arylamidine of the formula (Ia) wherein $R^1$-$R^7$ are defined herein above can also be obtained stepwise by using the process described in following scheme 3-8.

Scheme-3

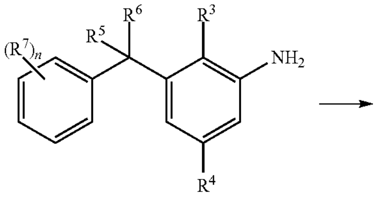

(IV)

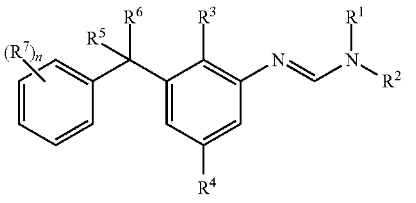

(Ia)

The C-bridged amidine of formula (Ia), can be obtained by treating the corresponding aniline derivatives of formula (IV) with N-(dimethoxymethyl)-N-methylethanamine in 1,4-dioxane using a catalytic amount of anhydrous p-toluenesulphonic acid following an analogous procedure as disclosed in US20110130282.

Scheme-4

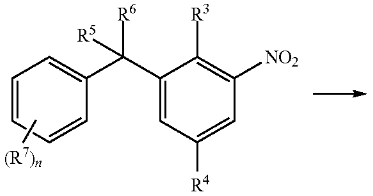

(V)

-continued

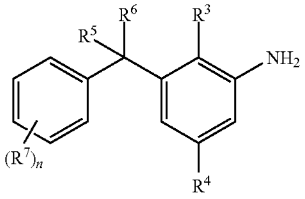

(IV)

The aniline derivative of formula (IV) can be obtained by reduction of a corresponding nitro intermediate of formula (V) by using various reduction methods as disclosed in the literature, for example, iron powder in the presence of aqueous ammonium chloride or hydrogenation in the presence of Pd/C, following the analogous procedure as disclosed in US2006194801A1.

Scheme-5

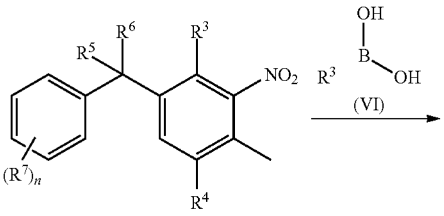

(VI)

(VII)

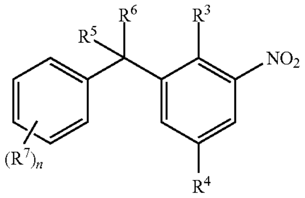

(V)

The compound of formula (V) wherein $R^3$ is preferably an (cyclo)alkyl group; can be obtained by palladium catalyzed cross coupling of a corresponding alkyl boronic acid of formula (VI) with a bromo derivative of formula (VII) in the presence of a base e.g. potassium carbonate or potassium phosphate by following the analogous procedure as disclosed in US2017355679A1.

Scheme-6

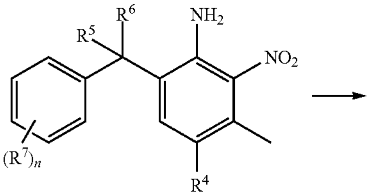

(VIII)

-continued

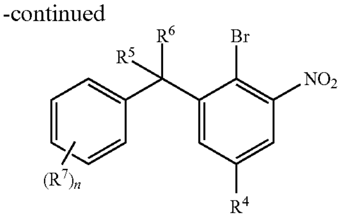

(VII)

The corresponding halogen derivatives of formula (VII) can be obtained by a Sandmeyer reaction of corresponding aniline derivatives of formula (VIII) by following the analogous procedure as disclosed in *J. Org. Chem.,* 1980, 45, 2570-2575. This approach provides various functionalization opportunities at this position by converting the corresponding amino group to different halogens, nitrile, hydroxy, trifluoromethyl etc. as disclosed in *J. Fluorine Chem.,* 2001, 107, 31-34 and *Synthesis,* 2007, 81-84.

Scheme-7

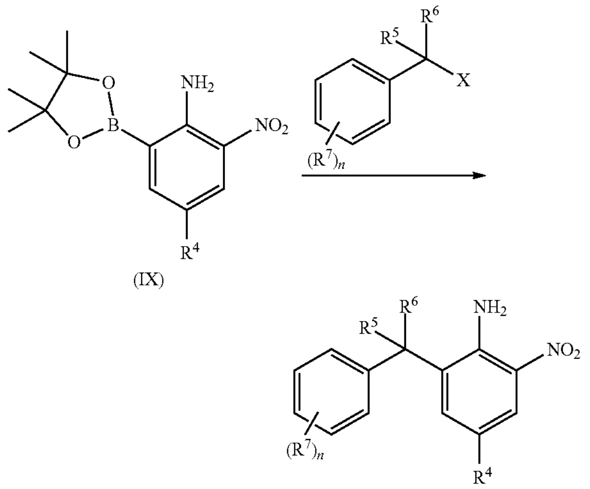

(IX)

(VIII)

The C-bridged derivative of formula (VIII) can be obtained from the boronate ester intermediate of formula (IX) by following a Suzuki coupling reaction with various benzyl bromides in the presence of a palladium catalyst by following the analogous procedure as disclosed in WO2018069841.

Scheme-8

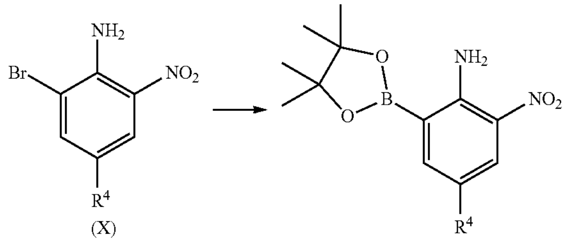

(X)

(IX)

The boronate ester derivative of formula (IX) can be obtained from corresponding commercially available bromo derivatives of formula (X) using bispinacolato diborane in the presence of a palladium catalyst by following the Miyaura borylation reaction using a suitable base as disclosed in WO 2016210234.

CHEMISTRY EXAMPLES

The following representative examples set forth the manner and process of making compounds of the present invention without being a limitation thereof and include the best mode contemplated by the inventors for carrying out the invention.

Example 1: Synthesis of 3-Bromo Amidine Intermediates a) N'-(3-bromo-2,5-dimethylphenyl)-N-ethyl-N-methylformimidamide

Step 1: Preparation of 3-Bromo-2,5-Dimethylbenzoic Acid

A mixture of 2,5-dimethylbenzoic acid (2 g, 13.3 mmol) and sulfuric acid (20 mL) was cooled to 0° C., N-bromosuccinimide (2.4 g, 13.3 mmol) was added to the reaction mixture and stirred at 0° C. for 1.5 h. After completion of the reaction, the reaction mixture was poured onto crushed ice and extracted with ethyl acetate (50 mL). The ethyl acetate layer was washed with brine solution, dried over anhydrous sodium sulfate and evaporated under reduced pressure. The crude product was purified by column chromatography using 50% ethyl acetate in hexane as an eluent to obtain 3-bromo-2,5-dimethylbenzoic acid (1.6 g, 52% yield), LCMS (M−1): 229.00.

Step 2: Preparation of tert-butyl (3-bromo-2,5-dimethylphenyl)carbamate

A reaction mixture of 3-bromo-2,5-dimethylbenzoic acid (1 g, 4.3 mmol), triethylamine (1.5 mL, 10.9 mmol) and diphenylphosphoryl azide (1.8 g, 6.5 mmol) in anhydrous tert-butanol was heated at 80° C. for 6 h. After completion of the reaction, the reaction mixture was poured onto crushed ice and extracted with ethyl acetate (50 mL). The ethyl acetate layer was washed with brine solution, dried over anhydrous sodium sulfate and evaporated under reduced pressure. The crude product was purified by column chromatography using 50% ethyl acetate in hexane as an eluent to obtain tert-butyl (3-bromo-2,5-dimethylphenyl) carbamate (0.9 g, 69% yield).

Step 3: Preparation of 3-bromo-2,5-dimethylaniline

To a solution of tert-butyl (3-bromo-2,5-dimethylphenyl) carbamate (1 g, 3.3 mmol) in dichloromethane (20 mL), trifluoroacetic acid (10 mL, 130 mmol) was added dropwise at 0° C. The reaction mixture was stirred at 25° C. for 6 h. After completion of the reaction, the reaction mixture was concentrated under reduced pressure. The crude residue was dissolved in dichloromethane (30 mL) and washed twice with saturated sodium bicarbonate solution (10 mL). The organic layer was separated, washed with brine solution then dried over anhydrous sodium sulfate and evaporated under reduced pressure. The crude product was purified by column chromatography using 50% ethyl acetate as an eluent to obtain 3-bromo-2,5-dimethylaniline (0.45 g, 2.2 mmol, 67% yield). $^1$H-NMR (400 MHz, DMSO-d) δ 6.59 (s, 1H), 6.42 (s, 1H), 5.10 (s, 2H), 2.11 (s, 3H), 2.09 (s, 3H).

Step 4: Preparation of N'-(3-bromo-2,5-dimethylphenyl)-N-ethyl-N-methylformimidamide To a stirred solution of 3-bromo-2,5-dimethylaniline (1.00 g, 5.0 mmol) in trimethyl orthoformate (15 mL), anhydrous p-toluenesulfonic acid monohydrate (0.05 g, 0.2 mmol) was added and the resulting reaction mixture was refluxed at 105° C. for 4 h. After completion of the reaction, the solvent was evaporated under reduced pressure. The crude product was dissolved in 1,4-dioxane (50 mL) under nitrogen atmosphere, followed by the addition of N-ethylmethylamine (0.9 mL, 10 mmol). The resulting reaction mixture was refluxed at 80° C. for 3 h. After completion of the reaction, the reaction mixture was concentrated under reduced pressure. The crude product was purified by column chromatography using 7% ethyl acetate in hexane as an eluent to obtain N'-(3-bromo-2,5-dimethylphenyl)-N-ethyl-N-methylformimidamide (1 g, 3.5 mmol, 71% yield). $^1$H-NMR (400 MHz, DMSO-d) δ 7.62 (brs, 1H), 6.96 (s, 1H), 6.59 (s, 1H), 3.40-3.31 (m, 2H), 2.91 (s, 3H), 2.22 (s, 3H), 2.18 (s, 3H), 1.11 (t, 3H); LCMS (M+1): 270.90.

Preparation of N'-(3-benzyl-2,5-dimethylphenyl)-N-ethyl-N-methylformimidamide a) Preparation of N'-(2,5-dimethyl-3-(4,4,5,5-tetramethyl-1,3,2-dioxaborolan-2-yl)phenyl)-N-ethyl-N-methylformimidamide A stirred mixture of N'-(3-bromo-2,5-dimethylphenyl)-N-ethyl-N-methylformimidamide (1.0 g, 3.7 mmol), bis(pinacol)diboron (1.9 g, 7.4 mmol), [1,1'-Bis(diphenylphosphino)ferrocene]dichloropalladium(II) dichloromethane [$PdCl_2$(dppf)-$CH_2Cl_2$] (0.2 g, 0.2 mmol) and potassium acetate (0.7 g, 7.4 mmol) in 1,4-dioxane (30 mL) was degassed for 5 min with nitrogen. The reaction mixture was stirred at 95° C. for 16 h under nitrogen atmosphere. After completion of the reaction, the reaction mixture was diluted with dichloromethane, filtered through a celite bed, the residue was washed with dichloromethane (100 mL). The combined filtrate was washed with brine solution, dried over anhydrous sodium sulfate. The volatiles were removed under reduced pressure. The crude product was purified by column chromatography using 10% ethyl acetate in hexane as an eluent to obtain N'-(2,5-dimethyl-3-(4,4,5,5-tetramethyl-1,3,2-dioxaborolan-2-yl)phenyl)-N-ethyl-N-methylformimidamide (0.8 g, 70% yield).

b) Preparation of N'-(3-benzyl-2,5-dimethylphenyl)-N-ethyl-N-methylformimidamide A mixture of N'-(2,5-dimethyl-3-(4,4,5,5-tetramethyl-1,3,2-dioxaborolan-2-yl)phenyl)-N-ethyl-N-methylformimidamide (0.5 g, 1.6 mmol), (bromomethyl)benzene (0.3 g, 1.6 mmol), $Pd(Ph_3P)_4$ [tetrakis(triphenylphosphine)palladium (0)] (0.09 g, 0.08 mmol) and potassium carbonate (0.5 g, 3.9 mmol) in dioxane:water (12 mL, 8:2) was degassed with nitrogen. The reaction mixture was stirred at 100° C. for 4 h under nitrogen atmosphere. After completion of the reaction, the reaction mixture was cooled to 25° C., filtered through a celite bed. The filtrate was diluted with ethyl acetate and washed with brine, dried over anhydrous sodium sulfate and the solvent was removed under reduced pressure. The crude product was purified by column chromatography using 7% ethyl acetate in hexane as an eluent to obtain N'-(3-benzyl-2,5-dimethylphenyl)-N-ethyl-N-methylformimidamide (0.4 g, 63% yield).

BIOLOGY EXAMPLES

As described herein, the compounds of formula (I) show fungicidal activities which are exerted with respect to numerous fungi which attack on important agricultural crops. The compounds of the present invention were assessed for their activity as described in the following tests:

Biological Test Examples

The compounds were selected for in vivo (glasshouse) testing. The methods followed to check the efficacy of compounds on the pathogens were as following:

Example A: *Pyricularia oryzae* Test in Rice

The single compounds or respective compound combinations were dissolved in 2% dimethyl sulfoxide/acetone and then mixed with water containing emulsifier to a calibrated spray volume of 50 mL. The test solutions were poured into spray bottles for further applications.

To test the preventive activity of compounds, healthy young rice plants, raised in the greenhouse, were sprayed with the single compound or mixture preparation at the stated application rates inside the spray cabinets using hollow cone nozzles. One day after treatment, the plants were inoculated with a spore suspension containing $1.4\times10^6$ *Pyricularia oryzae* inoculum. The inoculated plants were then kept in a greenhouse chamber at 24° C. temperature and 95% relative humidity for disease expression.

A visual assessment of the performance of the compounds or respective compound combinations was carried out by rating the disease severity (0-100% scale) on treated plants 3, 7, 10 and 15 days after application. Efficacy (% control) of the single compounds and combinations were calculated by comparing the disease rating in the treatment with the one of the untreated controls. The compounds were also assessed for their plant compatibility by recording symptoms like necrosis, chlorosis and stunting. The results are shown for the representive compound of formula (I), particularly (I-1) to (I-5) in Table A1-A4.

Surprisingly, the following combinations, indicated in the table below, have revealed unexpected synergistic effects:

TABLE A1

The synergistic fungicidal activity of the compositions of the present invention, wherein the representative compounds of formula (I) is particularly compound (I-1) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-1) | 1 | | 17 | | |
| 2 | Compound (I-1) | 5 | | 27 | | |
| 3 | Compound (I-1) | 20 | | 37 | | |
| 4 | Mefentrifluconazole | 0.05 | | 21 | | |
| 5 | Mefentrifluconazole | 0.1 | | 24 | | |
| 6 | Prothioconazole | 0.05 | | 17 | | |
| 7 | Prothioconazole | 0.1 | | 33 | | |
| 8 | Pyraclostrobin | 0.05 | | 16 | | |
| 9 | Pyraclostrobin | 0.1 | | 24 | | |
| 10 | Trifloxystrobin | 0.05 | | 24 | | |
| 11 | Trifloxystrobin | 0.1 | | 32 | | |
| 12 | Difenconazole | 0.05 | | 24 | | |
| 13 | Difenconazole | 0.1 | | 26 | | |
| 14 | Fluxapyroxad | 0.05 | | 24 | | |
| 15 | Fluxapyroxad | 0.1 | | 32 | | |
| 16 | Azoxystrobin | 0.05 | | 21 | | |
| 17 | Azoxystrobin | 0.1 | | 26 | | |
| 18 | Metominostrobin | 0.05 | | 17 | | |
| 19 | Metominostrobin | 0.1 | | 33 | | |
| 20 | Folpet | 0.05 | | 34 | | |
| 21 | Folpet | 0.1 | | 39 | | |
| 22 | Tebuconazole | 0.05 | | 17 | | |
| 23 | Tebuconazole | 0.1 | | 36 | | |
| 24 | Metiram | 0.05 | | 16 | | |
| 25 | Metiram | 0.1 | | 18 | | |
| 26 | Benzovindiflupyr | 0.05 | | 17 | | |
| 27 | Fluindapyr | 0.05 | | 11 | | |
| 28 | Compound (I-1) + Mefentrifluconazole | (1:0.1) | 10:1 | 64 | 37 | 27 |
| 29 | Compound (I-1) + Mefentrifluconazole | (5:0.1) | 50:1 | 72 | 44 | 28 |
| 30 | Compound (I-1) + Mefentrifluconazole | (20:0.1) | 200:1 | 78 | 52 | 26 |
| 31 | Compound (I-1) + Prothioconazole | (1:0.1) | 10:1 | 69 | 44 | 25 |
| 32 | Compound (I-1) + Prothioconazole | (5:0.1) | 50:1 | 81 | 51 | 30 |
| 33 | Compound (I-1) + Prothioconazole | (20:0.1) | 200:1 | 89 | 58 | 31 |
| 34 | Compound (I-1) + Pyraclostrobin | (1:0.1) | 10:1 | 61 | 37 | 24 |
| 35 | Compound (I-1) + Pyraclostrobin | (5:0.1) | 50:1 | 67 | 44 | 22 |
| 36 | Compound (I-1) + Pyraclostrobin | (20:0.1) | 200:1 | 72 | 52 | 20 |
| 37 | Compound (I-1) + Trifloxystrobin | (1:0.1) | 10:1 | 72 | 43 | 29 |
| 38 | Compound (I-1) + Trifloxystrobin | (5:0.1) | 50:1 | 78 | 50 | 28 |
| 39 | Compound (I-1) + Trifloxystrobin | (20:0.1) | 200:1 | 81 | 57 | 24 |
| 40 | Compound (I-1) + Difenconazole | (1:0.05) | 20:1 | 53 | 37 | 16 |
| 41 | Compound (I-1) + Difenconazole | (5:0.05) | 100:1 | 61 | 44 | 17 |
| 42 | Compound (I-1) + Difenconazole | (20:0.05) | 400:1 | 67 | 52 | 15 |
| 43 | Compound (I-1) + Difenconazole | (1:0.1) | 10:1 | 64 | 38 | 26 |
| 44 | Compound (I-1) + Difenconazole | (5:0.1) | 50:1 | 67 | 46 | 21 |
| 45 | Compound (I-1) + Difenconazole | (20:0.1) | 200:1 | 72 | 53 | 19 |
| 46 | Compound (I-1) + Fluxapyroxad | (20:0.05) | 400:1 | 63 | 52 | 11 |
| 47 | Compound (I-1) + Fluxapyroxad | (1:0.1) | 10:1 | 55 | 43 | 12 |
| 48 | Compound (I-1) + Fluxapyroxad | (5:0.1) | 50:1 | 63 | 50 | 13 |
| 49 | Compound (I-1) + Azoxystrobin | (20:0.05) | 400:1 | 76 | 50 | 26 |

TABLE A1-continued

The synergistic fungicidal activity of the compositions of the present invention, wherein the representative compounds of formula (I) is particularly compound (I-1) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 50 | Compound (I-1) + Azoxystrobin | (1:0.1) | 10:1 | 66 | 38 | 27 |
| 51 | Compound (I-1) + Azoxystrobin | (5:0.1) | 50:1 | 71 | 46 | 25 |
| 52 | Compound (I-1) + Azoxystrobin | (20:0.1) | 200:1 | 79 | 53 | 26 |
| 53 | Compound (I-1) + Metominostrobin | (20:0.05) | 400:1 | 76 | 47 | 29 |
| 54 | Compound (I-1) + Metominostrobin | (1:0.1) | 10:1 | 71 | 44 | 27 |
| 55 | Compound (I-1) + Metominostrobin | (5:0.1) | 50:1 | 74 | 51 | 23 |
| 56 | Compound (I-1) + Metominostrobin | (20:0.1) | 200:1 | 82 | 58 | 24 |
| 57 | Compound (I-1) + Folpet | (20:0.05) | 400:1 | 68 | 58 | 10 |
| 58 | Compound (I-1) + Folpet | (5:0.1) | 50:1 | 66 | 55 | 11 |
| 59 | Compound (I-1) + Folpet | (20:0.1) | 200:1 | 71 | 61 | 10 |
| 60 | Compound (I-1) + Tebuconazole | (20:0.05) | 400:1 | 74 | 47 | 26 |
| 61 | Compound (I-1) + Tebuconazole | (1:0.1) | 10:1 | 66 | 47 | 19 |
| 62 | Compound (I-1) + Tebuconazole | (5:0.1) | 50:1 | 71 | 53 | 18 |
| 63 | Compound (I-1) + Tebuconazole | (20:0.1) | 200:1 | 76 | 59 | 17 |
| 64 | Compound (I-1) + Metiram | (1:0.05) | 20:1 | 41 | 30 | 11 |
| 65 | Compound (I-1) + Metiram | (5:0.05) | 100:1 | 49 | 38 | 10 |
| 66 | Compound (I-1) + Metiram | (1:0.1) | 10:1 | 51 | 32 | 20 |
| 67 | Compound (I-1) + Metiram | (5:0.1) | 50:1 | 57 | 40 | 17 |
| 68 | Compound (I-1) + Metiram | (20:0.1) | 200:1 | 62 | 48 | 14 |
| 69 | Compound (I-1) + Benzovindiflupyr | (1:0.05) | 20:1 | 41 | 31 | 10 |
| 70 | Compound (I-1) + Fluindapyr | (1:0.05) | 20:1 | 38 | 26 | 12 |
| 71 | Compound (I-1) + Fluindapyr | (5:0.05) | 100:1 | 46 | 35 | 11 |
| 72 | Compound (I-1) + Fluindapyr | (20:0.05) | 400:1 | 54 | 44 | 10 |

TABLE-A2

The synergistic fungicidal activity of the compositions of the present invention, wherein the representative compounds of formula (I), is particularly compound (I-2) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-2) | 1 | | 13 | | |
| 2 | Compound (I-2) | 5 | | 23 | | |
| 3 | Compound (I-2) | 20 | | 37 | | |
| 4 | Mefentrifluconazole | 0.05 | | 21 | | |
| 5 | Mefentrifluconazole | 0.1 | | 24 | | |
| 6 | Prothioconazole | 0.05 | | 17 | | |
| 7 | Prothioconazole | 0.1 | | 33 | | |
| 8 | Pyraclostrobin | 0.05 | | 16 | | |
| 9 | Pyraclostrobin | 0.1 | | 24 | | |
| 10 | Boscalid | 0.05 | | 24 | | |
| 11 | Boscalid | 0.1 | | 37 | | |
| 12 | Difenconazole | 0.1 | | 26 | | |
| 13 | Azoxystrobin | 0.1 | | 26 | | |

TABLE-A2-continued

The synergistic fungicidal activity of the compositions of the present invention, wherein the representative compounds of formula (I), is particularly compound (I-2) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 14 | Picoxystrobin | 0.05 | | 16 | | |
| 15 | Picoxystrobin | 0.1 | | 33 | | |
| 16 | Benzovindiflupyr | 0.05 | | 17 | | |
| 17 | Compound (I-2) + Mefentrifluconazole | (1:0.05) | 20:1 | 58 | 32 | 26 |
| 18 | Compound (I-2) + Mefentrifluconazole | (5:0.05) | 100:1 | 61 | 39 | 21 |
| 20 | Compound (I-2) + Mefentrifluconazole | (1:0.1) | 10:1 | 66 | 34 | 32 |
| 21 | Compound (I-2) + Mefentrifluconazole | (5:0.1) | 50:1 | 68 | 42 | 27 |
| 22 | Compound (I-2) + Mefentrifluconazole | (20:0.1) | 200:1 | 74 | 52 | 22 |
| 23 | Compound (I-2) + Prothioconazole | (1:0.05) | 20:1 | 47 | 28 | 19 |
| 24 | Compound (I-2) + Prothioconazole | (5:0.05) | 100:1 | 47 | 36 | 11 |
| 25 | Compound (I-2) + Prothioconazole | (1:0.1) | 10:1 | 53 | 42 | 11 |
| 26 | Compound (I-2) + Prothioconazole | (20:0.1) | 200:1 | 71 | 58 | 13 |
| 27 | Compound (I-2) + Pyraclostrobin | (5:0.05) | 100:1 | 50 | 36 | 14 |
| 28 | Compound (I-2) + Pyraclostrobin | (20:0.05) | 400:1 | 63 | 47 | 16 |
| 29 | Compound (I-2) + Pyraclostrobin | (1:0.1) | 10:1 | 53 | 34 | 18 |
| 30 | Compound (I-2) + Pyraclostrobin | (5:0.1) | 50:1 | 63 | 42 | 21 |
| 31 | Compound (I-2) + Pyraclostrobin | (20:0.1) | 200:1 | 68 | 52 | 17 |
| 32 | Compound (I-2) + Boscalid | (5:0.05) | 100:1 | 58 | 42 | 16 |
| 33 | Compound (I-2) + Boscalid | (20:0.05) | 400:1 | 71 | 52 | 19 |
| 34 | Compound (I-2) + Boscalid | (1:0.1) | 10:1 | 61 | 45 | 15 |
| 35 | Compound (I-2) + Boscalid | (5:0.1) | 50:1 | 66 | 52 | 14 |
| 36 | Compound (I-2) + Boscalid | (20:0.1) | 200:1 | 74 | 60 | 14 |
| 37 | Compound (I-2) + Difenconazole | (1:0.1) | 10:1 | 50 | 36 | 14 |
| 38 | Compound (I-2) + Difenconazole | (20:0.1) | 200:1 | 63 | 53 | 10 |
| 39 | Compound (I-2) + Azoxystrobin | (20:0.1) | 200:1 | 67 | 53 | 14 |
| 40 | Compound (I-2) + Picoxystrobin | (20:0.05) | 400:1 | 60 | 47 | 13 |
| 41 | Compound (I-2) + Picoxystrobin | (5:0.1) | 50:1 | 60 | 49 | 11 |
| 42 | Compound (I-2) + Benzovindiflupyr | (5:0.05) | 100:1 | 46 | 36 | 10 |

TABLE-A3

The synergistic fungicidal activity of the compositions of the present invention, wherein the representative compounds of formula (I) is particularly compound (I-4) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-4) | 1 | | 17 | | |
| 2 | Compound (I-4) | 5 | | 23 | | |
| 3 | Compound (I-4) | 20 | | 33 | | |

TABLE-A3-continued

The synergistic fungicidal activity of the compositions of the present invention, wherein the representative compounds of formula (I) is particularly compound (I-4) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 4 | Mefentrifluconazole | 0.1 | | 24 | | |
| 5 | Azoxystrobin | 0.1 | | 26 | | |
| 6 | Tebuconazole | 0.05 | | 17 | | |
| 7 | Tebuconazole | 0.1 | | 36 | | |
| 8 | Metiram | 0.05 | | 16 | | |
| 9 | Metiram | 0.1 | | 18 | | |
| 10 | Benzovindiflupyr | 0.05 | | 17 | | |
| 11 | Fluindapyr | 0.05 | | 11 | | |
| 12 | Dithianon | 0.05 | | 34 | | |
| 13 | Dithianon | 0.1 | | 42 | | |
| 14 | Compound (I-4) + Mefentrifluconazole | (20:0.1) | 200:1 | 61 | 49 | 12 |
| 15 | Compound (I-4) + Azoxystrobin | (20:0.1) | 200:1 | 62 | 51 | 11 |
| 16 | Compound (I-4) + Tebuconazole | (20:0.05) | 400:1 | 62 | 45 | 17 |
| 17 | Compound (I-4) + Tebuconazole | (5:0.1) | 50:1 | 65 | 51 | 14 |
| 18 | Compound (I-4) + Tebuconazole | (20:0.1) | 200:1 | 70 | 57 | 13 |
| 19 | Compound (I-4) + Metiram | (1:0.05) | 20:1 | 53 | 30 | 23 |
| 20 | Compound (I-4) + Metiram | (5:0.05) | 100:1 | 61 | 36 | 26 |
| 21 | Compound (I-4) + Metiram | (20:0.05) | 400:1 | 81 | 44 | 37 |
| 22 | Compound (I-4) + Metiram | (1:0.1) | 10:1 | 67 | 32 | 35 |
| 23 | Compound (I-4) + Metiram | (5:0.1) | 50:1 | 72 | 37 | 35 |
| 24 | Compound (I-4) + Metiram | (20:0.1) | 200:1 | 86 | 45 | 41 |
| 25 | Compound (I-4) + Benzovindiflupyr | (5:0.05) | 100:1 | 50 | 36 | 14 |
| 26 | Compound (I-4) + Benzovindiflupyr | (20:0.05) | 400:1 | 56 | 45 | 11 |
| 27 | Compound (I-4) + Fluindapyr | (1:0.05) | 20:1 | 47 | 26 | 21 |
| 28 | Compound (I-4) + Fluindapyr | (5:0.05) | 100:1 | 53 | 32 | 21 |
| 29 | Compound (I-4) + Fluindapyr | (20:0.05) | 400:1 | 64 | 41 | 23 |
| 30 | Compound (I-4) + Dithianon | (1:0.05) | 20:1 | 61 | 45 | 16 |
| 31 | Compound (I-4) + Dithianon | (5:0.05) | 100:1 | 72 | 49 | 23 |
| 32 | Compound (I-4) + Dithianon | (5:0.1) | 50:1 | 81 | 56 | 25 |
| 33 | Compound (I-4) + Dithianon | (20:0.1) | 200:1 | 86 | 61 | 25 |

TABLE-A4

The synergistic fungicidal activity of the compositions of the present invention, wherein the representative compounds of formula (I) is particularly compound (I-5) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-5) | 1 | | 23 | | |
| 2 | Compound (I-5) | 5 | | 37 | | |
| 3 | Compound (I-5) | 20 | | 47 | | |
| 4 | Fluxapyroxad | 0.05 | | 24 | | |
| 5 | Azoxystrobin | 0.05 | | 21 | | |

TABLE-A4-continued

The synergistic fungicidal activity of the compositions of the present invention, wherein the representative compounds of formula (I) is particularly compound (I-5) as component (1) and other components (2) selected from the groups (A) to (R) against *Pyricularia oryzae* in rice are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 6 | Azoxystrobin | 0.1 | | 26 | | |
| 7 | Compound (I-5) + Fluxapyroxad | (20:0.05) | 400:1 | 70 | 59 | 11 |
| 8 | Compound (I-5) + Azoxystrobin | (20:0.05) | 400:1 | 73 | 58 | 15 |
| 9 | Compound (I-5) + Azoxystrobin | (1:0.1) | 10:1 | 65 | 43 | 22 |
| 10 | Compound (I-5) + Azoxystrobin | (5:0.1) | 50:1 | 70 | 53 | 17 |
| 11 | Compound (I-5) + Azoxystrobin | (20:0.1) | 200:1 | 78 | 61 | 18 |

Example B: *Alternaria solani* Test in Tomato

The single compounds or respective compound combinations were dissolved in 2% dimethyl sulfoxide/acetone and then mixed with water containing emulsifier to a calibrated spray volume of 50 mL.

The test solutions were poured into spray bottles for further applications.

To test the preventive activity of compounds, healthy young tomato plants, raised in the greenhouse, were sprayed with the single compound or mixture preparation at the stated application rates inside the spray cabinets using hollow cone nozzles. One day after treatment, the plants were inoculated with a spore suspension containing $0.24\times10^6$ *Alternaria solani* inoculum and 2% Malt. The inoculated plants were then kept in a greenhouse chamber at 22-24° C. temperature and 90-95% relative humidity for disease expression.

A visual assessment of the performance of the compounds or respective compound combinations was carried out by rating the disease severity (0-100% scale) on treated plants 3, 7, 10 and 15 days after application. Efficacy (% control) of the single compounds and combinations was calculated by comparing the disease rating in the treatment with the one of the untreated controls. The compounds were also assessed for their plant compatibility by recording symptoms like necrosis, chlorosis and stunting. The results are shown for the representative compounds of compound of formula (I) particularly, (I-1) to (I-5) in Table B1-B5.

Surprisingly, the following combinations, indicated in the table below, have revealed unexpected synergistic effects:

TABLE-B1

The synergistic fungicidal activity of the compositions of the present invention, wherein the representative compounds of formula (I) is particularly compound (I-1) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-1) | 1 | | 20 | | |
| 2 | Compound (I-1) | 5 | | 27 | | |
| 3 | Compound (I-1) | 20 | | 40 | | |
| 4 | Mefentrifluconazole | 0.05 | | 12 | | |
| 5 | Mefentrifluconazole | 0.1 | | 26 | | |
| 6 | Prothioconazole | 0.05 | | 20 | | |
| 7 | Prothioconazole | 0.1 | | 31 | | |
| 8 | Pyraclostrobin | 0.05 | | 21 | | |
| 9 | Pyraclostrobin | 0.1 | | 28 | | |
| 10 | Boscalid | 0.05 | | 13 | | |
| 11 | Boscalid | 0.1 | | 26 | | |
| 12 | Bixafen | 0.05 | | 11 | | |
| 13 | Bixafen | 0.1 | | 29 | | |
| 14 | Difenconazole | 0.05 | | 42 | | |
| 15 | Difenconazole | 0.1 | | 47 | | |
| 16 | Fluxapyroxad | 0.05 | | 40 | | |
| 17 | Azoxystrobin | 0.05 | | 33 | | |
| 18 | Azoxystrobin | 0.1 | | 49 | | |
| 19 | Metominostrobin | 0.05 | | 26 | | |
| 20 | Metominostrobin | 0.1 | | 31 | | |
| 21 | Folpet | 0.05 | | 12 | | |
| 22 | Folpet | 0.1 | | 16 | | |
| 23 | Tebuconazole | 0.05 | | 34 | | |
| 24 | Tebuconazole | 0.1 | | 54 | | |
| 25 | Mancozeb | 0.1 | | 16 | | |

TABLE-B1-continued

The synergistic fungicidal activity of the compositions of the present invention, wherein the representative compounds of formula (I) is particularly compound (I-1) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 26 | Propineb | 0.05 | | 20 | | |
| 27 | Compound (I-1) + Mefentrifluconazole | (1:0.05) | 20:1 | 78 | 30 | 49 |
| 28 | Compound (I-1) + Mefentrifluconazole | (5:0.05) | 100:1 | 81 | 35 | 46 |
| 29 | Compound (I-1) + Mefentrifluconazole | (20:0.05) | 400:1 | 84 | 47 | 37 |
| 30 | Compound (I-1) + Mefentrifluconazole | (1:0.1) | 10:1 | 86 | 41 | 46 |
| 31 | Compound (I-1) + Mefentrifluconazole | (5:0.1) | 50:1 | 92 | 46 | 46 |
| 32 | Compound (I-1) + Mefentrifluconazole | (20:0.1) | 200:1 | 97 | 56 | 42 |
| 33 | Compound (I-1) + Prothioconazole | (1:0.05) | 20:1 | 46 | 36 | 10 |
| 34 | Compound (I-1) + Prothioconazole | (5:0.05) | 100:1 | 51 | 41 | 10 |
| 35 | Compound (I-1) + Prothioconazole | (1:0.1) | 10:1 | 57 | 45 | 12 |
| 36 | Compound (I-1) + Prothioconazole | (5:0.1) | 50:1 | 62 | 49 | 13 |
| 37 | Compound (I-1) + Pyraclostrobin | (1:0.05) | 20:1 | 51 | 37 | 15 |
| 38 | Compound (I-1) + Pyraclostrobin | (5:0.05) | 100:1 | 62 | 42 | 20 |
| 39 | Compound (I-1) + Pyraclostrobin | (20:0.05) | 400:1 | 70 | 53 | 18 |
| 40 | Compound (I-1) + Pyraclostrobin | (1:0.1) | 10:1 | 76 | 42 | 33 |
| 41 | Compound (I-1) + Pyraclostrobin | (5:0.1) | 50:1 | 78 | 47 | 31 |
| 42 | Compound (I-1) + Pyraclostrobin | (20:0.1) | 200:1 | 81 | 57 | 24 |
| 43 | Compound (I-1) + Boscalid | (1:0.05) | 20:1 | 49 | 30 | 18 |
| 44 | Compound (I-1) + Boscalid | (5:0.05) | 100:1 | 54 | 36 | 18 |
| 45 | Compound (I-1) + Boscalid | (1:0.1) | 10:1 | 62 | 41 | 21 |
| 46 | Compound (I-1) + Boscalid | (5:0.1) | 50:1 | 68 | 46 | 22 |
| 47 | Compound (I-1) + Boscalid | (20:0.1) | 200:1 | 73 | 56 | 17 |
| 48 | Compound (I-1) + Bixafen | (1:0.05) | 20:1 | 70 | 29 | 41 |
| 49 | Compound (I-1) + Bixafen | (5:0.05) | 100:1 | 78 | 35 | 44 |
| 50 | Compound (I-1) + Bixafen | (20:0.05) | 400:1 | 81 | 47 | 34 |
| 51 | Compound (I-1) + Bixafen | (1:0.1) | 10:1 | 84 | 43 | 41 |
| 52 | Compound (I-1) + Bixafen | (5:0.1) | 50:1 | 89 | 48 | 41 |
| 53 | Compound (I-1) + Bixafen | (20:0.1) | 200:1 | 97 | 57 | 40 |
| 54 | Compound (I-1) + Difenconazole | (20:0.05) | 400:1 | 78 | 65 | 13 |
| 55 | Compound (I-1) + Difenconazole | (20:0.1) | 200:1 | 86 | 68 | 18 |
| 56 | Compound (I-1) + Fluxapyroxad | (20:0.05) | 400:1 | 76 | 64 | 12 |
| 57 | Compound (I-1) + Azoxystrobin | (5:0.05) | 100:1 | 63 | 51 | 12 |
| 58 | Compound (I-1) + Azoxystrobin | (20:0.05) | 400:1 | 84 | 60 | 24 |
| 59 | Compound (I-1) + Azoxystrobin | (1:0.1) | 10:1 | 79 | 59 | 20 |
| 60 | Compound (I-1) + Azoxystrobin | (5:0.1) | 50:1 | 82 | 63 | 19 |
| 61 | Compound (I-1) + Azoxystrobin | (20:0.1) | 200:1 | 89 | 69 | 20 |

TABLE-B1-continued

The synergistic fungicidal activity of the compositions of the present invention, wherein the representative compounds of formula (I) is particularly compound (I-1) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 62 | Compound (I-1) + Metominostrobin | (20:0.05) | 400:1 | 74 | 56 | 18 |
| 63 | Compound (I-1) + Metominostrobin | (1:0.1) | 10:1 | 58 | 45 | 13 |
| 64 | Compound (I-1) + Metominostrobin | (5:0.1) | 50:1 | 71 | 49 | 22 |
| 65 | Compound (I-1) + Metominostrobin | (20:0.1) | 200:1 | 79 | 59 | 20 |
| 66 | Compound (I-1) + Folpet | (20:0.05) | 400:1 | 66 | 47 | 19 |
| 67 | Compound (I-1) + Folpet | (1:0.1) | 10:1 | 53 | 33 | 20 |
| 68 | Compound (I-1) + Folpet | (5:0.1) | 50:1 | 55 | 38 | 17 |
| 69 | Compound (I-1) + Folpet | (20:0.1) | 200:1 | 71 | 50 | 21 |
| 70 | Compound (I-1) + Tebuconazole | (5:0.05) | 100:1 | 71 | 52 | 19 |
| 71 | Compound (I-1) + Tebuconazole | (20:0.05) | 400:1 | 87 | 60 | 26 |
| 72 | Compound (I-1) + Tebuconazole | (1:0.1) | 10:1 | 79 | 63 | 16 |
| 73 | Compound (I-1) + Tebuconazole | (5:0.1) | 50:1 | 87 | 66 | 21 |
| 74 | Compound (I-1) + Tebuconazole | (20:0.1) | 200:1 | 89 | 72 | 17 |
| 75 | Compound (I-1) + Mancozeb | (1:0.1) | 10:1 | 46 | 33 | 13 |
| 76 | Compound (I-1) + Mancozeb | (5:0.1) | 50:1 | 49 | 38 | 10 |
| 77 | Compound (I-1) + Propineb | (20:0.05) | 400:1 | 62 | 52 | 10 |

TABLE-B2

The synergistic fungicidal activity of the compositions of the present invention, wherein the representative compounds of formula (I) is particularly compound (I-2) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-2) | 1 | | 13 | | |
| 2 | Compound (I-2) | 5 | | 23 | | |
| 3 | Compound (I-2) | 20 | | 33 | | |
| 4 | Mefentrifluconazole | 0.05 | | 12 | | |
| 5 | Mefentrifluconazole | 0.1 | | 26 | | |
| 6 | Prothioconazole | 0.05 | | 20 | | |
| 7 | Prothioconazole | 0.1 | | 31 | | |
| 8 | Pyraclostrobin | 0.05 | | 21 | | |
| 9 | Pyraclostrobin | 0.1 | | 28 | | |
| 10 | Trifloxystrobin | 0.05 | | 33 | | |
| 11 | Trifloxystrobin | 0.1 | | 40 | | |
| 12 | Boscalid | 0.05 | | 13 | | |
| 13 | Boscalid | 0.1 | | 26 | | |
| 14 | Bixafen | 0.05 | | 11 | | |
| 15 | Bixafen | 0.1 | | 29 | | |
| 16 | Difenconazole | 0.05 | | 42 | | |
| 17 | Difenconazole | 0.1 | | 47 | | |
| 18 | Fluxapyroxad | 0.05 | | 40 | | |
| 19 | Fluxapyroxad | 0.1 | | 56 | | |
| 20 | Azoxystrobin | 0.05 | | 33 | | |
| 21 | Azoxystrobin | 0.1 | | 49 | | |
| 22 | Picoxystrobin | 0.05 | | 23 | | |
| 23 | Picoxystrobin | 0.1 | | 26 | | |
| 24 | Fluazinam | 0.05 | | 7 | | |
| 25 | Fluazinam | 0.1 | | 16 | | |
| 26 | Metominostrobin | 0.05 | | 26 | | |
| 27 | Metominostrobin | 0.1 | | 31 | | |
| 28 | Folpet | 0.05 | | 12 | | |

TABLE-B2-continued

The synergistic fungicidal activity of the compositions of the present invention, wherein the representative compounds of formula (I) is particularly compound (I-2) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 29 | Folpet | 0.1 | | 16 | | |
| 30 | Tebuconazole | 0.05 | | 34 | | |
| 31 | Tebuconazole | 0.1 | | 54 | | |
| 32 | Fluopyram | 0.05 | | 26 | | |
| 33 | Fluopyram | 0.1 | | 35 | | |
| 34 | Mancozeb | 0.05 | | 14 | | |
| 35 | Mancozeb | 0.1 | | 16 | | |
| 36 | Propineb | 0.05 | | 20 | | |
| 37 | Propineb | 0.1 | | 31 | | |
| 38 | Metiram | 0.05 | | 26 | | |
| 39 | Metiram | 0.1 | | 30 | | |
| 40 | Benzovindiflupyr | 0.05 | | 14 | | |
| 41 | Benzovindiflupyr | 0.1 | | 29 | | |
| 42 | Fluindapyr | 0.05 | | 14 | | |
| 43 | Fluindapyr | 0.1 | | 29 | | |
| 44 | Inpyrfluxam | 0.05 | | 14 | | |
| 45 | Inpyrfluxam | 0.1 | | 23 | | |
| 46 | Dithianon | 0.05 | | 21 | | |
| 47 | Dithianon | 0.1 | | 26 | | |
| 48 | Compound (I-2) + Mefentrifluconazole | (1:0.05) | 20:1 | 61 | 24 | 37 |
| 49 | Compound (I-2) + Mefentrifluconazole | (5:0.05) | 100:1 | 67 | 33 | 34 |
| 50 | Compound (I-2) + Mefentrifluconazole | (20:0.05) | 400:1 | 81 | 41 | 39 |
| 51 | Compound (I-2) + Mefentrifluconazole | (1:0.1) | 10:1 | 69 | 36 | 34 |
| 52 | Compound (I-2) + Mefentrifluconazole | (5:0.1) | 50:1 | 78 | 43 | 35 |
| 53 | Compound (I-2) + Mefentrifluconazole | (20:0.1) | 200:1 | 86 | 51 | 35 |
| 54 | Compound (I-2) + Prothioconazole | (1:0.05) | 20:1 | 61 | 31 | 30 |
| 55 | Compound (I-2) + Prothioconazole | (5:0.05) | 100:1 | 69 | 39 | 31 |
| 56 | Compound (I-2) + Prothioconazole | (20:0.05) | 400:1 | 75 | 47 | 28 |
| 57 | Compound (I-2) + Prothioconazole | (1:0.1) | 10:1 | 69 | 40 | 29 |
| 58 | Compound (I-2) + Prothioconazole | (5:0.1) | 50:1 | 78 | 47 | 31 |
| 59 | Compound (I-2) + Prothioconazole | (20:0.1) | 200:1 | 89 | 54 | 35 |
| 60 | Compound (I-2) + Pyraclostrobin | (1:0.05) | 20:1 | 64 | 32 | 32 |
| 61 | Compound (I-2) + Pyraclostrobin | (5:0.05) | 100:1 | 69 | 39 | 30 |
| 62 | Compound (I-2) + Pyraclostrobin | (20:0.05) | 400:1 | 78 | 47 | 30 |
| 63 | Compound (I-2) + Pyraclostrobin | (1:0.1) | 10:1 | 64 | 38 | 26 |
| 64 | Compound (I-2) + Pyraclostrobin | (5:0.1) | 50:1 | 78 | 45 | 33 |
| 65 | Compound (I-2) + Pyraclostrobin | (20:0.1) | 200:1 | 81 | 52 | 29 |
| 66 | Compound (I-2) + Trifloxystrobin | (5:0.05) | 100:1 | 61 | 49 | 12 |
| 67 | Compound (I-2) + Trifloxystrobin | (20:0.05) | 400:1 | 67 | 55 | 11 |
| 68 | Compound (I-2) + Trifloxystrobin | (1:0.1) | 10:1 | 61 | 48 | 13 |
| 69 | Compound (I-2) + Trifloxystrobin | (5:0.1) | 50:1 | 67 | 54 | 13 |
| 70 | Compound (I-2) + Boscalid | (5:0.05) | 100:1 | 53 | 33 | 19 |
| 71 | Compound (I-2) + Boscalid | (20:0.05) | 400:1 | 67 | 42 | 25 |
| 72 | Compound (I-2) + Boscalid | (1:0.1) | 10:1 | 56 | 36 | 20 |
| 73 | Compound (I-2) + Boscalid | (5:0.1) | 50:1 | 67 | 43 | 23 |

TABLE-B2-continued

The synergistic fungicidal activity of the compositions of the present invention, wherein the representative compounds of formula (I) is particularly compound (I-2) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 74 | Compound (I-2) + Boscalid | (20:0.1) | 200:1 | 72 | 51 | 22 |
| 75 | Compound (I-2) + Bixafen | (1:0.05) | 20:1 | 44 | 23 | 22 |
| 76 | Compound (I-2) + Bixafen | (5:0.05) | 100:1 | 56 | 32 | 24 |
| 77 | Compound (I-2) + Bixafen | (20:0.05) | 400:1 | 69 | 41 | 29 |
| 78 | Compound (I-2) + Bixafen | (1:0.1) | 10:1 | 61 | 38 | 23 |
| 79 | Compound (I-2) + Bixafen | (5:0.1) | 50:1 | 69 | 46 | 24 |
| 80 | Compound (I-2) + Bixafen | (20:0.1) | 200:1 | 81 | 53 | 28 |
| 81 | Compound (I-2) + Difenconazole | (5:0.05) | 100:1 | 69 | 56 | 14 |
| 82 | Compound (I-2) + Difenconazole | (1:0.1) | 10:1 | 69 | 54 | 15 |
| 83 | Compound (I-2) + Difenconazole | (5:0.1) | 50:1 | 81 | 59 | 21 |
| 84 | Compound (I-2) + Difenconazole | (20:0.1) | 200:1 | 83 | 65 | 19 |
| 85 | Compound (I-2) + Fluxapyroxad | (1:0.05) | 20:1 | 61 | 48 | 13 |
| 86 | Compound (I-2) + Fluxapyroxad | (5:0.05) | 100:1 | 69 | 54 | 15 |
| 87 | Compound (I-2) + Fluxapyroxad | (20:0.05) | 400:1 | 83 | 60 | 23 |
| 88 | Compound (I-2) + Fluxapyroxad | (1:0.1) | 10:1 | 78 | 62 | 16 |
| 89 | Compound (I-2) + Fluxapyroxad | (5:0.1) | 50:1 | 83 | 66 | 17 |
| 90 | Compound (I-2) + Fluxapyroxad | (20:0.1) | 200:1 | 86 | 71 | 15 |
| 91 | Compound (I-2) + Azoxystrobin | (1:0.05) | 20:1 | 67 | 42 | 25 |
| 92 | Compound (I-2) + Azoxystrobin | (5:0.05) | 100:1 | 69 | 49 | 21 |
| 93 | Compound (I-2) + Azoxystrobin | (20:0.05) | 400:1 | 89 | 55 | 34 |
| 94 | Compound (I-2) + Azoxystrobin | (1:0.1) | 10:1 | 81 | 56 | 25 |
| 95 | Compound (I-2) + Azoxystrobin | (5:0.1) | 50:1 | 89 | 61 | 28 |
| 96 | Compound (I-2) + Azoxystrobin | (20:0.1) | 200:1 | 92 | 66 | 26 |
| 97 | Compound (I-2) + Picoxystrobin | (20:0.05) | 400:1 | 69 | 49 | 21 |
| 98 | Compound (I-2) + Picoxystrobin | (1:0.1) | 10:1 | 50 | 36 | 14 |
| 99 | Compound (I-2) + Picoxystrobin | (5:0.1) | 50:1 | 64 | 43 | 21 |
| 100 | Compound (I-2) + Picoxystrobin | (20:0.1) | 200:1 | 72 | 51 | 22 |
| 101 | Compound (I-2) + Fluazinam | (5:0.05) | 100:1 | 47 | 29 | 19 |
| 102 | Compound (I-2) + Fluazinam | (20:0.05) | 400:1 | 58 | 38 | 20 |
| 103 | Compound (I-2) + Fluazinam | (1:0.1) | 10:1 | 50 | 27 | 23 |
| 104 | Compound (I-2) + Fluazinam | (5:0.1) | 50:1 | 56 | 36 | 20 |
| 105 | Compound (I-2) + Fluazinam | (20:0.1) | 200:1 | 61 | 44 | 17 |
| 106 | Compound (I-2) + Metominostrobin | (20:0.05) | 400:1 | 81 | 51 | 30 |
| 107 | Compound (I-2) + Metominostrobin | (1:0.1) | 10:1 | 61 | 40 | 21 |
| 108 | Compound (I-2) + Metominostrobin | (5:0.1) | 50:1 | 72 | 47 | 25 |

TABLE-B2-continued

The synergistic fungicidal activity of the compositions of the present invention, wherein the representative compounds of formula (I) is particularly compound (I-2) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 109 | Compound (I-2) + Metominostrobin | (20:0.1) | 200:1 | 86 | 54 | 32 |
| 110 | Compound (I-2) + Folpet | (1:0.05) | 20:1 | 44 | 24 | 21 |
| 111 | Compound (I-2) + Folpet | (5:0.05) | 100:1 | 56 | 33 | 23 |
| 112 | Compound (I-2) + Folpet | (20:0.05) | 400:1 | 69 | 41 | 28 |
| 113 | Compound (I-2) + Folpet | (1:0.1) | 10:1 | 61 | 27 | 34 |
| 114 | Compound (I-2) + Folpet | (5:0.1) | 50:1 | 67 | 36 | 31 |
| 115 | Compound (I-2) + Folpet | (20:0.1) | 200:1 | 72 | 44 | 28 |
| 116 | Compound (I-2) + Tebuconazole | (1:0.05) | 20:1 | 78 | 43 | 35 |
| 117 | Compound (I-2) + Tebuconazole | (5:0.05) | 100:1 | 83 | 49 | 34 |
| 118 | Compound (I-2) + Tebuconazole | (20:0.05) | 400:1 | 89 | 56 | 33 |
| 119 | Compound (I-2) + Tebuconazole | (1:0.1) | 10:1 | 83 | 60 | 23 |
| 120 | Compound (I-2) + Tebuconazole | (5:0.1) | 50:1 | 86 | 65 | 21 |
| 121 | Compound (I-2) + Tebuconazole | (20:0.1) | 200:1 | 92 | 69 | 22 |
| 122 | Compound (I-2) + Fluopyram | (1:0.05) | 20:1 | 59 | 36 | 23 |
| 123 | Compound (I-2) + Fluopyram | (5:0.05) | 100:1 | 68 | 43 | 24 |
| 124 | Compound (I-2) + Fluopyram | (20:0.05) | 400:1 | 76 | 51 | 26 |
| 125 | Compound (I-2) + Fluopyram | (5:0.1) | 50:1 | 76 | 50 | 26 |
| 126 | Compound (I-2) + Fluopyram | (20:0.1) | 200:1 | 88 | 57 | 32 |
| 127 | Compound (I-2) + Mancozeb | (1:0.05) | 20:1 | 62 | 25 | 36 |
| 128 | Compound (I-2) + Mancozeb | (5:0.05) | 100:1 | 71 | 34 | 37 |
| 129 | Compound (I-2) + Mancozeb | (20:0.05) | 400:1 | 79 | 43 | 37 |
| 130 | Compound (I-2) + Mancozeb | (1:0.1) | 10:1 | 68 | 27 | 40 |
| 131 | Compound (I-2) + Mancozeb | (5:0.1) | 50:1 | 82 | 36 | 47 |
| 132 | Compound (I-2) + Mancozeb | (20:0.1) | 200:1 | 88 | 44 | 44 |
| 133 | Compound (I-2) + Propineb | (1:0.05) | 20:1 | 76 | 31 | 46 |
| 134 | Compound (I-2) + Propineb | (5:0.05) | 100:1 | 79 | 39 | 41 |
| 135 | Compound (I-2) + Propineb | (20:0.05) | 400:1 | 91 | 47 | 45 |
| 136 | Compound (I-2) + Propineb | (1:0.1) | 10:1 | 79 | 40 | 39 |
| 137 | Compound (I-2) + Propineb | (5:0.1) | 50:1 | 85 | 47 | 38 |
| 138 | Compound (I-2) + Propineb | (20:0.1) | 200:1 | 94 | 54 | 40 |
| 139 | Compound (I-2) + Metiram | (1:0.05) | 20:1 | 59 | 36 | 23 |
| 140 | Compound (I-2) + Metiram | (5:0.05) | 100:1 | 65 | 43 | 21 |
| 141 | Compound (I-2) + Metiram | (20:0.05) | 400:1 | 74 | 51 | 23 |
| 142 | Compound (I-2) + Metiram | (1:0.1) | 10:1 | 62 | 39 | 22 |
| 143 | Compound (I-2) + Metiram | (5:0.1) | 50:1 | 71 | 46 | 24 |

TABLE-B2-continued

The synergistic fungicidal activity of the compositions of the present invention, wherein the representative compounds of formula (I) is particularly compound (I-2) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 144 | Compound (I-2) + Metiram | (20:0.1) | 200:1 | 76 | 53 | 23 |
| 145 | Compound (I-2) + Benzovindiflupyr | (1:0.05) | 20:1 | 71 | 25 | 45 |
| 146 | Compound (I-2) + Benzovindiflupyr | (5:0.05) | 100:1 | 82 | 34 | 48 |
| 147 | Compound (I-2) + Benzovindiflupyr | (20:0.05) | 400:1 | 88 | 43 | 46 |
| 148 | Compound (I-2) + Benzovindiflupyr | (1:0.1) | 10:1 | 79 | 38 | 41 |
| 149 | Compound (I-2) + Benzovindiflupyr | (5:0.1) | 50:1 | 85 | 46 | 40 |
| 150 | Compound (I-2) + Benzovindiflupyr | (20:0.1) | 200:1 | 91 | 53 | 39 |
| 151 | Compound (I-2) + Fluindapyr | (1:0.05) | 20:1 | 44 | 25 | 19 |
| 152 | Compound (I-2) + Fluindapyr | (5:0.05) | 100:1 | 66 | 34 | 32 |
| 153 | Compound (I-2) + Fluindapyr | (20:0.05) | 400:1 | 59 | 43 | 16 |
| 154 | Compound (I-2) + Fluindapyr | (1:0.1) | 10:1 | 53 | 38 | 14 |
| 155 | Compound (I-2) + Fluindapyr | (5:0.1) | 50:1 | 59 | 46 | 13 |
| 156 | Compound (I-2) + Fluindapyr | (20:0.1) | 200:1 | 68 | 53 | 15 |
| 157 | Compound (I-2) + Inpyrfluxam | (1:0.05) | 20:1 | 53 | 25 | 27 |
| 158 | Compound (I-2) + Inpyrfluxam | (5:0.05) | 100:1 | 62 | 34 | 28 |
| 159 | Compound (I-2) + Inpyrfluxam | (20:0.05) | 400:1 | 68 | 43 | 25 |
| 160 | Compound (I-2) + Inpyrfluxam | (1:0.1) | 10:1 | 65 | 33 | 31 |
| 161 | Compound (I-2) + Inpyrfluxam | (5:0.1) | 50:1 | 68 | 41 | 27 |
| 162 | Compound (I-2) + Inpyrfluxam | (20:0.1) | 200:1 | 76 | 49 | 28 |
| 163 | Compound (I-2) + Dithianon | (1:0.05) | 20:1 | 53 | 32 | 21 |
| 164 | Compound (I-2) + Dithianon | (5:0.05) | 100:1 | 56 | 39 | 16 |
| 165 | Compound (I-2) + Dithianon | (20:0.05) | 400:1 | 76 | 47 | 29 |
| 166 | Compound (I-2) + Dithianon | (1:0.1) | 10:1 | 59 | 36 | 23 |
| 167 | Compound (I-2) + Dithianon | (5:0.1) | 50:1 | 65 | 43 | 21 |
| 168 | Compound (I-2) + Dithianon | (20:0.1) | 200:1 | 79 | 51 | 29 |

TABLE-B3

The synergistic fungicidal activity of the compositions of the present invention, wherein the representative compounds of formula (I) is particularly compound (I-3) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 1 | Compound (I-3) | 1 | | 17 | | |
| 2 | Compound (I-3) | 5 | | 23 | | |
| 3 | Compound (I-3) | 20 | | 43 | | |
| 4 | Mefentrifluconazole | 0.05 | | 12 | | |
| 5 | Mefentrifluconazole | 0.1 | | 26 | | |

TABLE-B3-continued

The synergistic fungicidal activity of the compositions of the present invention, wherein the representative compounds of formula (I) is particularly compound (I-3) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 6 | Prothioconazole | 0.05 | | 20 | | |
| 7 | Prothioconazole | 0.1 | | 31 | | |
| 8 | Pyraclostrobin | 0.1 | | 28 | | |
| 9 | Trifloxystrobin | 0.1 | | 40 | | |
| 10 | Boscalid | 0.05 | | 13 | | |
| 11 | Boscalid | 0.1 | | 26 | | |
| 12 | Bixafen | 0.05 | | 11 | | |
| 13 | Bixafen | 0.1 | | 29 | | |
| 14 | Fluxapyroxad | 0.05 | | 40 | | |
| 15 | Fluxapyroxad | 0.1 | | 56 | | |
| 16 | Azoxystrobin | 0.05 | | 33 | | |
| 17 | Azoxystrobin | 0.1 | | 49 | | |
| 18 | Picoxystrobin | 0.05 | | 23 | | |
| 19 | Picoxystrobin | 0.1 | | 26 | | |
| 20 | Fluazinam | 0.05 | | 7 | | |
| 21 | Fluazinam | 0.1 | | 16 | | |
| 22 | Metominostrobin | 0.1 | | 31 | | |
| 23 | Folpet | 0.05 | | 12 | | |
| 24 | Folpet | 0.1 | | 16 | | |
| 25 | Tebuconazole | 0.05 | | 34 | | |
| 26 | Tebuconazole | 0.1 | | 54 | | |
| 27 | Fluopyram | 0.05 | | 26 | | |
| 28 | Fluopyram | 0.1 | | 35 | | |
| 29 | Mancozeb | 0.05 | | 14 | | |
| 30 | Mancozeb | 0.1 | | 16 | | |
| 31 | Benzovindiflupyr | 0.05 | | 14 | | |
| 32 | Benzovindiflupyr | 0.1 | | 29 | | |
| 33 | Fluindapyr | 0.05 | | 14 | | |
| 34 | Fluindapyr | 0.1 | | 29 | | |
| 35 | Dithionon | 0.05 | | 21 | | |
| 36 | Dithionon | 0.1 | | 26 | | |
| 37 | Compound (I-3) + Mefentrifluconazole | (1:0.05) | 20:1 | 56 | 27 | 29 |
| 38 | Compound (I-3) + Mefentrifluconazole | (5:0.05) | 100:1 | 61 | 33 | 29 |
| 39 | Compound (I-3) + Mefentrifluconazole | (20:0.05) | 400:1 | 81 | 50 | 30 |
| 40 | Compound (I-3) + Mefentrifluconazole | (1:0.1) | 10:1 | 69 | 38 | 31 |
| 41 | Compound (I-3) + Mefentrifluconazole | (5:0.1) | 50:1 | 81 | 43 | 37 |
| 42 | Compound (I-3) + Mefentrifluconazole | (20:0.1) | 200:1 | 92 | 58 | 34 |
| 43 | Compound (I-3) + Prothioconazole | (1:0.05) | 20:1 | 56 | 33 | 22 |
| 44 | Compound (I-3) + Prothioconazole | (5:0.05) | 100:1 | 64 | 39 | 25 |
| 45 | Compound (I-3) + Prothioconazole | (20:0.05) | 400:1 | 72 | 55 | 18 |
| 46 | Compound (I-3) + Prothioconazole | (1:0.1) | 10:1 | 69 | 43 | 27 |
| 47 | Compound (I-3) + Prothioconazole | (5:0.1) | 50:1 | 83 | 47 | 36 |
| 48 | Compound (I-3) + Prothioconazole | (20:0.1) | 200:1 | 86 | 61 | 25 |
| 49 | Compound (I-3) + Pyraclostrobin | (1:0.1) | 10:1 | 56 | 40 | 16 |
| 50 | Compound (I-3) + Pyraclostrobin | (5:0.1) | 50:1 | 61 | 45 | 16 |
| 51 | Compound (I-3) + Pyraclostrobin | (20:0.1) | 200:1 | 69 | 59 | 10 |
| 52 | Compound (I-3) + Trifloxystrobin | (20:0.1) | 200:1 | 78 | 66 | 12 |
| 53 | Compound (I-3) + Boscalid | (1:0.05) | 20:1 | 47 | 28 | 20 |
| 54 | Compound (I-3) + Boscalid | (5:0.05) | 100:1 | 56 | 33 | 22 |
| 55 | Compound (I-3) + Boscalid | (20:0.05) | 400:1 | 64 | 51 | 13 |

TABLE-B3-continued

The synergistic fungicidal activity of the compositions of the present invention, wherein the representative compounds of formula (I) is particularly compound (I-3) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/(I-3) alculated Efficacy | Synergy (Colby's) |
|---|---|---|---|---|---|---|
| 56 | Compound (I-3) + Boscalid | (1:0.1) | 10:1 | 67 | 38 | 28 |
| 57 | Compound (I-3) + Boscalid | (5:0.1) | 50:1 | 78 | 43 | 35 |
| 58 | Compound (I-3) + Boscalid | (20:0.1) | 200:1 | 81 | 58 | 22 |
| 59 | Compound (I-3) + Bixafen | (1:0.05) | 20:1 | 67 | 26 | 41 |
| 60 | Compound (I-3) + Bixafen | (5:0.05) | 100:1 | 78 | 32 | 46 |
| 61 | Compound (I-3) + Bixafen | (20:0.05) | 400:1 | 81 | 50 | 31 |
| 62 | Compound (I-3) + Bixafen | (1:0.1) | 10:1 | 83 | 41 | 43 |
| 63 | Compound (I-3) + Bixafen | (5:0.1) | 50:1 | 86 | 46 | 41 |
| 64 | Compound (I-3) + Bixafen | (20:0.1) | 200:1 | 89 | 60 | 29 |
| 65 | Compound (I-3) + Fluxapyroxad | (1:0.05) | 20:1 | 72 | 50 | 22 |
| 66 | Compound (I-3) + Fluxapyroxad | (5:0.05) | 100:1 | 75 | 54 | 21 |
| 67 | Compound (I-3) + Fluxapyroxad | (20:0.05) | 400:1 | 86 | 66 | 20 |
| 68 | Compound (I-3) + Fluxapyroxad | (1:0.1) | 10:1 | 81 | 63 | 17 |
| 69 | Compound (I-3) + Fluxapyroxad | (5:0.1) | 50:1 | 83 | 66 | 17 |
| 70 | Compound (I-3) + Fluxapyroxad | (20:0.1) | 200:1 | 89 | 75 | 14 |
| 71 | Compound (I-3) + Azoxystrobin | (20:0.05) | 400:1 | 75 | 62 | 13 |
| 72 | Compound (I-3) + Azoxystrobin | (1:0.1) | 10:1 | 69 | 58 | 12 |
| 73 | Compound (I-3) + Azoxystrobin | (5:0.1) | 50:1 | 72 | 61 | 11 |
| 74 | Compound (I-3) + Picoxystrobin | (20:0.05) | 400:1 | 75 | 56 | 19 |
| 75 | Compound (I-3) + Picoxystrobin | (1:0.1) | 10:1 | 69 | 38 | 31 |
| 76 | Compound (I-3) + Picoxystrobin | (5:0.1) | 50:1 | 72 | 43 | 29 |
| 77 | Compound (I-3) + Picoxystrobin | (20:0.1) | 200:1 | 81 | 58 | 22 |
| 78 | Compound (I-3) + Fluazinam | (5:0.05) | 100:1 | 39 | 29 | 10 |
| 79 | Compound (I-3) + Fluazinam | (1:0.1) | 10:1 | 50 | 30 | 20 |
| 80 | Compound (I-3) + Fluazinam | (5:0.1) | 50:1 | 56 | 36 | 20 |
| 81 | Compound (I-3) + Metominostrobin | (1:0.1) | 10:1 | 61 | 43 | 19 |
| 82 | Compound (I-3) + Metominostrobin | (5:0.1) | 50:1 | 69 | 47 | 22 |
| 83 | Compound (I-3) + Metominostrobin | (20:0.1) | 200:1 | 72 | 61 | 11 |
| 84 | Compound (I-3) + Folpet | (1:0.05) | 20:1 | 44 | 27 | 18 |
| 85 | Compound (I-3) + Folpet | (5:0.05) | 100:1 | 56 | 33 | 23 |
| 86 | Compound (I-3) + Folpet | (20:0.05) | 400:1 | 81 | 50 | 30 |
| 87 | Compound (I-3) + Folpet | (1:0.1) | 10:1 | 69 | 30 | 39 |
| 88 | Compound (I-3) + Folpet | (5:0.1) | 50:1 | 78 | 36 | 42 |
| 89 | Compound (I-3) + Folpet | (20:0.1) | 200:1 | 86 | 52 | 34 |
| 90 | Compound (I-3) + Tebuconazole | (1:0.05) | 20:1 | 69 | 45 | 24 |

TABLE-B3-continued

The synergistic fungicidal activity of the compositions of the present invention, wherein the representative compounds of formula (I) is particularly compound (I-3) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 91 | Compound (I-3) + Tebuconazole | (5:0.05) | 100:1 | 75 | 49 | 26 |
| 92 | Compound (I-3) + Tebuconazole | (20:0.05) | 400:1 | 92 | 63 | 29 |
| 93 | Compound (I-3) + Tebuconazole | (1:0.1) | 10:1 | 83 | 62 | 22 |
| 94 | Compound (I-3) + Tebuconazole | (5:0.1) | 50:1 | 89 | 65 | 24 |
| 95 | Compound (I-3) + Tebuconazole | (20:0.1) | 200:1 | 94 | 74 | 21 |
| 96 | Compound (I-3) + Fluopyram | (1:0.05) | 20:1 | 49 | 38 | 10 |
| 97 | Compound (I-3) + Fluopyram | (5:0.05) | 100:1 | 62 | 43 | 19 |
| 98 | Compound (I-3) + Fluopyram | (20:0.05) | 400:1 | 68 | 58 | 10 |
| 99 | Compound (I-3) + Fluopyram | (5:0.1) | 50:1 | 68 | 50 | 17 |
| 100 | Compound (I-3) + Mancozeb | (1:0.05) | 20:1 | 41 | 28 | 12 |
| 101 | Compound (I-3) + Mancozeb | (5:0.05) | 100:1 | 51 | 34 | 17 |
| 102 | Compound (I-3) + Mancozeb | (20:0.05) | 400:1 | 62 | 51 | 11 |
| 103 | Compound (I-3) + Mancozeb | (1:0.1) | 10:1 | 49 | 30 | 19 |
| 104 | Compound (I-3) + Mancozeb | (5:0.1) | 50:1 | 62 | 36 | 27 |
| 105 | Compound (I-3) + Mancozeb | (20:0.1) | 200:1 | 68 | 52 | 15 |
| 106 | Compound (I-3) + Benzovindiflupyr | (1:0.05) | 20:1 | 41 | 28 | 12 |
| 107 | Compound (I-3) + Benzovindiflupyr | (5:0.05) | 100:1 | 51 | 34 | 17 |
| 108 | Compound (I-3) + Benzovindiflupyr | (20:0.05) | 400:1 | 62 | 51 | 11 |
| 109 | Compound (I-3) + Benzovindiflupyr | (1:0.1) | 10:1 | 51 | 41 | 11 |
| 110 | Compound (I-3) + Benzovindiflupyr | (5:0.1) | 50:1 | 62 | 46 | 17 |
| 111 | Compound (I-3) + Fluindapyr | (5:0.05) | 100:1 | 46 | 34 | 12 |
| 112 | Compound (I-3) + Fluindapyr | (20:0.05) | 400:1 | 62 | 51 | 11 |
| 113 | Compound (I-3) + Fluindapyr | (5:0.1) | 50:1 | 57 | 46 | 11 |
| 114 | Compound (I-3) + Dithionon | (5:0.05) | 100:1 | 51 | 39 | 12 |
| 115 | Compound (I-3) + Dithionon | (5:0.1) | 50:1 | 57 | 43 | 13 |

TABLE-B4

The synergistic fungicidal activity of the compositions of the present invention, wherein the representative compounds of compounds of formula (I) is particularly compound (I-4) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-4) | 1 | | 20 | | |
| 2 | Compound (I-4) | 5 | | 27 | | |
| 3 | Compound (I-4) | 20 | | 37 | | |
| 4 | Mefentrifluconazole | 0.05 | | 12 | | |
| 5 | Mefentrifluconazole | 0.1 | | 26 | | |

TABLE-B4-continued

The synergistic fungicidal activity of the compositions of the present invention, wherein the representative compounds of compounds of formula (I) is particularly compound (I-4) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 6 | Prothioconazole | 0.05 | | 20 | | |
| 7 | Prothioconazole | 0.1 | | 31 | | |
| 8 | Bixafen | 0.05 | | 11 | | |
| 9 | Bixafen | 0.1 | | 29 | | |
| 10 | Difenconazole | 0.1 | | 47 | | |
| 11 | Fluazinam | 0.05 | | 7 | | |
| 12 | Fluazinam | 0.1 | | 16 | | |
| 13 | Metominostrobin | 0.05 | | 26 | | |
| 14 | Metominostrobin | 0.1 | | 31 | | |
| 15 | Folpet | 0.1 | | 16 | | |
| 16 | Tebuconazole | 0.05 | | 34 | | |
| 17 | Fluopyram | 0.05 | | 26 | | |
| 18 | Fluopyram | 0.1 | | 35 | | |
| 19 | Mancozeb | 0.05 | | 14 | | |
| 20 | Mancozeb | 0.1 | | 16 | | |
| 21 | Propineb | 0.05 | | 20 | | |
| 22 | Propineb | 0.1 | | 31 | | |
| 23 | Metiram | 0.05 | | 26 | | |
| 24 | Metiram | 0.1 | | 30 | | |
| 25 | Benzovindiflupyr | 0.05 | | 14 | | |
| 26 | Benzovindiflupyr | 0.1 | | 29 | | |
| 27 | Fluindapyr | 0.05 | | 14 | | |
| 28 | Fluindapyr | 0.1 | | 29 | | |
| 29 | Inpyrfluxam | 0.05 | | 14 | | |
| 30 | Inpyrfluxam | 0.1 | | 23 | | |
| 31 | Dithianon | 0.05 | | 21 | | |
| 32 | Dithianon | 0.1 | | 26 | | |
| 33 | Compound (I-4) + Mefentrifluconazole | (1:0.05) | 20:1 | 47 | 30 | 18 |
| 34 | Compound (I-4) + Mefentrifluconazole | (5:0.05) | 100:1 | 56 | 35 | 20 |
| 35 | Compound (I-4) + Mefentrifluconazole | (20:0.05) | 400:1 | 69 | 44 | 25 |
| 36 | Compound (I-4) + Mefentrifluconazole | (1:0.1) | 10:1 | 61 | 41 | 20 |
| 37 | Compound (I-4) + Mefentrifluconazole | (5:0.1) | 50:1 | 72 | 46 | 26 |
| 38 | Compound (I-4) + Mefentrifluconazole | (20:0.1) | 200:1 | 75 | 53 | 22 |
| 39 | Compound (I-4) + Prothioconazole | (1:0.05) | 20:1 | 50 | 36 | 14 |
| 40 | Compound (I-4) + Prothioconazole | (5:0.05) | 100:1 | 56 | 41 | 14 |
| 41 | Compound (I-4) + Prothioconazole | (20:0.05) | 400:1 | 67 | 49 | 17 |
| 42 | Compound (I-4) + Prothioconazole | (20:0.1) | 200:1 | 72 | 56 | 16 |
| 43 | Compound (I-4) + Bixafen | (5:0.05) | 100:1 | 64 | 35 | 29 |
| 44 | Compound (I-4) + Bixafen | (20:0.05) | 400:1 | 78 | 44 | 34 |
| 45 | Compound (I-4) + Bixafen | (1:0.1) | 10:1 | 67 | 43 | 23 |
| 46 | Compound (I-4) + Bixafen | (5:0.1) | 50:1 | 72 | 48 | 24 |
| 47 | Compound (I-4) + Bixafen | (20:0.1) | 200:1 | 83 | 55 | 28 |
| 48 | Compound (I-4) + Difenconazole | (20:0.1) | 200:1 | 81 | 66 | 14 |
| 49 | Compound (I-4) + Fluazinam | (5:0.05) | 100:1 | 54 | 32 | 22 |
| 50 | Compound (I-4) + Fluazinam | (20:0.05) | 400:1 | 73 | 41 | 32 |
| 51 | Compound (I-4) + Fluazinam | (1:0.1) | 10:1 | 54 | 33 | 21 |
| 52 | Compound (I-4) + Fluazinam | (5:0.1) | 50:1 | 65 | 38 | 26 |
| 53 | Compound (I-4) + Fluazinam | (20:0.1) | 200:1 | 86 | 47 | 40 |
| 54 | Compound (I-4) + Metominostrobin | (20:0.05) | 400:1 | 78 | 53 | 25 |

TABLE-B4-continued

The synergistic fungicidal activity of the compositions of the present invention, wherein the representative compounds of compounds of formula (I) is particularly compound (I-4) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 55 | Compound (I-4) + Metominostrobin | (5:0.1) | 50:1 | 65 | 49 | 15 |
| 56 | Compound (I-4) + Metominostrobin | (20:0.1) | 200:1 | 81 | 56 | 25 |
| 57 | Compound (I-4) + Folpet | (5:0.1) | 50:1 | 49 | 38 | 10 |
| 58 | Compound (I-4) + Folpet | (20:0.1) | 200:1 | 62 | 47 | 15 |
| 59 | Compound (I-4) + Tebuconazole | (20:0.05) | 400:1 | 73 | 58 | 15 |
| 60 | Compound (I-4) + Fluopyram | (1:0.05) | 20:1 | 59 | 41 | 18 |
| 61 | Compound (I-4) + Fluopyram | (5:0.05) | 100:1 | 65 | 46 | 19 |
| 62 | Compound (I-4) + Fluopyram | (20:0.05) | 400:1 | 68 | 53 | 15 |
| 63 | Compound (I-4) + Fluopyram | (1:0.1) | 10:1 | 68 | 48 | 20 |
| 64 | Compound (I-4) + Fluopyram | (5:0.1) | 50:1 | 76 | 52 | 24 |
| 65 | Compound (I-4) + Fluopyram | (20:0.1) | 200:1 | 79 | 59 | 21 |
| 66 | Compound (I-4) + Mancozeb | (1:0.05) | 20:1 | 53 | 31 | 22 |
| 67 | Compound (I-4) + Mancozeb | (5:0.05) | 100:1 | 59 | 37 | 22 |
| 68 | Compound (I-4) + Mancozeb | (20:0.05) | 400:1 | 62 | 46 | 16 |
| 69 | Compound (I-4) + Mancozeb | (1:0.1) | 10:1 | 62 | 33 | 29 |
| 70 | Compound (I-4) + Mancozeb | (5:0.1) | 50:1 | 65 | 38 | 26 |
| 71 | Compound (I-4) + Mancozeb | (20:0.1) | 200:1 | 68 | 47 | 21 |
| 72 | Compound (I-4) + Propineb | (1:0.05) | 20:1 | 50 | 36 | 14 |
| 73 | Compound (I-4) + Propineb | (5:0.05) | 100:1 | 59 | 41 | 17 |
| 74 | Compound (I-4) + Propineb | (20:0.05) | 400:1 | 71 | 49 | 21 |
| 75 | Compound (I-4) + Propineb | (1:0.1) | 10:1 | 59 | 45 | 14 |
| 76 | Compound (I-4) + Propineb | (5:0.1) | 50:1 | 62 | 49 | 12 |
| 77 | Compound (I-4) + Propineb | (20:0.1) | 200:1 | 79 | 56 | 23 |
| 78 | Compound (I-4) + Metiram | (1:0.05) | 20:1 | 59 | 41 | 18 |
| 79 | Compound (I-4) + Metiram | (5:0.05) | 100:1 | 65 | 46 | 19 |
| 80 | Compound (I-4) + Metiram | (20:0.05) | 400:1 | 82 | 53 | 29 |
| 81 | Compound (I-4) + Metiram | (1:0.1) | 10:1 | 68 | 44 | 24 |
| 82 | Compound (I-4) + Metiram | (5:0.1) | 50:1 | 79 | 49 | 31 |
| 83 | Compound (I-4) + Metiram | (20:0.1) | 200:1 | 88 | 56 | 33 |
| 84 | Compound (I-4) + Benzovindiflupyr | (1:0.05) | 20:1 | 47 | 31 | 16 |
| 85 | Compound (I-4) + Benzovindiflupyr | (5:0.05) | 100:1 | 65 | 37 | 28 |
| 86 | Compound (I-4) + Benzovindiflupyr | (20:0.05) | 400:1 | 71 | 46 | 25 |
| 87 | Compound (I-4) + Benzovindiflupyr | (1:0.1) | 10:1 | 59 | 43 | 16 |
| 88 | Compound (I-4) + Benzovindiflupyr | (5:0.1) | 50:1 | 71 | 48 | 23 |
| 89 | Compound (I-4) + Benzovindiflupyr | (20:0.1) | 200:1 | 76 | 55 | 21 |

TABLE-B4-continued

The synergistic fungicidal activity of the compositions of the present invention, wherein the representative compounds of compounds of formula (I) is particularly compound (I-4) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 90 | Compound (I-4) + Fluindapyr | (1:0.05) | 20:1 | 62 | 31 | 31 |
| 91 | Compound (I-4) + Fluindapyr | (5:0.05) | 100:1 | 68 | 37 | 31 |
| 92 | Compound (I-4) + Fluindapyr | (20:0.05) | 400:1 | 79 | 46 | 34 |
| 93 | Compound (I-4) + Fluindapyr | (1:0.1) | 10:1 | 68 | 43 | 24 |
| 94 | Compound (I-4) + Fluindapyr | (5:0.1) | 50:1 | 85 | 48 | 37 |
| 95 | Compound (I-4) + Fluindapyr | (20:0.1) | 200:1 | 94 | 55 | 39 |
| 96 | Compound (I-4) + Inpyrfluxam | (1:0.05) | 20:1 | 65 | 31 | 34 |
| 97 | Compound (I-4) + Inpyrfluxam | (5:0.05) | 100:1 | 71 | 37 | 34 |
| 98 | Compound (I-4) + Inpyrfluxam | (20:0.05) | 400:1 | 79 | 46 | 34 |
| 99 | Compound (I-4) + Inpyrfluxam | (1:0.1) | 10:1 | 71 | 38 | 32 |
| 100 | Compound (I-4) + Inpyrfluxam | (5:0.1) | 50:1 | 79 | 44 | 36 |
| 101 | Compound (I-4) + Inpyrfluxam | (20:0.1) | 200:1 | 91 | 51 | 40 |
| 102 | Compound (I-4) + Dithianon | (1:0.05) | 20:1 | 62 | 37 | 25 |
| 103 | Compound (I-4) + Dithianon | (5:0.05) | 100:1 | 71 | 42 | 29 |
| 104 | Compound (I-4) + Dithianon | (20:0.05) | 400:1 | 79 | 50 | 29 |
| 105 | Compound (I-4) + Dithianon | (1:0.1) | 10:1 | 68 | 41 | 27 |
| 106 | Compound (I-4) + Dithianon | (5:0.1) | 50:1 | 74 | 46 | 28 |
| 107 | Compound (I-4) + Dithianon | (20:0.1) | 200:1 | 76 | 53 | 23 |

TABLE B5

The synergistic fungicidal activity of the compositions of the present invention, wherein the representative compounds of formula (I) is particularly compound (I-5) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-5) | 1 | | 13 | | |
| 2 | Compound (I-5) | 5 | | 17 | | |
| 3 | Compound (I-5) | 20 | | 27 | | |
| 4 | Mefentrifluconazole | 0.05 | | 12 | | |
| 5 | Mefentrifluconazole | 0.1 | | 26 | | |
| 6 | Prothioconazole | 0.05 | | 20 | | |
| 7 | Prothioconazole | 0.1 | | 31 | | |
| 8 | Boscalid | 0.05 | | 13 | | |
| 9 | Boscalid | 0.1 | | 26 | | |
| 10 | Bixafen | 0.05 | | 11 | | |
| 11 | Bixafen | 0.1 | | 29 | | |
| 12 | Difenconazole | 0.05 | | 42 | | |
| 13 | Difenconazole | 0.1 | | 47 | | |
| 14 | Azoxystrobin | 0.05 | | 33 | | |
| 15 | Azoxystrobin | 0.1 | | 49 | | |
| 16 | Picoxystrobin | 0.05 | | 23 | | |
| 17 | Picoxystrobin | 0.1 | | 26 | | |
| 18 | Fluazinam | 0.05 | | 7 | | |
| 19 | Fluazinam | 0.1 | | 16 | | |
| 20 | Metominostrobin | 0.05 | | 26 | | |
| 21 | Metominostrobin | 0.1 | | 31 | | |
| 22 | Folpet | 0.05 | | 12 | | |
| 23 | Folpet | 0.1 | | 16 | | |
| 24 | Tebuconazole | 0.05 | | 34 | | |
| 25 | Tebuconazole | 0.1 | | 54 | | |
| 26 | Fluopyram | 0.05 | | 26 | | |
| 27 | Fluopyram | 0.1 | | 35 | | |
| 28 | Mancozeb | 0.05 | | 14 | | |
| 29 | Mancozeb | 0.1 | | 16 | | |
| 30 | Propineb | 0.05 | | 20 | | |
| 31 | Benzovindiflupyr | 0.05 | | 14 | | |
| 32 | Benzovindiflupyr | 0.1 | | 29 | | |
| 33 | Fluindapyr | 0.05 | | 14 | | |
| 34 | Fluindapyr | 0.1 | | 29 | | |
| 35 | Dithianon | 0.05 | | 21 | | |
| 36 | Dithianon | 0.1 | | 26 | | |

TABLE B5-continued

The synergistic fungicidal activity of the compositions of the present invention, wherein the representative compounds of formula (I) is particularly compound (I-5) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calc-ulated Efficacy | Syn-ergy (Col-by's) |
|---|---|---|---|---|---|---|
| 37 | Compound (I-5) + Mefentrifluconazole | (1:0.05) | 20:1 | 47 | 24 | 23 |
| 38 | Compound (I-5) + Mefentrifluconazole | (5:0.05) | 100:1 | 56 | 27 | 29 |
| 39 | Compound (I-5) + Mefentrifluconazole | (20:0.05) | 400:1 | 69 | 35 | 34 |
| 40 | Compound (I-5) + Mefentrifluconazole | (1:0.1) | 10:1 | 61 | 36 | 25 |
| 41 | Compound (I-5) + Mefentrifluconazole | (5:0.1) | 50:1 | 72 | 38 | 34 |
| 42 | Compound (I-5) + Mefentrifluconazole | (20:0.1) | 200:1 | 75 | 46 | 29 |
| 43 | Compound (I-5) + Prothioconazole | (1:0.05) | 20:1 | 50 | 31 | 19 |
| 44 | Compound (I-5) + Prothioconazole | (5:0.05) | 100:1 | 56 | 33 | 22 |
| 45 | Compound (I-5) + Prothioconazole | (20:0.05) | 400:1 | 67 | 41 | 25 |
| 46 | Compound (I-5) + Prothioconazole | (20:0.1) | 200:1 | 72 | 49 | 23 |
| 47 | Compound (I-5) + Boscalid | (5:0.05) | 100:1 | 39 | 28 | 11 |
| 48 | Compound (I-5) + Boscalid | (20:0.05) | 400:1 | 50 | 36 | 14 |
| 49 | Compound (I-5) + Boscalid | (20:0.1) | 200:1 | 56 | 46 | 10 |
| 51 | Compound (I-5) + Bixafen | (5:0.05) | 100:1 | 64 | 26 | 38 |
| 52 | Compound (I-5) + Bixafen | (20:0.05) | 400:1 | 78 | 35 | 43 |
| 53 | Compound (I-5) + Bixafen | (1:0.1) | 10:1 | 67 | 38 | 28 |
| 54 | Compound (I-5) + Bixafen | (5:0.1) | 50:1 | 72 | 41 | 31 |
| 55 | Compound (I-5) + Bixafen | (20:0.1) | 200:1 | 83 | 48 | 35 |
| 56 | Compound (I-5) + Difenconazole | (20:0.05) | 400:1 | 72 | 57 | 15 |
| 57 | Compound (I-5) + Difenconazole | (5:0.1) | 50:1 | 67 | 56 | 11 |
| 58 | Compound (I-5) + Difenconazole | (20:0.1) | 200:1 | 81 | 61 | 19 |
| 59 | Compound (I-5) + Azoxystrobin | (5:0.05) | 100:1 | 70 | 44 | 26 |
| 60 | Compound (I-5) + Azoxystrobin | (20:0.05) | 400:1 | 84 | 51 | 33 |
| 61 | Compound (I-5) + Azoxystrobin | (1:0.1) | 10:1 | 78 | 56 | 23 |
| 62 | Compound (I-5) + Azoxystrobin | (5:0.1) | 50:1 | 84 | 58 | 26 |
| 63 | Compound (I-5) + Azoxystrobin | (20:0.1) | 200:1 | 86 | 63 | 24 |
| 64 | Compound (I-5) + Picoxystrobin | (1:0.05) | 20:1 | 65 | 33 | 32 |
| 65 | Compound (I-5) + Picoxystrobin | (5:0.05) | 100:1 | 70 | 36 | 34 |
| 66 | Compound (I-5) + Picoxystrobin | (20:0.05) | 400:1 | 81 | 44 | 38 |
| 67 | Compound (I-5) + Picoxystrobin | (1:0.1) | 10:1 | 92 | 36 | 56 |
| 68 | Compound (I-5) + Picoxystrobin | (5:0.1) | 50:1 | 95 | 38 | 56 |
| 69 | Compound (I-5) + Picoxystrobin | (20:0.1) | 200:1 | 97 | 46 | 52 |
| 70 | Compound (I-5) + Fluazinam | (1:0.05) | 20:1 | 62 | 19 | 43 |
| 71 | Compound (I-5) + Fluazinam | (5:0.05) | 100:1 | 68 | 23 | 45 |

TABLE B5-continued

The synergistic fungicidal activity of the compositions of the present invention, wherein the representative compounds of formula (I) is particularly compound (I-5) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calc-ulated Efficacy | Syn-ergy (Col-by's) |
|---|---|---|---|---|---|---|
| 72 | Compound (I-5) + Fluazinam | (20:0.05) | 400:1 | 78 | 32 | 47 |
| 73 | Compound (I-5) + Fluazinam | (1:0.1) | 10:1 | 68 | 27 | 40 |
| 74 | Compound (I-5) + Fluazinam | (5:0.1) | 50:1 | 70 | 30 | 40 |
| 75 | Compound (I-5) + Fluazinam | (20:0.1) | 200:1 | 78 | 38 | 40 |
| 76 | Compound (I-5) + Metominostrobin | (1:0.05) | 20:1 | 68 | 36 | 32 |
| 77 | Compound (I-5) + Metominostrobin | (5:0.05) | 100:1 | 78 | 38 | 40 |
| 78 | Compound (I-5) + Metominostrobin | (20:0.05) | 400:1 | 84 | 46 | 38 |
| 79 | Compound (I-5) + Metominostrobin | (1:0.1) | 10:1 | 78 | 40 | 38 |
| 80 | Compound (I-5) + Metominostrobin | (5:0.1) | 50:1 | 84 | 43 | 41 |
| 81 | Compound (I-5) + Metominostrobin | (20:0.1) | 200:1 | 89 | 49 | 40 |
| 84 | Compound (I-5) + Folpet | (1:0.1) | 10:1 | 57 | 27 | 30 |
| 85 | Compound (I-5) + Folpet | (5:0.1) | 50:1 | 62 | 30 | 32 |
| 86 | Compound (I-5) + Folpet | (20:0.1) | 200:1 | 68 | 38 | 29 |
| 87 | Compound (I-5) + Tebuconazole | (5:0.05) | 100:1 | 62 | 45 | 17 |
| 88 | Compound (I-5) + Tebuconazole | (20:0.05) | 400:1 | 84 | 52 | 32 |
| 89 | Compound (I-5) + Tebuconazole | (1:0.1) | 10:1 | 78 | 60 | 18 |
| 90 | Compound (I-5) + Tebuconazole | (5:0.1) | 50:1 | 89 | 62 | 28 |
| 91 | Compound (I-5) + Tebuconazole | (20:0.1) | 200:1 | 89 | 66 | 23 |
| 93 | Compound (I-5) + Fluopyram | (5:0.05) | 100:1 | 62 | 38 | 24 |
| 94 | Compound (I-5) + Fluopyram | (20:0.05) | 400:1 | 68 | 46 | 22 |
| 96 | Compound (I-5) + Fluopyram | (5:0.1) | 50:1 | 68 | 46 | 22 |
| 97 | Compound (I-5) + Fluopyram | (20:0.1) | 200:1 | 70 | 52 | 18 |
| 99 | Compound (I-5) + Mancozeb | (5:0.05) | 100:1 | 51 | 28 | 23 |
| 100 | Compound (I-5) + Mancozeb | (20:0.05) | 400:1 | 62 | 37 | 25 |
| 101 | Compound (I-5) + Mancozeb | (1:0.1) | 10:1 | 49 | 27 | 21 |
| 102 | Compound (I-5) + Mancozeb | (5:0.1) | 50:1 | 62 | 30 | 32 |
| 103 | Compound (I-5) + Mancozeb | (20:0.1) | 200:1 | 68 | 38 | 29 |
| 104 | Compound (I-5) + Propineb | (20:0.05) | 400:1 | 51 | 41 | 10 |
| 105 | Compound (I-5) + Benzovindiflupyr | (1:0.05) | 20:1 | 41 | 25 | 15 |
| 106 | Compound (I-5) + Benzovindiflupyr | (5:0.05) | 100:1 | 51 | 28 | 23 |
| 107 | Compound (I-5) + Benzovindiflupyr | (20:0.05) | 400:1 | 62 | 37 | 25 |
| 108 | Compound (I-5) + Benzovindiflupyr | (1:0.1) | 10:1 | 51 | 38 | 13 |
| 109 | Compound (I-5) + Benzovindiflupyr | (5:0.1) | 50:1 | 62 | 41 | 21 |
| 110 | Compound (I-5) + Benzovindiflupyr | (20:0.1) | 200:1 | 68 | 48 | 20 |

TABLE B5-continued

The synergistic fungicidal activity of the compositions of the present invention, wherein the representative compounds of formula (I) is particularly compound (I-5) as component (1) and other components (2) selected from the groups (A) to (R) against *Alternaria solani* test in tomato are shown in the table below:

| Sr. No. | Compound | Conc. (ppm) | Ratio | Observed Efficacy (%) | Expected/ Calc-ulated Efficacy | Syn-ergy (Col-by's) |
|---|---|---|---|---|---|---|
| 111 | Compound (I-5) + Fluindapyr | (1:0.05) | 20:1 | 35 | 25 | 10 |
| 112 | Compound (I-5) + Fluindapyr | (5:0.05) | 100:1 | 46 | 28 | 18 |
| 113 | Compound (I-5) + Fluindapyr | (20:0.05) | 400:1 | 62 | 37 | 25 |
| 114 | Compound (I-5) + Fluindapyr | (5:0.1) | 50:1 | 57 | 41 | 16 |
| 115 | Compound (I-5) + Fluindapyr | (20:0.1) | 200:1 | 65 | 48 | 17 |
| 116 | Compound (I-5) + Dithianon | (5:0.05) | 100:1 | 51 | 34 | 17 |
| 117 | Compound (I-5) + Dithianon | (20:0.05) | 400:1 | 57 | 42 | 15 |
| 118 | Compound (I-5) + Dithianon | (1:0.1) | 10:1 | 46 | 36 | 10 |
| 119 | Compound (I-5) + Dithianon | (5:0.1) | 50:1 | 57 | 38 | 18 |
| 120 | Compound (I-5) + Dithianon | (20:0.1) | 200:1 | 62 | 46 | 16 |

Example C: *Erysiphe cichoracearum* Test in Cucumber

The single compounds or the respective compound combinations were dissolved in 2% dimethyl sulfoxide/acetone and then mixed with water containing emulsifier to a calibrated spray volume of 50 mL. The test solutions were poured into spray bottles for further applications.

To test the preventive activity of compounds, healthy young cucumber plants, raised in the greenhouse, were sprayed with the single compound or mixture preparation at the stated application rates inside the spray cabinets using hollow cone nozzles. One day after treatment, the plants were inoculated with a conidial suspension containing $2\times10^5$ *Erysiphe cichoracearum* inoculum. The inoculated plants were then kept in a greenhouse chamber at 22-24° C. temperature and 50-60% relative humidity for disease expression.

A visual assessment of the performance of the compounds and the respective compound combinations was carried out by rating the disease severity (0-100% scale) on treated plants 3, 7, 10 and 15 days after application. Efficacy (% control) of the compounds was calculated by comparing the disease rating in the treatment with the one of the untreated control. The compounds were also assessed for their plant compatibility by recording symptoms like necrosis, chlorosis and stunting. The results are shown for the representative compounds of compound of formula (I) particularly, (I-1) to (I-5) in Table $C_1$-$C_5$.

Surprisingly, the following combinations, indicated in the table below, have revealed unexpected synergistic effects:

TABLE C1

The synergistic fungicidal activity of the compositions of the present invention, wherein the representative compounds of formula (I) is particularly compound (I-1) as component (1) and other components (2) selected from the groups (A) to (R) against *Erysiphe cichoracearum* test in cucumber are shown in the table below:

| Sr. No. | Compound | Conc. (ppm) | Ratio | Ob-served Efficacy (%) | Expected/ Calc-ulated Efficacy | Syn-ergy (Col-by's) |
|---|---|---|---|---|---|---|
| 1 | Compound (I-1) | 1 | | 13 | | |
| 2 | Compound (I-1) | 5 | | 33 | | |
| 3 | Compound (I-1) | 20 | | 57 | | |
| 4 | Mefentrifluconazole | 0.1 | | 24 | | |
| 5 | Pyraclostrobin | 0.1 | | 24 | | |
| 6 | Boscalid | 0.05 | | 24 | | |
| 7 | Boscalid | 0.1 | | 32 | | |
| 8 | Azoxystrobin | 0.1 | | 50 | | |
| 9 | Picoxystrobin | 0.05 | | 19 | | |
| 10 | Picoxystrobin | 0.1 | | 43 | | |
| 11 | Fluazinam | 0.05 | | 11 | | |
| 12 | Fluazinam | 0.1 | | 18 | | |
| 13 | Metominostrobin | 0.05 | | 14 | | |
| 14 | Metominostrobin | 0.1 | | 57 | | |
| 15 | Folpet | 0.05 | | 24 | | |
| 16 | Folpet | 0.1 | | 32 | | |
| 17 | Mancozeb | 0.05 | | 24 | | |
| 18 | Mancozeb | 0.1 | | 29 | | |
| 19 | Propineb | 0.05 | | 14 | | |
| 20 | Propineb | 0.1 | | 43 | | |
| 21 | Metiram | 0.05 | | 47 | | |
| 22 | Metiram | 0.1 | | 55 | | |
| 23 | Benzovindiflupyr | 0.05 | | 24 | | |
| 24 | Benzovindiflupyr | 0.1 | | 29 | | |
| 25 | Fluindapyr | 0.05 | | 29 | | |
| 26 | Fluindapyr | 0.1 | | 38 | | |
| 27 | Inpyrfluxam | 0.05 | | 29 | | |
| 28 | Inpyrfluxam | 0.1 | | 38 | | |
| 29 | Dithianon | 0.05 | | 11 | | |
| 30 | Dithianon | 0.1 | | 18 | | |
| 31 | Compound (I-1) + Mefentrifluconazole | (1:0.1) | 10:1 | 59 | 34 | 24 |
| 32 | Compound (I-1) + Mefentrifluconazole | (5:0.1) | 50:1 | 68 | 49 | 19 |
| 33 | Compound (I-1) + Pyraclostrobin | (1:0.1) | 10:1 | 59 | 34 | 24 |
| 34 | Compound (I-1) + Pyraclostrobin | (5:0.1) | 50:1 | 76 | 49 | 26 |
| 35 | Compound (I-1) + Boscalid | (1:0.05) | 20:1 | 46 | 34 | 12 |
| 36 | Compound (I-1) + Boscalid | (1:0.1) | 10:1 | 61 | 41 | 20 |
| 37 | Compound (I-1) + Boscalid | (5:0.1) | 50:1 | 73 | 55 | 19 |
| 38 | Compound (I-1) + Boscalid | (20:0.1) | 200:1 | 85 | 71 | 15 |
| 39 | Compound (I-1) + Azoxystrobin | (1:0.1) | 10:1 | 78 | 57 | 21 |
| 40 | Compound (I-1) + Azoxystrobin | (5:0.1) | 50:1 | 83 | 67 | 17 |
| 41 | Compound (I-1) + Picoxystrobin | (1:0.05) | 20:1 | 56 | 30 | 26 |
| 42 | Compound (I-1) + Picoxystrobin | (5:0.05) | 100:1 | 67 | 46 | 21 |
| 43 | Compound (I-1) + Picoxystrobin | (1:0.1) | 10:1 | 78 | 51 | 27 |
| 44 | Compound (I-1) + Picoxystrobin | (5:0.1) | 50:1 | 89 | 62 | 27 |
| 45 | Compound (I-1) + Picoxystrobin | (20:0.1) | 200:1 | 97 | 75 | 22 |
| 46 | Compound (I-1) + Fluazinam | (1:0.05) | 20:1 | 44 | 23 | 22 |
| 47 | Compound (I-1) + Fluazinam | (5:0.05) | 100:1 | 61 | 41 | 20 |
| 48 | Compound (I-1) + Fluazinam | (1:0.1) | 10:1 | 78 | 29 | 49 |
| 49 | Compound (I-1) + Fluazinam | (5:0.1) | 50:1 | 81 | 45 | 35 |

TABLE C1-continued

The synergistic fungicidal activity of the compositions of the present invention, wherein the representative compounds of formula (I) is particularly compound (I-1) as component (1) and other components (2) selected from the groups (A) to (R) against *Erysiphe cichoracearum* test in cucumber are shown in the table below:

| Sr. No. | Compound | Conc. (ppm) | Ratio | Observed Efficacy (%) | Expected/Calculated Efficacy | Synergy (Colby's) |
|---|---|---|---|---|---|---|
| 50 | Compound (I-1) + Fluazinam | (20:0.1) | 200:1 | 89 | 64 | 24 |
| 51 | Compound (I-1) + Metominostrobin | (1:0.05) | 20:1 | 53 | 25 | 27 |
| 52 | Compound (I-1) + Metominostrobin | (5:0.05) | 100:1 | 61 | 43 | 18 |
| 53 | Compound (I-1) + Metominostrobin | (1:0.1) | 10:1 | 75 | 63 | 12 |
| 54 | Compound (I-1) + Folpet | (1:0.05) | 20:1 | 44 | 34 | 10 |
| 55 | Compound (I-1) + Folpet | (1:0.1) | 10:1 | 61 | 41 | 20 |
| 56 | Compound (I-1) + Folpet | (5:0.1) | 50:1 | 67 | 55 | 12 |
| 57 | Compound (I-1) + Mancozeb | (1:0.05) | 20:1 | 61 | 34 | 27 |
| 58 | Compound (I-1) + Mancozeb | (5:0.05) | 100:1 | 78 | 49 | 28 |
| 59 | Compound (I-1) + Mancozeb | (1:0.1) | 10:1 | 72 | 38 | 34 |
| 60 | Compound (I-1) + Mancozeb | (5:0.1) | 50:1 | 83 | 53 | 31 |
| 61 | Compound (I-1) + Mancozeb | (20:0.1) | 200:1 | 89 | 69 | 20 |
| 62 | Compound (I-1) + Propineb | (1:0.05) | 20:1 | 56 | 25 | 30 |
| 63 | Compound (I-1) + Propineb | (5:0.05) | 100:1 | 64 | 43 | 21 |
| 64 | Compound (I-1) + Metiram | (20:0.05) | 400:1 | 92 | 77 | 15 |
| 65 | Compound (I-1) + Metiram | (20:0.1) | 200:1 | 97 | 81 | 17 |
| 66 | Compound (I-1) + Benzovindiflupyr | (1:0.05) | 20:1 | 53 | 34 | 19 |
| 67 | Compound (I-1) + Benzovindiflupyr | (5:0.05) | 100:1 | 69 | 49 | 20 |
| 68 | Compound (I-1) + Benzovindiflupyr | (20:0.05) | 400:1 | 83 | 67 | 16 |
| 69 | Compound (I-1) + Benzovindiflupyr | (1:0.1) | 10:1 | 64 | 38 | 25 |
| 70 | Compound (I-1) + Benzovindiflupyr | (5:0.1) | 50:1 | 69 | 53 | 17 |
| 71 | Compound (I-1) + Benzovindiflupyr | (20:0.1) | 200:1 | 86 | 69 | 17 |
| 72 | Compound (I-1) + Fluindapyr | (1:0.05) | 20:1 | 50 | 38 | 12 |
| 73 | Compound (I-1) + Fluindapyr | (20:0.05) | 400:1 | 83 | 69 | 14 |
| 74 | Compound (I-1) + Fluindapyr | (20:0.1) | 200:1 | 86 | 73 | 13 |
| 75 | Compound (I-1) + Inpyrfluxam | (1:0.05) | 20:1 | 53 | 38 | 14 |
| 76 | Compound (I-1) + Inpyrfluxam | (5:0.05) | 100:1 | 67 | 53 | 14 |
| 77 | Compound (I-1) + Inpyrfluxam | (20:0.05) | 400:1 | 83 | 69 | 14 |
| 78 | Compound (I-1) + Inpyrfluxam | (1:0.1) | 10:1 | 64 | 46 | 18 |
| 79 | Compound (I-1) + Inpyrfluxam | (20:0.1) | 200:1 | 89 | 73 | 16 |
| 80 | Compound (I-1) + Dithianon | (1:0.05) | 20:1 | 53 | 23 | 30 |
| 81 | Compound (I-1) + Dithianon | (5:0.05) | 100:1 | 61 | 41 | 20 |
| 82 | Compound (I-1) + Dithianon | (20:0.05) | 400:1 | 78 | 61 | 16 |
| 83 | Compound (I-1) + Dithianon | (1:0.1) | 10:1 | 61 | 29 | 32 |
| 84 | Compound (I-1) + Dithianon | (5:0.1) | 50:1 | 69 | 45 | 24 |

TABLE C2

The synergistic fungicidal activity of the compositions of the present invention, wherein the representative compounds of formula (I) is particularly compound (I-3) as component (1) and other components (2) selected from the groups (A) to (R) against *Erysiphe cichoracearum* test in cucumber are shown in the table below:

| Sr. No. | Compound | Conc. (ppm) | Ratio | Observed Efficacy (%) | Expected/(I-3) alculated Efficacy | Synergy (Colby's) |
|---|---|---|---|---|---|---|
| 1 | Compound (I-3) | 1 | | 17 | | |
| 2 | Compound (I-3) | 5 | | 27 | | |
| 3 | Compound (I-3) | 20 | | 47 | | |
| 4 | Mefentrifluconazole | 0.05 | | 21 | | |
| 5 | Mefentrifluconazole | 0.1 | | 24 | | |
| 6 | Pyraclostrobin | 0.05 | | 21 | | |
| 7 | Pyraclostrobin | 0.1 | | 24 | | |
| 8 | Picoxystrobin | 0.05 | | 19 | | |
| 9 | Picoxystrobin | 0.1 | | 43 | | |
| 10 | Fluazinam | 0.05 | | 11 | | |
| 11 | Fluazinam | 0.1 | | 18 | | |
| 12 | Metominostrobin | 0.05 | | 14 | | |
| 13 | Folpet | 0.05 | | 24 | | |
| 14 | Folpet | 0.1 | | 32 | | |
| 15 | Tebuconazole | 0.05 | | 29 | | |
| 16 | Fluopyram | 0.1 | | 39 | | |
| 17 | Mancozeb | 0.05 | | 24 | | |
| 18 | Mancozeb | 0.1 | | 29 | | |
| 19 | Propineb | 0.05 | | 14 | | |
| 20 | Propineb | 0.1 | | 43 | | |
| 21 | Metiram | 0.05 | | 47 | | |
| 22 | Metiram | 0.1 | | 55 | | |
| 23 | Benzovindiflupyr | 0.05 | | 24 | | |
| 24 | Benzovindiflupyr | 0.1 | | 29 | | |
| 25 | Fluindapyr | 0.05 | | 29 | | |
| 26 | Fluindapyr | 0.1 | | 38 | | |
| 27 | Inpyrfluxam | 0.05 | | 29 | | |
| 28 | Inpyrfluxam | 0.1 | | 38 | | |
| 29 | Dithianon | 0.05 | | 11 | | |
| 30 | Dithianon | 0.1 | | 18 | | |
| 31 | Compound (I-3) + Mefentrifluconazole | (1:0.05) | 20:1 | 45 | 34 | 11 |
| 32 | Compound (I-3) + Mefentrifluconazole | (5:0.05) | 100:1 | 55 | 42 | 13 |
| 33 | Compound (I-3) + Mefentrifluconazole | (1:0.1) | 10:1 | 53 | 37 | 16 |
| 34 | Compound (I-3) + Mefentrifluconazole | (5:0.1) | 50:1 | 60 | 44 | 16 |
| 35 | Compound (I-3) + Pyraclostrobin | (1:0.05) | 20:1 | 50 | 34 | 16 |
| 36 | Compound (I-3) + Pyraclostrobin | (5:0.05) | 100:1 | 58 | 42 | 15 |
| 37 | Compound (I-3) + Pyraclostrobin | (20:0.05) | 400:1 | 68 | 58 | 10 |
| 38 | Compound (I-3) + Pyraclostrobin | (1:0.1) | 10:1 | 53 | 37 | 16 |
| 39 | Compound (I-3) + Pyraclostrobin | (5:0.1) | 50:1 | 65 | 44 | 21 |
| 40 | Compound (I-3) + Pyraclostrobin | (20:0.1) | 200:1 | 70 | 59 | 11 |

TABLE C2-continued

The synergistic fungicidal activity of the compositions of the present invention, wherein the representative compounds of formula (I) is particularly compound (I-3) as component (1) and other components (2) selected from the groups (A) to (R) against *Erysiphe cichoracearum* test in cucumber are shown in the table below:

| Sr. No. | Compound | Conc. (ppm) | Ratio | Observed Efficacy (%) | Expected/(I-3) alculated Efficacy | Synergy (Colby's) |
|---|---|---|---|---|---|---|
| 41 | Compound (I-3) + Picoxystrobin | (20:0.05) | 400:1 | 78 | 57 | 21 |
| 42 | Compound (I-3) + Picoxystrobin | (5:0.1) | 50:1 | 72 | 58 | 14 |
| 43 | Compound (I-3) + Picoxystrobin | (20:0.1) | 200:1 | 83 | 70 | 14 |
| 44 | Compound (I-3) + Fluazinam | (20:0.05) | 400:1 | 69 | 53 | 17 |
| 45 | Compound (I-3) + Fluazinam | (1:0.1) | 10:1 | 44 | 32 | 13 |
| 46 | Compound (I-3) + Fluazinam | (5:0.1) | 50:1 | 56 | 40 | 16 |
| 47 | Compound (I-3) + Fluazinam | (20:0.1) | 200:1 | 72 | 56 | 16 |
| 48 | Compound (I-3) + Metominostrobin | (5:0.05) | 100:1 | 61 | 37 | 24 |
| 49 | Compound (I-3) + Metominostrobin | (20:0.05) | 400:1 | 67 | 54 | 13 |
| 50 | Compound (I-3) + Folpet | (5:0.05) | 100:1 | 61 | 44 | 17 |
| 51 | Compound (I-3) + Folpet | (20:0.05) | 400:1 | 83 | 59 | 24 |
| 52 | Compound (I-3) + Folpet | (1:0.1) | 10:1 | 56 | 43 | 12 |
| 53 | Compound (I-3) + Folpet | (5:0.1) | 50:1 | 72 | 50 | 22 |
| 54 | Compound (I-3) + Folpet | (20:0.1) | 200:1 | 89 | 64 | 25 |
| 55 | Compound (I-3) + Tebuconazole | (20:0.05) | 400:1 | 78 | 62 | 16 |
| 56 | Compound (1-3) + Fluopyram | (1:0.1) | 10:1 | 59 | 49 | 10 |
| 57 | Compound (I-3) + Mancozeb | (1:0.05) | 20:1 | 53 | 37 | 16 |
| 58 | Compound (I-3) + Mancozeb | (5:0.05) | 100:1 | 65 | 44 | 20 |
| 59 | Compound (I-3) + Mancozeb | (20:0.05) | 400:1 | 79 | 59 | 20 |
| 60 | Compound (1-3) + Mancozeb | (1:0.1) | 10:1 | 59 | 41 | 18 |
| 61 | Compound (I-3) + Mancozeb | (5:0.1) | 50:1 | 76 | 48 | 29 |
| 62 | Compound (I-3) + Mancozeb | (20:0.1) | 200:1 | 85 | 62 | 23 |
| 63 | Compound (I-3) + Propineb | (1:0.05) | 20:1 | 59 | 28 | 30 |
| 64 | Compound (I-3) + Propineb | (5:0.05) | 100:1 | 79 | 37 | 42 |
| 65 | Compound (I-3) + Propineb | (20:0.05) | 400:1 | 91 | 54 | 37 |
| 66 | Compound (I-3) + Propineb | (5:0.1) | 50:1 | 82 | 58 | 24 |
| 67 | Compound (I-3) + Propineb | (20:0.1) | 200:1 | 94 | 70 | 25 |
| 68 | Compound (I-3) + Metiram | (20:0.05) | 400:1 | 82 | 72 | 11 |
| 69 | Compound (I-3) + Metiram | (20:0.1) | 200:1 | 88 | 76 | 12 |
| 70 | Compound (I-3) + Benzovindiflupyr | (1:0.05) | 20:1 | 47 | 37 | 10 |
| 71 | Compound (I-3) + Benzovindiflupyr | (1:0.1) | 10:1 | 53 | 41 | 12 |
| 72 | Compound (I-3) + Benzovindiflupyr | (5:0.1) | 50:1 | 59 | 48 | 11 |
| 73 | Compound (I-3) + Fluindapyr | (1:0.05) | 20:1 | 59 | 41 | 18 |
| 74 | Compound (I-3) + Fluindapyr | (5:0.05) | 100:1 | 71 | 48 | 23 |
| 75 | Compound (I-3) + Fluindapyr | (20:0.05) | 400:1 | 82 | 62 | 20 |
| 76 | Compound (I-3) + Fluindapyr | (1:0.1) | 10:1 | 71 | 48 | 22 |
| 77 | Compound (I-3) + Fluindapyr | (5:0.1) | 50:1 | 79 | 55 | 25 |
| 78 | Compound (I-3) + Fluindapyr | (20:0.1) | 200:1 | 85 | 67 | 18 |
| 79 | Compound (I-3) + Inpyrfluxam | (1:0.05) | 20:1 | 53 | 41 | 12 |
| 80 | Compound (I-3) + Inpyrfluxam | (5:0.05) | 100:1 | 62 | 48 | 14 |
| 81 | Compound (I-3) + Inpyrfluxam | (1:0.1) | 10:1 | 59 | 48 | 10 |
| 82 | Compound (I-3) + Inpyrfluxam | (5:0.1) | 50:1 | 68 | 55 | 13 |
| 83 | Compound (I-3) + Inpyrfluxam | (20:0.1) | 200:1 | 76 | 67 | 10 |
| 84 | Compound (I-3) + Dithianon | (1:0.05) | 20:1 | 50 | 26 | 24 |
| 85 | Compound (I-3) + Dithianon | (5:0.05) | 100:1 | 62 | 35 | 27 |
| 86 | Compound (I-3) + Dithianon | (20:0.05) | 400:1 | 71 | 53 | 18 |
| 87 | Compound (1-3) + Dithianon | (1:0.1) | 10:1 | 59 | 32 | 27 |
| 88 | Compound (I-3) + Dithianon | (5:0.1) | 50:1 | 68 | 40 | 28 |
| 89 | Compound (I-3) + Dithianon | (20:0.1) | 200:1 | 76 | 56 | 20 |

TABLE C4

The synergistic fungicidal activity of the compositions of the present invention, wherein the representative compounds of formula (I) is particularly compound (I-4) as component (1) and other components (2) selected from the groups (A) to (R) against *Erysiphe cichoracearum* test in cucumber are shown in the table below:

| Sr. No. | Compound | Conc. (ppm) | Ratio | Observed Efficacy (%) | Expected/Calculated Efficacy | Synergy (Colby's) |
|---|---|---|---|---|---|---|
| 1 | Compound (I-4) | 1 | | 33 | | |
| 2 | Compound (I-4) | 5 | | 63 | | |
| 3 | Mefentrifluconazole | 0.1 | | 24 | | |
| 4 | Pyraclostrobin | 0.1 | | 24 | | |
| 5 | Picoxystrobin | 0.05 | | 19 | | |
| 6 | Fluazinam | 0.05 | | 11 | | |
| 7 | Fluazinam | 0.1 | | 18 | | |
| 8 | Metominostrobin | 0.05 | | 14 | | |
| 9 | Folpet | 0.1 | | 32 | | |
| 10 | Tebuconazole | 0.05 | | 29 | | |
| 11 | Fluopyram | 0.05 | | 32 | | |
| 12 | Fluopyram | 0.1 | | 39 | | |
| 13 | Mancozeb | 0.05 | | 24 | | |
| 14 | Mancozeb | 0.1 | | 29 | | |
| 15 | Propineb | 0.05 | | 14 | | |
| 16 | Benzovindiflupyr | 0.05 | | 24 | | |
| 17 | Benzovindiflupyr | 0.1 | | 29 | | |
| 18 | Fluindapyr | 0.05 | | 29 | | |
| 19 | Fluindapyr | 0.1 | | 38 | | |
| 20 | Inpyrfluxam | 0.1 | | 38 | | |
| 21 | Dithianon | 0.05 | | 11 | | |
| 22 | Dithianon | 0.1 | | 18 | | |

TABLE C4-continued

The synergistic fungicidal activity of the compositions of the present invention, wherein the representative compounds of formula (I) is particularly compound (I-4) as component (1) and other components (2) selected from the groups (A) to (R) against *Erysiphe cichoracearum* test in cucumber are shown in the table below:

| Sr. No. | Compound | Conc. (ppm) | Ratio | Observed Efficacy (%) | Expected/Calculated Efficacy | Synergy (Colby's) |
|---|---|---|---|---|---|---|
| 23 | Compound (I-4) + Mefentrifluconazole | (1:0.1) | 10:1 | 69 | 49 | 20 |
| 24 | Compound (I-4) + Pyraclostrobin | (1:0.1) | 10:1 | 62 | 49 | 13 |
| 25 | Compound (I-4) + Picoxystrobin | (1:0.05) | 20:1 | 70 | 46 | 24 |
| 26 | Compound (I-4) + Picoxystrobin | (5:0.05) | 100:1 | 84 | 70 | 13 |
| 27 | Compound (I-4) + Fluazinam | (1:0.05) | 20:1 | 73 | 41 | 32 |
| 28 | Compound (I-4) + Fluazinam | (5:0.05) | 100:1 | 78 | 67 | 11 |
| 29 | Compound (I-4) + Fluazinam | (1:0.1) | 10:1 | 76 | 45 | 30 |
| 30 | Compound (I-4) + Fluazinam | (5:0.1) | 50:1 | 81 | 70 | 11 |
| 31 | Compound (I-4) + Metominostrobin | (1:0.05) | 20:1 | 57 | 43 | 14 |
| 32 | Compound (I-4) + Folpet | (1:0.1) | 10:1 | 73 | 55 | 18 |
| 33 | Compound (I-4) + Tebuconazole | (1:0.05) | 20:1 | 76 | 53 | 23 |
| 34 | Compound (I-4) + Tebuconazole | (5:0.05) | 100:1 | 86 | 74 | 13 |
| 35 | Compound (I-4) + Fluopyram | (1:0.05) | 20:1 | 68 | 55 | 13 |
| 36 | Compound (I-4) + Fluopyram | (1:0.1) | 10:1 | 78 | 59 | 19 |
| 37 | Compound (I-4) + Mancozeb | (1:0.05) | 20:1 | 65 | 49 | 16 |
| 38 | Compound (I-4) + Mancozeb | (1:0.1) | 10:1 | 68 | 53 | 15 |
| 39 | Compound (I-4) + Propineb | (1:0.05) | 20:1 | 62 | 43 | 19 |
| 40 | Compound (I-4) + Benzovindiflupyr | (1:0.05) | 20:1 | 62 | 49 | 13 |
| 41 | Compound (I-4) + Benzovindiflupyr | (1:0.1) | 10:1 | 73 | 53 | 20 |
| 42 | Compound (I-4) + Fluindapyr | (1:0.05) | 20:1 | 68 | 53 | 15 |
| 43 | Compound (I-4) + Fluindapyr | (1:0.1) | 10:1 | 81 | 59 | 22 |
| 44 | Compound (I-4) + Fluindapyr | (5:0.1) | 50:1 | 92 | 77 | 15 |
| 45 | Compound (I-4) + Inpyrfluxam | (1:0.1) | 10:1 | 73 | 59 | 14 |
| 46 | Compound (I-4) + Dithianon | (1:0.05) | 20:1 | 57 | 41 | 16 |
| 47 | Compound (I-4) + Dithianon | (1:0.1) | 10:1 | 62 | 45 | 17 |

TABLE C5

The synergistic fungicidal activity of the compositions of the present invention, wherein the representative compounds of formula (I) is particularly compound (I-5) as component (1) and other components (2) selected from the groups (A) to (R) against *Erysiphe cichoracearum* test in cucumber are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-5) | 1 | | 23 | | |
| 2 | Compound (I-5) | 5 | | 47 | | |
| 3 | Compound (I-5) | 20 | | 77 | | |
| 4 | Mefentrifluconazole | 0.05 | | 21 | | |
| 5 | Mefentrifluconazole | 0.1 | | 24 | | |
| 6 | Pyraclostrobin | 0.05 | | 21 | | |
| 7 | Pyraclostrobin | 0.1 | | 24 | | |
| 8 | Boscalid | 0.05 | | 24 | | |
| 9 | Boscalid | 0.1 | | 32 | | |
| 10 | Azoxystrobin | 0.1 | | 50 | | |
| 11 | Picoxystrobin | 0.05 | | 19 | | |
| 12 | Picoxystrobin | 0.1 | | 43 | | |
| 13 | Fluazinam | 0.1 | | 18 | | |
| 14 | Metominostrobin | 0.05 | | 14 | | |
| 15 | Folpet | 0.1 | | 32 | | |
| 16 | Mancozeb | 0.05 | | 24 | | |
| 17 | Mancozeb | 0.1 | | 29 | | |
| 18 | Propineb | 0.05 | | 14 | | |
| 19 | Propineb | 0.1 | | 43 | | |
| 20 | Fluindapyr | 0.05 | | 29 | | |
| 21 | Fluindapyr | 0.1 | | 38 | | |
| 22 | Dithianon | 0.05 | | 11 | | |
| 23 | Dithianon | 0.1 | | 18 | | |
| 24 | Compound (I-5) + Mefentrifluconazole | (1:0.05) | 20:1 | 52 | 39 | 13 |
| 25 | Compound (I-5) + Mefentrifluconazole | (1:0.1) | 10:1 | 60 | 42 | 18 |
| 26 | Compound (I-5) + Pyraclostrobin | (1:0.05) | 20:1 | 64 | 39 | 25 |
| 27 | Compound (I-5) + Pyraclostrobin | (5:0.05) | 100:1 | 71 | 58 | 14 |
| 28 | Compound (I-5) + Pyraclostrobin | (1:0.1) | 10:1 | 71 | 42 | 30 |
| 29 | Compound (I-5) + Pyraclostrobin | (5:0.1) | 50:1 | 74 | 59 | 14 |
| 30 | Compound (I-5) + Boscalid | (1:0.05) | 20:1 | 62 | 42 | 20 |
| 31 | Compound (I-5) + Boscalid | (1:0.1) | 10:1 | 69 | 48 | 21 |
| 32 | Compound (I-5) + Azoxystrobin | (1:0.1) | 10:1 | 75 | 62 | 13 |
| 33 | Compound (I-5) + Picoxystrobin | (1:0.05) | 20:1 | 56 | 38 | 18 |
| 34 | Compound (I-5) + Picoxystrobin | (5:0.05) | 100:1 | 69 | 57 | 13 |
| 35 | Compound (I-5) + Picoxystrobin | (1:0.1) | 10:1 | 81 | 56 | 24 |
| 36 | Compound (I-5) + Picoxystrobin | (5:0.1) | 50:1 | 86 | 70 | 17 |
| 37 | Compound (I-5) + Fluazinam | (1:0.1) | 10:1 | 47 | 37 | 10 |
| 38 | Compound (I-5) + Fluazinam | (5:0.1) | 50:1 | 69 | 56 | 13 |
| 39 | Compound (I-5) + Metominostrobin | (1:0.05) | 20:1 | 47 | 34 | 13 |
| 40 | Compound (I-5) + Folpet | (1:0.1) | 10:1 | 78 | 48 | 30 |
| 41 | Compound (I-5) + Folpet | (5:0.1) | 50:1 | 81 | 64 | 17 |
| 42 | Compound (I-5) + Mancozeb | (1:0.05) | 20:1 | 53 | 42 | 11 |
| 43 | Compound (I-5) + Mancozeb | (1:0.1) | 10:1 | 59 | 46 | 13 |
| 44 | Compound (I-5) + Mancozeb | (5:0.1) | 50:1 | 76 | 62 | 14 |
| 45 | Compound (I-5) + Propineb | (1:0.05) | 20:1 | 59 | 34 | 25 |
| 46 | Compound (I-5) + Propineb | (5:0.05) | 100:1 | 79 | 54 | 25 |
| 48 | Compound (I-5) + Propineb | (5:0.1) | 50:1 | 82 | 70 | 13 |

TABLE C5-continued

The synergistic fungicidal activity of the compositions of the present invention, wherein the representative compounds of formula (I) is particularly compound (I-5) as component (1) and other components (2) selected from the groups (A) to (R) against *Erysiphe cichoracearum* test in cucumber are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 49 | Compound (I-5) + Fluindapyr | (1:0.05) | 20:1 | 59 | 46 | 13 |
| 50 | Compound (I-5) + Fluindapyr | (1:0.1) | 10:1 | 71 | 52 | 18 |
| 51 | Compound (I-5) + Fluindapyr | (5:0.1) | 50:1 | 79 | 67 | 12 |
| 52 | Compound (I-5) + Dithianon | (1:0.05) | 20:1 | 50 | 32 | 18 |
| 53 | Compound (I-5) + Dithianon | (1:0.1) | 10:1 | 59 | 37 | 22 |
| 54 | Compound (I-5) + Dithianon | (5:0.1) | 50:1 | 68 | 56 | 11 |

Example D: *Phakopsora pachyrhizi* Test in Soybean

The single compounds or the respective compound combinations were dissolved in 2% dimethyl sulfoxide/acetone and then mixed with water containing an emulsifier to a calibrated spray volume of 50 ml. The test solutions were poured into spray bottles for further applications.

To test the preventive activity of compounds, healthy young soybean plants, raised in the greenhouse, were sprayed with the single compound or mixture preparation at the stated application rates inside the spray cabinets using hollow cone nozzles. One day after treatment, the plants were inoculated with a suspension containing $2\times10^5$ *Phakopsora pachyrhizi* conidia. The inoculated plants were then kept in a greenhouse chamber at 22-24° C. temperature and 80-90% relative humidity for disease expression.

A visual assessment of the performance of the compounds and the respective compound combinations was carried out by rating the disease severity (0-100% scale) on treated plants 3, 7, 10 and 15 days after application. Efficacy (% control) of the compounds was calculated by comparing the disease rating in the treatment with the one of the untreated control. The compounds were also assessed for their plant compatibility by recording symptoms like necrosis, chlorosis and stunting. The results are shown for the representative compounds of compound of formula (I) particularly, (I-1) to (I-5) in Table D1-D5.

Surprisingly, the following combinations, indicated in the table below, have revealed unexpected synergistic effects:

TABLE D1

The synergistic fungicidal activity of the compositions of the present invention, wherein the representative compounds of formula (I) is particularly compound (I-1) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-1) | 0.0001 | | 40 | | |
| 2 | Compound (I-1) | 0.001 | | 50 | | |
| 3 | Compound (I-1) | 0.01 | | 62 | | |
| 4 | Bixafen | 0.05 | | 15 | | |
| 5 | Bixafen | 0.1 | | 22 | | |
| 6 | Azoxystrobin | 0.05 | | 15 | | |
| 7 | Azoxystrobin | 0.1 | | 22 | | |
| 8 | Fluazinam | 0.05 | | 2 | | |
| 9 | Fluazinam | 0.1 | | 10 | | |
| 10 | Folpet | 0.05 | | 5 | | |
| 11 | Folpet | 0.1 | | 12 | | |
| 12 | Tebuconazole | 0.1 | | 44 | | |
| 13 | Fluopyram | 0.05 | | 7 | | |
| 14 | Fluopyram | 0.1 | | 10 | | |
| 15 | Mancozeb | 0.05 | | 12 | | |
| 16 | Mancozeb | 0.1 | | 15 | | |
| 17 | Propineb | 0.05 | | 20 | | |
| 18 | Propineb | 0.1 | | 33 | | |
| 19 | Metiram | 0.05 | | 17 | | |
| 20 | Benzovindiflupyr | 0.1 | | 38 | | |
| 21 | Fluindapyr | 0.05 | | 20 | | |
| 22 | Fluindapyr | 0.1 | | 30 | | |
| 23 | Inpyrfluxam | 0.05 | | 18 | | |
| 24 | Inpyrfluxam | 0.1 | | 30 | | |
| 25 | Dithianon | 0.05 | | 15 | | |
| 26 | Dithianon | 0.1 | | 24 | | |
| 27 | Compound (I-1) + Bixafen | (0.0001:0.05) | 0.002:1 | 63 | 49 | 14 |
| 28 | Compound (I-1) + Bixafen | (0.0001:0.1) | 0.001:1 | 73 | 53 | 20 |
| 29 | Compound (I-1) + Bixafen | (0.001:0.1) | 0.01:1 | 80 | 61 | 19 |
| 30 | Compound (I-1) + Bixafen | (0.01:0.1) | 0.1:1 | 83 | 70 | 13 |
| 31 | Compound (I-1) + Azoxystrobin | (0.0001:0.05) | 0.002:1 | 66 | 49 | 17 |
| 32 | Compound (I-1) + Azoxystrobin | (0.001:0.05) | 0.02:1 | 75 | 58 | 18 |
| 33 | Compound (I-1) + Azoxystrobin | (0.01:0.05) | 0.2:1 | 88 | 68 | 20 |
| 34 | Compound (I-1) + Azoxystrobin | (0.0001:0.1) | 0.001:1 | 75 | 53 | 22 |
| 35 | Compound (I-1) + Azoxystrobin | (0.001:0.1) | 0.01:1 | 84 | 61 | 23 |
| 36 | Compound (I-1) + Azoxystrobin | (0.01:0.1) | 0.1:1 | 94 | 70 | 23 |
| 37 | Compound (I-1) + Fluazinam | (0.001:0.05) | 0.02:1 | 66 | 51 | 15 |
| 38 | Compound (I-1) + Fluazinam | (0.0001:0.1) | 0.001:1 | 59 | 46 | 13 |
| 39 | Compound (I-1) + Fluazinam | (0.001:0.1) | 0.01:1 | 69 | 55 | 14 |
| 40 | Compound (I-1) + Folpet | (0.01:0.05) | 0.2:1 | 75 | 64 | 11 |
| 41 | Compound (I-1) + Folpet | (0.0001:0.1) | 0.001:1 | 69 | 47 | 22 |
| 42 | Compound (I-1) + Folpet | (0.001:0.1) | 0.01:1 | 75 | 56 | 19 |
| 43 | Compound (I-1) + Folpet | (0.01:0.1) | 0.1:1 | 81 | 67 | 15 |
| 44 | Compound (I-1) + Tebuconazole | (0.0001:0.1) | 0.001:1 | 78 | 66 | 12 |
| 45 | Compound (I-1) + Tebuconazole | (0.001:0.1) | 0.01:1 | 84 | 72 | 12 |
| 46 | Compound (I-1) + Fluopyram | (0.0001:0.05) | 0.002:1 | 67 | 44 | 22 |
| 47 | Compound (I-1) + Fluopyram | (0.001:0.05) | 0.02:1 | 77 | 54 | 23 |
| 48 | Compound (I-1) + Fluopyram | (0.01:0.05) | 0.2:1 | 83 | 65 | 19 |

TABLE D1-continued

The synergistic fungicidal activity of the compositions of the present invention, wherein the representative compounds of formula (I) is particularly compound (I-1) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 49 | Compound (I-1) + Fluopyram | (0.0001:0.1) | 0.001:1 | 80 | 46 | 34 |
| 50 | Compound (I-1) + Fluopyram | (0.001:0.1) | 0.01:1 | 87 | 55 | 32 |
| 51 | Compound (I-1) + Fluopyram | (0.01:0.1) | 0.1:1 | 93 | 66 | 28 |
| 52 | Compound (I-1) + Mancozeb | (0.0001:0.05) | 0.002:1 | 67 | 47 | 19 |
| 53 | Compound (I-1) + Mancozeb | (0.001:0.05) | 0.02:1 | 73 | 56 | 17 |
| 54 | Compound (I-1) + Mancozeb | (0.01:0.05) | 0.2:1 | 83 | 67 | 17 |
| 55 | Compound (I-1) + Mancozeb | (0.0001:0.1) | 0.001:1 | 77 | 49 | 28 |
| 56 | Compound (I-1) + Mancozeb | (0.001:0.1) | 0.01:1 | 83 | 58 | 26 |
| 57 | Compound (I-1) + Mancozeb | (0.01:0.1) | 0.1:1 | 87 | 68 | 19 |
| 58 | Compound (I-1) + Propineb | (0.0001:0.05) | 0.002:1 | 67 | 52 | 15 |
| 59 | Compound (I-1) + Propineb | (0.001:0.05) | 0.02:1 | 77 | 60 | 17 |
| 60 | Compound (I-1) + Propineb | (0.01:0.05) | 0.2:1 | 83 | 70 | 14 |
| 61 | Compound (I-1) + Propineb | (0.0001:0.1) | 0.001:1 | 77 | 60 | 17 |
| 62 | Compound (I-1) + Propineb | (0.001:0.1) | 0.01:1 | 80 | 67 | 14 |
| 63 | Compound (I-1) + Propineb | (0.01:0.1) | 0.1:1 | 87 | 75 | 12 |
| 64 | Compound (I-1) + Metiram | (0.0001:0.05) | 0.002:1 | 63 | 50 | 13 |
| 65 | Compound (I-1) + Metiram | (0.01:0.05) | 0.2:1 | 80 | 68 | 12 |
| 66 | Compound (I-1) + Benzovindiflupyr | (0.0001:0.1) | 0.001:1 | 73 | 63 | 11 |
| 67 | Compound (I-1) + Benzovindiflupyr | (0.001:0.1) | 0.01:1 | 83 | 69 | 14 |
| 68 | Compound (I-1) + Benzovindiflupyr | (0.01:0.1) | 0.1:1 | 90 | 76 | 14 |
| 69 | Compound (I-1) + Fluindapyr | (0.0001:0.05) | 0.002:1 | 63 | 52 | 11 |
| 70 | Compound (I-1) + Fluindapyr | (0.01:0.05) | 0.2:1 | 83 | 70 | 14 |
| 71 | Compound (I-1) + Fluindapyr | (0.0001:0.1) | 0.001:1 | 73 | 58 | 15 |
| 72 | Compound (I-1) + Fluindapyr | (0.001:0.1) | 0.01:1 | 77 | 65 | 12 |
| 73 | Compound (I-1) + Fluindapyr | (0.01:0.1) | 0.1:1 | 87 | 73 | 13 |
| 74 | Compound (I-1) + Inpyrfluxam | (0.001:0.05) | 0.02:1 | 73 | 59 | 14 |
| 75 | Compound (I-1) + Inpyrfluxam | (0.001:0.1) | 0.01:1 | 77 | 65 | 12 |
| 76 | Compound (I-1) + Dithianon | (0.0001:0.05) | 0.002:1 | 63 | 49 | 14 |
| 77 | Compound (I-1) + Dithianon | (0.001:0.05) | 0.02:1 | 73 | 58 | 16 |
| 78 | Compound (I-1) + Dithianon | (0.01:0.05) | 0.2:1 | 83 | 68 | 16 |
| 79 | Compound (I-1) + Dithianon | (0.0001:0.1) | 0.001:1 | 73 | 54 | 19 |
| 80 | Compound (I-1) + Dithianon | (0.001:0.1) | 0.01:1 | 80 | 62 | 18 |
| 81 | Compound (I-1) + Dithianon | (0.01:0.1) | 0.1:1 | 93 | 71 | 22 |

TABLE-D2

The synergistic fungicidal activity of the compositions of the present invention, wherein the representative compounds of formula (I) is particularly compound (I-2) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-2) | 0.0001 | | 47 | | |
| 2 | Compound (I-2) | 0.001 | | 57 | | |
| 3 | Compound (I-2) | 0.01 | | 68 | | |
| 4 | Bixafen | 0.05 | | 15 | | |
| 5 | Bixafen | 0.1 | | 22 | | |
| 6 | Difenconazole | 0.1 | | 24 | | |
| 7 | Azoxystrobin | 0.05 | | 15 | | |
| 8 | Azoxystrobin | 0.1 | | 22 | | |
| 9 | Picoxystrobin | 0.05 | | 20 | | |
| 10 | Picoxystrobin | 0.1 | | 28 | | |
| 11 | Fluazinam | 0.05 | | 2 | | |
| 12 | Fluazinam | 0.1 | | 10 | | |
| 13 | Folpet | 0.05 | | 5 | | |
| 14 | Folpet | 0.1 | | 12 | | |
| 15 | Tebuconazole | 0.05 | | 38 | | |
| 16 | Tebuconazole | 0.1 | | 44 | | |
| 17 | Fluopyram | 0.05 | | 7 | | |
| 18 | Fluopyram | 0.1 | | 10 | | |
| 19 | Mancozeb | 0.1 | | 15 | | |
| 20 | Dithianon | 0.05 | | 15 | | |
| 21 | Dithianon | 0.1 | | 24 | | |

TABLE-D2-continued

The synergistic fungicidal activity of the compositions of the present invention, wherein the representative compounds of formula (I) is particularly compound (I-2) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 22 | Compound (I-2) + Bixafen | (0.001:0.05) | 0.02:1 | 77 | 63 | 14 |
| 23 | Compound (I-2) + Bixafen | (0.01:0.05) | 0.2:1 | 87 | 73 | 14 |
| 24 | Compound (I-2) + Bixafen | (0.0001:0.1) | 0.001:1 | 80 | 59 | 21 |
| 25 | Compound (I-2) + Bixafen | (0.001:0.1) | 0.01:1 | 87 | 66 | 20 |
| 26 | Compound (I-2) + Bixafen | (0.01:0.1) | 0.1:1 | 90 | 75 | 15 |
| 27 | Compound (I-2) + Difenconazole | (0.0001:0.1) | 0.001:1 | 73 | 60 | 14 |
| 28 | Compound (I-2) + Difenconazole | (0.001:0.1) | 0.01:1 | 87 | 67 | 20 |
| 29 | Compound (I-2) + Difenconazole | (0.01:0.1) | 0.1:1 | 90 | 76 | 14 |
| 30 | Compound (I-2) + Azoxystrobin | (0.0001:0.05) | 0.002:1 | 88 | 55 | 33 |
| 31 | Compound (I-2) + Azoxystrobin | (0.001:0.05) | 0.02:1 | 91 | 63 | 27 |
| 32 | Compound (I-2) + Azoxystrobin | (0.01:0.05) | 0.2:1 | 94 | 73 | 21 |
| 33 | Compound (I-2) + Azoxystrobin | (0.0001:0.1) | 0.001:1 | 91 | 59 | 32 |
| 34 | Compound (I-2) + Azoxystrobin | (0.001:0.1) | 0.01:1 | 94 | 66 | 28 |
| 35 | Compound (I-2) + Azoxystrobin | (0.01:0.1) | 0.1:1 | 97 | 75 | 22 |
| 36 | Compound (I-2) + Picoxystrobin | (0.0001:0.05) | 0.002:1 | 78 | 58 | 21 |
| 37 | Compound (I-2) + Picoxystrobin | (0.001:0.05) | 0.02:1 | 81 | 65 | 16 |
| 38 | Compound (I-2) + Picoxystrobin | (0.0001:0.1) | 0.001:1 | 81 | 62 | 19 |
| 39 | Compound (I-2) + Picoxystrobin | (0.001:0.1) | 0.01:1 | 84 | 69 | 16 |
| 40 | Compound (I-2) + Fluazinam | (0.0001:0.05) | 0.002:1 | 78 | 48 | 30 |
| 41 | Compound (I-2) + Fluazinam | (0.001:0.05) | 0.02:1 | 81 | 58 | 24 |
| 42 | Compound (I-2) + Fluazinam | (0.01:0.05) | 0.2:1 | 84 | 69 | 16 |
| 43 | Compound (I-2) + Fluazinam | (0.0001:0.1) | 0.001:1 | 81 | 52 | 29 |
| 44 | Compound (I-2) + Fluazinam | (0.001:0.1) | 0.01:1 | 84 | 61 | 23 |
| 45 | Compound (I-2) + Fluazinam | (0.01:0.1) | 0.1:1 | 88 | 71 | 16 |
| 46 | Compound (I-2) + Folpet | (0.0001:0.05) | 0.002:1 | 75 | 50 | 25 |
| 47 | Compound (I-2) + Folpet | (0.001:0.05) | 0.02:1 | 81 | 59 | 22 |
| 48 | Compound (I-2) + Folpet | (0.01:0.05) | 0.2:1 | 91 | 70 | 21 |
| 49 | Compound (I-2) + Folpet | (0.0001:0.1) | 0.001:1 | 84 | 53 | 31 |
| 50 | Compound (I-2) + Folpet | (0.001:0.1) | 0.01:1 | 88 | 62 | 26 |
| 51 | Compound (I-2) + Folpet | (0.01:0.1) | 0.1:1 | 94 | 72 | 22 |
| 52 | Compound (I-2) + Tebuconazole | (0.0001:0.05) | 0.002:1 | 88 | 67 | 20 |
| 53 | Compound (I-2) + Tebuconazole | (0.001:0.05) | 0.02:1 | 91 | 73 | 17 |
| 54 | Compound (I-2) + Tebuconazole | (0.01:0.05) | 0.2:1 | 94 | 80 | 14 |
| 55 | Compound (I-2) + Tebuconazole | (0.0001:0.1) | 0.001:1 | 91 | 70 | 20 |
| 56 | Compound (I-2) + Tebuconazole | (0.001:0.1) | 0.01:1 | 94 | 76 | 18 |

TABLE-D2-continued

The synergistic fungicidal activity of the compositions of the present invention, wherein the representative compounds of formula (I) is particularly compound (I-2) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 57 | Compound (I-2) + Tebuconazole | (0.01:0.1) | 0.1:1 | 97 | 82 | 15 |
| 58 | Compound (I-2) + Fluopyram | (0.0001:0.05) | 0.002:1 | 63 | 51 | 13 |
| 59 | Compound (I-2) + Fluopyram | (0.01:0.05) | 0.2:1 | 83 | 70 | 13 |
| 60 | Compound (I-2) + Fluopyram | (0.0001:0.1) | 0.001:1 | 70 | 52 | 18 |
| 61 | Compound (I-2) + Fluopyram | (0.001:0.1) | 0.01:1 | 83 | 61 | 22 |
| 62 | Compound (I-2) + Fluopyram | (0.01:0.1) | 0.1:1 | 90 | 71 | 19 |
| 63 | Compound (I-2) + Mancozeb | (0.001:0.1) | 0.01:1 | 73 | 63 | 10 |
| 64 | Compound (I-2) + Mancozeb | (0.01:0.1) | 0.1:1 | 83 | 73 | 11 |
| 65 | Compound (I-2) + Dithianon | (0.001:0.05) | 0.02:1 | 73 | 63 | 10 |
| 66 | Compound (I-2) + Dithianon | (0.01:0.05) | 0.2:1 | 83 | 73 | 11 |
| 67 | Compound (I-2) + Dithianon | (0.0001:0.1) | 0.001:1 | 77 | 60 | 17 |
| 68 | Compound (I-2) + Dithianon | (0.001:0.1) | 0.01:1 | 83 | 67 | 16 |
| 69 | Compound (I-2) + Dithianon | (0.01:0.1) | 0.1:1 | 87 | 76 | 11 |

TABLE-D3

The synergistic fungicidal activity of the compositions of the present invention, wherein the representative compounds of formula (I) is particularly compound (I-3) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 1 | Compound (I-3) | 0.0001 | | 47 | | |
| 2 | Compound (I-3) | 0.001 | | 53 | | |
| 3 | Compound (I-3) | 0.01 | | 65 | | |
| 4 | Trifloxystrobin | 0.1 | | 32 | | |
| 5 | Boscalid | 0.1 | | 32 | | |
| 6 | Bixafen | 0.1 | | 22 | | |
| 7 | Azoxystrobin | 0.05 | | 15 | | |
| 8 | Azoxystrobin | 0.1 | | 22 | | |
| 9 | Picoxystrobin | 0.05 | | 20 | | |
| 10 | Picoxystrobin | 0.1 | | 28 | | |
| 11 | Fluazinam | 0.05 | | 2 | | |
| 12 | Fluazinam | 0.1 | | 10 | | |
| 13 | Metaminostorbin | 0.05 | | 45 | | |
| 14 | Metaminostorbin | 0.1 | | 56 | | |
| 15 | Folpet | 0.05 | | 5 | | |
| 16 | Folpet | 0.1 | | 12 | | |
| 17 | Tebuconazole | 0.05 | | 38 | | |
| 18 | Tebuconazole | 0.1 | | 44 | | |
| 19 | Fluopyram | 0.1 | | 10 | | |
| 20 | Mancozeb | 0.05 | | 12 | | |
| 21 | Mancozeb | 0.1 | | 15 | | |
| 22 | Propineb | 0.05 | | 20 | | |
| 23 | Propineb | 0.1 | | 33 | | |
| 24 | Benzovindiflupyr | 0.05 | | 27 | | |
| 25 | Benzovindiflupyr | 0.1 | | 38 | | |
| 26 | Fluindapyr | 0.05 | | 20 | | |
| 27 | Fluindapyr | 0.1 | | 30 | | |
| 28 | Inpyrfluxam | 0.05 | | 18 | | |
| 29 | Inpyrfluxam | 0.1 | | 30 | | |

TABLE-D3-continued

The synergistic fungicidal activity of the compositions of the present invention, wherein the representative compounds of formula (I) is particularly compound (I-3) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 30 | Dithianon | 0.05 | | 15 | | |
| 31 | Dithianon | 0.1 | | 24 | | |
| 32 | Compound (I-3) + Trifloxystrobin | (0.01:0.1) | 0.1:1 | 87 | 76 | 10 |
| 33 | Compound (I-3) + Boscalid | (0.01:0.1) | 0.1:1 | 90 | 76 | 14 |
| 34 | Compound (I-3) + Bixafen | (0.001:0.1) | 0.01:1 | 73 | 64 | 10 |
| 35 | Compound (I-3) + Azoxystrobin | (0.01:0.05) | 0.2:1 | 90 | 70 | 19 |
| 36 | Compound (I-3) + Azoxystrobin | (0.0001:0.1) | 0.001:1 | 79 | 59 | 21 |
| 37 | Compound (I-3) + Azoxystrobin | (0.001:0.1) | 0.01:1 | 83 | 64 | 19 |
| 38 | Compound (1-3) + Azoxystrobin | (0.01:0.1) | 0.1:1 | 93 | 73 | 20 |
| 39 | Compound (I-3) + Picoxystrobin | (0.001:0.05) | 0.02:1 | 72 | 63 | 10 |
| 40 | Compound (I-3) + Picoxystrobin | (0.01:0.05) | 0.2:1 | 90 | 72 | 18 |
| 41 | Compound (I-3) + Picoxystrobin | (0.0001:0.1) | 0.001:1 | 76 | 62 | 14 |
| 42 | Compound (I-3) + Picoxystrobin | (0.001:0.1) | 0.01:1 | 79 | 66 | 13 |
| 43 | Compound (I-3) + Picoxystrobin | (0.01:0.1) | 0.1:1 | 93 | 75 | 18 |
| 44 | Compound (I-3) + Fluazinam | (0.0001:0.05) | 0.002:1 | 72 | 48 | 24 |
| 45 | Compound (I-3) + Fluazinam | (0.001:0.05) | 0.02:1 | 79 | 54 | 25 |
| 46 | Compound (I-3) + Fluazinam | (0.01:0.05) | 0.2:1 | 86 | 66 | 21 |
| 47 | Compound (I-3) + Fluazinam | (0.0001:0.1) | 0.001:1 | 79 | 52 | 27 |
| 48 | Compound (I-3) + Fluazinam | (0.001:0.1) | 0.01:1 | 83 | 58 | 25 |
| 49 | Compound (I-3) + Fluazinam | (0.01:0.1) | 0.1:1 | 90 | 69 | 21 |
| 50 | Compound (I-3) + Metominostrobin | (0.001:0.05) | 0.02:1 | 86 | 74 | 12 |
| 51 | Compound (I-3) + Metominostrobin | (0.01:0.05) | 0.2:1 | 93 | 81 | 12 |
| 52 | Compound (I-3) + Metominostrobin | (0.0001:0.1) | 0.001:1 | 90 | 77 | 13 |
| 53 | Compound (1-3) + Metominostrobin | (0.001:0.1) | 0.01:1 | 93 | 79 | 14 |
| 54 | Compound (I-3) + Metominostrobin | (0.01:0.1) | 0.1:1 | 100 | 85 | 15 |
| 55 | Compound (I-3) + Folpet | (0.0001:0.05) | 0.002:1 | 66 | 50 | 16 |
| 56 | Compound (I-3) + Folpet | (0.01:0.05) | 0.2:1 | 93 | 67 | 26 |
| 57 | Compound (I-3) + Folpet | (0.0001:0.1) | 0.001:1 | 83 | 53 | 29 |
| 58 | Compound (I-3) + Folpet | (0.001:0.1) | 0.01:1 | 86 | 59 | 27 |
| 59 | Compound (I-3) + Folpet | (0.01:0.1) | 0.1:1 | 97 | 69 | 27 |
| 60 | Compound (I-3) + Tebuconazole | (0.0001:0.05) | 0.002:1 | 79 | 67 | 12 |
| 61 | Compound (I-3) + Tebuconazole | (0.001:0.05) | 0.02:1 | 86 | 71 | 15 |
| 62 | Compound (I-3) + Tebuconazole | (0.01:0.05) | 0.2:1 | 90 | 78 | 11 |
| 63 | Compound (I-3) + Tebuconazole | (0.0001:0.1) | 0.001:1 | 83 | 70 | 12 |
| 64 | Compound (I-3) + Tebuconazole | (0.001:0.1) | 0.01:1 | 93 | 74 | 19 |
| 65 | Compound (I-3) + Tebuconazole | (0.01:0.1) | 0.1:1 | 97 | 80 | 16 |

TABLE-D3-continued

The synergistic fungicidal activity of the compositions of the present invention, wherein the representative compounds of formula (I) is particularly compound (I-3) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 66 | Compound (I-3) + Fluopyram | (0.01:0.1) | 0.1:1 | 83 | 69 | 15 |
| 67 | Compound (I-3) + Mancozeb | (0.0001:0.05) | 0.002:1 | 73 | 53 | 20 |
| 68 | Compound (I-3) + Mancozeb | (0.001:0.05) | 0.02:1 | 77 | 59 | 18 |
| 69 | Compound (I-3) + Mancozeb | (0.0001:0.1) | 0.001:1 | 77 | 55 | 22 |
| 70 | Compound (I-3) + Mancozeb | (0.001:0.1) | 0.01:1 | 80 | 60 | 20 |
| 71 | Compound (I-3) + Propineb | (0.001:0.05) | 0.02:1 | 73 | 63 | 11 |
| 72 | Compound (I-3) + Propineb | (0.01:0.1) | 0.1:1 | 87 | 77 | 10 |
| 73 | Compound (I-3) + Benzovindiflupyr | (0.01:0.05) | 0.2:1 | 87 | 74 | 12 |
| 74 | Compound (I-3) + Benzovindiflupyr | (0.001:0.1) | 0.01:1 | 83 | 71 | 12 |
| 75 | Compound (I-3) + Benzovindiflupyr | (0.01:0.1) | 0.1:1 | 97 | 78 | 18 |
| 76 | Compound (I-3) + Fluindapyr | (0.001:0.05) | 0.02:1 | 73 | 63 | 11 |
| 77 | Compound (I-3) + Fluindapyr | (0.0001:0.1) | 0.001:1 | 77 | 63 | 14 |
| 78 | Compound (I-3) + Fluindapyr | (0.001:0.1) | 0.01:1 | 83 | 67 | 16 |
| 79 | Compound (I-3) + Inpyrfluxam | (0.01:0.05) | 0.2:1 | 93 | 71 | 22 |
| 80 | Compound (I-3) + Inpyrfluxam | (0.01:0.1) | 0.1:1 | 97 | 76 | 21 |
| 81 | Compound (I-3) + Dithianon | (0.001:0.05) | 0.02:1 | 70 | 60 | 10 |
| 82 | Compound (I-3) + Dithianon | (0.01:0.1) | 0.1:1 | 87 | 73 | 13 |

TABLE-D4

The synergistic fungicidal activity of the compositions of the present invention, wherein the representative compounds of formula (I) is particularly compound (I-4) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-4) | 0.0001 | | 43 | | |
| 2 | Compound (I-4) | 0.001 | | 47 | | |
| 3 | Compound (I-4) | 0.01 | | 59 | | |
| 4 | Trifloxystrobin | 0.05 | | 22 | | |
| 5 | Trifloxystrobin | 0.1 | | 32 | | |
| 6 | Boscalid | 0.1 | | 32 | | |
| 7 | Bixafen | 0.05 | | 15 | | |
| 8 | Bixafen | 0.1 | | 22 | | |
| 9 | Difenconazole | 0.05 | | 17 | | |
| 10 | Difenconazole | 0.1 | | 24 | | |
| 11 | Azoxystrobin | 0.05 | | 15 | | |
| 12 | Azoxystrobin | 0.1 | | 22 | | |
| 13 | Picoxystrobin | 0.05 | | 20 | | |
| 14 | Picoxystrobin | 0.1 | | 28 | | |
| 15 | Fluazinam | 0.05 | | 2 | | |
| 16 | Fluazinam | 0.1 | | 10 | | |
| 17 | Metominostrobin | 0.05 | | 45 | | |
| 18 | Folpet | 0.05 | | 5 | | |
| 19 | Folpet | 0.1 | | 12 | | |
| 20 | Tebuconazole | 0.05 | | 38 | | |
| 21 | Tebuconazole | 0.1 | | 44 | | |

TABLE-D4-continued

The synergistic fungicidal activity of the compositions of the present invention, wherein the representative compounds of formula (I) is particularly compound (I-4) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 22 | Fluopyram | 0.05 | | 7 | | |
| 23 | Fluopyram | 0.1 | | 10 | | |
| 24 | Mancozeb | 0.05 | | 12 | | |
| 25 | Mancozeb | 0.1 | | 15 | | |
| 26 | Propineb | 0.05 | | 20 | | |
| 27 | Propineb | 0.1 | | 33 | | |
| 28 | Metiram | 0.05 | | 17 | | |
| 29 | Metiram | 0.1 | | 37 | | |
| 30 | Benzovindiflupyr | 0.05 | | 27 | | |
| 31 | Benzovindiflupyr | 0.1 | | 38 | | |
| 32 | Fluindapyr | 0.05 | | 20 | | |
| 33 | Fluindapyr | 0.1 | | 30 | | |
| 34 | Inpyrfluxam | 0.05 | | 18 | | |
| 35 | Inpyrfluxam | 0.1 | | 30 | | |
| 36 | Dithianon | 0.05 | | 15 | | |
| 37 | Dithianon | 0.1 | | 24 | | |
| 38 | Compound (I-4) + Trifloxystrobin | (0.001:0.05) | 0.02:1 | 70 | 58 | 12 |
| 39 | Compound (I-4) + Trifloxystrobin | (0.001:0.1) | 0.01:1 | 73 | 64 | 10 |
| 40 | Compound (I-4) + Boscalid | (0.001:0.1) | 0.01:1 | 73 | 64 | 10 |
| 41 | Compound (I-4) + Bixafen | (0.01:0.05) | 0.2:1 | 77 | 65 | 12 |
| 42 | Compound (I-4) + Bixafen | (0.01:0.1) | 0.1:1 | 83 | 68 | 15 |
| 43 | Compound (I-4) + Difenconazole | (0.001:0.05) | 0.02:1 | 73 | 56 | 18 |
| 44 | Compound (I-4) + Difenconazole | (0.01:0.05) | 0.2:1 | 80 | 66 | 14 |
| 45 | Compound (I-4) + Difenconazole | (0.001:0.1) | 0.01:1 | 77 | 59 | 17 |
| 46 | Compound (I-4) + Difenconazole | (0.01:0.1) | 0.1:1 | 83 | 69 | 14 |
| 47 | Compound (I-4) + Azoxystrobin | (0.0001:0.05) | 0.002:1 | 84 | 52 | 32 |
| 48 | Compound (I-4) + Azoxystrobin | (0.001:0.05) | 0.02:1 | 87 | 55 | 32 |
| 49 | Compound (I-4) + Azoxystrobin | (0.01:0.05) | 0.2:1 | 94 | 65 | 28 |
| 50 | Compound (I-4) + Azoxystrobin | (0.0001:0.1) | 0.001:1 | 94 | 56 | 38 |
| 51 | Compound (I-4) + Azoxystrobin | (0.001:0.1) | 0.01:1 | 97 | 58 | 38 |
| 52 | Compound (I-4) + Azoxystrobin | (0.01:0.1) | 0.1:1 | 100 | 68 | 32 |
| 53 | Compound (I-4) + Picoxystrobin | (0.0001:0.05) | 0.002:1 | 77 | 54 | 23 |
| 54 | Compound (I-4) + Picoxystrobin | (0.001:0.05) | 0.02:1 | 81 | 57 | 23 |
| 55 | Compound (I-4) + Picoxystrobin | (0.01:0.05) | 0.2:1 | 94 | 67 | 26 |
| 56 | Compound (I-4) + Picoxystrobin | (0.0001:0.1) | 0.001:1 | 84 | 59 | 25 |
| 57 | Compound (I-4) + Picoxystrobin | (0.001:0.1) | 0.01:1 | 94 | 62 | 32 |
| 58 | Compound (I-4) + Picoxystrobin | (0.01:0.1) | 0.1:1 | 97 | 70 | 26 |
| 59 | Compound (I-4) + Fluazinam | (0.0001:0.05) | 0.002:1 | 77 | 44 | 33 |
| 60 | Compound (I-4) + Fluazinam | (0.001:0.05) | 0.02:1 | 87 | 48 | 39 |
| 61 | Compound (I-4) + Fluazinam | (0.01:0.05) | 0.2:1 | 90 | 60 | 31 |
| 62 | Compound (I-4) + Fluazinam | (0.0001:0.1) | 0.001:1 | 87 | 49 | 38 |
| 63 | Compound (I-4) + Fluazinam | (0.001:0.1) | 0.01:1 | 90 | 52 | 38 |
| 64 | Compound (I-4) + Fluazinam | (0.01:0.1) | 0.1:1 | 94 | 63 | 30 |

TABLE-D4-continued

The synergistic fungicidal activity of the compositions of the present invention, wherein the representative compounds of formula (I) is particularly compound (I-4) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 65 | Compound (I-4) + Metominostrobin | (0.001:0.05) | 0.02:1 | 81 | 71 | 10 |
| 66 | Compound (I-4) + Metominostrobin | (0.01:0.05) | 0.2:1 | 87 | 77 | 10 |
| 67 | Compound (I-4) + Folpet | (0.0001:0.05) | 0.002:1 | 77 | 46 | 32 |
| 68 | Compound (I-4) + Folpet | (0.001:0.05) | 0.02:1 | 81 | 49 | 31 |
| 69 | Compound (I-4) + Folpet | (0.01:0.05) | 0.2:1 | 87 | 61 | 26 |
| 70 | Compound (I-4) + Folpet | (0.0001:0.1) | 0.001:1 | 84 | 50 | 34 |
| 71 | Compound (I-4) + Folpet | (0.001:0.1) | 0.01:1 | 87 | 53 | 34 |
| 72 | Compound (I-4) + Folpet | (0.01:0.1) | 0.1:1 | 90 | 64 | 26 |
| 73 | Compound (I-4) + Tebuconazole | (0.0001:0.05) | 0.002:1 | 90 | 65 | 26 |
| 74 | Compound (I-4) + Tebuconazole | (0.001:0.05) | 0.02:1 | 94 | 67 | 27 |
| 75 | Compound (I-4) + Tebuconazole | (0.01:0.05) | 0.2:1 | 97 | 75 | 22 |
| 76 | Compound (I-4) + Tebuconazole | (0.0001:0.1) | 0.001:1 | 97 | 68 | 29 |
| 77 | Compound (I-4) + Tebuconazole | (0.001:0.1) | 0.01:1 | 100 | 70 | 30 |
| 78 | Compound (I-4) + Tebuconazole | (0.01:0.1) | 0.1:1 | 100 | 77 | 23 |
| 79 | Compound (I-4) + Fluopyram | (0.0001:0.05) | 0.002:1 | 63 | 47 | 16 |
| 80 | Compound (I-4) + Fluopyram | (0.001:0.05) | 0.02:1 | 73 | 50 | 23 |
| 81 | Compound (I-4) + Fluopyram | (0.01:0.05) | 0.2:1 | 77 | 62 | 15 |
| 82 | Compound (I-4) + Fluopyram | (0.0001:0.1) | 0.001:1 | 63 | 49 | 15 |
| 83 | Compound (I-4) + Fluopyram | (0.001:0.1) | 0.01:1 | 77 | 52 | 25 |
| 84 | Compound (I-4) + Fluopyram | (0.01:0.1) | 0.1:1 | 80 | 63 | 17 |
| 85 | Compound (I-4) + Mancozeb | (0.01:0.05) | 0.2:1 | 83 | 64 | 19 |
| 86 | Compound (I-4) + Mancozeb | (0.0001:0.1) | 0.001:1 | 73 | 52 | 22 |
| 87 | Compound (I-4) + Mancozeb | (0.001:0.1) | 0.01:1 | 77 | 55 | 22 |
| 88 | Compound (I-4) + Mancozeb | (0.01:0.1) | 0.1:1 | 87 | 65 | 22 |
| 89 | Compound (I-4) + Propineb | (0.001:0.05) | 0.02:1 | 77 | 57 | 19 |
| 90 | Compound (I-4) + Propineb | (0.01:0.05) | 0.2:1 | 83 | 67 | 16 |
| 91 | Compound (I-4) + Propineb | (0.0001:0.1) | 0.001:1 | 80 | 62 | 18 |
| 92 | Compound (I-4) + Propineb | (0.001:0.1) | 0.01:1 | 87 | 64 | 22 |
| 93 | Compound (I-4) + Propineb | (0.01:0.1) | 0.1:1 | 93 | 73 | 21 |
| 94 | Compound (I-4) + Metiram | (0.0001:0.05) | 0.002:1 | 67 | 53 | 14 |
| 95 | Compound (I-4) + Metiram | (0.001:0.05) | 0.02:1 | 70 | 56 | 14 |
| 96 | Compound (I-4) + Metiram | (0.01:0.05) | 0.2:1 | 80 | 66 | 14 |
| 97 | Compound (I-4) + Benzovindiflupyr | (0.001:0.05) | 0.02:1 | 73 | 61 | 12 |
| 98 | Compound (I-4) + Benzovindiflupyr | (0.01:0.05) | 0.2:1 | 83 | 70 | 13 |
| 99 | Compound (I-4) + Benzovindiflupyr | (0.001:0.1) | 0.01:1 | 80 | 67 | 13 |

TABLE-D4-continued

The synergistic fungicidal activity of the compositions of the present invention, wherein the representative compounds of formula (I) is particularly compound (I-4) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 100 | Compound (I-4) + Benzovindiflupyr | (0.01:0.1) | 0.1:1 | 93 | 75 | 19 |
| 101 | Compound (I-4) + Fluindapyr | (0.001:0.05) | 0.02:1 | 73 | 57 | 16 |
| 102 | Compound (I-4) + Fluindapyr | (0.01:0.05) | 0.2:1 | 83 | 67 | 16 |
| 103 | Compound (I-4) + Fluindapyr | (0.0001:0.1) | 0.001:1 | 77 | 60 | 17 |
| 104 | Compound (I-4) + Fluindapyr | (0.001:0.1) | 0.01:1 | 83 | 63 | 21 |
| 105 | Compound (I-4) + Fluindapyr | (0.01:0.1) | 0.1:1 | 87 | 71 | 15 |
| 106 | Compound (I-4) + Inpyrfluxam | (0.001:0.05) | 0.02:1 | 73 | 56 | 17 |
| 107 | Compound (I-4) + Inpyrfluxam | (0.01:0.05) | 0.2:1 | 80 | 66 | 14 |
| 108 | Compound (I-4) + Inpyrfluxam | (0.0001:0.1) | 0.001:1 | 73 | 60 | 13 |
| 109 | Compound (I-4) + Inpyrfluxam | (0.001:0.1) | 0.01:1 | 83 | 63 | 21 |
| 110 | Compound (I-4) + Inpyrfluxam | (0.01:0.1) | 0.1:1 | 90 | 71 | 19 |
| 111 | Compound (I-4) + Dithianon | (0.0001:0.05) | 0.002:1 | 67 | 52 | 15 |
| 112 | Compound (I-4) + Dithianon | (0.001:0.05) | 0.02:1 | 77 | 55 | 22 |
| 113 | Compound (I-4) + Dithianon | (0.01:0.05) | 0.2:1 | 83 | 65 | 18 |
| 114 | Compound (I-4) + Dithianon | (0.0001:0.1) | 0.001:1 | 77 | 57 | 20 |
| 115 | Compound (I-4) + Dithianon | (0.001:0.1) | 0.01:1 | 83 | 59 | 24 |
| 116 | Compound (I-4) + Dithianon | (0.01:0.1) | 0.1:1 | 90 | 69 | 21 |

TABLE-D5

The synergistic fungicidal activity of the compositions of the present invention, wherein the representative compounds of formula (I) is particularly compound (I-5) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-5) | 0.0001 | | 37 | | |
| 2 | Compound (I-5) | 0.001 | | 50 | | |
| 3 | Compound (I-5) | 0.01 | | 61 | | |
| 4 | Trifloxystrobin | 0.1 | | 32 | | |
| 5 | Difenconazole | 0.1 | | 24 | | |
| 6 | Fluxapyroxad | 0.05 | | 46 | | |
| 7 | Fluxapyroxad | 0.1 | | 59 | | |
| 8 | Azoxystrobin | 0.05 | | 15 | | |
| 9 | Azoxystrobin | 0.1 | | 22 | | |
| 10 | Picoxystrobin | 0.05 | | 20 | | |
| 11 | Picoxystrobin | 0.1 | | 28 | | |
| 12 | Fluazinam | 0.05 | | 2 | | |
| 13 | Fluazinam | 0.1 | | 10 | | |
| 14 | Metominostrobin | 0.05 | | 45 | | |
| 15 | Metominostrobin | 0.1 | | 56 | | |
| 16 | Folpet | 0.05 | | 5 | | |
| 17 | Folpet | 0.1 | | 12 | | |
| 18 | Tebuconazole | 0.05 | | 38 | | |
| 19 | Tebuconazole | 0.1 | | 44 | | |
| 20 | Fluopyram | 0.05 | | 7 | | |
| 21 | Fluopyram | 0.1 | | 10 | | |
| 22 | Mancozeb | 0.05 | | 12 | | |

TABLE-D5-continued

The synergistic fungicidal activity of the compositions of the present invention, wherein the representative compounds of formula (I) is particularly compound (I-5) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 23 | Mancozeb | 0.1 | | 15 | | |
| 24 | Propineb | 0.05 | | 20 | | |
| 25 | Propineb | 0.1 | | 33 | | |
| 26 | Benzovindiflupyr | 0.05 | | 27 | | |
| 27 | Benzovindiflupyr | 0.1 | | 38 | | |
| 28 | Fluindapyr | 0.1 | | 30 | | |
| 29 | Dithianon | 0.05 | | 15 | | |
| 30 | Dithianon | 0.1 | | 24 | | |
| 31 | Compound (I-5) + Trifloxystrobin | (0.0001:0.1) | 0.001:1 | 67 | 57 | 10 |
| 32 | Compound (I-5) + Difenconazole | (0.001:0.1) | 0.01:1 | 73 | 62 | 11 |
| 33 | Compound (I-5) + Fluxapyroxad | (0.0001:0.05) | 0.002:1 | 87 | 66 | 21 |
| 34 | Compound (I-5) + Fluxapyroxad | (0.001:0.05) | 0.02:1 | 90 | 73 | 17 |
| 35 | Compound (I-5) + Fluxapyroxad | (0.01:0.05) | 0.2:1 | 97 | 79 | 18 |
| 36 | Compound (I-5) + Fluxapyroxad | (0.0001:0.1) | 0.001:1 | 93 | 74 | 19 |
| 37 | Compound (I-5) + Fluxapyroxad | (0.001:0.1) | 0.01:1 | 97 | 80 | 17 |
| 38 | Compound (I-5) + Fluxapyroxad | (0.01:0.1) | 0.1:1 | 100 | 84 | 16 |
| 39 | Compound (I-5) + Azoxystrobin | (0.0001:0.05) | 0.002:1 | 93 | 46 | 47 |
| 40 | Compound (I-5) + Azoxystrobin | (0.001:0.05) | 0.02:1 | 100 | 58 | 43 |
| 41 | Compound (I-5) + Azoxystrobin | (0.01:0.05) | 0.2:1 | 100 | 67 | 33 |
| 42 | Compound (I-5) + Azoxystrobin | (0.0001:0.1) | 0.001:1 | 97 | 51 | 46 |
| 43 | Compound (I-5) + Azoxystrobin | (0.001:0.1) | 0.01:1 | 100 | 61 | 39 |
| 44 | Compound (I-5) + Azoxystrobin | (0.01:0.1) | 0.1:1 | 100 | 70 | 30 |
| 45 | Compound (I-5) + Picoxystrobin | (0.0001:0.05) | 0.002:1 | 77 | 50 | 27 |
| 46 | Compound (I-5) + Picoxystrobin | (0.001:0.05) | 0.02:1 | 80 | 60 | 20 |
| 47 | Compound (I-5) + Picoxystrobin | (0.01:0.05) | 0.2:1 | 87 | 69 | 18 |
| 48 | Compound (I-5) + Picoxystrobin | (0.0001:0.1) | 0.001:1 | 83 | 55 | 29 |
| 49 | Compound (I-5) + Picoxystrobin | (0.001:0.1) | 0.01:1 | 87 | 64 | 23 |
| 50 | Compound (I-5) + Picoxystrobin | (0.01:0.1) | 0.1:1 | 90 | 72 | 18 |
| 51 | Compound (I-5) + Fluazinam | (0.0001:0.05) | 0.002:1 | 87 | 38 | 48 |
| 52 | Compound (I-5) + Fluazinam | (0.001:0.05) | 0.02:1 | 90 | 51 | 39 |
| 53 | Compound (I-5) + Fluazinam | (0.01:0.05) | 0.2:1 | 93 | 62 | 32 |
| 54 | Compound (I-5) + Fluazinam | (0.0001:0.1) | 0.001:1 | 90 | 43 | 47 |
| 55 | Compound (I-5) + Fluazinam | (0.001:0.1) | 0.01:1 | 93 | 55 | 38 |
| 56 | Compound (I-5) + Fluazinam | (0.01:0.1) | 0.1:1 | 97 | 65 | 32 |
| 57 | Compound (I-5) + Metominostrobin | (0.0001:0.05) | 0.002:1 | 90 | 65 | 25 |
| 58 | Compound (I-5) + Metominostrobin | (0.001:0.05) | 0.02:1 | 93 | 73 | 21 |
| 59 | Compound (I-5) + Metominostrobin | (0.01:0.05) | 0.2:1 | 97 | 79 | 18 |
| 60 | Compound (I-5) + Metominostrobin | (0.0001:0.1) | 0.001:1 | 97 | 72 | 24 |
| 61 | Compound (I-5) + Metominostrobin | (0.001:0.1) | 0.01:1 | 100 | 78 | 22 |

TABLE-D5-continued

The synergistic fungicidal activity of the compositions of the present invention, wherein the representative compounds of formula (I) is particularly compound (I-5) as component (1) and other components (2) selected from the groups (A) to (R) against *Phakopsora pachyrhizi* test in soybean are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 62 | Compound (I-5) + Metominostrobin | (0.01:0.1) | 0.1:1 | 100 | 83 | 17 |
| 63 | Compound (I-5) + Folpet | (0.0001:0.05) | 0.002:1 | 90 | 40 | 50 |
| 64 | Compound (I-5) + Folpet | (0.001:0.05) | 0.02:1 | 97 | 53 | 44 |
| 65 | Compound (I-5) + Folpet | (0.01:0.05) | 0.2:1 | 100 | 63 | 37 |
| 66 | Compound (I-5) + Folpet | (0.0001:0.1) | 0.001:1 | 100 | 45 | 55 |
| 67 | Compound (I-5) + Folpet | (0.001:0.1) | 0.01:1 | 100 | 56 | 44 |
| 68 | Compound (I-5) + Folpet | (0.01:0.1) | 0.1:1 | 100 | 66 | 34 |
| 69 | Compound (I-5) + Tebuconazole | (0.0001:0.05) | 0.002:1 | 93 | 61 | 32 |
| 70 | Compound (I-5) + Tebuconazole | (0.001:0.05) | 0.02:1 | 97 | 69 | 28 |
| 71 | Compound (I-5) + Tebuconazole | (0.01:0.05) | 0.2:1 | 100 | 76 | 24 |
| 72 | Compound (I-5) + Tebuconazole | (0.0001:0.1) | 0.001:1 | 100 | 65 | 35 |
| 73 | Compound (I-5) + Tebuconazole | (0.001:0.1) | 0.01:1 | 100 | 72 | 28 |
| 74 | Compound (I-5) + Tebuconazole | (0.01:0.1) | 0.1:1 | 100 | 78 | 22 |
| 75 | Compound (I-5) + Fluopyram | (0.01:0.05) | 0.2:1 | 90 | 64 | 26 |
| 76 | Compound (I-5) + Fluopyram | (0.0001:0.1) | 0.001:1 | 67 | 43 | 23 |
| 77 | Compound (I-5) + Fluopyram | (0.001:0.1) | 0.01:1 | 77 | 55 | 22 |
| 78 | Compound (I-5) + Fluopyram | (0.01:0.1) | 0.1:1 | 97 | 65 | 32 |
| 79 | Compound (I-5) + Mancozeb | (0.0001:0.1) | 0.001:1 | 67 | 46 | 20 |
| 80 | Compound (I-5) + Mancozeb | (0.001:0.1) | 0.01:1 | 73 | 58 | 16 |
| 81 | Compound (I-5) + Mancozeb | (0.01:0.1) | 0.1:1 | 83 | 67 | 16 |
| 82 | Compound (I-5) + Propineb | (0.001:0.05) | 0.02:1 | 77 | 60 | 17 |
| 83 | Compound (I-5) + Propineb | (0.01:0.05) | 0.2:1 | 90 | 69 | 21 |
| 84 | Compound (I-5) + Propineb | (0.0001:0.1) | 0.001:1 | 77 | 58 | 19 |
| 85 | Compound (I-5) + Propineb | (0.001:0.1) | 0.01:1 | 87 | 67 | 20 |
| 86 | Compound (I-5) + Propineb | (0.01:0.1) | 0.1:1 | 93 | 74 | 19 |
| 87 | Compound (I-5) + Benzovindiflupyr | (0.001:0.05) | 0.02:1 | 87 | 64 | 23 |
| 88 | Compound (I-5) + Benzovindiflupyr | (0.01:0.05) | 0.2:1 | 100 | 72 | 28 |
| 89 | Compound (I-5) + Benzovindiflupyr | (0.001:0.1) | 0.01:1 | 90 | 69 | 21 |
| 90 | Compound (I-5) + Benzovindiflupyr | (0.01:0.1) | 0.1:1 | 100 | 76 | 24 |
| 91 | Compound (I-5) + Fluindapyr | (0.01:0.1) | 0.1:1 | 83 | 73 | 11 |
| 92 | Compound (I-5) + Dithianon | (0.001:0.05) | 0.02:1 | 70 | 58 | 13 |
| 93 | Compound (I-5) + Dithianon | (0.01:0.05) | 0.2:1 | 87 | 67 | 20 |
| 94 | Compound (I-5) + Dithianon | (0.0001:0.1) | 0.001:1 | 63 | 52 | 11 |
| 95 | Compound (I-5) + Dithianon | (0.001:0.1) | 0.01:1 | 83 | 62 | 21 |
| 96 | Compound (I-5) + Dithianon | (0.01:0.1) | 0.1:1 | 93 | 70 | 23 |

Example E: *Parastagonospora nodorum/Septoria nodorum*/Stagnospora *Nodorum* Test in Wheat The single compounds or compound combinations were dissolved in 2% DMSO/Acetone and then mixed with water containing emulsifier to a calibrated spray volume of 50 mL. The spray solutions were poured into spray bottles for further applications.

To test the preventive activity of compounds, healthy young wheat plants, raised in the greenhouse, were sprayed with the single compound or mixture preparation at the stated application rates inside the spray cabinets using hollow cone nozzles. One day after treatment, the plants were inoculated with a suspension containing $2.8\times10^6$ Stagnospora *nodorum* inoculum. The inoculated plants were then kept in a greenhouse chamber at 22-25° C. temperature and 90-100% relative humidity for disease expression.

A visual assessment of the performance of the compounds and respective compound combinations was carried out by rating the disease severity (0-100% scale) on treated plants 3, 7 and 10 days after application. Efficacy (% control) of the compounds was calculated by comparing the disease rating in the treatment with the one of the untreated control. The compounds were also assessed for their plant compatibility by recording symptoms like necrosis, chlorosis & stunting. The results are shown for the compound of formula (I-1) to (I-5) in Table E1-E5.

Surprisingly, the following combinations, indicated in the table below, have revealed unexpected synergistic effects:

TABLE-E1

The synergistic fungicidal activity of the compositions of the present invention, wherein the representative compounds of formula (I) is particularly compound (I-1) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-1) | 1 | | 17 | | |
| 2 | Compound (I-1) | 5 | | 20 | | |
| 3 | Compound (I-1) | 20 | | 43 | | |
| 4 | Trifloxystrobin | 0.05 | | 5 | | |
| 5 | Trifloxystrobin | 0.1 | | 18 | | |
| 6 | Bixafen | 0.05 | | 18 | | |
| 7 | Bixafen | 0.1 | | 29 | | |
| 8 | Difenconazole | 0.1 | | 32 | | |
| 9 | Fluxapyroxad | 0.05 | | 3 | | |
| 10 | Fluxapyroxad | 0.1 | | 5 | | |
| 11 | Azoxystrobin | 0.05 | | 42 | | |
| 12 | Azoxystrobin | 0.1 | | 47 | | |
| 13 | Fluazinam | 0.1 | | 21 | | |
| 14 | Metaminostorbin | 0.1 | | 12 | | |
| 15 | Folpet | 0.05 | | 16 | | |
| 16 | Folpet | 0.1 | | 21 | | |
| 17 | Fluopyram | 0.05 | | 8 | | |
| 18 | Fluopyram | 0.1 | | 21 | | |
| 19 | Propineb | 0.05 | | 12 | | |
| 20 | Propineb | 0.1 | | 24 | | |
| 21 | Inpyrfluxam | 0.05 | | 12 | | |
| 22 | Inpyrfluxam | 0.1 | | 29 | | |
| 23 | Compound (I-1) + Trifloxystrobin | (5:0.05) | 100:1 | 35 | 24 | 11 |
| 24 | Compound (I-1) + Trifloxystrobin | (1:0.1) | 10:1 | 48 | 32 | 16 |
| 25 | Compound (I-1) + Trifloxystrobin | (5:0.1) | 50:1 | 53 | 34 | 18 |
| 26 | Compound (I-1) + Bixafen | (5:0.05) | 100:1 | 45 | 34 | 11 |
| 27 | Compound (I-1) + Bixafen | (1:0.1) | 10:1 | 55 | 41 | 14 |
| 28 | Compound (I-1) + Bixafen | (5:0.1) | 50:1 | 60 | 43 | 17 |
| 29 | Compound (I-1) + Bixafen | (20:0.1) | 200:1 | 73 | 60 | 13 |
| 30 | Compound (I-1) + Difenconazole | (5:0.1) | 50:1 | 60 | 46 | 14 |
| 31 | Compound (I-1) + Fluxapyroxad | (1:0.05) | 20:1 | 39 | 19 | 20 |
| 32 | Compound (I-1) + Fluxapyroxad | (5:0.05) | 100:1 | 53 | 22 | 30 |
| 33 | Compound (I-1) + Fluxapyroxad | (20:0.05) | 400:1 | 67 | 45 | 22 |
| 34 | Compound (I-1) + Fluxapyroxad | (1:0.1) | 10:1 | 61 | 21 | 40 |
| 35 | Compound (I-1) + Fluxapyroxad | (5:0.1) | 50:1 | 58 | 24 | 34 |
| 36 | Compound (I-1) + Fluxapyroxad | (20:0.1) | 200:1 | 69 | 46 | 23 |
| 37 | Compound (I-1) + Azoxystrobin | (20:0.05) | 400:1 | 78 | 67 | 11 |

TABLE-E1-continued

The synergistic fungicidal activity of the compositions of the present invention, wherein the representative compounds of formula (I) is particularly compound (I-1) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 38 | Compound (I-1) + Azoxystrobin | (1:0.1) | 10:1 | 72 | 56 | 16 |
| 39 | Compound (I-1) + Azoxystrobin | (5:0.1) | 50:1 | 75 | 58 | 17 |
| 40 | Compound (I-1) + Azoxystrobin | (20:0.1) | 200:1 | 81 | 70 | 11 |
| 41 | Compound (I-1) + Fluazinam | (5:0.1) | 50:1 | 47 | 37 | 10 |
| 42 | Compound (I-1) + Metominostrobin | (1:0.1) | 10:1 | 47 | 27 | 21 |
| 43 | Compound (I-1) + Metominostrobin | (5:0.1) | 50:1 | 53 | 30 | 23 |
| 45 | Compound (I-1) + Folpet | (5:0.05) | 100:1 | 53 | 33 | 20 |
| 46 | Compound (I-1) + Folpet | (1:0.1) | 10:1 | 64 | 34 | 30 |
| 47 | Compound (I-1) + Folpet | (5:0.1) | 50:1 | 69 | 37 | 33 |
| 48 | Compound (I-1) + Folpet | (20:0.1) | 200:1 | 72 | 55 | 17 |
| 49 | Compound (I-1) + Fluopyram | (1:0.05) | 20:1 | 38 | 23 | 14 |
| 50 | Compound (I-1) + Fluopyram | (5:0.05) | 100:1 | 44 | 26 | 17 |
| 51 | Compound (I-1) + Fluopyram | (1:0.1) | 10:1 | 44 | 34 | 10 |
| 52 | Compound (I-1) + Fluopyram | (5:0.1) | 50:1 | 50 | 37 | 13 |
| 53 | Compound (I-1) + Propineb | (1:0.05) | 20:1 | 38 | 27 | 11 |
| 54 | Compound (I-1) + Propineb | (5:0.05) | 100:1 | 41 | 30 | 11 |
| 55 | Compound (I-1) + Propineb | (5:0.1) | 50:1 | 50 | 39 | 11 |
| 56 | Compound (I-1) + Inpyrfluxam | (1:0.05) | 20:1 | 38 | 27 | 11 |
| 57 | Compound (I-1) + Inpyrfluxam | (5:0.05) | 100:1 | 44 | 30 | 14 |
| 58 | Compound (I-1) + Inpyrfluxam | (5:0.1) | 50:1 | 56 | 43 | 13 |

TABLE-E2

The synergistic fungicidal activity of the compositions of the present invention, wherein the representative compounds of formula (I) is particularly compound (I-2) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-2) | 1 | | 13 | | |
| 2 | Compound (I-2) | 5 | | 23 | | |
| 3 | Compound (I-2) | 20 | | 33 | | |
| 4 | Trifloxystrobin | 0.05 | | 5 | | |
| 5 | Trifloxystrobin | 0.1 | | 18 | | |
| 6 | Bixafen | 0.1 | | 29 | | |
| 7 | Fluxapyroxad | 0.05 | | 3 | | |
| 8 | Fluxapyroxad | 0.1 | | 5 | | |
| 9 | Picoxystrobin | 0.05 | | 12 | | |
| 10 | Picoxystrobin | 0.1 | | 26 | | |
| 11 | Metominostrobin | 0.05 | | 6 | | |
| 12 | Metominostrobin | 0.1 | | 12 | | |
| 13 | Folpet | 0.05 | | 16 | | |
| 14 | Folpet | 0.1 | | 21 | | |
| 15 | Fluopyram | 0.05 | | 8 | | |
| 16 | Inpyrfluxam | 0.05 | | 12 | | |

TABLE-E2-continued

The synergistic fungicidal activity of the compositions of the present invention, wherein the representative compounds of formula (I) is particularly compound (I-2) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 17 | Dithianon | 0.05 | | 11 | | |
| 18 | Dithianon | 0.1 | | 16 | | |
| 19 | Compound (I-2) + Trifloxystrobin | (5:0.05) | 100:1 | 37 | 27 | 10 |
| 20 | Compound (I-2) + Trifloxystrobin | (20:0.05) | 400:1 | 50 | 37 | 13 |
| 21 | Compound (I-2) + Trifloxystrobin | (1:0.1) | 10:1 | 39 | 29 | 11 |
| 22 | Compound (I-2) + Trifloxystrobin | (5:0.1) | 50:1 | 53 | 37 | 15 |
| 23 | Compound (I-2) + Trifloxystrobin | (20:0.1) | 200:1 | 55 | 45 | 10 |
| 24 | Compound (I-2) + Bixafen | (20:0.1) | 200:1 | 92 | 53 | 39 |
| 25 | Compound (I-2) + Fluxapyroxad | (20:0.05) | 400:1 | 64 | 35 | 29 |
| 26 | Compound (I-2) + Fluxapyroxad | (1:0.1) | 10:1 | 47 | 18 | 30 |
| 27 | Compound (I-2) + Fluxapyroxad | (5:0.1) | 50:1 | 61 | 27 | 34 |
| 28 | Compound (I-2) + Fluxapyroxad | (20:0.1) | 200:1 | 69 | 37 | 33 |
| 29 | Compound (I-2) + Picoxystrobin | (20:0.05) | 400:1 | 58 | 41 | 17 |
| 30 | Compound (I-2) + Picoxystrobin | (5:0.1) | 50:1 | 56 | 43 | 12 |
| 31 | Compound (I-2) + Picoxystrobin | (20:0.1) | 200:1 | 61 | 51 | 10 |
| 32 | Compound (I-2) + Metominostrobin | (20:0.05) | 400:1 | 67 | 37 | 29 |
| 33 | Compound (I-2) + Metominostrobin | (1:0.1) | 10:1 | 53 | 24 | 29 |
| 34 | Compound (I-2) + Metominostrobin | (5:0.1) | 50:1 | 64 | 33 | 31 |
| 35 | Compound (I-2) + Metominostrobin | (20:0.1) | 200:1 | 72 | 41 | 31 |
| 36 | Compound (I-2) + Folpet | (20:0.05) | 400:1 | 58 | 44 | 14 |
| 37 | Compound (I-2) + Folpet | (1:0.1) | 10:1 | 50 | 32 | 18 |
| 38 | Compound (I-2) + Folpet | (5:0.1) | 50:1 | 53 | 39 | 13 |
| 39 | Compound (I-2) + Folpet | (20:0.1) | 200:1 | 61 | 47 | 14 |
| 40 | Compound (I-2) + Fluopyram | (1:0.05) | 20:1 | 33 | 20 | 12 |
| 41 | Compound (I-2) + Fluopyram | (5:0.05) | 100:1 | 40 | 29 | 10 |
| 42 | Compound (I-2) + Inpyrfluxam | (1:0.05) | 20:1 | 35 | 24 | 11 |
| 43 | Compound (I-2) + Dithianon | (1:0.05) | 20:1 | 37 | 23 | 14 |
| 44 | Compound (I-2) + Dithianon | (5:0.05) | 100:1 | 42 | 32 | 10 |
| 45 | Compound (I-2) + Dithianon | (1:0.1) | 10:1 | 40 | 27 | 12 |
| 46 | Compound (I-2) + Dithianon | (5:0.1) | 50:1 | 47 | 36 | 11 |
| 47 | Compound (I-2) + Dithianon | (20:0.1) | 200:1 | 56 | 44 | 12 |

TABLE E3

The synergistic fungicidal activity of the compositions of the present invention, wherein the representative compounds of formula (I) is particularly compound (I-3) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 1 | Compound (I-3) | 1 | | 13 | | |
| 2 | Compound (I-3) | 5 | | 27 | | |
| 3 | Compound (I-3) | 20 | | 40 | | |
| 4 | Trifloxystrobin | 0.05 | | 5 | | |
| 5 | Trifloxystrobin | 0.1 | | 18 | | |
| 6 | Fluxapyroxad | 0.05 | | 3 | | |
| 7 | Fluxapyroxad | 0.1 | | 5 | | |
| 8 | Fluazinam | 0.1 | | 21 | | |
| 9 | Metominostrobin | 0.1 | | 12 | | |
| 10 | Fluopyram | 0.05 | | 8 | | |
| 11 | Dithianon | 0.05 | | 11 | | |
| 12 | Dithianon | 0.1 | | 16 | | |
| 13 | Compound (I-3) + Trifloxystrobin | (1:0.05) | 20:1 | 35 | 18 | 17 |
| 14 | Compound (I-3) + Trifloxystrobin | (20:0.05) | 400:1 | 55 | 43 | 12 |
| 15 | Compound (I-3) + Trifloxystrobin | (1:0.1) | 10:1 | 45 | 29 | 16 |
| 16 | Compound (I-3) + Fluxapyroxad | (1:0.05) | 20:1 | 32 | 16 | 16 |
| 17 | Compound (I-3) + Fluxapyroxad | (5:0.05) | 100:1 | 39 | 29 | 11 |
| 18 | Compound (I-3) + Fluxapyroxad | (20:0.05) | 400:1 | 61 | 42 | 19 |
| 23 | Compound (I-3) + Fluxapyroxad | (1:0.1) | 10:1 | 47 | 18 | 30 |
| 24 | Compound (I-3) + Fluxapyroxad | (5:0.1) | 50:1 | 53 | 30 | 22 |
| 25 | Compound (I-3) + Fluxapyroxad | (20:0.1) | 200:1 | 66 | 43 | 23 |
| 26 | Compound (I-3) + Fluazinam | (1:0.1) | 10:1 | 45 | 32 | 13 |
| 27 | Compound (I-3) + Metominostrobin | (1:0.1) | 10:1 | 42 | 24 | 18 |
| 28 | Compound (I-3) + Metominostrobin | (5:0.1) | 50:1 | 47 | 35 | 12 |
| 29 | Compound (I-3) + Fluopyram | (1:0.05) | 20:1 | 38 | 20 | 17 |
| 30 | Compound (I-3) + Dithianon | (1:0.05) | 20:1 | 38 | 23 | 15 |
| 31 | Compound (I-3) + Dithianon | (20:0.05) | 400:1 | 56 | 47 | 10 |
| 32 | Compound (I-3) + Dithianon | (1:0.1) | 10:1 | 41 | 27 | 13 |
| 33 | Compound (I-3) + Dithianon | (5:0.1) | 50:1 | 50 | 38 | 12 |
| 34 | Compound (I-3) + Dithianon | (20:0.1) | 200:1 | 59 | 50 | 10 |

TABLE E4

The synergistic fungicidal activity of the compositions of the present invention, wherein the representative compounds of formula (I) is particularly compound (I-4) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-4) | 1 | | 20 | | |
| 2 | Compound (I-4) | 5 | | 23 | | |
| 3 | Compound (I-4) | 20 | | 27 | | |
| 4 | Fluxapyroxad | 0.05 | | 3 | | |
| 5 | Fluxapyroxad | 0.1 | | 5 | | |
| 6 | Picoxystrobin | 0.05 | | 12 | | |
| 7 | Picoxystrobin | 0.1 | | 26 | | |

TABLE E4-continued

The synergistic fungicidal activity of the compositions of the present invention, wherein the representative compounds of formula (I) is particularly compound (I-4) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 8 | Metominostrobin | 0.05 | | 6 | | |
| 9 | Metominostrobin | 0.1 | | 12 | | |
| 10 | Fluopyram | 0.05 | | 8 | | |
| 11 | Fluopyram | 0.1 | | 21 | | |
| 12 | Propineb | 0.05 | | 12 | | |
| 13 | Propineb | 0.1 | | 24 | | |
| 14 | Benzovindiflupyr | 0.05 | | 29 | | |
| 15 | Inpyrfluxam | 0.05 | | 12 | | |
| 16 | Inpyrfluxam | 0.1 | | 29 | | |
| 17 | Dithianon | 0.05 | | 11 | | |
| 18 | Dithianon | 0.1 | | 16 | | |
| 19 | Compound (I-4) + Fluxapyroxad | (20:0.05) | 400:1 | 50 | 29 | 21 |
| 20 | Compound (I-4) + Fluxapyroxad | (5:0.1) | 50:1 | 47 | 27 | 20 |
| 21 | Compound (I-4) + Fluxapyroxad | (20:0.1) | 200:1 | 55 | 30 | 25 |
| 22 | Compound (I-4) + Picoxystrobin | (20:0.05) | 400:1 | 47 | 35 | 12 |
| 23 | Compound (I-4) + Picoxystrobin | (20:0.1) | 200:1 | 55 | 46 | 10 |
| 24 | Compound (I-4) + Metominostrobin | (20:0.05) | 400:1 | 50 | 31 | 19 |
| 25 | Compound (I-4) + Metominostrobin | (5:0.1) | 50:1 | 42 | 33 | 10 |
| 26 | Compound (I-4) + Metominostrobin | (20:0.1) | 200:1 | 55 | 35 | 20 |
| 27 | Compound (I-4) + Fluopyram | (1:0.05) | 20:1 | 49 | 26 | 22 |
| 28 | Compound (I-4) + Fluopyram | (5:0.05) | 100:1 | 54 | 29 | 25 |
| 29 | Compound (I-4) + Fluopyram | (20:0.05) | 400:1 | 65 | 33 | 32 |
| 30 | Compound (I-4) + Fluopyram | (5:0.1) | 50:1 | 70 | 39 | 31 |
| 31 | Compound (I-4) + Fluopyram | (20:0.1) | 200:1 | 78 | 42 | 36 |
| 32 | Compound (I-4) + Propineb | (1:0.05) | 20:1 | 41 | 30 | 11 |
| 33 | Compound (I-4) + Propineb | (5:0.05) | 100:1 | 46 | 33 | 13 |
| 34 | Compound (I-4) + Propineb | (20:0.05) | 400:1 | 49 | 35 | 13 |
| 35 | Compound (I-4) + Propineb | (5:0.1) | 50:1 | 51 | 42 | 10 |
| 36 | Compound (I-4) + Propineb | (20:0.1) | 200:1 | 54 | 44 | 10 |
| 37 | Compound (I-4) + Benzovindiflupyr | (5:0.05) | 100:1 | 57 | 46 | 11 |
| 38 | Compound (I-4) + Benzovindiflupyr | (20:0.05) | 400:1 | 65 | 48 | 17 |
| 39 | Compound (I-4) + Inpyrfluxam | (5:0.05) | 100:1 | 46 | 33 | 13 |
| 40 | Compound (I-4) + Inpyrfluxam | (20:0.05) | 400:1 | 57 | 35 | 21 |
| 41 | Compound (I-4) + Inpyrfluxam | (20:0.1) | 200:1 | 65 | 48 | 17 |
| 42 | Compound (I-4) + Dithianon | (1:0.05) | 20:1 | 51 | 29 | 23 |
| 43 | Compound (I-4) + Dithianon | (5:0.05) | 100:1 | 57 | 32 | 25 |
| 44 | Compound (I-4) + Dithianon | (20:0.05) | 400:1 | 65 | 35 | 30 |
| 45 | Compound (I-4) + Dithianon | (1:0.1) | 10:1 | 57 | 33 | 24 |
| 46 | Compound (I-4) + Dithianon | (5:0.1) | 50:1 | 65 | 36 | 29 |
| 47 | Compound (I-4) + Dithianon | (20:0.1) | 200:1 | 76 | 38 | 37 |

TABLE E5

The synergistic fungicidal activity of the compositions of the present invention, wherein the representative compounds of formula (I) is particularly compound (I-5) as component (1) and other components (2) selected from the groups (A) to (R) against *Septoria nodorum* test in wheat are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-5) | 1 | | 23 | | |
| 2 | Compound (I-5) | 5 | | 33 | | |
| 3 | Compound (I-5) | 20 | | 40 | | |
| 4 | Trifloxystrobin | 0.05 | | 5 | | |
| 5 | Bixafen | 0.1 | | 29 | | |
| 6 | Fluxapyroxad | 0.05 | | 3 | | |
| 7 | Fluxapyroxad | 0.1 | | 5 | | |
| 8 | Metominostrobin | 0.05 | | 6 | | |
| 9 | Metominostrobin | 0.1 | | 12 | | |
| 10 | Folpet | 0.1 | | 21 | | |
| 11 | Fluopyram | 0.05 | | 8 | | |
| 12 | Fluopyram | 0.1 | | 21 | | |
| 13 | Propineb | 0.05 | | 12 | | |
| 14 | Propineb | 0.1 | | 24 | | |
| 15 | Inpyrfluxam | 0.05 | | 12 | | |
| 16 | Compound (I-5) + Trifloxystrobin | (5:0.05) | 100:1 | 47 | 37 | 11 |
| 17 | Compound (I-5) + Bixafen | (20:0.1) | 200:1 | 68 | 57 | 11 |
| 18 | Compound (I-5) + Fluxapyroxad | (20:0.05) | 400:1 | 54 | 42 | 12 |
| 19 | Compound (I-5) + Fluxapyroxad | (1:0.1) | 10:1 | 51 | 27 | 24 |
| 20 | Compound (I-5) + Fluxapyroxad | (5:0.1) | 50:1 | 56 | 37 | 20 |
| 21 | Compound (I-5) + Fluxapyroxad | (20:0.1) | 200:1 | 59 | 43 | 16 |
| 22 | Compound (I-5) + Metominostrobin | (1:0.05) | 20:1 | 41 | 28 | 13 |
| 23 | Compound (I-5) + Metominostrobin | (20:0.05) | 400:1 | 64 | 44 | 21 |
| 24 | Compound (I-5) + Metominostrobin | (1:0.1) | 10:1 | 51 | 33 | 19 |
| 25 | Compound (I-5) + Metominostrobin | (5:0.1) | 50:1 | 67 | 41 | 25 |
| 26 | Compound (I-5) + Metominostrobin | (20:0.1) | 200:1 | 72 | 47 | 25 |
| 27 | Compound (I-5) + Folpet | (20:0.1) | 200:1 | 67 | 53 | 14 |
| 28 | Compound (I-5) + Fluopyram | (1:0.05) | 20:1 | 50 | 29 | 21 |
| 29 | Compound (I-5) + Fluopyram | (5:0.05) | 100:1 | 59 | 39 | 20 |
| 30 | Compound (I-5) + Fluopyram | (20:0.05) | 400:1 | 68 | 45 | 23 |
| 31 | Compound (I-5) + Fluopyram | (1:0.1) | 10:1 | 53 | 39 | 14 |
| 32 | Compound (I-5) + Fluopyram | (5:0.1) | 50:1 | 62 | 47 | 14 |
| 33 | Compound (I-5) + Fluopyram | (20:0.1) | 200:1 | 76 | 53 | 24 |
| 34 | Compound (I-5) + Propineb | (1:0.05) | 20:1 | 50 | 33 | 17 |
| 35 | Compound (I-5) + Propineb | (5:0.05) | 100:1 | 53 | 41 | 12 |
| 36 | Compound (I-5) + Propineb | (20:0.05) | 400:1 | 72 | 47 | 25 |
| 37 | Compound (I-5) + Propineb | (1:0.1) | 10:1 | 53 | 42 | 11 |
| 38 | Compound (I-5) + Inpyrfluxam | (1:0.05) | 20:1 | 44 | 33 | 12 |
| 39 | Compound (I-5) + Inpyrfluxam | (20:0.05) | 400:1 | 59 | 47 | 12 |

Example F: *Botrytis cinerea* Test in Tomato

The single compounds or compound combinations were dissolved in 2% dimethyl sulfoxide/acetone and then mixed with water containing emulsifier to a calibrated spray volume of 50 mL. The test solutions were poured into spray bottles for further applications.

To test the preventive activity of compounds, healthy young tomato plants, raised in the greenhouse, were sprayed with the single compound or mixture preparation at the stated application rates inside the spray cabinets using hollow cone nozzles. One day after treatment, the plants were inoculated with a spore suspension containing $1.2\times10^6$ *Botrytis cinerea* inoculum and 2% malt. The inoculated plants were then kept in a greenhouse chamber at 18-20° C. temperature and 90-100% relative humidity for disease expression.

A visual assessment of the performance of the compounds and compound combinations was carried out by rating the disease severity (0-100% scale) on treated plants 3, 7, 10 and 15 days after application. Efficacy (% control) of the compounds was calculated by comparing the disease rating in the treatment with the one of the untreated control. The compounds were also assessed for their plant compatibility by recording symptoms like necrosis, chlorosis and stunting. The results are shown for the compound of formula (I-1) to (I-5) in Table 52-75.

Surprisingly, the following combinations, indicated in the table below, have revealed unexpected synergistic effects:

TABLE F1

The synergistic fungicidal activity of the compositions of the present invention, wherein the representative compounds of formula (I) is particularly compound (I-1) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-1) | 1 | | 20 | | |
| 2 | Compound (I-1) | 5 | | 27 | | |
| 3 | Compound (I-1) | 20 | | 47 | | |
| 4 | Mefentrifluconazole | 0.05 | | 31 | | |
| 5 | Mefentrifluconazole | 0.1 | | 38 | | |
| 6 | Prothioconazole | 0.05 | | 36 | | |
| 7 | Prothioconazole | 0.1 | | 44 | | |
| 8 | Trifloxystrobin | 0.05 | | 26 | | |
| 9 | Trifloxystrobin | 0.1 | | 33 | | |
| 10 | Boscalid | 0.05 | | 38 | | |
| 11 | Bixafen | 0.1 | | 48 | | |
| 12 | Difenconazole | 0.05 | | 42 | | |
| 13 | Difenconazole | 0.1 | | 52 | | |
| 14 | Fluxapyroxad | 0.1 | | 38 | | |
| 15 | Azoxystrobin | 0.1 | | 45 | | |
| 16 | Picoxystrobin | 0.1 | | 38 | | |
| 17 | Fluazinam | 0.05 | | 29 | | |
| 18 | Fluazinam | 0.1 | | 38 | | |
| 19 | Metaminostorbin | 0.05 | | 28 | | |
| 20 | Metaminostorbin | 0.1 | | 40 | | |
| 21 | Folpet | 0.05 | | 24 | | |
| 22 | Folpet | 0.1 | | 38 | | |
| 23 | Tebuconazole | 0.05 | | 35 | | |
| 24 | Tebuconazole | 0.1 | | 38 | | |
| 25 | Fluopyram | 0.05 | | 38 | | |
| 26 | Fluopyram | 0.1 | | 45 | | |
| 27 | Mancozeb | 0.05 | | 19 | | |
| 28 | Mancozeb | 0.1 | | 24 | | |
| 29 | Propineb | 0.05 | | 15 | | |
| 30 | Propineb | 0.1 | | 22 | | |
| 31 | Metiram | 0.05 | | 40 | | |
| 32 | Metiram | 0.1 | | 57 | | |
| 33 | Benzovindiflupyr | 0.05 | | 33 | | |
| 34 | Benzovindiflupyr | 0.1 | | 42 | | |
| 35 | Fluindapyr | 0.05 | | 27 | | |
| 36 | Fluindapyr | 0.1 | | 41 | | |
| 37 | Inpyrfluxam | 0.05 | | 35 | | |
| 38 | Inpyrfluxam | 0.1 | | 38 | | |
| 39 | Dithianon | 0.05 | | 38 | | |
| 40 | Dithianon | 0.1 | | 45 | | |
| 41 | Compound (I-1) + Mefentrifluconazole | (5:0.05) | 100:1 | 64 | 49 | 14 |
| 42 | Compound (I-1) + Mefentrifluconazole | (1:0.1) | 10:1 | 72 | 50 | 22 |
| 43 | Compound (I-1) + Mefentrifluconazole | (5:0.1) | 50:1 | 78 | 55 | 23 |
| 44 | Compound (I-1) + Mefentrifluconazole | (20:0.1) | 200:1 | 81 | 67 | 14 |
| 45 | Compound (I-1) + Prothioconazole | (1:0.05) | 20:1 | 64 | 49 | 15 |
| 46 | Compound (I-1) + Prothioconazole | (5:0.05) | 100:1 | 78 | 53 | 25 |
| 47 | Compound (I-1) + Prothioconazole | (20:0.05) | 400:1 | 83 | 66 | 17 |
| 48 | Compound (I-1) + Prothioconazole | (1:0.1) | 10:1 | 78 | 55 | 23 |
| 49 | Compound (I-1) + Prothioconazole | (5:0.1) | 50:1 | 83 | 59 | 24 |

TABLE F1-continued

The synergistic fungicidal activity of the compositions of the present invention, wherein the representative compounds of formula (I) is particularly compound (I-1) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 50 | Compound (I-1) + Prothioconazole | (20:0.1) | 200:1 | 86 | 70 | 16 |
| 51 | Compound (I-1) + Trifloxystrobin | (1:0.05) | 20:1 | 67 | 41 | 26 |
| 52 | Compound (I-1) + Trifloxystrobin | (5:0.05) | 100:1 | 78 | 46 | 32 |
| 53 | Compound (I-1) + Trifloxystrobin | (20:0.05) | 400:1 | 83 | 61 | 23 |
| 54 | Compound (I-1) + Trifloxystrobin | (1:0.1) | 10:1 | 81 | 46 | 34 |
| 55 | Compound (I-1) + Trifloxystrobin | (5:0.1) | 50:1 | 86 | 51 | 35 |
| 56 | Compound (I-1) + Trifloxystrobin | (20:0.1) | 200:1 | 89 | 64 | 25 |
| 57 | Compound (I-1) + Boscalid | (1:0.05) | 20:1 | 61 | 50 | 11 |
| 58 | Compound (I-1) + Boscalid | (5:0.05) | 100:1 | 69 | 55 | 15 |
| 59 | Compound (I-1) + Bixafen | (5:0.1) | 50:1 | 72 | 62 | 10 |
| 60 | Compound (I-1) + Difenconazole | (1:0.05) | 20:1 | 69 | 54 | 16 |
| 61 | Compound (I-1) + Difenconazole | (5:0.05) | 100:1 | 78 | 57 | 20 |
| 62 | Compound (I-1) + Difenconazole | (20:0.05) | 400:1 | 86 | 69 | 17 |
| 63 | Compound (I-1) + Difenconazole | (1:0.1) | 10:1 | 83 | 62 | 22 |
| 64 | Compound (I-1) + Difenconazole | (5:0.1) | 50:1 | 86 | 65 | 21 |
| 65 | Compound (I-1) + Difenconazole | (20:0.1) | 200:1 | 89 | 74 | 14 |
| 66 | Compound (I-1) + Fluxapyroxad | (1:0.1) | 10:1 | 64 | 50 | 13 |
| 67 | Compound (I-1) + Fluxapyroxad | (5:0.1) | 50:1 | 69 | 55 | 15 |
| 68 | Compound (I-1) + Fluxapyroxad | (20:0.1) | 200:1 | 78 | 67 | 11 |
| 69 | Compound (I-1) + Azoxystrobin | (5:0.1) | 50:1 | 69 | 60 | 10 |
| 70 | Compound (I-1) + Picoxystrobin | (1:0.1) | 10:1 | 61 | 50 | 11 |
| 71 | Compound (I-1) + Fluazinam | (1:0.05) | 20:1 | 72 | 43 | 29 |
| 72 | Compound (I-1) + Fluazinam | (5:0.05) | 100:1 | 75 | 48 | 27 |
| 73 | Compound (I-1) + Fluazinam | (20:0.05) | 400:1 | 83 | 62 | 21 |
| 74 | Compound (I-1) + Fluazinam | (1:0.1) | 10:1 | 78 | 50 | 27 |
| 75 | Compound (I-1) + Fluazinam | (5:0.1) | 50:1 | 81 | 55 | 26 |
| 76 | Compound (I-1) + Fluazinam | (20:0.1) | 200:1 | 86 | 67 | 19 |
| 77 | Compound (I-1) + Metominostrobin | (1:0.05) | 20:1 | 69 | 42 | 27 |
| 78 | Compound (I-1) + Metominostrobin | (5:0.05) | 100:1 | 75 | 47 | 28 |
| 79 | Compound (I-1) + Metominostrobin | (20:0.05) | 400:1 | 89 | 62 | 27 |
| 80 | Compound (I-1) + Metominostrobin | (1:0.1) | 10:1 | 81 | 52 | 29 |
| 81 | Compound (I-1) + Metominostrobin | (5:0.1) | 50:1 | 83 | 56 | 27 |
| 82 | Compound (I-1) + Metominostrobin | (20:0.1) | 200:1 | 94 | 68 | 26 |
| 83 | Compound (I-1) + Folpet | (1:0.05) | 20:1 | 64 | 39 | 25 |
| 84 | Compound (I-1) + Folpet | (5:0.05) | 100:1 | 67 | 44 | 22 |
| 85 | Compound (I-1) + Folpet | (20:0.05) | 400:1 | 78 | 59 | 18 |
| 86 | Compound (I-1) + Folpet | (1:0.1) | 10:1 | 72 | 50 | 22 |
| 87 | Compound (I-1) + Folpet | (5:0.1) | 50:1 | 78 | 55 | 23 |

TABLE F1-continued

The synergistic fungicidal activity of the compositions of the present invention, wherein the representative compounds of formula (I) is particularly compound (I-1) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 88 | Compound (I-1) + Folpet | (20:0.1) | 200:1 | 81 | 67 | 14 |
| 89 | Compound (I-1) + Tebuconazole | (1:0.05) | 20:1 | 64 | 48 | 16 |
| 90 | Compound (I-1) + Tebuconazole | (5:0.05) | 100:1 | 75 | 52 | 23 |
| 91 | Compound (I-1) + Tebuconazole | (20:0.05) | 400:1 | 92 | 65 | 26 |
| 92 | Compound (I-1) + Tebuconazole | (1:0.1) | 10:1 | 83 | 50 | 33 |
| 93 | Compound (I-1) + Tebuconazole | (5:0.1) | 50:1 | 92 | 55 | 37 |
| 94 | Compound (I-1) + Tebuconazole | (20:0.1) | 200:1 | 94 | 67 | 28 |
| 95 | Compound (I-1) + Fluopyram | (1:0.05) | 20:1 | 63 | 50 | 13 |
| 96 | Compound (I-1) + Fluopyram | (5:0.05) | 100:1 | 73 | 55 | 19 |
| 97 | Compound (I-1) + Fluopyram | (20:0.05) | 400:1 | 77 | 67 | 10 |
| 98 | Compound (I-1) + Fluopyram | (1:0.1) | 10:1 | 67 | 56 | 11 |
| 99 | Compound (I-1) + Fluopyram | (5:0.1) | 50:1 | 77 | 60 | 17 |
| 100 | Compound (I-1) + Fluopyram | (20:0.1) | 200:1 | 83 | 71 | 13 |
| 101 | Compound (I-1) + Mancozeb | (1:0.05) | 20:1 | 53 | 35 | 18 |
| 102 | Compound (I-1) + Mancozeb | (5:0.05) | 100:1 | 60 | 41 | 19 |
| 103 | Compound (I-1) + Mancozeb | (20:0.05) | 400:1 | 67 | 57 | 10 |
| 104 | Compound (I-1) + Mancozeb | (1:0.1) | 10:1 | 57 | 39 | 17 |
| 105 | Compound (I-1) + Mancozeb | (5:0.1) | 50:1 | 63 | 44 | 19 |
| 106 | Compound (I-1) + Mancozeb | (20:0.1) | 200:1 | 77 | 59 | 17 |
| 107 | Compound (I-1) + Propineb | (1:0.05) | 20:1 | 80 | 32 | 48 |
| 108 | Compound (I-1) + Propineb | (5:0.05) | 100:1 | 83 | 38 | 46 |
| 109 | Compound (I-1) + Propineb | (20:0.05) | 400:1 | 90 | 55 | 35 |
| 110 | Compound (I-1) + Propineb | (1:0.1) | 10:1 | 83 | 38 | 46 |
| 111 | Compound (I-1) + Propineb | (5:0.1) | 50:1 | 90 | 43 | 47 |
| 112 | Compound (I-1) + Propineb | (20:0.1) | 200:1 | 93 | 58 | 35 |
| 113 | Compound (I-1) + Metiram | (1:0.05) | 20:1 | 77 | 52 | 25 |
| 114 | Compound (I-1) + Metiram | (5:0.05) | 100:1 | 83 | 56 | 27 |
| 115 | Compound (I-1) + Metiram | (20:0.05) | 400:1 | 93 | 68 | 25 |
| 116 | Compound (I-1) + Metiram | (1:0.1) | 10:1 | 83 | 66 | 18 |
| 117 | Compound (I-1) + Metiram | (5:0.1) | 50:1 | 90 | 68 | 22 |
| 118 | Compound (I-1) + Metiram | (20:0.1) | 200:1 | 100 | 77 | 23 |
| 119 | Compound (I-1) + Benzovindiflupyr | (1:0.05) | 20:1 | 73 | 46 | 27 |
| 120 | Compound (I-1) + Benzovindiflupyr | (5:0.05) | 100:1 | 80 | 51 | 29 |
| 121 | Compound (I-1) + Benzovindiflupyr | (20:0.05) | 400:1 | 83 | 64 | 19 |
| 122 | Compound (I-1) + Benzovindiflupyr | (1:0.1) | 10:1 | 80 | 54 | 26 |
| 123 | Compound (I-1) + Benzovindiflupyr | (5:0.1) | 50:1 | 83 | 57 | 26 |

TABLE F1-continued

The synergistic fungicidal activity of the compositions of the present invention, wherein the representative compounds of formula (I) is particularly compound (I-1) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 124 | Compound (I-1) + Benzovindiflupyr | (20:0.1) | 200:1 | 90 | 69 | 21 |
| 125 | Compound (I-1) + Fluindapyr | (1:0.05) | 20:1 | 73 | 42 | 32 |
| 126 | Compound (I-1) + Fluindapyr | (5:0.05) | 100:1 | 83 | 46 | 37 |
| 127 | Compound (I-1) + Fluindapyr | (20:0.05) | 400:1 | 87 | 61 | 26 |
| 128 | Compound (I-1) + Fluindapyr | (1:0.1) | 10:1 | 80 | 53 | 27 |
| 129 | Compound (I-1) + Fluindapyr | (5:0.1) | 50:1 | 87 | 57 | 30 |
| 130 | Compound (I-1) + Fluindapyr | (20:0.1) | 200:1 | 93 | 69 | 25 |
| 131 | Compound (I-1) + Inpyrfluxam | (1:0.05) | 20:1 | 87 | 40 | 47 |
| 132 | Compound (I-1) + Inpyrfluxam | (5:0.05) | 100:1 | 90 | 45 | 45 |
| 133 | Compound (I-1) + Inpyrfluxam | (20:0.05) | 400:1 | 97 | 60 | 37 |
| 134 | Compound (I-1) + Inpyrfluxam | (1:0.1) | 10:1 | 93 | 50 | 43 |
| 135 | Compound (I-1) + Inpyrfluxam | (5:0.1) | 50:1 | 97 | 55 | 42 |
| 136 | Compound (I-1) + Inpyrfluxam | (20:0.1) | 200:1 | 100 | 67 | 33 |
| 137 | Compound (I-1) + Dithianon | (1:0.05) | 20:1 | 97 | 50 | 46 |
| 138 | Compound (I-1) + Dithianon | (5:0.05) | 100:1 | 100 | 55 | 45 |
| 139 | Compound (I-1) + Dithianon | (20:0.05) | 400:1 | 100 | 67 | 33 |
| 140 | Compound (I-1) + Dithianon | (1:0.1) | 10:1 | 100 | 56 | 44 |
| 141 | Compound (I-1) + Dithianon | (5:0.1) | 50:1 | 100 | 60 | 40 |
| 142 | Compound (I-1) + Dithianon | (20:0.1) | 200:1 | 100 | 71 | 29 |

TABLE F2

The synergistic fungicidal activity of the compositions of the present invention, wherein the representative compounds of formula (I) is particularly compound (I-2) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-2) | 1 | | 23 | | |
| 2 | Compound (I-2) | 5 | | 33 | | |
| 3 | Compound (I-2) | 20 | | 53 | | |
| 4 | Mefentrifluconazole | 0.1 | | 38 | | |
| 5 | Fluazinam | 0.05 | | 29 | | |
| 6 | Fluazinam | 0.1 | | 38 | | |
| 7 | Mancozeb | 0.05 | | 19 | | |
| 8 | Mancozeb | 0.1 | | 24 | | |
| 9 | Propineb | 0.05 | | 15 | | |
| 10 | Propineb | 0.1 | | 22 | | |
| 11 | Benzovindiflupyr | 0.1 | | 42 | | |
| 12 | Fluindapyr | 0.05 | | 27 | | |
| 13 | Fluindapyr | 0.1 | | 41 | | |
| 14 | Compound (I-2) + Mefentrifluconazole | (1:0.1) | 10:1 | 63 | 52 | 11 |
| 15 | Compound (I-2) + Mefentrifluconazole | (5:0.1) | 50:1 | 68 | 59 | 10 |

TABLE F2-continued

The synergistic fungicidal activity of the compositions of the present invention, wherein the representative compounds of formula (I) is particularly compound (I-2) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 16 | Compound (I-2) + Fluazinam | (5:0.05) | 100:1 | 65 | 53 | 12 |
| 17 | Compound (I-2) + Fluazinam | (20:0.05) | 400:1 | 78 | 67 | 11 |
| 18 | Compound (I-2) + Fluazinam | (1:0.1) | 10:1 | 68 | 52 | 15 |
| 19 | Compound (I-2) + Fluazinam | (5:0.1) | 50:1 | 73 | 59 | 14 |
| 20 | Compound (I-2) + Mancozeb | (1:0.05) | 20:1 | 50 | 38 | 12 |
| 21 | Compound (I-2) + Mancozeb | (5:0.05) | 100:1 | 61 | 46 | 15 |
| 22 | Compound (I-2) + Mancozeb | (1:0.1) | 10:1 | 61 | 42 | 19 |
| 23 | Compound (I-2) + Mancozeb | (5:0.1) | 50:1 | 68 | 49 | 19 |
| 24 | Compound (I-2) + Mancozeb | (20:0.1) | 200:1 | 82 | 65 | 18 |
| 25 | Compound (I-2) + Propineb | (1:0.05) | 20:1 | 46 | 35 | 12 |
| 26 | Compound (I-2) + Propineb | (5:0.05) | 100:1 | 61 | 43 | 17 |
| 27 | Compound (I-2) + Propineb | (1:0.1) | 10:1 | 50 | 40 | 10 |
| 28 | Compound (I-2) + Propineb | (5:0.1) | 50:1 | 64 | 48 | 16 |
| 29 | Compound (I-2) + Benzovindiflupyr | (1:0.1) | 10:1 | 68 | 56 | 12 |
| 30 | Compound (I-2) + Benzovindiflupyr | (5:0.1) | 50:1 | 75 | 61 | 14 |
| 31 | Compound (I-2) + Fluindapyr | (1:0.05) | 20:1 | 54 | 44 | 10 |
| 32 | Compound (I-2) + Fluindapyr | (1:0.1) | 10:1 | 64 | 55 | 10 |
| 33 | Compound (I-2) + Fluindapyr | (5:0.1) | 50:1 | 71 | 61 | 11 |

TABLE F3

The synergistic fungicidal activity of the compositions of the present invention, wherein the representative compounds of formula (I) is particularly compound (I-3) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 1 | Compound (I-3) | 1 | | 57 | | |
| 2 | Compound (I-3) | 5 | | 67 | | |
| 3 | Compound (I-3) | 20 | | 77 | | |
| 4 | Prothioconazole | 0.01 | | 44 | | |
| 5 | Propineb | 0.05 | | 15 | | |
| 6 | Propineb | 0.1 | | 22 | | |
| 7 | Benzovindiflupyr | 0.1 | | 42 | | |
| 8 | Fluindapyr | 0.05 | | 27 | | |
| 9 | Fluindapyr | 0.1 | | 41 | | |
| 10 | Inpyrfluxam | 0.05 | | 25 | | |
| 11 | Inpyrfluxam | 0.1 | | 38 | | |
| 12 | Dithianon | 0.05 | | 38 | | |
| 13 | Dithianon | 0.1 | | 45 | | |
| 14 | Compound (I-3) + Prothioconazole | (1:0.1) | 10:1 | 86 | 76 | 10 |
| 15 | Compound (I-3) + Prothioconazole | (5:0.1) | 50:1 | 94 | 81 | 13 |
| 16 | Compound (I-3) + Prothioconazole | (20:0.1) | 200:1 | 97 | 87 | 10 |

TABLE F3-continued

The synergistic fungicidal activity of the compositions of the present invention, wherein the representative compounds of formula (I) is particularly compound (I-3) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ (I-3) alculated Efficacy | Synergy (Colby's) |
|---|---|---|---|---|---|---|
| 17 | Compound (I-3) + Propineb | (1:0.05) | 20:1 | 75 | 63 | 12 |
| 18 | Compound (I-3) + Propineb | (5:0.05) | 100:1 | 81 | 72 | 10 |
| 19 | Compound (I-3) + Propineb | (1:0.1) | 10:1 | 81 | 66 | 15 |
| 20 | Compound (I-3) + Propineb | (5:0.1) | 50:1 | 84 | 74 | 10 |
| 21 | Compound (I-3) + Benzovindiflupyr | (1:0.1) | 10:1 | 84 | 75 | 10 |
| 22 | Compound (I-3) + Fluindapyr | (1:0.05) | 20:1 | 78 | 68 | 10 |
| 23 | Compound (I-3) + Fluindapyr | (20:0.05) | 400:1 | 97 | 83 | 14 |
| 24 | Compound (I-3) + Fluindapyr | (1:0.1) | 10:1 | 84 | 74 | 10 |
| 25 | Compound (I-3) + Fluindapyr | (20:0.1) | 200:1 | 100 | 86 | 14 |
| 26 | Compound (I-3) + Inpyrfluxam | (1:0.05) | 20:1 | 88 | 68 | 20 |
| 27 | Compound (I-3) + Inpyrfluxam | (5:0.05) | 100:1 | 91 | 75 | 16 |
| 28 | Compound (I-3) + Inpyrfluxam | (20:0.05) | 400:1 | 97 | 83 | 14 |
| 29 | Compound (I-3) + Inpyrfluxam | (1:0.1) | 10:1 | 94 | 73 | 21 |
| 30 | Compound (I-3) + Inpyrfluxam | (5:0.1) | 50:1 | 97 | 79 | 18 |
| 31 | Compound (I-3) + Inpyrfluxam | (20:0.1) | 200:1 | 100 | 86 | 14 |
| 32 | Compound (I-3) + Dithianon | (1:0.05) | 20:1 | 97 | 73 | 24 |
| 33 | Compound (I-3) + Dithianon | (5:0.05) | 100:1 | 100 | 79 | 21 |
| 34 | Compound (I-3) + Dithianon | (20:0.05) | 400:1 | 100 | 86 | 14 |
| 35 | Compound (I-3) + Dithianon | (1:0.1) | 10:1 | 100 | 76 | 24 |
| 36 | Compound (I-3) + Dithianon | (5:0.1) | 50:1 | 100 | 82 | 18 |
| 37 | Compound (I-3) + Dithianon | (20:0.1) | 200:1 | 100 | 87 | 13 |

TABLE F4

The synergistic fungicidal activity of the compositions of the present invention, wherein the representative compounds of formula (I) is particularly compound (I-4) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-4) | 1 | | 10 | | |
| 2 | Compound (I-4) | 5 | | 17 | | |
| 3 | Compound (I-4) | 20 | | 23 | | |
| 4 | Mefentrifluconazole | 0.05 | | 31 | | |
| 5 | Mefentrifluconazole | 0.1 | | 38 | | |
| 6 | Prothioconazole | 0.05 | | 36 | | |
| 7 | Prothioconazole | 0.1 | | 44 | | |
| 8 | Pyraclostrobin | 0.05 | | 38 | | |
| 9 | Pyraclostrobin | 0.1 | | 43 | | |
| 10 | Trifloxystrobin | 0.05 | | 26 | | |
| 11 | Trifloxystrobin | 0.1 | | 33 | | |
| 12 | Boscalid | 0.05 | | 38 | | |
| 13 | Boscalid | 0.1 | | 52 | | |

TABLE F4-continued

The synergistic fungicidal activity of the compositions of the present invention, wherein the representative compounds of formula (I) is particularly compound (I-4) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 14 | Difenconazole | 0.05 | | 42 | | |
| 15 | Difenconazole | 0.1 | | 52 | | |
| 16 | Fluazinam | 0.05 | | 29 | | |
| 17 | Fluazinam | 0.1 | | 38 | | |
| 18 | Fluopyram | 0.05 | | 38 | | |
| 19 | Fluopyram | 0.1 | | 45 | | |
| 20 | Mancozeb | 0.05 | | 19 | | |
| 21 | Mancozeb | 0.1 | | 24 | | |
| 22 | Propineb | 0.05 | | 15 | | |
| 23 | Propineb | 0.1 | | 22 | | |
| 24 | Metiram | 0.05 | | 40 | | |
| 25 | Metiram | 0.1 | | 57 | | |
| 26 | Benzovindiflupyr | 0.05 | | 33 | | |
| 27 | Benzovindiflupyr | 0.1 | | 42 | | |
| 28 | Fluindapyr | 0.05 | | 27 | | |
| 29 | Fluindapyr | 0.1 | | 41 | | |
| 30 | Inpyrfluxam | 0.05 | | 25 | | |
| 31 | Inpyrfluxam | 0.1 | | 38 | | |
| 32 | Dithionon | 0.05 | | 38 | | |
| 33 | Dithionon | 0.1 | | 45 | | |
| 34 | Compound (I-4) + Mefentrifluconazole | (1:0.05) | 20:1 | 50 | 38 | 12 |
| 35 | Compound (I-4) + Mefentrifluconazole | (5:0.05) | 100:1 | 69 | 43 | 27 |
| 36 | Compound (I-4) + Mefentrifluconazole | (20:0.05) | 400:1 | 72 | 47 | 25 |
| 37 | Compound (I-4) + Mefentrifluconazole | (1:0.1) | 10:1 | 61 | 44 | 17 |
| 38 | Compound (I-4) + Mefentrifluconazole | (5:0.1) | 50:1 | 78 | 48 | 29 |
| 39 | Compound (I-4) + Mefentrifluconazole | (20:0.1) | 200:1 | 81 | 52 | 28 |
| 40 | Compound (I-4) + Prothioconazole | (5:0.05) | 100:1 | 61 | 47 | 14 |
| 41 | Compound (I-4) + Prothioconazole | (20:0.05) | 400:1 | 69 | 51 | 19 |
| 42 | Compound (I-4) + Prothioconazole | (5:0.1) | 50:1 | 72 | 53 | 19 |
| 43 | Compound (I-4) + Prothioconazole | (20:0.1) | 200:1 | 78 | 57 | 21 |
| 44 | Compound (I-4) + Pyraclostrobin | (5:0.05) | 100:1 | 67 | 48 | 18 |
| 45 | Compound (I-4) + Pyraclostrobin | (20:0.05) | 400:1 | 69 | 52 | 17 |
| 46 | Compound (I-4) + Pyraclostrobin | (1:0.1) | 10:1 | 64 | 49 | 15 |
| 47 | Compound (I-4) + Pyraclostrobin | (5:0.1) | 50:1 | 69 | 53 | 17 |
| 48 | Compound (I-4) + Pyraclostrobin | (20:0.1) | 200:1 | 72 | 56 | 16 |
| 49 | Compound (I-4) + Trifloxystrobin | (1:0.05) | 20:1 | 50 | 33 | 17 |
| 50 | Compound (I-4) + Trifloxystrobin | (20:0.05) | 400:1 | 67 | 43 | 23 |
| 51 | Compound (I-4) + Trifloxystrobin | (1:0.1) | 10:1 | 61 | 40 | 21 |
| 52 | Compound (I-4) + Trifloxystrobin | (5:0.1) | 50:1 | 67 | 44 | 23 |
| 53 | Compound (I-4) + Trifloxystrobin | (20:0.1) | 200:1 | 78 | 49 | 29 |
| 54 | Compound (I-4) + Boscalid | (20:0.05) | 400:1 | 64 | 52 | 11 |
| 55 | Compound (I-4) + Boscalid | (20:0.1) | 200:1 | 81 | 63 | 17 |
| 56 | Compound (I-4) + Difenconazole | (1:0.05) | 20:1 | 64 | 48 | 16 |
| 57 | Compound (I-4) + Difenconazole | (5:0.05) | 100:1 | 72 | 52 | 21 |
| 58 | Compound (I-4) + Difenconazole | (20:0.05) | 400:1 | 78 | 56 | 22 |

TABLE F4-continued

The synergistic fungicidal activity of the compositions of the present invention, wherein the representative compounds of formula (I) is particularly compound (I-4) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 59 | Compound (I-4) + Difenconazole | (1:0.1) | 10:1 | 69 | 57 | 13 |
| 60 | Compound (I-4) + Difenconazole | (5:0.1) | 50:1 | 81 | 60 | 21 |
| 61 | Compound (I-4) + Difenconazole | (20:0.1) | 200:1 | 83 | 63 | 20 |
| 62 | Compound (I-4) + Fluazinam | (20:0.05) | 400:1 | 63 | 46 | 17 |
| 63 | Compound (I-4) + Fluazinam | (20:0.1) | 200:1 | 65 | 52 | 13 |
| 64 | Compound (I-4) + Fluopyram | (1:0.05) | 20:1 | 59 | 44 | 15 |
| 65 | Compound (I-4) + Fluopyram | (5:0.05) | 100:1 | 66 | 48 | 17 |
| 66 | Compound (I-4) + Fluopyram | (20:0.05) | 400:1 | 72 | 52 | 19 |
| 67 | Compound (I-4) + Fluopyram | (1:0.1) | 10:1 | 63 | 51 | 12 |
| 68 | Compound (I-4) + Fluopyram | (5:0.1) | 50:1 | 69 | 54 | 15 |
| 69 | Compound (I-4) + Fluopyram | (20:0.1) | 200:1 | 75 | 58 | 17 |
| 70 | Compound (I-4) + Mancozeb | (1:0.05) | 20:1 | 59 | 27 | 32 |
| 71 | Compound (I-4) + Mancozeb | (5:0.05) | 100:1 | 63 | 33 | 30 |
| 72 | Compound (I-4) + Mancozeb | (20:0.05) | 400:1 | 75 | 38 | 37 |
| 73 | Compound (I-4) + Mancozeb | (1:0.1) | 10:1 | 66 | 32 | 34 |
| 74 | Compound (I-4) + Mancozeb | (5:0.1) | 50:1 | 69 | 37 | 32 |
| 75 | Compound (I-4) + Mancozeb | (20:0.1) | 200:1 | 78 | 42 | 36 |
| 76 | Compound (I-4) + Propineb | (1:0.05) | 20:1 | 53 | 24 | 30 |
| 77 | Compound (I-4) + Propineb | (5:0.05) | 100:1 | 59 | 29 | 30 |
| 78 | Compound (I-4) + Propineb | (20:0.05) | 400:1 | 63 | 35 | 28 |
| 79 | Compound (I-4) + Propineb | (1:0.1) | 10:1 | 56 | 30 | 26 |
| 80 | Compound (I-4) + Propineb | (5:0.1) | 50:1 | 63 | 35 | 28 |
| 81 | Compound (I-4) + Propineb | (20:0.1) | 200:1 | 69 | 40 | 29 |
| 82 | Compound (I-4) + Metiram | (1:0.05) | 20:1 | 63 | 46 | 17 |
| 83 | Compound (I-4) + Metiram | (5:0.05) | 100:1 | 69 | 50 | 19 |
| 84 | Compound (I-4) + Metiram | (20:0.05) | 400:1 | 81 | 54 | 27 |
| 85 | Compound (I-4) + Metiram | (20:0.1) | 200:1 | 84 | 67 | 17 |
| 86 | Compound (I-4) + Benzovindiflupyr | (1:0.05) | 20:1 | 59 | 40 | 20 |
| 87 | Compound (I-4) + Benzovindiflupyr | (5:0.05) | 100:1 | 69 | 44 | 25 |
| 88 | Compound (I-4) + Benzovindiflupyr | (20:0.05) | 400:1 | 78 | 49 | 29 |
| 89 | Compound (I-4) + Benzovindiflupyr | (1:0.1) | 10:1 | 66 | 48 | 18 |
| 90 | Compound (I-4) + Benzovindiflupyr | (5:0.1) | 50:1 | 75 | 52 | 23 |
| 91 | Compound (I-4) + Benzovindiflupyr | (20:0.1) | 200:1 | 81 | 56 | 26 |
| 92 | Compound (I-4) + Fluindapyr | (1:0.05) | 20:1 | 66 | 34 | 31 |
| 93 | Compound (I-4) + Fluindapyr | (5:0.05) | 100:1 | 78 | 39 | 39 |

TABLE F4-continued

The synergistic fungicidal activity of the compositions of the present invention, wherein the representative compounds of formula (I) is particularly compound (I-4) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 94 | Compound (I-4) + Fluindapyr | (20:0.05) | 400:1 | 91 | 44 | 47 |
| 95 | Compound (I-4) + Fluindapyr | (1:0.1) | 10:1 | 75 | 47 | 28 |
| 96 | Compound (I-4) + Fluindapyr | (5:0.1) | 50:1 | 84 | 51 | 34 |
| 97 | Compound (I-4) + Fluindapyr | (20:0.1) | 200:1 | 97 | 55 | 42 |
| 98 | Compound (I-4) + Inpyrfluxam | (1:0.05) | 20:1 | 63 | 33 | 30 |
| 99 | Compound (I-4) + Inpyrfluxam | (5:0.05) | 100:1 | 69 | 38 | 31 |
| 100 | Compound (I-4) + Inpyrfluxam | (20:0.05) | 400:1 | 78 | 43 | 36 |
| 101 | Compound (I-4) + Inpyrfluxam | (1:0.1) | 10:1 | 72 | 44 | 28 |
| 102 | Compound (I-4) + Inpyrfluxam | (5:0.1) | 50:1 | 78 | 48 | 30 |
| 103 | Compound (I-4) + Inpyrfluxam | (20:0.1) | 200:1 | 84 | 52 | 32 |
| 104 | Compound (I-4) + Dithionon | (1:0.05) | 20:1 | 59 | 44 | 15 |
| 105 | Compound (I-4) + Dithionon | (5:0.05) | 100:1 | 66 | 48 | 17 |
| 106 | Compound (I-4) + Dithionon | (20:0.05) | 400:1 | 81 | 52 | 29 |
| 107 | Compound (I-4) + Dithionon | (1:0.1) | 10:1 | 75 | 51 | 25 |
| 108 | Compound (I-4) + Dithionon | (5:0.1) | 50:1 | 78 | 54 | 24 |
| 109 | Compound (I-4) + Dithionon | (20:0.1) | 200:1 | 88 | 58 | 30 |

TABLE F5

The synergistic fungicidal activity of the compositions of the present invention, wherein the representative compounds of formula (I) is particularly compound (I-5) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 1 | Compound (I-5) | 1 | | 53 | | |
| 2 | Compound (I-5) | 5 | | 63 | | |
| 3 | Compound (I-5) | 20 | | 73 | | |
| 4 | Metominostrobin | 0.1 | | 40 | | |
| 5 | Propineb | 0.05 | | 15 | | |
| 6 | Propineb | 0.1 | | 22 | | |
| 7 | Benzovindiflupyr | 0.1 | | 42 | | |
| 8 | Fluindapyr | 0.05 | | 27 | | |
| 9 | Fluindapyr | 0.1 | | 41 | | |
| 10 | Inpyrfluxam | 0.05 | | 25 | | |
| 11 | Inpyrfluxam | 0.1 | | 38 | | |
| 12 | Dithionon | 0.05 | | 38 | | |
| 13 | Dithionon | 0.1 | | 45 | | |
| 14 | Compound (I-5) + Metominostrobin | (20:0.1) | 200:1 | 94 | 84 | 10 |
| 15 | Compound (I-5) + Propineb | (1:0.05) | 20:1 | 75 | 60 | 15 |
| 16 | Compound (I-5) + Propineb | (5:0.05) | 100:1 | 81 | 69 | 12 |
| 17 | Compound (I-5) + Propineb | (1:0.1) | 10:1 | 81 | 64 | 18 |
| 18 | Compound (I-5) + Propineb | (5:0.1) | 50:1 | 84 | 71 | 13 |

TABLE F5-continued

The synergistic fungicidal activity of the compositions of the present invention, wherein the representative compounds of formula (I) is particularly compound (I-5) as component (1) and other components (2) selected from the groups (A) to (R) against *Botrytis cinerea* test in tomato are shown in the table below:

| Sr. No. | Compound | Conc. (ppm) | Ratio | Observed Efficacy (%) | Expected/ Calculated Efficacy | Synergy (Colby's) |
|---|---|---|---|---|---|---|
| 19 | Compound (I-5) + Benzovindiflupyr | (1:0.1) | 10:1 | 84 | 73 | 11 |
| 20 | Compound (I-5) + Fluindapyr | (1:0.05) | 20:1 | 78 | 66 | 12 |
| 21 | Compound (I-5) + Fluindapyr | (5:0.05) | 100:1 | 84 | 73 | 11 |
| 22 | Compound (I-5) + Fluindapyr | (20:0.05) | 400:1 | 97 | 81 | 16 |
| 23 | Compound (I-5) + Fluindapyr | (1:0.1) | 10:1 | 84 | 72 | 12 |
| 24 | Compound (I-5) + Fluindapyr | (20:0.1) | 200:1 | 100 | 84 | 16 |
| 25 | Compound (I-5) + Inpyrfluxam | (1:0.05) | 20:1 | 88 | 65 | 23 |
| 26 | Compound (I-5) + Inpyrfluxam | (5:0.05) | 100:1 | 91 | 73 | 18 |
| 27 | Compound (I-5) + Inpyrfluxam | (20:0.05) | 400:1 | 97 | 80 | 17 |
| 28 | Compound (I-5) + Inpyrfluxam | (1:0.1) | 10:1 | 94 | 71 | 23 |
| 29 | Compound (I-5) + Inpyrfluxam | (5:0.1) | 50:1 | 97 | 77 | 20 |
| 30 | Compound (I-5) + Inpyrfluxam | (20:0.1) | 200:1 | 100 | 83 | 17 |
| 31 | Compound (I-5) + Dithionon | (1:0.05) | 20:1 | 97 | 71 | 26 |
| 32 | Compound (I-5) + Dithionon | (5:0.05) | 100:1 | 100 | 77 | 23 |
| 33 | Compound (I-5) + Dithionon | (20:0.05) | 400:1 | 100 | 83 | 17 |
| 34 | Compound (I-5) + Dithionon | (1:0.1) | 10:1 | 100 | 74 | 26 |
| 35 | Compound (I-5) + Dithionon | (5:0.1) | 50:1 | 100 | 80 | 20 |
| 36 | Compound (I-5) + Dithionon | (20:0.1) | 200:1 | 100 | 85 | 15 |

Having described the invention with reference to certain preferred embodiments, other embodiments will become apparent to one skilled in the art from consideration of the specification. It will be apparent to those skilled in the art that many modifications, both to materials and methods, may be practiced without departing from the scope of the invention.

We claim:

1. A synergistic agrochemical composition comprising a mixture of component (1) and component (2), wherein the component (1) is selected from:

(I-1) N'-(5-chloro-2-methyl-3-(3-methylbenzyl) phenyl)-N-ethyl-N-methylformimidamide;

(I-2) N'-(2,5-dimethyl-3-(4-methylbenzyl) phenyl)-N-ethyl-N-methylformimidamide;

(I-3) N'-(2,5-dimethyl-3-(2-methylbenzyl) phenyl)-N-ethyl-N-methylformimidamide;

(I-4) N-ethyl-N'-(3-(3-fluorobenzyl)-2,5-dimethylphenyl)-N-methylformimidamide;

(I-5) N-ethyl-N'-(5-fluoro-2-methyl-3-(3-methylbenzyl) phenyl)-N-methylformimidamide;

or salts, N-oxides, or stereoisomers thereof;

and the component (2) is selected from the group consisting of:

(A) inhibitors of the sterol synthesis, (B) inhibitors of the respiratory chain at complex I or II, (C) inhibitors of the respiratory chain at complex III, (E) compounds capable of having a multisite action, (K) inhibitors of the melanine biosynthesis, (N) compounds capable of acting as uncoupler, (O) other fungicides, and (P) inhibitors of histone deacetylase, wherein (A) Inhibitors of the sterol biosynthesis are selected from (A002) difenoconazole, (A003) epoxiconazole, (A006) fenpropimorph, (A009) flutriafol, (A018) prothioconazole, (A021) tebuconazole, (A081) mefentrifluconazole, and (A091) triforine;

(B) Inhibitors of the respiratory chain at complex I or II are selected from (B001) benzovindiflupyr, (B002) bixafen, (B003) boscalid, (B005) fluopyram, (B007) fluxapyroxad, (B019) pydiflumetofen, (B028) 3-(difluoromethyl)-1-methyl-N-[(3R)-1,1,3-trimethyl-2,3-dihydro-IH-inden-4-yl]-IH-pyrazole-4-carboxamide (inpyrfluxam), (B030) 3-(difluoromethyl)-N-(7-fluoro-1,1,3-trimethyl-2,3-dihydro-IH-inden-4-yl)-1-methyl-1H-pyrazole-4-carboxamide (Fluindapyr), (B038) N-(5-chloro-2-isopropylbenzyl)-N-cyclopropyl-3-(difluoromethyl)-5-fluoro-1-methyl-IH-pyrazole-4-carboxamide (isoflucpyram), (B065) thifluzamide, and (B069) cyclobutrifluram;

(C) Inhibitors of the respiratory chain at complex III are selected from (C003) azoxystrobin, (C014) metominostrobin, (C016) picoxystrobin, (C017) pyraclostrobin, (C020) trifloxystrobin, (C030) 1-(2-{[1-(4-chlorophenyl) pyrazol-3-yl]oxymethyl}-3-methylphenyl)-1,4-dihydro-4-methyl-5H-tetrazol-5-one (Metyltetraprole), (C031) florylpicoxamid, and (C034) metarylpicoxamid;

(E) Compounds capable to have a multisite action are selected from (E004) chlorothalonil, (E008) copper oxychloride, (E010) dithianon, (E012) folpet, (E013) mancozeb, (E015) metiram, and (E018) propineb;

(K) the inhibitor of the melanin biosynthesis is selected from (K001) tricyclazole;

(N) the compound capable to act as an uncoupler is selected from (N001) fluazinam;

(O) the other fungicide is selected from (O062) 5-fluoro-4-imino-3-methyl-1-[(4-methylphenyl) sulfonyl]-3,4-dihydropyrimidin-2 (1H)-one; and (P) the inhibitor of histone deacetylase is selected from (P094) N-(2-fluorophenyl)-4-[5-(trifluoromethyl)-1,2,4-oxadiazol-3-yl]benzamide.

2. The agrochemical composition according to claim 1, wherein a component (1) and a component (2) are present in a weight ratio of from 500:1 to 1:500.

3. The agrochemical composition according to claim 1, wherein a component (1) and a component (2) are present in a weight ratio of from 50:1 to 1:50.

4. The agrochemical composition according to claim 1, wherein a component (1) and a component (2) are present in a weight ratio of from 10:1 to 1:10.

5. The agrochemical composition according to claim 1, wherein said composition further comprises agriculturally acceptable additives.

6. The agrochemical composition according to claim 5, wherein agriculturally acceptable additives are selected from the group consisting of: solvent(s) or diluent(s), dye(s), wetting agent(s), dispersant(s), emulsifier(s), antifoam(s), preservative(s), thickener(s), adhesive(s), gibberellins, solid carrier(s), liquid carrier(s), gaseous carrier(s), surfactant(s), binder(s), disintegrating agent(s), pH adjuster(s), anti-caking agent(s), anti-freezing agent(s), defoaming agent(s), extender(s), filler(s), stabilizer(s) and/or coloring agent(s) or combination thereof.

7. A method for controlling or preventing diseases caused by phytopathogenic fungi on agricultural crops and/or horticultural crops, the method comprising applying the composition according to claim 1 to the agricultural crops and/or horticultural crops.

8. The method according to claim 7, wherein said phytopathogenic fungi are *Alternaria* spp., *Botrytis* spp., *Colletotrichum* spp., *Erysiphe* spp., *Fusarium* spp., *Hemileia* spp., *Phakopsoraceae* spp., *Pyricularia* spp., *Rhizoctonia* spp., *Septoria* spp, *Puccinia* spp., and *Uromyces* spp.

9. A method for treating a seed or a transgenic plants, the method comprising applying the composition according to claim 1 to the seed or the transgenic plant.

10. A method for controlling or preventing infestation of useful plants by phytopathogenic fungi in agricultural crops and/or horticultural crops, the method comprising: applying the composition according to claim 1 to the plants, to parts thereof or to a locus thereof.

* * * * *